United States Patent
Graham et al.

(10) Patent No.: US 11,755,273 B2
(45) Date of Patent: Sep. 12, 2023

(54) USER INTERFACES FOR AUDIO MEDIA CONTROL

(71) Applicant: Apple Inc., Cupertino, CA (US)

(72) Inventors: David Chance Graham, Columbus, OH (US); Taylor G. Carrigan, San Francisco, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 327 days.

(21) Appl. No.: 17/306,354

(22) Filed: May 3, 2021

(65) Prior Publication Data

US 2021/0255819 A1 Aug. 19, 2021

Related U.S. Application Data

(63) Continuation of application No. 16/583,989, filed on Sep. 26, 2019, now Pat. No. 10,996,917.

(60) Provisional application No. 62/855,852, filed on May 31, 2019.

(51) Int. Cl.
*G06F 3/16* (2006.01)
*H04R 3/00* (2006.01)
*G10K 11/18* (2006.01)
*H04R 1/00* (2006.01)
(Continued)

(52) U.S. Cl.
CPC .......... *G06F 3/162* (2013.01); *G06F 3/04847* (2013.01); *G06F 3/165* (2013.01); *G10K 11/18* (2013.01); *H04M 1/72412* (2021.01); *H04R 1/00* (2013.01); *H04R 3/00* (2013.01)

(58) Field of Classification Search
CPC . G06F 3/16; G06F 3/162; G06F 3/165; G06F 3/167
See application file for complete search history.

(56) References Cited

U.S. PATENT DOCUMENTS

| | | |
|---|---|---|
| 5,202,961 A | 4/1993 | Mills et al. |
| 5,305,435 A | 4/1994 | Bronson |
| 5,347,628 A | 9/1994 | Welch et al. |

(Continued)

FOREIGN PATENT DOCUMENTS

| | | |
|---|---|---|
| AR | 060465 A1 | 6/2008 |
| AU | 2007100826 A4 | 9/2007 |

(Continued)

OTHER PUBLICATIONS

Corrected Notice of Allowance received for U.S. Appl. No. 16/836,571, dated Nov. 4, 2021, 4 pages.

(Continued)

*Primary Examiner* — Joseph Saunders, Jr.
(74) *Attorney, Agent, or Firm* — DLA Piper LLP (US)

(57) ABSTRACT

A method includes displaying a first media information affordance representing a first media item in response to detecting an indication that a physical proximity between an electronic device and an external device satisfies a proximity condition. The electronic device receives a first input representing selection of the first media information affordance. In response to receiving the first input: in accordance with a determination that the first input is a first type of input, a process to playback the first media item is initiated; and in accordance with a determination that the first input is a second type of input different from the first type of input, a second media information affordance representing the first media item is displayed.

33 Claims, 40 Drawing Sheets

(51) Int. Cl.
  *G06F 3/04847*  (2022.01)
  *H04M 1/72412*  (2021.01)

(56) References Cited

U.S. PATENT DOCUMENTS

| | | | |
|---|---|---|---|
| 5,404,316 A | 4/1995 | Klingler et al. |
| 5,463,725 A | 10/1995 | Henckel et al. |
| 5,495,566 A | 2/1996 | Kwatinetz |
| 5,513,342 A | 4/1996 | Leong et al. |
| 5,519,828 A | 5/1996 | Rayner |
| 5,521,841 A | 5/1996 | Arman et al. |
| 5,557,724 A | 9/1996 | Sampat et al. |
| 5,568,603 A | 10/1996 | Chen et al. |
| 5,611,060 A | 3/1997 | Belfiore et al. |
| 5,614,940 A | 3/1997 | Cobbley et al. |
| 5,682,326 A | 10/1997 | Klingler et al. |
| 5,684,970 A | 11/1997 | Asuma et al. |
| 5,692,213 A | 11/1997 | Harrison et al. |
| 5,726,687 A | 3/1998 | Belfiore et al. |
| 5,732,184 A | 3/1998 | Chao et al. |
| 5,745,096 A | 4/1998 | Ludolph et al. |
| 5,751,260 A | 5/1998 | Nappi et al. |
| 5,754,174 A | 5/1998 | Carpenter et al. |
| 5,758,180 A | 5/1998 | Duffy et al. |
| 5,760,767 A | 6/1998 | Shore et al. |
| 5,760,772 A | 6/1998 | Austin |
| 5,778,053 A | 7/1998 | Skarbo et al. |
| 5,793,366 A | 8/1998 | Mano et al. |
| 5,841,971 A | 11/1998 | Longginou et al. |
| 5,864,868 A | 1/1999 | Contois |
| 5,872,566 A | 2/1999 | Bates et al. |
| 5,872,922 A | 2/1999 | Hogan et al. |
| 5,874,958 A | 2/1999 | Ludolph |
| 5,880,725 A | 3/1999 | Southgate |
| 5,880,733 A | 3/1999 | Horvitz et al. |
| 5,892,507 A | 4/1999 | Moorby |
| 5,936,623 A | 8/1999 | Amro |
| 5,999,173 A | 12/1999 | Ubillos |
| 6,011,537 A | 1/2000 | Slotznick |
| 6,016,248 A | 1/2000 | Anzai et al. |
| 6,023,275 A | 2/2000 | Horvitz et al. |
| 6,026,389 A | 2/2000 | Nakajima et al. |
| 6,031,529 A | 2/2000 | Migos et al. |
| 6,061,062 A | 5/2000 | Venolia |
| 6,072,503 A | 6/2000 | Tani et al. |
| 6,081,256 A | 6/2000 | Martin et al. |
| 6,094,197 A | 7/2000 | Buxton et al. |
| 6,115,037 A | 9/2000 | Sumiyoshi et al. |
| 6,118,450 A | 9/2000 | Proehl et al. |
| 6,140,987 A | 10/2000 | Stein et al. |
| 6,166,736 A | 12/2000 | Hugh |
| 6,204,840 B1 | 3/2001 | Petelycky et al. |
| 6,208,342 B1 | 3/2001 | Mugura et al. |
| 6,236,400 B1 | 5/2001 | Guerrero |
| 6,262,724 B1 | 7/2001 | Crow et al. |
| 6,308,187 B1 | 10/2001 | Destefano |
| 6,310,613 B1 | 10/2001 | Tanaka et al. |
| 6,317,784 B1 | 11/2001 | Mackintosh et al. |
| 6,323,846 B1 | 11/2001 | Westerman et al. |
| 6,332,147 B1 | 12/2001 | Moran et al. |
| 6,351,765 B1 | 2/2002 | Pietropaolo et al. |
| 6,362,837 B1 | 3/2002 | Ginn |
| 6,363,395 B1 | 3/2002 | Tanaka et al. |
| 6,366,296 B1 | 4/2002 | Boreczky et al. |
| 6,369,835 B1 | 4/2002 | Lin |
| 6,393,430 B1 | 5/2002 | Van et al. |
| 6,393,462 B1 | 5/2002 | Mullen-Schultz |
| 6,446,080 B1 | 9/2002 | Van Ryzin et al. |
| 6,452,609 B1 | 9/2002 | Katinsky et al. |
| 6,456,305 B1 | 9/2002 | Qureshi et al. |
| 6,477,117 B1 | 11/2002 | Narayanaswami et al. |
| 6,489,951 B1 | 12/2002 | Wong et al. |
| 6,504,934 B1 | 1/2003 | Kasai et al. |
| 6,515,681 B1 | 2/2003 | Knight |
| 6,515,988 B1 | 2/2003 | Eldridge et al. |
| 6,538,665 B2 | 3/2003 | Crow et al. |
| 6,544,295 B1 | 4/2003 | Bodnar et al. |
| 6,556,222 B1 | 4/2003 | Narayanaswami |
| 6,570,557 B1 | 5/2003 | Westerman et al. |
| 6,577,330 B1 | 6/2003 | Tsuda et al. |
| 6,584,479 B2 | 6/2003 | Chang et al. |
| 6,587,127 B1 | 7/2003 | Stojakovic et al. |
| 6,600,936 B1 | 7/2003 | Kärkkäinen et al. |
| 6,674,452 B1 | 1/2004 | Kraft et al. |
| 6,677,932 B1 | 1/2004 | Westerman |
| 6,677,965 B1 | 1/2004 | Ullmann et al. |
| 6,725,427 B2 | 4/2004 | Freeman et al. |
| 6,833,848 B1 | 12/2004 | Wolff et al. |
| 6,834,371 B1 | 12/2004 | Jensen et al. |
| 6,850,256 B2 | 2/2005 | Crow et al. |
| 6,922,147 B1 | 7/2005 | Viksnins et al. |
| 6,975,306 B2 | 12/2005 | Hinckley et al. |
| 7,081,905 B1 | 7/2006 | Raghunath |
| 7,091,964 B2 | 8/2006 | Wong et al. |
| 7,111,240 B2 | 9/2006 | Crow et al. |
| 7,191,411 B2 | 3/2007 | Moehrle |
| 7,240,297 B1 | 7/2007 | Anderson et al. |
| 7,315,984 B2 | 1/2008 | Crow et al. |
| 7,318,196 B2 | 1/2008 | Crow et al. |
| 7,370,244 B2 | 5/2008 | Breitling et al. |
| 7,415,720 B2 | 8/2008 | Jung |
| 7,441,207 B2 | 10/2008 | Filner |
| 7,454,192 B1 | 11/2008 | Zhu |
| 7,458,025 B2 | 11/2008 | Crow et al. |
| 7,479,949 B2 | 1/2009 | Jobs et al. |
| 7,492,350 B2 | 2/2009 | Fabre et al. |
| 7,526,728 B2 | 4/2009 | Apparao et al. |
| 7,546,470 B2 | 6/2009 | Schultz |
| 7,571,014 B1 | 8/2009 | Lambourne et al. |
| 7,581,186 B2 | 8/2009 | Dowdy et al. |
| 7,593,749 B2 | 9/2009 | Vallström et al. |
| 7,596,761 B2 | 9/2009 | Lemay et al. |
| 7,656,393 B2 | 2/2010 | King et al. |
| 7,710,393 B2 | 5/2010 | Tsuk et al. |
| 7,730,223 B1 | 6/2010 | Bavor et al. |
| 7,750,893 B2 | 7/2010 | Hashimoto et al. |
| 7,831,054 B2 | 11/2010 | Ball et al. |
| 7,860,936 B1 | 12/2010 | Newstadt et al. |
| 7,996,792 B2 | 8/2011 | Anzures et al. |
| 8,028,323 B2 | 9/2011 | Weel |
| 8,042,157 B2 | 10/2011 | Bennett et al. |
| 8,046,804 B2 | 10/2011 | Kelts |
| 8,060,571 B2 | 11/2011 | Rao |
| 8,060,825 B2 | 11/2011 | Chaudhri et al. |
| 8,077,157 B2 | 12/2011 | Sengupta et al. |
| 8,116,807 B2 | 2/2012 | Matas |
| 8,146,019 B2 | 3/2012 | Kim et al. |
| 8,171,137 B1 | 5/2012 | Parks et al. |
| 8,196,043 B2 | 6/2012 | Crow et al. |
| 8,217,906 B2 | 7/2012 | Sinclair |
| 8,224,894 B1 | 7/2012 | Parks et al. |
| 8,225,191 B1 | 7/2012 | Kalman |
| 8,234,395 B2 | 7/2012 | Millington |
| 8,260,879 B2 | 9/2012 | Chan |
| 8,264,465 B2 | 9/2012 | Grant et al. |
| 8,280,539 B2 | 10/2012 | Jehan et al. |
| 8,290,603 B1 | 10/2012 | Lambourne |
| 8,305,356 B1 | 11/2012 | Jang |
| 8,386,563 B2 | 2/2013 | Parks et al. |
| 8,392,259 B2 | 3/2013 | Macgillivray et al. |
| 8,392,617 B1 | 3/2013 | Weber et al. |
| 8,434,133 B2 | 4/2013 | Kulkarni et al. |
| 8,458,780 B1 | 6/2013 | Takkallapally et al. |
| 8,467,766 B2 | 6/2013 | Rackley, III et al. |
| 8,478,363 B2 | 7/2013 | Levien et al. |
| 8,478,816 B2 | 7/2013 | Parks et al. |
| 8,531,427 B2 | 9/2013 | Jang |
| 8,564,543 B2 | 10/2013 | Chaudhri |
| 8,572,513 B2 | 10/2013 | Chaudhri et al. |
| 8,587,528 B2 | 11/2013 | Chaudhri |
| 8,589,823 B2 | 11/2013 | Lemay et al. |
| 8,613,070 B1 | 12/2013 | Borzycki et al. |
| 8,624,836 B1 | 1/2014 | Miller et al. |
| 8,682,722 B1 | 3/2014 | Des Jardins et al. |

(56) References Cited

U.S. PATENT DOCUMENTS

| | | |
|---|---|---|
| 8,689,128 B2 | 4/2014 | Chaudhri et al. |
| 8,698,762 B2 | 4/2014 | Wagner et al. |
| 8,718,556 B2 | 5/2014 | Lee et al. |
| 8,736,557 B2 | 5/2014 | Chaudhri et al. |
| 8,769,624 B2 | 7/2014 | Cotterill |
| 8,811,951 B1 | 8/2014 | Faaborg et al. |
| 8,812,601 B2 | 8/2014 | Hsieh et al. |
| 8,830,181 B1 | 9/2014 | Clark et al. |
| 8,860,674 B2 | 10/2014 | Lee et al. |
| 8,875,046 B2 | 10/2014 | Jitkoff |
| 8,884,874 B1 | 11/2014 | Kim et al. |
| 8,886,710 B2 | 11/2014 | Evans et al. |
| 8,914,752 B1 | 12/2014 | Spiegel |
| 8,914,840 B2 | 12/2014 | Reisman |
| 8,943,410 B2 | 1/2015 | Ubillos |
| 8,984,431 B2 | 3/2015 | Newman et al. |
| 9,002,322 B2 | 4/2015 | Cotterill |
| 9,042,556 B2 | 5/2015 | Kallai et al. |
| 9,084,003 B1 | 7/2015 | Sanio et al. |
| 9,095,779 B2 | 8/2015 | Chan et al. |
| 9,100,944 B2 | 8/2015 | Sauhta et al. |
| 9,112,849 B1 | 8/2015 | Werkelin Ahlin et al. |
| 9,134,902 B2 | 9/2015 | Kang et al. |
| 9,185,062 B1 | 11/2015 | Yang et al. |
| 9,191,988 B2 | 11/2015 | Newham |
| 9,195,219 B2 | 11/2015 | Hong et al. |
| 9,202,509 B2 | 12/2015 | Kallai et al. |
| 9,244,584 B2 | 1/2016 | Fino |
| 9,247,363 B2 | 1/2016 | Triplett et al. |
| 9,251,787 B1 | 2/2016 | Hart et al. |
| 9,269,083 B1 | 2/2016 | Jarajapu et al. |
| 9,294,476 B1 | 3/2016 | Lurey et al. |
| 9,294,853 B1 | 3/2016 | Dhaundiyal |
| 9,319,782 B1 | 4/2016 | Crump et al. |
| 9,374,607 B2 | 6/2016 | Bates et al. |
| 9,395,905 B2 | 7/2016 | Wherry |
| 9,400,489 B2 | 7/2016 | Kim et al. |
| D765,118 S | 8/2016 | Bachman et al. |
| 9,407,624 B1 | 8/2016 | Myers et al. |
| 9,431,021 B1 | 8/2016 | Scalise et al. |
| 9,450,812 B1 | 9/2016 | Lee et al. |
| 9,451,144 B2 | 9/2016 | Dye |
| 9,477,208 B2 | 10/2016 | Park et al. |
| 9,489,106 B2 | 11/2016 | Chaudhri et al. |
| D773,510 S | 12/2016 | Foss et al. |
| 9,519,413 B2 | 12/2016 | Bates |
| 9,549,323 B2 | 1/2017 | Lee et al. |
| 9,582,178 B2 | 2/2017 | Grant et al. |
| 9,628,414 B1 | 4/2017 | Umapathy et al. |
| D789,381 S | 6/2017 | Okumura et al. |
| 9,680,927 B2 | 6/2017 | Miller et al. |
| 9,680,982 B2 | 6/2017 | Fiedler |
| 9,710,639 B1 | 7/2017 | Saini |
| 9,727,749 B2 | 8/2017 | Tzeng et al. |
| 9,794,720 B1 | 10/2017 | Kadri |
| 9,798,443 B1 | 10/2017 | Gray |
| 9,812,128 B2 | 11/2017 | Mixter et al. |
| 9,820,323 B1 | 11/2017 | Young et al. |
| 9,826,083 B2 | 11/2017 | Kanevsky et al. |
| 9,846,685 B2 | 12/2017 | Li |
| 9,847,999 B2 | 12/2017 | Van Os et al. |
| 9,898,250 B1 | 2/2018 | Williams et al. |
| 9,922,317 B2 | 3/2018 | Bak et al. |
| 9,954,989 B2 | 4/2018 | Zhou |
| 9,967,401 B2 | 5/2018 | Coffman et al. |
| 10,055,094 B2 | 8/2018 | Li et al. |
| 10,089,607 B2 | 10/2018 | Ziat et al. |
| 10,089,983 B1 | 10/2018 | Gella et al. |
| 10,096,015 B2 | 10/2018 | Bak et al. |
| 10,129,044 B2 | 11/2018 | Kangshang et al. |
| 10,142,122 B1 | 11/2018 | Hill et al. |
| 10,178,234 B2 | 1/2019 | Coffman et al. |
| 10,182,138 B2 | 1/2019 | Motika et al. |
| 10,200,468 B2 | 2/2019 | Leban et al. |
| 10,225,711 B2 | 3/2019 | Parks et al. |
| 10,237,141 B2 | 3/2019 | Sasaki et al. |
| 10,248,779 B2 | 4/2019 | Song et al. |
| 10,284,980 B1 | 5/2019 | Woo et al. |
| 10,299,300 B1 | 5/2019 | Young |
| 10,303,422 B1 | 5/2019 | Woo et al. |
| 10,304,463 B2 | 5/2019 | Mixter et al. |
| 10,310,725 B2 | 6/2019 | Smith et al. |
| 10,334,054 B2 | 6/2019 | Van Os et al. |
| 10,412,206 B1 | 9/2019 | Liang et al. |
| 10,417,037 B2 | 9/2019 | Gruber et al. |
| 10,436,977 B2 | 10/2019 | Bergman et al. |
| 10,454,781 B2 | 10/2019 | Sasaki et al. |
| 10,490,195 B1 | 11/2019 | Krishnamoorthy et al. |
| 10,511,456 B2 | 12/2019 | Smith et al. |
| 10,523,625 B1 | 12/2019 | Allen et al. |
| 10,524,300 B2 | 12/2019 | Ueda et al. |
| 10,558,546 B2 | 2/2020 | Cranfill et al. |
| 10,567,515 B1 | 2/2020 | Bao |
| 10,705,701 B2 | 7/2020 | Pisula et al. |
| 10,713,699 B1 | 7/2020 | Lien et al. |
| 10,732,819 B2 | 8/2020 | Wang et al. |
| 10,749,967 B2 | 8/2020 | Van Os et al. |
| 10,779,085 B1 | 9/2020 | Carrigan |
| 10,802,843 B1 | 10/2020 | Carrigan et al. |
| 10,824,299 B2 | 11/2020 | Bai |
| 10,833,887 B2 | 11/2020 | Wu |
| 10,924,446 B1 | 2/2021 | Paul |
| 10,963,145 B1 | 3/2021 | Voss et al. |
| 11,079,913 B1 | 8/2021 | Kim et al. |
| 2001/0030597 A1 | 10/2001 | Inoue et al. |
| 2001/0031622 A1 | 10/2001 | Kivela et al. |
| 2001/0039497 A1 | 11/2001 | Hubbard |
| 2001/0043514 A1 | 11/2001 | Kita et al. |
| 2001/0049627 A1 | 12/2001 | Simpson |
| 2001/0050687 A1 | 12/2001 | Iida et al. |
| 2002/0002039 A1 | 1/2002 | Qureshey et al. |
| 2002/0015024 A1 | 2/2002 | Westerman et al. |
| 2002/0026442 A1 | 2/2002 | Lipscomb et al. |
| 2002/0048224 A1 | 4/2002 | Dygert et al. |
| 2002/0054158 A1 | 5/2002 | Asami |
| 2002/0054164 A1 | 5/2002 | Uemura |
| 2002/0057262 A1 | 5/2002 | Patrick et al. |
| 2002/0059295 A1 | 5/2002 | Ludtke et al. |
| 2002/0068600 A1 | 6/2002 | Chihara et al. |
| 2002/0080151 A1 | 6/2002 | Venolia |
| 2002/0115478 A1 | 8/2002 | Fujisawa et al. |
| 2002/0116276 A1 | 8/2002 | Ottley |
| 2002/0122066 A1 | 9/2002 | Bates et al. |
| 2002/0137565 A1 | 9/2002 | Blanco |
| 2002/0142734 A1 | 10/2002 | Wickstead |
| 2002/0154173 A1 | 10/2002 | Etgen et al. |
| 2002/0162005 A1 | 10/2002 | Ueda et al. |
| 2002/0168938 A1 | 11/2002 | Chang |
| 2002/0191028 A1 | 12/2002 | Senechalle et al. |
| 2002/0198909 A1 | 12/2002 | Huynh et al. |
| 2003/0028382 A1 | 2/2003 | Chambers et al. |
| 2003/0028639 A1 | 2/2003 | Yamamoto et al. |
| 2003/0030673 A1 | 2/2003 | Ho |
| 2003/0052901 A1 | 3/2003 | Fukuchi |
| 2003/0055977 A1 | 3/2003 | Miller |
| 2003/0067908 A1 | 4/2003 | Mattaway et al. |
| 2003/0076301 A1 | 4/2003 | Tsuk et al. |
| 2003/0079057 A1 | 4/2003 | Ruskin et al. |
| 2003/0081506 A1 | 5/2003 | Karhu et al. |
| 2003/0097358 A1 | 5/2003 | Mendez et al. |
| 2003/0097413 A1 | 5/2003 | Vishik et al. |
| 2003/0112938 A1 | 6/2003 | Kanakubo et al. |
| 2003/0122787 A1 | 7/2003 | Zimmerman et al. |
| 2003/0128192 A1 | 7/2003 | Van Os |
| 2003/0160861 A1 | 8/2003 | Barlow et al. |
| 2003/0182139 A1 | 9/2003 | Harris et al. |
| 2003/0188183 A1 | 10/2003 | Lee et al. |
| 2003/0229900 A1 | 12/2003 | Reisman |
| 2004/0019640 A1 | 1/2004 | Bartram et al. |
| 2004/0027371 A1 | 2/2004 | Jaeger |
| 2004/0032955 A1 | 2/2004 | Hashimoto et al. |
| 2004/0046638 A1 | 3/2004 | Kawasaki |
| 2004/0055446 A1 | 3/2004 | Robbin et al. |
| 2004/0056837 A1 | 3/2004 | Koga et al. |

(56) References Cited

U.S. PATENT DOCUMENTS

| | | |
|---|---|---|
| 2004/0073432 A1 | 4/2004 | Stone |
| 2004/0100479 A1 | 5/2004 | Nakano et al. |
| 2004/0104896 A1 | 6/2004 | Suraqui |
| 2004/0122683 A1 | 6/2004 | Grossman et al. |
| 2004/0125088 A1 | 7/2004 | Zimmerman et al. |
| 2004/0130581 A1 | 7/2004 | Howard et al. |
| 2004/0139398 A1 | 7/2004 | Testa et al. |
| 2004/0140956 A1 | 7/2004 | Kushler et al. |
| 2004/0155907 A1 | 8/2004 | Yamaguchi et al. |
| 2004/0168118 A1 | 8/2004 | Wong et al. |
| 2004/0181695 A1 | 9/2004 | Walker et al. |
| 2004/0189714 A1 | 9/2004 | Fox et al. |
| 2004/0235520 A1 | 11/2004 | Cadiz et al. |
| 2004/0237048 A1 | 11/2004 | Tojo et al. |
| 2004/0242200 A1 | 12/2004 | Maeoka et al. |
| 2004/0250217 A1 | 12/2004 | Tojo et al. |
| 2004/0261010 A1 | 12/2004 | Matsuishi |
| 2004/0264916 A1 | 12/2004 | Van et al. |
| 2004/0268400 A1 | 12/2004 | Barde et al. |
| 2005/0012723 A1 | 1/2005 | Pallakoff |
| 2005/0021418 A1 | 1/2005 | Marcus et al. |
| 2005/0024341 A1 | 2/2005 | Gillespie et al. |
| 2005/0052458 A1 | 3/2005 | Lambert |
| 2005/0071188 A1 | 3/2005 | Thuerk |
| 2005/0093868 A1 | 5/2005 | Hinckley |
| 2005/0096009 A1 | 5/2005 | Ackley |
| 2005/0097135 A1 | 5/2005 | Epperson et al. |
| 2005/0117752 A1 | 6/2005 | Iima et al. |
| 2005/0144247 A1 | 6/2005 | Christensen et al. |
| 2005/0144452 A1 | 6/2005 | Lynch et al. |
| 2005/0144568 A1 | 6/2005 | Gruen et al. |
| 2005/0146534 A1 | 7/2005 | Fong et al. |
| 2005/0160372 A1 | 7/2005 | Gruen et al. |
| 2005/0162402 A1 | 7/2005 | Watanachote |
| 2005/0177445 A1 | 8/2005 | Church |
| 2005/0181774 A1 | 8/2005 | Miyata |
| 2005/0192924 A1 | 9/2005 | Drucker et al. |
| 2005/0210412 A1 | 9/2005 | Matthews et al. |
| 2005/0216839 A1 | 9/2005 | Salvucci |
| 2005/0220304 A1 | 10/2005 | Lenoir et al. |
| 2005/0229112 A1 | 10/2005 | Clay et al. |
| 2005/0240756 A1 | 10/2005 | Mayer |
| 2005/0251566 A1 | 11/2005 | Weel |
| 2005/0268237 A1 | 12/2005 | Crane et al. |
| 2005/0275628 A1 | 12/2005 | Balakrishnan et al. |
| 2005/0278587 A1 | 12/2005 | Breitling et al. |
| 2006/0001645 A1 | 1/2006 | Drucker et al. |
| 2006/0002523 A1 | 1/2006 | Bettis et al. |
| 2006/0019649 A1 | 1/2006 | Feinleib et al. |
| 2006/0020637 A1 | 1/2006 | Kedem |
| 2006/0020904 A1 | 1/2006 | Aaltonen et al. |
| 2006/0026535 A1 | 2/2006 | Hotelling et al. |
| 2006/0026536 A1 | 2/2006 | Hotelling et al. |
| 2006/0038796 A1 | 2/2006 | Hinckley et al. |
| 2006/0050054 A1 | 3/2006 | Liang et al. |
| 2006/0085751 A1 | 4/2006 | O'brien et al. |
| 2006/0085766 A1 | 4/2006 | Dominowska et al. |
| 2006/0125799 A1 | 6/2006 | Hillis et al. |
| 2006/0132456 A1 | 6/2006 | Anson |
| 2006/0132460 A1 | 6/2006 | Kolmykov-Zotov et al. |
| 2006/0132469 A1 | 6/2006 | Lai et al. |
| 2006/0143716 A1 | 6/2006 | Ikemoto |
| 2006/0146074 A1 | 7/2006 | Harrison |
| 2006/0148455 A1 | 7/2006 | Kim |
| 2006/0156239 A1 | 7/2006 | Jobs et al. |
| 2006/0161621 A1 | 7/2006 | Rosenberg |
| 2006/0161870 A1 | 7/2006 | Hotelling et al. |
| 2006/0161871 A1 | 7/2006 | Hotelling et al. |
| 2006/0176278 A1 | 8/2006 | Mathews et al. |
| 2006/0178110 A1 | 8/2006 | Nurminen et al. |
| 2006/0185005 A1 | 8/2006 | Graves et al. |
| 2006/0197753 A1 | 9/2006 | Hotelling |
| 2006/0206709 A1 | 9/2006 | Labrou et al. |
| 2006/0210092 A1 | 9/2006 | Navid |
| 2006/0217104 A1 | 9/2006 | Cho |
| 2006/0224882 A1 | 10/2006 | Chin |
| 2006/0227106 A1 | 10/2006 | Hashimoto et al. |
| 2006/0236847 A1 | 10/2006 | Withop |
| 2006/0246874 A1 | 11/2006 | Sullivan |
| 2006/0250578 A1 | 11/2006 | Pohl et al. |
| 2006/0256090 A1 | 11/2006 | Huppi |
| 2006/0258289 A1 | 11/2006 | Dua |
| 2006/0268020 A1 | 11/2006 | Han |
| 2006/0271425 A1 | 11/2006 | Goodman et al. |
| 2006/0271864 A1 | 11/2006 | Satterfield et al. |
| 2006/0271867 A1 | 11/2006 | Wang et al. |
| 2006/0279541 A1 | 12/2006 | Kim et al. |
| 2006/0281449 A1 | 12/2006 | Kun et al. |
| 2006/0286971 A1 | 12/2006 | Maly et al. |
| 2006/0288226 A1 | 12/2006 | Kowal |
| 2007/0011614 A1 | 1/2007 | Crow et al. |
| 2007/0013671 A1 | 1/2007 | Zadesky et al. |
| 2007/0027682 A1 | 2/2007 | Bennett |
| 2007/0033295 A1 | 2/2007 | Marriott |
| 2007/0048714 A1 | 3/2007 | Plastina et al. |
| 2007/0053268 A1 | 3/2007 | Crandall et al. |
| 2007/0070045 A1 | 3/2007 | Sung et al. |
| 2007/0070066 A1 | 3/2007 | Bakhash |
| 2007/0073649 A1 | 3/2007 | Kikkoji et al. |
| 2007/0085841 A1 | 4/2007 | Tsuk et al. |
| 2007/0097090 A1 | 5/2007 | Battles |
| 2007/0097093 A1 | 5/2007 | Ohshita et al. |
| 2007/0113294 A1 | 5/2007 | Field et al. |
| 2007/0115933 A1 | 5/2007 | Muhamed et al. |
| 2007/0124680 A1 | 5/2007 | Robbin et al. |
| 2007/0126715 A1 | 6/2007 | Funamoto |
| 2007/0136679 A1 | 6/2007 | Yang |
| 2007/0136778 A1 | 6/2007 | Birger et al. |
| 2007/0143495 A1 | 6/2007 | Porat |
| 2007/0150842 A1 | 6/2007 | Chaudhri et al. |
| 2007/0152979 A1 | 7/2007 | Jobs et al. |
| 2007/0157089 A1 | 7/2007 | Van Os et al. |
| 2007/0157094 A1 | 7/2007 | Lemay et al. |
| 2007/0157103 A1 | 7/2007 | Arneson et al. |
| 2007/0162963 A1 | 7/2007 | Penet et al. |
| 2007/0168369 A1 | 7/2007 | Bruns |
| 2007/0168413 A1 | 7/2007 | Barletta et al. |
| 2007/0180492 A1 | 8/2007 | Hassan et al. |
| 2007/0186106 A1 | 8/2007 | Ting et al. |
| 2007/0186235 A1 | 8/2007 | Jarman et al. |
| 2007/0191008 A1 | 8/2007 | Bucher et al. |
| 2007/0192744 A1 | 8/2007 | Reponen |
| 2007/0198111 A1 | 8/2007 | Oetzel et al. |
| 2007/0226645 A1 | 9/2007 | Kongqiao et al. |
| 2007/0226778 A1 | 9/2007 | Pietruszka |
| 2007/0229221 A1 | 10/2007 | Saotome |
| 2007/0260547 A1 | 11/2007 | Little |
| 2007/0283011 A1 | 12/2007 | Rakowski et al. |
| 2007/0294182 A1 | 12/2007 | Hammad |
| 2008/0011827 A1 | 1/2008 | Little et al. |
| 2008/0016368 A1 | 1/2008 | Adams |
| 2008/0016468 A1 | 1/2008 | Chambers et al. |
| 2008/0016537 A1 | 1/2008 | Little et al. |
| 2008/0017721 A1 | 1/2008 | Zehnacker |
| 2008/0027947 A1 | 1/2008 | Pritchett et al. |
| 2008/0034011 A1 | 2/2008 | Cisler et al. |
| 2008/0034289 A1 | 2/2008 | Doepke et al. |
| 2008/0036743 A1 | 2/2008 | Westerman et al. |
| 2008/0037951 A1 | 2/2008 | Cho et al. |
| 2008/0040786 A1 | 2/2008 | Chang et al. |
| 2008/0042866 A1 | 2/2008 | Morse et al. |
| 2008/0055264 A1 | 3/2008 | Anzures et al. |
| 2008/0057926 A1 | 3/2008 | Forstall et al. |
| 2008/0062141 A1 | 3/2008 | Chaudhri |
| 2008/0065505 A1 | 3/2008 | Plastina et al. |
| 2008/0066016 A1 | 3/2008 | Dowdy et al. |
| 2008/0075368 A1 | 3/2008 | Kuzmin |
| 2008/0081558 A1 | 4/2008 | Dunko et al. |
| 2008/0082939 A1 | 4/2008 | Nash et al. |
| 2008/0084400 A1 | 4/2008 | Rosenberg |
| 2008/0091717 A1 | 4/2008 | Garbow et al. |
| 2008/0094367 A1 | 4/2008 | Van De Ven et al. |
| 2008/0100693 A1 | 5/2008 | Jobs et al. |
| 2008/0109764 A1 | 5/2008 | Linnamaki |

(56) References Cited

U.S. PATENT DOCUMENTS

| | | |
|---|---|---|
| 2008/0114678 A1 | 5/2008 | Bennett et al. |
| 2008/0114980 A1 | 5/2008 | Sridhar |
| 2008/0122794 A1 | 5/2008 | Koiso et al. |
| 2008/0122796 A1 | 5/2008 | Jobs et al. |
| 2008/0126935 A1 | 5/2008 | Blomgren |
| 2008/0147735 A1 | 6/2008 | Sloo |
| 2008/0155413 A1 | 6/2008 | Ubillos et al. |
| 2008/0155417 A1 | 6/2008 | Vallone et al. |
| 2008/0155474 A1 | 6/2008 | Duhig et al. |
| 2008/0158170 A1 | 7/2008 | Herz et al. |
| 2008/0160974 A1 | 7/2008 | Vartiainen et al. |
| 2008/0163127 A1 | 7/2008 | Newell et al. |
| 2008/0165141 A1 | 7/2008 | Christie |
| 2008/0165152 A1 | 7/2008 | Forstall et al. |
| 2008/0165153 A1 | 7/2008 | Platzer et al. |
| 2008/0168185 A1 | 7/2008 | Robbin et al. |
| 2008/0168384 A1 | 7/2008 | Platzer et al. |
| 2008/0168395 A1 | 7/2008 | Ording et al. |
| 2008/0168403 A1 | 7/2008 | Westerman et al. |
| 2008/0190266 A1 | 8/2008 | Kim et al. |
| 2008/0201454 A1 | 8/2008 | Soffer |
| 2008/0208762 A1 | 8/2008 | Arthur et al. |
| 2008/0214163 A1 | 9/2008 | Onyon et al. |
| 2008/0222546 A1 | 9/2008 | Mudd et al. |
| 2008/0225007 A1 | 9/2008 | Nakadaira et al. |
| 2008/0225013 A1 | 9/2008 | Muylkens et al. |
| 2008/0229409 A1 | 9/2008 | Miller et al. |
| 2008/0250319 A1 | 10/2008 | Lee et al. |
| 2008/0259829 A1 | 10/2008 | Rosenblatt |
| 2008/0273712 A1 | 11/2008 | Eichfeld et al. |
| 2008/0273713 A1 | 11/2008 | Hartung et al. |
| 2008/0282202 A1 | 11/2008 | Sunday |
| 2008/0285772 A1 | 11/2008 | Haulick et al. |
| 2008/0292074 A1 | 11/2008 | Boni et al. |
| 2008/0313257 A1 | 12/2008 | Allen et al. |
| 2008/0320391 A1 | 12/2008 | Lemay et al. |
| 2009/0002335 A1 | 1/2009 | Chaudhri |
| 2009/0002396 A1 | 1/2009 | Andrews et al. |
| 2009/0006846 A1 | 1/2009 | Rosenblatt |
| 2009/0006958 A1 | 1/2009 | Pohjola et al. |
| 2009/0007188 A1 | 1/2009 | Omernick |
| 2009/0031375 A1 | 1/2009 | Sullivan et al. |
| 2009/0051649 A1 | 2/2009 | Rondel |
| 2009/0054044 A1 | 2/2009 | Ikemori et al. |
| 2009/0055377 A1 | 2/2009 | Hedge et al. |
| 2009/0058822 A1 | 3/2009 | Chaudhri |
| 2009/0060170 A1 | 3/2009 | Coughlan et al. |
| 2009/0061837 A1 | 3/2009 | Chaudhri et al. |
| 2009/0063851 A1 | 3/2009 | Nijdam |
| 2009/0075694 A1 | 3/2009 | Kim et al. |
| 2009/0077491 A1 | 3/2009 | Kim |
| 2009/0094681 A1 | 4/2009 | Sadler et al. |
| 2009/0100383 A1 | 4/2009 | Sunday et al. |
| 2009/0119754 A1 | 5/2009 | Schubert |
| 2009/0122149 A1 | 5/2009 | Ishii |
| 2009/0125571 A1 | 5/2009 | Kiilerich et al. |
| 2009/0128500 A1 | 5/2009 | Sinclair |
| 2009/0133051 A1 | 5/2009 | Hildreth |
| 2009/0135678 A1 | 5/2009 | Godat |
| 2009/0140960 A1 | 6/2009 | Mahowald et al. |
| 2009/0140991 A1 | 6/2009 | Takasaki et al. |
| 2009/0144391 A1 | 6/2009 | Jung et al. |
| 2009/0144451 A1 | 6/2009 | Cabezas et al. |
| 2009/0144623 A1 | 6/2009 | Jung |
| 2009/0153289 A1 | 6/2009 | Hope et al. |
| 2009/0158390 A1 | 6/2009 | Guan |
| 2009/0164581 A1 | 6/2009 | Bove et al. |
| 2009/0165107 A1 | 6/2009 | Tojo et al. |
| 2009/0174677 A1 | 7/2009 | Gehani et al. |
| 2009/0174680 A1 | 7/2009 | Anzures et al. |
| 2009/0174763 A1 | 7/2009 | Bengtsson et al. |
| 2009/0177966 A1 | 7/2009 | Chaudhri |
| 2009/0187423 A1 | 7/2009 | Kim |
| 2009/0187981 A1 | 7/2009 | Pan et al. |
| 2009/0193514 A1 | 7/2009 | Adams et al. |
| 2009/0195497 A1 | 8/2009 | Fitzgerald et al. |
| 2009/0198359 A1 | 8/2009 | Chaudhri |
| 2009/0199119 A1 | 8/2009 | Park et al. |
| 2009/0199130 A1 | 8/2009 | Tsern et al. |
| 2009/0199188 A1 | 8/2009 | Fujimaki |
| 2009/0204920 A1 | 8/2009 | Beverley et al. |
| 2009/0204929 A1 | 8/2009 | Baurmann et al. |
| 2009/0228938 A1 | 9/2009 | White et al. |
| 2009/0231960 A1 | 9/2009 | Hutcheson |
| 2009/0241169 A1 | 9/2009 | Dhand et al. |
| 2009/0244015 A1 | 10/2009 | Sengupta et al. |
| 2009/0248737 A1 | 10/2009 | Shukla et al. |
| 2009/0265417 A1 | 10/2009 | Svendsen et al. |
| 2009/0271744 A1 | 10/2009 | Anders |
| 2009/0304205 A1 | 12/2009 | Hardacker et al. |
| 2009/0307633 A1 | 12/2009 | Haughay et al. |
| 2009/0311993 A1 | 12/2009 | Horodezky |
| 2009/0322695 A1 | 12/2009 | Cho et al. |
| 2009/0327449 A1 | 12/2009 | Silverman et al. |
| 2010/0001967 A1 | 1/2010 | Yoo |
| 2010/0004031 A1 | 1/2010 | Kim |
| 2010/0005421 A1 | 1/2010 | Yoshioka |
| 2010/0023449 A1 | 1/2010 | Skowronek et al. |
| 2010/0042654 A1 | 2/2010 | Heller et al. |
| 2010/0042835 A1 | 2/2010 | Lee et al. |
| 2010/0054497 A1 | 3/2010 | Bull et al. |
| 2010/0058228 A1 | 3/2010 | Park |
| 2010/0058253 A1 | 3/2010 | Son |
| 2010/0070490 A1 | 3/2010 | Amidon et al. |
| 2010/0082374 A1 | 4/2010 | Charania et al. |
| 2010/0082481 A1 | 4/2010 | Lin et al. |
| 2010/0085379 A1 | 4/2010 | Hishikawa et al. |
| 2010/0088634 A1 | 4/2010 | Tsuruta et al. |
| 2010/0088639 A1 | 4/2010 | Yach et al. |
| 2010/0094834 A1 | 4/2010 | Svendsen |
| 2010/0106647 A1 | 4/2010 | Raman |
| 2010/0107229 A1 | 4/2010 | Najafi et al. |
| 2010/0121636 A1 | 5/2010 | Burke et al. |
| 2010/0122195 A1 | 5/2010 | Hwang |
| 2010/0125785 A1 | 5/2010 | Moore et al. |
| 2010/0131978 A1 | 5/2010 | Friedlander et al. |
| 2010/0159995 A1 | 6/2010 | Stallings et al. |
| 2010/0174644 A1 | 7/2010 | Rosano et al. |
| 2010/0174993 A1 | 7/2010 | Pennington et al. |
| 2010/0178873 A1 | 7/2010 | Lee et al. |
| 2010/0205563 A1 | 8/2010 | Haapsaari et al. |
| 2010/0223542 A1 | 9/2010 | Vuong et al. |
| 2010/0229094 A1 | 9/2010 | Nakajima et al. |
| 2010/0231534 A1 | 9/2010 | Chaudhri et al. |
| 2010/0231535 A1 | 9/2010 | Chaudhri et al. |
| 2010/0231536 A1 | 9/2010 | Chaudhri et al. |
| 2010/0231537 A1 | 9/2010 | Pisula et al. |
| 2010/0235729 A1 | 9/2010 | Kocienda et al. |
| 2010/0248823 A1 | 9/2010 | Smith |
| 2010/0250376 A1 | 9/2010 | Nandiraju |
| 2010/0251304 A1 | 9/2010 | Donoghue et al. |
| 2010/0257484 A1 | 10/2010 | Nakamura et al. |
| 2010/0259482 A1 | 10/2010 | Ball |
| 2010/0269156 A1 | 10/2010 | Hohlfeld et al. |
| 2010/0272250 A1 | 10/2010 | Yap et al. |
| 2010/0283743 A1 | 11/2010 | Coddington |
| 2010/0284389 A1 | 11/2010 | Ramsay et al. |
| 2010/0293598 A1 | 11/2010 | Collart et al. |
| 2010/0295803 A1 | 11/2010 | Kim et al. |
| 2010/0296678 A1 | 11/2010 | Kuhn-Rahloff et al. |
| 2010/0299436 A1 | 11/2010 | Khalid et al. |
| 2010/0299639 A1 | 11/2010 | Ramsay et al. |
| 2010/0302172 A1 | 12/2010 | Wilairat et al. |
| 2010/0306657 A1 | 12/2010 | Derbyshire et al. |
| 2010/0318917 A1 | 12/2010 | Holladay et al. |
| 2010/0318928 A1 | 12/2010 | Neuman et al. |
| 2010/0318939 A1 | 12/2010 | Moon |
| 2010/0321201 A1 | 12/2010 | Huang et al. |
| 2010/0325239 A1 | 12/2010 | Khedouri et al. |
| 2011/0003587 A1 | 1/2011 | Belz et al. |
| 2011/0010470 A1 | 1/2011 | Hulbert et al. |
| 2011/0016089 A1 | 1/2011 | Freedman et al. |
| 2011/0029750 A1 | 2/2011 | Jang et al. |
| 2011/0029891 A1 | 2/2011 | Kim et al. |

(56) References Cited

U.S. PATENT DOCUMENTS

| | | |
|---|---|---|
| 2011/0035799 A1 | 2/2011 | Handler |
| 2011/0041102 A1 | 2/2011 | Kim |
| 2011/0054268 A1 | 3/2011 | Fidacaro et al. |
| 2011/0054647 A1 | 3/2011 | Chipchase et al. |
| 2011/0059769 A1 | 3/2011 | Brunolli |
| 2011/0065384 A1 | 3/2011 | Cader et al. |
| 2011/0071656 A1 | 3/2011 | Mckiel, Jr. |
| 2011/0081923 A1 | 4/2011 | Bednar et al. |
| 2011/0082902 A1 | 4/2011 | Rottler et al. |
| 2011/0087431 A1 | 4/2011 | Gupta et al. |
| 2011/0088086 A1 | 4/2011 | Swink et al. |
| 2011/0106671 A1 | 5/2011 | Minnis et al. |
| 2011/0126148 A1 | 5/2011 | Krishnaraj et al. |
| 2011/0130168 A1 | 6/2011 | Vendrow et al. |
| 2011/0131537 A1 | 6/2011 | Cho et al. |
| 2011/0138166 A1 | 6/2011 | Peszek et al. |
| 2011/0138295 A1 | 6/2011 | Momchilov et al. |
| 2011/0142234 A1 | 6/2011 | Rogers |
| 2011/0149874 A1 | 6/2011 | Reif |
| 2011/0157046 A1 | 6/2011 | Lee et al. |
| 2011/0159469 A1 | 6/2011 | Hwang et al. |
| 2011/0159927 A1 | 6/2011 | Choi |
| 2011/0163971 A1 | 7/2011 | Wagner et al. |
| 2011/0164042 A1 | 7/2011 | Chaudhri |
| 2011/0164269 A1 | 7/2011 | Kamishiro |
| 2011/0179386 A1 | 7/2011 | Shaffer et al. |
| 2011/0183650 A1 | 7/2011 | Mckee |
| 2011/0185048 A1 | 7/2011 | Yew et al. |
| 2011/0187497 A1 | 8/2011 | Chin |
| 2011/0191695 A1 | 8/2011 | Dinka et al. |
| 2011/0209099 A1 | 8/2011 | Hinckley et al. |
| 2011/0214158 A1 | 9/2011 | Pasquero et al. |
| 2011/0215921 A1 | 9/2011 | Ben et al. |
| 2011/0225426 A1 | 9/2011 | Agarwal et al. |
| 2011/0231914 A1 | 9/2011 | Hung |
| 2011/0242002 A1 | 10/2011 | Kaplan et al. |
| 2011/0246942 A1 | 10/2011 | Misawa |
| 2011/0250895 A1 | 10/2011 | Wohlert et al. |
| 2011/0254683 A1 | 10/2011 | Soldan et al. |
| 2011/0273526 A1 | 11/2011 | Mehin et al. |
| 2011/0275358 A1 | 11/2011 | Faenger |
| 2011/0279852 A1 | 11/2011 | Oda et al. |
| 2011/0281568 A1 | 11/2011 | Le |
| 2011/0291971 A1 | 12/2011 | Masaki et al. |
| 2011/0302493 A1 | 12/2011 | Runstedler et al. |
| 2011/0306393 A1 | 12/2011 | Goldman et al. |
| 2011/0314398 A1 | 12/2011 | Yano et al. |
| 2011/0319056 A1 | 12/2011 | Toy et al. |
| 2011/0320450 A1 | 12/2011 | Liu et al. |
| 2012/0004920 A1 | 1/2012 | Kelly et al. |
| 2012/0005708 A1 | 1/2012 | Kelts |
| 2012/0011437 A1 | 1/2012 | James et al. |
| 2012/0016678 A1 | 1/2012 | Gruber et al. |
| 2012/0024947 A1 | 2/2012 | Naelon et al. |
| 2012/0033028 A1 | 2/2012 | Murphy et al. |
| 2012/0036556 A1 | 2/2012 | Lebeau et al. |
| 2012/0040719 A1 | 2/2012 | Lee et al. |
| 2012/0044062 A1 | 2/2012 | Jersa et al. |
| 2012/0050185 A1 | 3/2012 | Davydov et al. |
| 2012/0051560 A1 | 3/2012 | Sanders |
| 2012/0054278 A1 | 3/2012 | Taleb et al. |
| 2012/0059813 A1 | 3/2012 | Sejnoha et al. |
| 2012/0066632 A1 | 3/2012 | Sundermeyer et al. |
| 2012/0066731 A1 | 3/2012 | Vasquez et al. |
| 2012/0079126 A1 | 3/2012 | Evans et al. |
| 2012/0084697 A1 | 4/2012 | Reeves |
| 2012/0088477 A1 | 4/2012 | Cassidy et al. |
| 2012/0089951 A1 | 4/2012 | Cassidy |
| 2012/0096069 A1 | 4/2012 | Chan |
| 2012/0096076 A1 | 4/2012 | Chan et al. |
| 2012/0096386 A1 | 4/2012 | Baumann et al. |
| 2012/0105358 A1 | 5/2012 | Momeyer et al. |
| 2012/0110455 A1 | 5/2012 | Sharma et al. |
| 2012/0115608 A1 | 5/2012 | Pfeifer et al. |
| 2012/0129496 A1 | 5/2012 | Park et al. |
| 2012/0131459 A1 | 5/2012 | Ilama-Vaquero et al. |
| 2012/0136998 A1 | 5/2012 | Hough et al. |
| 2012/0143694 A1 | 6/2012 | Zargahi et al. |
| 2012/0178431 A1 | 7/2012 | Gold |
| 2012/0197419 A1 | 8/2012 | Dhruv et al. |
| 2012/0210226 A1 | 8/2012 | Mccoy et al. |
| 2012/0214458 A1 | 8/2012 | Levien et al. |
| 2012/0215684 A1 | 8/2012 | Kidron |
| 2012/0218177 A1 | 8/2012 | Pang et al. |
| 2012/0222092 A1 | 8/2012 | Rabii |
| 2012/0223890 A1 | 9/2012 | Borovsky et al. |
| 2012/0223959 A1 | 9/2012 | Lengeling et al. |
| 2012/0260169 A1 | 10/2012 | Schwartz et al. |
| 2012/0269361 A1 | 10/2012 | Bhow et al. |
| 2012/0272145 A1 | 10/2012 | Ryan et al. |
| 2012/0272230 A1 | 10/2012 | Lee |
| 2012/0284185 A1 | 11/2012 | Mettler et al. |
| 2012/0284297 A1 | 11/2012 | Aguera-Arcas et al. |
| 2012/0284673 A1 | 11/2012 | Lamb et al. |
| 2012/0290657 A1 | 11/2012 | Parks et al. |
| 2012/0290943 A1 | 11/2012 | Toney et al. |
| 2012/0294118 A1 | 11/2012 | Haulick et al. |
| 2012/0297017 A1 | 11/2012 | Livshits et al. |
| 2012/0304111 A1 | 11/2012 | Queru et al. |
| 2012/0311444 A1 | 12/2012 | Chaudhri |
| 2012/0322508 A1 | 12/2012 | Forstall et al. |
| 2012/0323868 A1 | 12/2012 | Robbin et al. |
| 2012/0324390 A1 | 12/2012 | Tao et al. |
| 2013/0002589 A1 | 1/2013 | Jang |
| 2013/0005487 A1 | 1/2013 | Frazzini et al. |
| 2013/0007203 A1 | 1/2013 | Szu |
| 2013/0007617 A1 | 1/2013 | Mackenzie et al. |
| 2013/0017846 A1 | 1/2013 | Schoppe |
| 2013/0022221 A1 | 1/2013 | Kallai et al. |
| 2013/0024932 A1 | 1/2013 | Toebes et al. |
| 2013/0026293 A1 | 1/2013 | Schneider et al. |
| 2013/0027289 A1 | 1/2013 | Choi et al. |
| 2013/0027341 A1 | 1/2013 | Mastandrea |
| 2013/0031217 A1 | 1/2013 | Rajapakse |
| 2013/0041790 A1 | 2/2013 | Murugesan et al. |
| 2013/0046893 A1 | 2/2013 | Hauser et al. |
| 2013/0047084 A1 | 2/2013 | Sanders et al. |
| 2013/0047233 A1 | 2/2013 | Fisk et al. |
| 2013/0051755 A1 | 2/2013 | Brown et al. |
| 2013/0053107 A1 | 2/2013 | Kang et al. |
| 2013/0054697 A1 | 2/2013 | Cha et al. |
| 2013/0055082 A1 | 2/2013 | Fino et al. |
| 2013/0055150 A1 | 2/2013 | Galor |
| 2013/0060687 A1 | 3/2013 | Bak et al. |
| 2013/0063364 A1 | 3/2013 | Moore |
| 2013/0073286 A1 | 3/2013 | Bastea-Forte et al. |
| 2013/0073584 A1 | 3/2013 | Kuper et al. |
| 2013/0074194 A1 | 3/2013 | White et al. |
| 2013/0080177 A1 | 3/2013 | Chen |
| 2013/0080516 A1 | 3/2013 | Bologh |
| 2013/0080525 A1 | 3/2013 | Aoki et al. |
| 2013/0080955 A1 | 3/2013 | Reimann et al. |
| 2013/0082819 A1 | 4/2013 | Cotterill |
| 2013/0086637 A1 | 4/2013 | Cotterill et al. |
| 2013/0094666 A1 | 4/2013 | Haaff et al. |
| 2013/0094770 A1 | 4/2013 | Lee et al. |
| 2013/0102281 A1 | 4/2013 | Kanda et al. |
| 2013/0102298 A1 | 4/2013 | Goodman et al. |
| 2013/0103797 A1 | 4/2013 | Park et al. |
| 2013/0111407 A1 | 5/2013 | Mullen |
| 2013/0113822 A1 | 5/2013 | Putrevu et al. |
| 2013/0115932 A1 | 5/2013 | Williams et al. |
| 2013/0117693 A1 | 5/2013 | Anderson et al. |
| 2013/0120106 A1 | 5/2013 | Cauwels et al. |
| 2013/0120254 A1 | 5/2013 | Mun et al. |
| 2013/0124207 A1 | 5/2013 | Sarin et al. |
| 2013/0132865 A1 | 5/2013 | Li |
| 2013/0138272 A1 | 5/2013 | Louise-Babando et al. |
| 2013/0141514 A1 | 6/2013 | Chao et al. |
| 2013/0145303 A1 | 6/2013 | Prakash et al. |
| 2013/0159858 A1 | 6/2013 | Joffray et al. |
| 2013/0162411 A1 | 6/2013 | Moses et al. |
| 2013/0166332 A1 | 6/2013 | Hammad |
| 2013/0173699 A1 | 7/2013 | Parks et al. |

(56) References Cited

U.S. PATENT DOCUMENTS

| | | |
|---|---|---|
| 2013/0173794 A1 | 7/2013 | Agerbak et al. |
| 2013/0174044 A1 | 7/2013 | Hill |
| 2013/0189963 A1 | 7/2013 | Epp et al. |
| 2013/0191220 A1 | 7/2013 | Dent et al. |
| 2013/0191454 A1 | 7/2013 | Oliver et al. |
| 2013/0191911 A1 | 7/2013 | Dellinger et al. |
| 2013/0194476 A1 | 8/2013 | Shimosato |
| 2013/0205375 A1 | 8/2013 | Woxblom et al. |
| 2013/0212212 A1 | 8/2013 | Addepalli et al. |
| 2013/0222270 A1 | 8/2013 | Winkler et al. |
| 2013/0223821 A1 | 8/2013 | Issa et al. |
| 2013/0231127 A1 | 9/2013 | Kildal et al. |
| 2013/0234924 A1 | 9/2013 | Janefalkar et al. |
| 2013/0239202 A1 | 9/2013 | Adams et al. |
| 2013/0243924 A1 | 9/2013 | Bhandari et al. |
| 2013/0244615 A1 | 9/2013 | Miller |
| 2013/0246522 A1 | 9/2013 | Bilinski et al. |
| 2013/0246916 A1 | 9/2013 | Reimann et al. |
| 2013/0254574 A1 | 9/2013 | Zacchio et al. |
| 2013/0262298 A1 | 10/2013 | Morley et al. |
| 2013/0262857 A1 | 10/2013 | Neuman et al. |
| 2013/0272511 A1 | 10/2013 | Mateer et al. |
| 2013/0282180 A1 | 10/2013 | Layton |
| 2013/0283161 A1 | 10/2013 | Reimann et al. |
| 2013/0283199 A1 | 10/2013 | Selig et al. |
| 2013/0298024 A1 | 11/2013 | Rhee et al. |
| 2013/0304758 A1 | 11/2013 | Gruber et al. |
| 2013/0305354 A1 | 11/2013 | King et al. |
| 2013/0311597 A1 | 11/2013 | Arrouye et al. |
| 2013/0311986 A1 | 11/2013 | Arrouye et al. |
| 2013/0311997 A1 | 11/2013 | Gruber et al. |
| 2013/0314302 A1 | 11/2013 | Jeung et al. |
| 2013/0318158 A1 | 11/2013 | Teng et al. |
| 2013/0318249 A1 | 11/2013 | Mcdonough et al. |
| 2013/0322634 A1 | 12/2013 | Bennett et al. |
| 2013/0324081 A1 | 12/2013 | Gargi et al. |
| 2013/0325967 A1 | 12/2013 | Parks et al. |
| 2013/0329924 A1 | 12/2013 | Fleizach et al. |
| 2013/0332162 A1 | 12/2013 | Keen |
| 2013/0332560 A1 | 12/2013 | Knight et al. |
| 2013/0333006 A1 | 12/2013 | Tapling et al. |
| 2013/0339343 A1 | 12/2013 | Hierons et al. |
| 2013/0346068 A1 | 12/2013 | Solem et al. |
| 2013/0346859 A1 | 12/2013 | Bates et al. |
| 2013/0347022 A1 | 12/2013 | Bates et al. |
| 2014/0003597 A1 | 1/2014 | Lazaridis et al. |
| 2014/0006562 A1 | 1/2014 | Handa et al. |
| 2014/0026188 A1 | 1/2014 | Gubler |
| 2014/0032706 A1 | 1/2014 | Kuscher et al. |
| 2014/0033035 A1 | 1/2014 | Crow et al. |
| 2014/0037107 A1 | 2/2014 | Marino et al. |
| 2014/0040742 A1 | 2/2014 | Park et al. |
| 2014/0043424 A1 | 2/2014 | Gaya et al. |
| 2014/0047020 A1 | 2/2014 | Matus et al. |
| 2014/0047382 A1 | 2/2014 | Kim et al. |
| 2014/0049447 A1 | 2/2014 | Choi |
| 2014/0058860 A1 | 2/2014 | Roh et al. |
| 2014/0064155 A1 | 3/2014 | Evans et al. |
| 2014/0068751 A1 | 3/2014 | Last |
| 2014/0072282 A1 | 3/2014 | Cho |
| 2014/0073256 A1 | 3/2014 | Newham et al. |
| 2014/0075130 A1 | 3/2014 | Bansal et al. |
| 2014/0075311 A1 | 3/2014 | Boettcher et al. |
| 2014/0080416 A1 | 3/2014 | Seo et al. |
| 2014/0082136 A1 | 3/2014 | Garcia Puga et al. |
| 2014/0082715 A1 | 3/2014 | Grajek et al. |
| 2014/0089196 A1 | 3/2014 | Paya et al. |
| 2014/0095965 A1 | 4/2014 | Li |
| 2014/0104178 A1 | 4/2014 | Jo |
| 2014/0114966 A1 | 4/2014 | Bilinski et al. |
| 2014/0122730 A1 | 5/2014 | Burch et al. |
| 2014/0136481 A1 | 5/2014 | Quan et al. |
| 2014/0136986 A1 | 5/2014 | Martin et al. |
| 2014/0139637 A1 | 5/2014 | Mistry et al. |
| 2014/0143737 A1 | 5/2014 | Mistry et al. |
| 2014/0149884 A1 | 5/2014 | Flynn et al. |
| 2014/0155031 A1 | 6/2014 | Lee et al. |
| 2014/0157160 A1 | 6/2014 | Cudak et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0171156 A1 | 6/2014 | Pattikonda et al. |
| 2014/0173447 A1 | 6/2014 | Das et al. |
| 2014/0176298 A1 | 6/2014 | Kumar et al. |
| 2014/0181104 A1 | 6/2014 | Chin et al. |
| 2014/0181183 A1 | 6/2014 | Yamamoto et al. |
| 2014/0181202 A1 | 6/2014 | Gossain |
| 2014/0181654 A1 | 6/2014 | Kumar et al. |
| 2014/0189589 A1 | 7/2014 | Kim et al. |
| 2014/0207707 A1 | 7/2014 | Na et al. |
| 2014/0215413 A1 | 7/2014 | Calkins et al. |
| 2014/0223490 A1 | 8/2014 | Pan et al. |
| 2014/0229835 A1 | 8/2014 | Ravine |
| 2014/0236325 A1 | 8/2014 | Sasaki et al. |
| 2014/0237361 A1 | 8/2014 | Martin et al. |
| 2014/0247229 A1 | 9/2014 | Cho et al. |
| 2014/0258292 A1 | 9/2014 | Thramann et al. |
| 2014/0267002 A1 | 9/2014 | Luna |
| 2014/0267911 A1 | 9/2014 | Grant et al. |
| 2014/0270183 A1 | 9/2014 | Luna |
| 2014/0282103 A1 | 9/2014 | Jerry |
| 2014/0282240 A1 | 9/2014 | Flynn et al. |
| 2014/0283018 A1 | 9/2014 | Dadu et al. |
| 2014/0298432 A1 | 10/2014 | Brown |
| 2014/0310348 A1 | 10/2014 | Keskitalo et al. |
| 2014/0315163 A1 | 10/2014 | Ingrassia et al. |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0333414 A1 | 11/2014 | Kursun |
| 2014/0334644 A1 | 11/2014 | Selig et al. |
| 2014/0335789 A1 | 11/2014 | Cohen et al. |
| 2014/0337791 A1 | 11/2014 | Agnetta et al. |
| 2014/0337931 A1 | 11/2014 | Cotterill |
| 2014/0344904 A1 | 11/2014 | Venkataramani et al. |
| 2014/0351339 A1 | 11/2014 | Kaneoka et al. |
| 2014/0351346 A1 | 11/2014 | Barton |
| 2014/0354759 A1 | 12/2014 | Cranfill et al. |
| 2014/0359140 A1 | 12/2014 | Shankarraman |
| 2014/0359454 A1 | 12/2014 | Lee et al. |
| 2014/0359637 A1 | 12/2014 | Yan |
| 2014/0359709 A1 | 12/2014 | Nassar et al. |
| 2014/0363024 A1 | 12/2014 | Apodaca |
| 2014/0364056 A1 | 12/2014 | Belk et al. |
| 2014/0365904 A1 | 12/2014 | Kim et al. |
| 2014/0372309 A1 | 12/2014 | Bullard et al. |
| 2014/0375577 A1 | 12/2014 | Yeh et al. |
| 2014/0380187 A1 | 12/2014 | Lewin et al. |
| 2014/0380234 A1 | 12/2014 | Shim et al. |
| 2015/0012435 A1 | 1/2015 | Wright et al. |
| 2015/0019944 A1 | 1/2015 | Kalgi |
| 2015/0020081 A1 | 1/2015 | Cho et al. |
| 2015/0029089 A1 | 1/2015 | Kim |
| 2015/0032812 A1 | 1/2015 | Dudley |
| 2015/0033361 A1 | 1/2015 | Choi et al. |
| 2015/0039494 A1 | 2/2015 | Sinton et al. |
| 2015/0049591 A1 | 2/2015 | Adams et al. |
| 2015/0051913 A1 | 2/2015 | Choi |
| 2015/0052222 A1 | 2/2015 | Farrell et al. |
| 2015/0058744 A1 | 2/2015 | Dhingra et al. |
| 2015/0067803 A1 | 3/2015 | Alduaiji |
| 2015/0081072 A1 | 3/2015 | Kallai et al. |
| 2015/0089359 A1 | 3/2015 | Brisebois |
| 2015/0095175 A1 | 4/2015 | Dua |
| 2015/0095804 A1 | 4/2015 | Grossman et al. |
| 2015/0111559 A1 | 4/2015 | Leaver et al. |
| 2015/0113407 A1 | 4/2015 | Hoffert et al. |
| 2015/0120545 A1 | 4/2015 | Fiore et al. |
| 2015/0130737 A1 | 5/2015 | Im et al. |
| 2015/0135282 A1 | 5/2015 | Kong et al. |
| 2015/0138101 A1 | 5/2015 | Park et al. |
| 2015/0143419 A1 | 5/2015 | Bhagwat et al. |
| 2015/0148927 A1 | 5/2015 | Georges et al. |
| 2015/0149599 A1 | 5/2015 | Caunter et al. |

(56) References Cited

U.S. PATENT DOCUMENTS

| | | |
|---|---|---|
| 2015/0154589 A1 | 6/2015 | Li |
| 2015/0154676 A1 | 6/2015 | Matousek et al. |
| 2015/0160856 A1 | 6/2015 | Jang et al. |
| 2015/0163188 A1 | 6/2015 | Faaborg et al. |
| 2015/0176998 A1 | 6/2015 | Huang et al. |
| 2015/0177914 A1 | 6/2015 | Coyner et al. |
| 2015/0179008 A1 | 6/2015 | Sung et al. |
| 2015/0186892 A1 | 7/2015 | Zhang et al. |
| 2015/0189426 A1 | 7/2015 | Pang |
| 2015/0193069 A1 | 7/2015 | Di Censo et al. |
| 2015/0193130 A1 | 7/2015 | Cho et al. |
| 2015/0193196 A1 | 7/2015 | Lin et al. |
| 2015/0193392 A1 | 7/2015 | Greenblatt et al. |
| 2015/0195133 A1 | 7/2015 | Sheets et al. |
| 2015/0199967 A1 | 7/2015 | Reddy et al. |
| 2015/0200715 A1 | 7/2015 | Oiwa et al. |
| 2015/0205511 A1 | 7/2015 | Vinna et al. |
| 2015/0205971 A1 | 7/2015 | Sanio et al. |
| 2015/0208158 A1 | 7/2015 | Sanders |
| 2015/0213542 A1 | 7/2015 | Wallaja |
| 2015/0215128 A1 | 7/2015 | Pal |
| 2015/0215382 A1 | 7/2015 | Arora et al. |
| 2015/0215398 A1 | 7/2015 | Murphy et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0229750 A1 | 8/2015 | Zhou et al. |
| 2015/0229782 A1 | 8/2015 | Zuidema et al. |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0242837 A1 | 8/2015 | Yarbrough et al. |
| 2015/0243163 A1 | 8/2015 | Shoemake |
| 2015/0248200 A1 | 9/2015 | Cho et al. |
| 2015/0248268 A1 | 9/2015 | Kumar et al. |
| 2015/0249540 A1 | 9/2015 | Khalil et al. |
| 2015/0253960 A1 | 9/2015 | Lin et al. |
| 2015/0254661 A1 | 9/2015 | Lanc |
| 2015/0256957 A1 | 9/2015 | Kim et al. |
| 2015/0261493 A1 | 9/2015 | Lemmon et al. |
| 2015/0262183 A1 | 9/2015 | Gervais et al. |
| 2015/0264304 A1 | 9/2015 | Chastney et al. |
| 2015/0271120 A1 | 9/2015 | Langholz |
| 2015/0278799 A1 | 10/2015 | Palanisamy |
| 2015/0286694 A1 | 10/2015 | Kaplinger et al. |
| 2015/0295921 A1 | 10/2015 | Cao |
| 2015/0302856 A1 | 10/2015 | Kim et al. |
| 2015/0304330 A1 | 10/2015 | Soamboonsrup et al. |
| 2015/0309768 A1 | 10/2015 | Van Der Heide |
| 2015/0312299 A1 | 10/2015 | Chen |
| 2015/0317977 A1 | 11/2015 | Manjunath et al. |
| 2015/0319006 A1 | 11/2015 | Plummer et al. |
| 2015/0319046 A1 | 11/2015 | Plummer et al. |
| 2015/0324552 A1 | 11/2015 | Beckhardt |
| 2015/0339466 A1 | 11/2015 | Gao et al. |
| 2015/0347010 A1 | 12/2015 | Yang et al. |
| 2015/0347738 A1 | 12/2015 | Ulrich et al. |
| 2015/0348002 A1 | 12/2015 | Van et al. |
| 2015/0350031 A1 | 12/2015 | Burks et al. |
| 2015/0350296 A1 | 12/2015 | Yang et al. |
| 2015/0350297 A1 | 12/2015 | Yang et al. |
| 2015/0350448 A1 | 12/2015 | Coffman et al. |
| 2015/0355816 A1 | 12/2015 | Shim |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358043 A1 | 12/2015 | Jeong et al. |
| 2015/0358304 A1 | 12/2015 | Beckhardt et al. |
| 2015/0365400 A1 | 12/2015 | Cox |
| 2015/0370426 A1 | 12/2015 | Carrigan et al. |
| 2015/0373172 A1 | 12/2015 | Boesen |
| 2015/0378522 A1 | 12/2015 | Butts |
| 2015/0382047 A1 | 12/2015 | Van Os et al. |
| 2016/0004393 A1 | 1/2016 | Faaborg et al. |
| 2016/0004417 A1 | 1/2016 | Bates |
| 2016/0004499 A1 | 1/2016 | Kim et al. |
| 2016/0005024 A1 | 1/2016 | Harrell |
| 2016/0006745 A1 | 1/2016 | Furuichi et al. |
| 2016/0012417 A1 | 1/2016 | Mizon |
| 2016/0014266 A1 | 1/2016 | Bhatt |
| 2016/0026429 A1 | 1/2016 | Triplett |
| 2016/0026779 A1 | 1/2016 | Grigg et al. |
| 2016/0028869 A1 | 1/2016 | Bhatt |
| 2016/0029146 A1 | 1/2016 | Tembey et al. |
| 2016/0034887 A1 | 2/2016 | Lee |
| 2016/0036996 A1 | 2/2016 | Midholt et al. |
| 2016/0037345 A1 | 2/2016 | Margadoudakis |
| 2016/0043962 A1 | 2/2016 | Kim et al. |
| 2016/0048705 A1 | 2/2016 | Yang |
| 2016/0050199 A1 | 2/2016 | Ganesan |
| 2016/0050476 A1 | 2/2016 | Patil |
| 2016/0054710 A1 | 2/2016 | Jo et al. |
| 2016/0062487 A1 | 3/2016 | Foss et al. |
| 2016/0062567 A1 | 3/2016 | Yang et al. |
| 2016/0062589 A1 | 3/2016 | Wan et al. |
| 2016/0062606 A1 | 3/2016 | Vega et al. |
| 2016/0065707 A1 | 3/2016 | Yang et al. |
| 2016/0065708 A1 | 3/2016 | Yang et al. |
| 2016/0066277 A1 | 3/2016 | Yang et al. |
| 2016/0070244 A1 | 3/2016 | Cipollo et al. |
| 2016/0073197 A1 | 3/2016 | Hammer et al. |
| 2016/0073482 A1 | 3/2016 | Fok et al. |
| 2016/0077734 A1 | 3/2016 | Buxton et al. |
| 2016/0085565 A1 | 3/2016 | Arcese et al. |
| 2016/0086176 A1 | 3/2016 | Henrique et al. |
| 2016/0088039 A1 | 3/2016 | Millington et al. |
| 2016/0092072 A1 | 3/2016 | So et al. |
| 2016/0092665 A1 | 3/2016 | Cowan et al. |
| 2016/0094678 A1 | 3/2016 | Kumar et al. |
| 2016/0097651 A1 | 4/2016 | Jung et al. |
| 2016/0099901 A1 | 4/2016 | Allen et al. |
| 2016/0127799 A1 | 5/2016 | Alsina et al. |
| 2016/0132864 A1 | 5/2016 | Shah et al. |
| 2016/0134488 A1 | 5/2016 | Straub et al. |
| 2016/0134942 A1 | 5/2016 | Lo |
| 2016/0139752 A1 | 5/2016 | Shim et al. |
| 2016/0142763 A1 | 5/2016 | Kim et al. |
| 2016/0150624 A1 | 5/2016 | Meerbeek et al. |
| 2016/0156687 A1 | 6/2016 | Leung |
| 2016/0156992 A1 | 6/2016 | Kuper |
| 2016/0162252 A1 | 6/2016 | Di Censo et al. |
| 2016/0171482 A1 | 6/2016 | Muncey et al. |
| 2016/0173318 A1 | 6/2016 | Ha et al. |
| 2016/0173617 A1 | 6/2016 | Allinson |
| 2016/0183046 A1 | 6/2016 | Kwon |
| 2016/0189451 A1 | 6/2016 | Yoo et al. |
| 2016/0196042 A1 | 7/2016 | Laute et al. |
| 2016/0196106 A1 | 7/2016 | Hammer et al. |
| 2016/0202866 A1 | 7/2016 | Zambetti |
| 2016/0209939 A1 | 7/2016 | Zambetti et al. |
| 2016/0210983 A1 | 7/2016 | Amada et al. |
| 2016/0226674 A1 | 8/2016 | Kangshang et al. |
| 2016/0231902 A1 | 8/2016 | Sirpal et al. |
| 2016/0239167 A1 | 8/2016 | Reimann et al. |
| 2016/0241543 A1 | 8/2016 | Jung et al. |
| 2016/0246566 A1 | 8/2016 | Fullerton et al. |
| 2016/0253145 A1 | 9/2016 | Lee et al. |
| 2016/0259656 A1 | 9/2016 | Sumner et al. |
| 2016/0259936 A1 | 9/2016 | Mukherjee et al. |
| 2016/0267319 A1 | 9/2016 | Murillo et al. |
| 2016/0267779 A1 | 9/2016 | Kuang |
| 2016/0277708 A1 | 9/2016 | Rintel et al. |
| 2016/0277903 A1 | 9/2016 | Poosala et al. |
| 2016/0291924 A1 | 10/2016 | Bierbower et al. |
| 2016/0295340 A1 | 10/2016 | Baker et al. |
| 2016/0299669 A1 | 10/2016 | Bates |
| 2016/0299736 A1 | 10/2016 | Bates et al. |
| 2016/0314451 A1 | 10/2016 | Martin |
| 2016/0320849 A1 | 11/2016 | Koo |
| 2016/0335041 A1 | 11/2016 | Wachter et al. |
| 2016/0336531 A1 | 11/2016 | Yokoyama |
| 2016/0342141 A1 | 11/2016 | Koumaiha et al. |
| 2016/0342386 A1 | 11/2016 | Kallai et al. |

(56) References Cited

U.S. PATENT DOCUMENTS

| | | |
|---|---|---|
| 2016/0345039 A1 | 11/2016 | Billmeyer |
| 2016/0345172 A1 | 11/2016 | Cotterill |
| 2016/0351191 A1 | 12/2016 | Vilermo et al. |
| 2016/0352661 A1 | 12/2016 | Yang et al. |
| 2016/0360344 A1 | 12/2016 | Shim et al. |
| 2016/0364600 A1 | 12/2016 | Shah et al. |
| 2016/0366481 A1 | 12/2016 | Lim et al. |
| 2016/0366531 A1 | 12/2016 | Popova |
| 2016/0373884 A1 | 12/2016 | Peterson et al. |
| 2016/0378961 A1 | 12/2016 | Park |
| 2016/0381476 A1 | 12/2016 | Gossain et al. |
| 2017/0003931 A1 | 1/2017 | Dvortsov et al. |
| 2017/0010782 A1 | 1/2017 | Chaudhri et al. |
| 2017/0010794 A1 | 1/2017 | Cho et al. |
| 2017/0013562 A1 | 1/2017 | Lim et al. |
| 2017/0017531 A1 | 1/2017 | Choi et al. |
| 2017/0019517 A1 | 1/2017 | Wilder et al. |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0031648 A1 | 2/2017 | So et al. |
| 2017/0041727 A1 | 2/2017 | Reimann |
| 2017/0046025 A1 | 2/2017 | Dascola et al. |
| 2017/0054731 A1 | 2/2017 | Cotterill |
| 2017/0060402 A1 | 3/2017 | Bates |
| 2017/0061965 A1 | 3/2017 | Penilla et al. |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0078294 A1 | 3/2017 | Medvinsky |
| 2017/0083285 A1 | 3/2017 | Meyers et al. |
| 2017/0083494 A1 | 3/2017 | Kim et al. |
| 2017/0092085 A1 | 3/2017 | Agarwal |
| 2017/0092270 A1 | 3/2017 | Newendorp et al. |
| 2017/0094049 A1 | 3/2017 | Kanevsky et al. |
| 2017/0097621 A1 | 4/2017 | Ackmann et al. |
| 2017/0099270 A1 | 4/2017 | Anson |
| 2017/0115940 A1 | 4/2017 | Byeon |
| 2017/0127145 A1 | 5/2017 | Rajapakse |
| 2017/0134553 A1 | 5/2017 | Jeon et al. |
| 2017/0134567 A1 | 5/2017 | Jeon et al. |
| 2017/0134872 A1 | 5/2017 | Silva et al. |
| 2017/0142087 A1 | 5/2017 | Maninder et al. |
| 2017/0142584 A1 | 5/2017 | Oh et al. |
| 2017/0148010 A1 | 5/2017 | Bak et al. |
| 2017/0180843 A1 | 6/2017 | Perianu et al. |
| 2017/0185373 A1 | 6/2017 | Kim et al. |
| 2017/0192730 A1 | 7/2017 | Yang et al. |
| 2017/0193813 A1 | 7/2017 | Carroll et al. |
| 2017/0195772 A1 | 7/2017 | Han et al. |
| 2017/0206779 A1 | 7/2017 | Lee et al. |
| 2017/0227935 A1 | 8/2017 | Su et al. |
| 2017/0235545 A1 | 8/2017 | Millington et al. |
| 2017/0235926 A1 | 8/2017 | Fyke et al. |
| 2017/0242653 A1 | 8/2017 | Lang et al. |
| 2017/0242657 A1 | 8/2017 | Jarvis et al. |
| 2017/0251314 A1 | 8/2017 | Pye et al. |
| 2017/0263249 A1 | 9/2017 | Akbacak et al. |
| 2017/0285788 A1 | 10/2017 | Park et al. |
| 2017/0289249 A1 | 10/2017 | Knight et al. |
| 2017/0293610 A1 | 10/2017 | Tran |
| 2017/0322713 A1 | 11/2017 | Hwang et al. |
| 2017/0339151 A1 | 11/2017 | Van Os et al. |
| 2017/0357421 A1 | 12/2017 | Dye et al. |
| 2017/0357425 A1 | 12/2017 | Smith et al. |
| 2017/0357434 A1 | 12/2017 | Coffman et al. |
| 2017/0357439 A1 | 12/2017 | Lemay et al. |
| 2017/0357477 A1 | 12/2017 | Im et al. |
| 2017/0357478 A1 | 12/2017 | Piersol et al. |
| 2017/0357973 A1 | 12/2017 | Van Os et al. |
| 2017/0359189 A1 | 12/2017 | Smith et al. |
| 2017/0359191 A1 | 12/2017 | Smith et al. |
| 2017/0359555 A1 | 12/2017 | Irani et al. |
| 2017/0363436 A1 | 12/2017 | Eronen et al. |
| 2017/0374004 A1 | 12/2017 | Holmes et al. |
| 2018/0019973 A1 | 1/2018 | Mikhailov et al. |
| 2018/0032997 A1 | 2/2018 | Gordon et al. |
| 2018/0039916 A1 | 2/2018 | Ravindra |
| 2018/0040322 A1 | 2/2018 | Mixter et al. |
| 2018/0040324 A1 | 2/2018 | Wilberding |
| 2018/0061421 A1 | 3/2018 | Sarikaya |
| 2018/0067528 A1 | 3/2018 | Wang et al. |
| 2018/0067712 A1 | 3/2018 | Behzadi et al. |
| 2018/0067904 A1 | 3/2018 | Li |
| 2018/0069957 A1 | 3/2018 | Mushikabe et al. |
| 2018/0070187 A1 | 3/2018 | Drinkwater et al. |
| 2018/0075439 A1 | 3/2018 | Bak et al. |
| 2018/0082682 A1 | 3/2018 | Erickson et al. |
| 2018/0096690 A1 | 4/2018 | Mixter et al. |
| 2018/0096696 A1 | 4/2018 | Mixter |
| 2018/0101297 A1 | 4/2018 | Yang et al. |
| 2018/0109629 A1 | 4/2018 | Van Os et al. |
| 2018/0124128 A1 | 5/2018 | Faulkner et al. |
| 2018/0139292 A1 | 5/2018 | Koren et al. |
| 2018/0144590 A1 | 5/2018 | Mixter et al. |
| 2018/0182389 A1 | 6/2018 | Devaraj et al. |
| 2018/0190264 A1 | 7/2018 | Mixter et al. |
| 2018/0190279 A1 | 7/2018 | Anderson et al. |
| 2018/0218201 A1 | 8/2018 | Siminoff |
| 2018/0227341 A1 | 8/2018 | Rizzi |
| 2018/0228003 A1 | 8/2018 | O'driscoll et al. |
| 2018/0234549 A1 | 8/2018 | Coffman et al. |
| 2018/0253281 A1 | 9/2018 | Jarvis et al. |
| 2018/0267773 A1 | 9/2018 | Kim et al. |
| 2018/0288115 A1 | 10/2018 | Asnis et al. |
| 2018/0302790 A1 | 10/2018 | Cotterill |
| 2018/0308480 A1 | 10/2018 | Jang et al. |
| 2018/0329585 A1 | 11/2018 | Carrigan et al. |
| 2018/0329586 A1 | 11/2018 | Sundstrom et al. |
| 2018/0330589 A1 | 11/2018 | Horling |
| 2018/0332559 A1 | 11/2018 | Gudivada et al. |
| 2018/0335903 A1 | 11/2018 | Coffman et al. |
| 2018/0336904 A1 | 11/2018 | Piercy et al. |
| 2018/0336905 A1 | 11/2018 | Kim et al. |
| 2018/0337924 A1 | 11/2018 | Graham et al. |
| 2018/0341448 A1 | 11/2018 | Behzadi et al. |
| 2018/0351762 A1 | 12/2018 | Iyengar et al. |
| 2018/0357631 A1 | 12/2018 | Bak et al. |
| 2018/0364665 A1 | 12/2018 | Clymer et al. |
| 2019/0012069 A1 | 1/2019 | Bates |
| 2019/0012073 A1 | 1/2019 | Hwang |
| 2019/0012966 A1 | 1/2019 | Shi |
| 2019/0025943 A1 | 1/2019 | Jobs et al. |
| 2019/0028419 A1 | 1/2019 | Sullivan |
| 2019/0043508 A1 | 2/2019 | Sak et al. |
| 2019/0056854 A1 | 2/2019 | Azzolin et al. |
| 2019/0056907 A1 | 2/2019 | So et al. |
| 2019/0080698 A1 | 3/2019 | Miller |
| 2019/0102145 A1 | 4/2019 | Wilberding et al. |
| 2019/0124049 A1 | 4/2019 | Bradley et al. |
| 2019/0124203 A1 | 4/2019 | Coffman et al. |
| 2019/0124510 A1 | 4/2019 | Cotterill |
| 2019/0129661 A1 | 5/2019 | Hirota et al. |
| 2019/0138951 A1 | 5/2019 | Brownhill et al. |
| 2019/0149972 A1 | 5/2019 | Parks et al. |
| 2019/0158645 A1 | 5/2019 | Yang et al. |
| 2019/0163329 A1 | 5/2019 | Yang et al. |
| 2019/0172467 A1 | 6/2019 | Kim et al. |
| 2019/0199963 A1 | 6/2019 | Ahn et al. |
| 2019/0221227 A1 | 7/2019 | Mixter |
| 2019/0222775 A1 | 7/2019 | Ahn |
| 2019/0278900 A1 | 9/2019 | Yang et al. |
| 2019/0289079 A1 | 9/2019 | Van Os et al. |
| 2019/0294406 A1 | 9/2019 | Bierbower et al. |
| 2019/0306607 A1 | 10/2019 | Clayton et al. |
| 2019/0310820 A1 | 10/2019 | Bates |
| 2019/0311721 A1 | 10/2019 | Edwards |
| 2019/0361575 A1 | 11/2019 | Ni et al. |
| 2019/0361729 A1 | 11/2019 | Gruber et al. |
| 2019/0370781 A1 | 12/2019 | Van Os et al. |
| 2019/0370805 A1 | 12/2019 | Van Os et al. |
| 2019/0371313 A1 | 12/2019 | Naughton et al. |
| 2019/0378500 A1 | 12/2019 | Miller et al. |
| 2020/0050426 A1 | 2/2020 | Jung et al. |

(56) References Cited

U.S. PATENT DOCUMENTS

| | | |
|---|---|---|
| 2020/0050502 A1 | 2/2020 | Ghafourifar et al. |
| 2020/0075026 A1 | 3/2020 | Peeler et al. |
| 2020/0104018 A1 | 4/2020 | Coffman et al. |
| 2020/0120503 A1 | 4/2020 | Cotterill |
| 2020/0126560 A1 | 4/2020 | Ho et al. |
| 2020/0135191 A1 | 4/2020 | Nourbakhsh |
| 2020/0151601 A1 | 5/2020 | Niewczas |
| 2020/0152186 A1 | 5/2020 | Koh et al. |
| 2020/0154583 A1 | 5/2020 | Lee et al. |
| 2020/0184964 A1 | 6/2020 | Myers et al. |
| 2020/0186378 A1 | 6/2020 | Six et al. |
| 2020/0192627 A1 | 6/2020 | Jang et al. |
| 2020/0201491 A1 | 6/2020 | Coffman et al. |
| 2020/0201495 A1 | 6/2020 | Coffman et al. |
| 2020/0213437 A1 | 7/2020 | Bhatt |
| 2020/0213530 A1 | 7/2020 | Ahn |
| 2020/0218486 A1 | 7/2020 | Behzadi et al. |
| 2020/0225817 A1 | 7/2020 | Coffman et al. |
| 2020/0275144 A1 | 8/2020 | Major |
| 2020/0294499 A1 | 9/2020 | Deluca et al. |
| 2020/0302913 A1 | 9/2020 | Marcinkiewicz |
| 2020/0336909 A1 | 10/2020 | Seel et al. |
| 2020/0366742 A1 | 11/2020 | Van Os et al. |
| 2020/0379711 A1 | 12/2020 | Graham et al. |
| 2020/0379712 A1 | 12/2020 | Carrigan |
| 2020/0379713 A1 | 12/2020 | Carrigan |
| 2020/0379714 A1 | 12/2020 | Graham et al. |
| 2020/0379716 A1 | 12/2020 | Carrigan et al. |
| 2020/0379729 A1 | 12/2020 | Graham et al. |
| 2020/0379730 A1 | 12/2020 | Graham et al. |
| 2020/0380972 A1 | 12/2020 | Carrigan et al. |
| 2020/0382332 A1 | 12/2020 | Carrigan et al. |
| 2020/0383157 A1 | 12/2020 | Lee et al. |
| 2020/0395012 A1 | 12/2020 | Kim et al. |
| 2020/0413197 A1 | 12/2020 | Carrigan et al. |
| 2021/0011588 A1 | 1/2021 | Coffman et al. |
| 2021/0011613 A1 | 1/2021 | Pisula et al. |
| 2021/0014610 A1 | 1/2021 | Carrigan et al. |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0099829 A1 | 4/2021 | Soto et al. |
| 2021/0158830 A1 | 5/2021 | Boehlke |
| 2021/0173431 A1 | 6/2021 | Yang et al. |
| 2021/0181903 A1 | 6/2021 | Carrigan et al. |
| 2021/0203765 A1 | 7/2021 | Yang et al. |
| 2021/0255816 A1 | 8/2021 | Behzadi et al. |
| 2021/0263702 A1 | 8/2021 | Carrigan |
| 2021/0266274 A1 | 8/2021 | Liu et al. |
| 2021/0272118 A1 | 9/2021 | Van Os et al. |
| 2021/0323406 A1 | 10/2021 | So et al. |
| 2021/0349680 A1 | 11/2021 | Kim et al. |
| 2021/0352172 A1 | 11/2021 | Kim et al. |
| 2021/0392223 A1 | 12/2021 | Coffman et al. |
| 2022/0004356 A1 | 1/2022 | Kim et al. |
| 2022/0043626 A1 | 2/2022 | Carrigan |
| 2022/0058257 A1 | 2/2022 | Cotterill |
| 2022/0100367 A1 | 3/2022 | Carrigan et al. |
| 2022/0100841 A1 | 3/2022 | Yang et al. |
| 2022/0116399 A1 | 4/2022 | Carrigan et al. |
| 2022/0129144 A1 | 4/2022 | Carrigan et al. |
| 2022/0137759 A1 | 5/2022 | Yang et al. |
| 2022/0163996 A1 | 5/2022 | Yang et al. |
| 2022/0191162 A1 | 6/2022 | Hegarty et al. |
| 2022/0277037 A1 | 9/2022 | Sanders et al. |
| 2022/0279063 A1 | 9/2022 | Coffman et al. |
| 2022/0286549 A1 | 9/2022 | Coffman et al. |
| 2022/0303383 A1 | 9/2022 | Coffman et al. |
| 2022/0326817 A1 | 10/2022 | Carrigan et al. |
| 2022/0350482 A1 | 11/2022 | Carrigan et al. |
| 2022/0357964 A1 | 11/2022 | Carrigan et al. |
| 2022/0391166 A1 | 12/2022 | Sanders |
| 2022/0391520 A1 | 12/2022 | Ma et al. |
| 2022/0392455 A1 | 12/2022 | Ma et al. |
| 2023/0041125 A1 | 2/2023 | Kim et al. |
| 2023/0073844 A1 | 3/2023 | Coffman et al. |
| 2023/0084551 A1 | 3/2023 | Coffman et al. |
| 2023/0098814 A1 | 3/2023 | Carrigan et al. |
| 2023/0104819 A1 | 4/2023 | Coffman et al. |
| 2023/0106600 A1 | 4/2023 | Coffman et al. |
| 2023/0106761 A1 | 4/2023 | Coffman et al. |
| 2023/0168797 A1 | 6/2023 | Chaudhri et al. |
| 2023/0179700 A1 | 6/2023 | Bhatt |

FOREIGN PATENT DOCUMENTS

| | | |
|---|---|---|
| AU | 2008100011 A4 | 2/2008 |
| AU | 2014100584 A4 | 7/2014 |
| CA | 2876587 A1 | 2/2014 |
| CN | 1263425 A | 8/2000 |
| CN | 1274439 A | 11/2000 |
| CN | 1341889 A | 3/2002 |
| CN | 1452739 A | 10/2003 |
| CN | 1525723 A | 9/2004 |
| CN | 1620677 A | 5/2005 |
| CN | 1663174 A | 8/2005 |
| CN | 1741104 A | 3/2006 |
| CN | 1797295 A | 7/2006 |
| CN | 1813240 A | 8/2006 |
| CN | 1846221 A | 10/2006 |
| CN | 1863281 A | 11/2006 |
| CN | 1908981 A | 2/2007 |
| CN | 101002167 A | 7/2007 |
| CN | 101022395 A | 8/2007 |
| CN | 101047521 A | 10/2007 |
| CN | 101107668 A | 1/2008 |
| CN | 101188506 A | 5/2008 |
| CN | 101243426 A | 8/2008 |
| CN | 101268470 A | 9/2008 |
| CN | 101299694 A | 11/2008 |
| CN | 101321156 A | 12/2008 |
| CN | 101340274 A | 1/2009 |
| CN | 101341718 A | 1/2009 |
| CN | 101341727 A | 1/2009 |
| CN | 101350938 A | 1/2009 |
| CN | 101359291 A | 2/2009 |
| CN | 101409743 A | 4/2009 |
| CN | 101485128 A | 7/2009 |
| CN | 101488138 A | 7/2009 |
| CN | 100530059 C | 8/2009 |
| CN | 101501657 A | 8/2009 |
| CN | 101517563 A | 8/2009 |
| CN | 101610155 A | 12/2009 |
| CN | 101625620 A | 1/2010 |
| CN | 101673207 A | 3/2010 |
| CN | 101673298 A | 3/2010 |
| CN | 101854278 A | 10/2010 |
| CN | 101861562 A | 10/2010 |
| CN | 101873386 A | 10/2010 |
| CN | 101877748 A | 11/2010 |
| CN | 101882409 A | 11/2010 |
| CN | 101931655 A | 12/2010 |
| CN | 101976171 A | 2/2011 |
| CN | 102065148 A | 5/2011 |
| CN | 102077191 A | 5/2011 |
| CN | 102164213 A | 8/2011 |
| CN | 201928419 U | 8/2011 |
| CN | 102202192 A | 9/2011 |
| CN | 102209321 A | 10/2011 |
| CN | 102262506 A | 11/2011 |
| CN | 102281294 A | 12/2011 |
| CN | 102301323 A | 12/2011 |
| CN | 102396205 A | 3/2012 |
| CN | 102508707 A | 6/2012 |
| CN | 102523213 A | 6/2012 |
| CN | 102695302 A | 9/2012 |
| CN | 102707994 A | 10/2012 |
| CN | 102737313 A | 10/2012 |
| CN | 102740146 A | 10/2012 |
| CN | 102750066 A | 10/2012 |
| CN | 102750086 A | 10/2012 |
| CN | 102754071 A | 10/2012 |
| CN | 102859480 A | 1/2013 |
| CN | 102866828 A | 1/2013 |

(56) References Cited

FOREIGN PATENT DOCUMENTS

| | | |
|---|---|---|
| CN | 102902453 A | 1/2013 |
| CN | 102905181 A | 1/2013 |
| CN | 103067625 A | 4/2013 |
| CN | 103069378 A | 4/2013 |
| CN | 103139370 A | 6/2013 |
| CN | 103250138 A | 8/2013 |
| CN | 103260079 A | 8/2013 |
| CN | 103425451 A | 12/2013 |
| CN | 103458215 A | 12/2013 |
| CN | 103558916 A | 2/2014 |
| CN | 103576902 A | 2/2014 |
| CN | 103582873 A | 2/2014 |
| CN | 103593154 A | 2/2014 |
| CN | 103765385 A | 4/2014 |
| CN | 103793075 A | 5/2014 |
| CN | 103793138 A | 5/2014 |
| CN | 103853328 A | 6/2014 |
| CN | 103870255 A | 6/2014 |
| CN | 104106036 A | 10/2014 |
| CN | 104166458 A | 11/2014 |
| CN | 104205785 A | 12/2014 |
| CN | 104335234 A | 2/2015 |
| CN | 104503688 A | 4/2015 |
| CN | 105374192 A | 3/2016 |
| CN | 105388998 A | 3/2016 |
| CN | 105474580 A | 4/2016 |
| CN | 105549947 A | 5/2016 |
| CN | 105794231 A | 7/2016 |
| CN | 105900376 A | 8/2016 |
| CN | 105940678 A | 9/2016 |
| CN | 106030700 A | 10/2016 |
| CN | 106062810 A | 10/2016 |
| CN | 106383645 A | 2/2017 |
| CN | 106797415 A | 5/2017 |
| CN | 107533368 A | 1/2018 |
| CN | 107637073 A | 1/2018 |
| CN | 107819928 A | 3/2018 |
| CN | 108292203 A | 7/2018 |
| CN | 109117078 A | 1/2019 |
| CN | 109196825 A | 1/2019 |
| CN | 109287140 A | 1/2019 |
| CN | 109302531 A | 2/2019 |
| CN | 109347581 A | 2/2019 |
| CN | 109348052 A | 2/2019 |
| CN | 109688441 A | 4/2019 |
| CN | 109688442 A | 4/2019 |
| CN | 108683798 B | 4/2021 |
| EP | 459174 A2 | 12/1991 |
| EP | 0564247 A1 | 10/1993 |
| EP | 684543 A1 | 11/1995 |
| EP | 0844555 A2 | 5/1998 |
| EP | 0871177 A2 | 10/1998 |
| EP | 0880091 A2 | 11/1998 |
| EP | 0881563 A2 | 12/1998 |
| EP | 1079371 A1 | 2/2001 |
| EP | 1133119 A2 | 9/2001 |
| EP | 1186987 A2 | 3/2002 |
| EP | 1215575 A2 | 6/2002 |
| EP | 1357458 A2 | 10/2003 |
| EP | 1469374 A1 | 10/2004 |
| EP | 1615109 A2 | 1/2006 |
| EP | 1705883 A1 | 9/2006 |
| EP | 1760584 A1 | 3/2007 |
| EP | 1885109 A2 | 2/2008 |
| EP | 1942401 A1 | 7/2008 |
| EP | 2018032 A1 | 1/2009 |
| EP | 2180665 A1 | 4/2010 |
| EP | 2194698 A1 | 6/2010 |
| EP | 2247087 A1 | 11/2010 |
| EP | 2409214 A1 | 1/2012 |
| EP | 2420925 A2 | 2/2012 |
| EP | 2523109 A1 | 11/2012 |
| EP | 2568693 A2 | 3/2013 |
| EP | 2632193 A2 | 8/2013 |
| EP | 2674889 A2 | 12/2013 |
| EP | 2725473 A1 | 4/2014 |
| EP | 2733579 A2 | 5/2014 |
| EP | 2750062 A2 | 7/2014 |
| EP | 2770673 A1 | 8/2014 |
| EP | 2770708 A1 | 8/2014 |
| EP | 2891049 A1 | 7/2015 |
| EP | 2892240 A1 | 7/2015 |
| EP | 2891049 A4 | 3/2016 |
| EP | 2998822 A2 | 3/2016 |
| EP | 3032537 A2 | 6/2016 |
| EP | 3038427 A1 | 6/2016 |
| EP | 2568693 A3 | 7/2016 |
| EP | 3057342 A1 | 8/2016 |
| EP | 3073703 A1 | 9/2016 |
| EP | 3138300 A1 | 3/2017 |
| EP | 3276905 A1 | 1/2018 |
| EP | 3379853 A1 | 9/2018 |
| EP | 2632193 B1 | 10/2018 |
| EP | 3445058 A1 | 2/2019 |
| EP | 2568693 B1 | 12/2019 |
| EP | 3038427 B1 | 12/2019 |
| EP | 3633963 A1 | 4/2020 |
| GB | 2402105 A | 12/2004 |
| GB | 2466038 A | 6/2010 |
| GB | 2505476 A | 3/2014 |
| IN | 1038/MUM/2005 A | 6/2007 |
| JP | 5-266169 A | 10/1993 |
| JP | 8-147138 A | 6/1996 |
| JP | 8-166783 A | 6/1996 |
| JP | 9-97154 A | 4/1997 |
| JP | 9-258947 A | 10/1997 |
| JP | 10-198517 A | 7/1998 |
| JP | 10-232757 A | 9/1998 |
| JP | 11-272391 A | 10/1999 |
| JP | 2000-101879 A | 4/2000 |
| JP | 2000-105772 A | 4/2000 |
| JP | 2000-122957 A | 4/2000 |
| JP | 2000-163193 A | 6/2000 |
| JP | 2000-200092 A | 7/2000 |
| JP | 2000-231371 A | 8/2000 |
| JP | 2000-259477 A | 9/2000 |
| JP | 2000-284879 A | 10/2000 |
| JP | 2000-347921 A | 12/2000 |
| JP | 2001-202176 A | 7/2001 |
| JP | 2001-306375 A | 11/2001 |
| JP | 2001-331758 A | 11/2001 |
| JP | 2002-82745 A | 3/2002 |
| JP | 2002-288125 A | 10/2002 |
| JP | 2002-288690 A | 10/2002 |
| JP | 2002-342356 A | 11/2002 |
| JP | 2002-351768 A | 12/2002 |
| JP | 2003-30245 A | 1/2003 |
| JP | 2003-43978 A | 2/2003 |
| JP | 2003-52019 A | 2/2003 |
| JP | 2003-62975 A | 3/2003 |
| JP | 2003-264621 A | 9/2003 |
| JP | 2003-330586 A | 11/2003 |
| JP | 2003-330613 A | 11/2003 |
| JP | 2004-38895 A | 2/2004 |
| JP | 2004-104813 A | 4/2004 |
| JP | 2004-192573 A | 7/2004 |
| JP | 2004-348601 A | 12/2004 |
| JP | 2004-356816 A | 12/2004 |
| JP | 2005-44036 A | 2/2005 |
| JP | 2005-507112 A | 3/2005 |
| JP | 2005-190108 A | 7/2005 |
| JP | 2006-166248 A | 6/2006 |
| JP | 2006-295753 A | 10/2006 |
| JP | 2007-41976 A | 2/2007 |
| JP | 2007-304854 A | 11/2007 |
| JP | 2007-534009 A | 11/2007 |
| JP | 2007-334301 A | 12/2007 |
| JP | 2008-26439 A | 2/2008 |
| JP | 2008-99330 A | 4/2008 |
| JP | 2009-17486 A | 1/2009 |
| JP | 2009-93206 A | 4/2009 |
| JP | 2009-239867 A | 10/2009 |
| JP | 2009-296577 A | 12/2009 |
| JP | 2009-543166 A | 12/2009 |

(56) References Cited

FOREIGN PATENT DOCUMENTS

| | | |
|---|---|---|
| JP | 2009-543228 A | 12/2009 |
| JP | 2010-503082 A | 1/2010 |
| JP | 2010-503922 A | 2/2010 |
| JP | 2010-245940 A | 10/2010 |
| JP | 2010-257118 A | 11/2010 |
| JP | 2010-271779 A | 12/2010 |
| JP | 2011-65590 A | 3/2011 |
| JP | 2011-118662 A | 6/2011 |
| JP | 2011-209786 A | 10/2011 |
| JP | 2011-237857 A | 11/2011 |
| JP | 2012-168966 A | 9/2012 |
| JP | 2012-215938 A | 11/2012 |
| JP | 2013-506225 A | 2/2013 |
| JP | 2013-93699 A | 5/2013 |
| JP | 2013-98613 A | 5/2013 |
| JP | 2013-105468 A | 5/2013 |
| JP | 2013-530433 A | 7/2013 |
| JP | 2013-530458 A | 7/2013 |
| JP | 2013-175188 A | 9/2013 |
| JP | 2014-502454 A | 1/2014 |
| JP | 2014-503861 A | 2/2014 |
| JP | 2014-71835 A | 4/2014 |
| JP | 2014-87126 A | 5/2014 |
| JP | 2014-512044 A | 5/2014 |
| JP | 2014-110638 A | 6/2014 |
| JP | 2014-131359 A | 7/2014 |
| JP | 2014-170982 A | 9/2014 |
| JP | 2015-8001 A | 1/2015 |
| JP | 2015-14923 A | 1/2015 |
| JP | 2015-501022 A | 1/2015 |
| JP | 2015-61318 A | 3/2015 |
| JP | 2015-520456 A | 7/2015 |
| JP | 2015-524974 A | 8/2015 |
| JP | 2015-526776 A | 9/2015 |
| JP | 6023162 B2 | 11/2016 |
| JP | 2017-41008 A | 2/2017 |
| JP | 2018-7158 A | 1/2018 |
| KR | 10-2003-0030384 A | 4/2003 |
| KR | 10-2005-0072071 A | 7/2005 |
| KR | 10-2007-0101893 A | 10/2007 |
| KR | 10-2007-0120125 A | 12/2007 |
| KR | 10-0805341 B1 | 2/2008 |
| KR | 10-2009-0089472 A | 8/2009 |
| KR | 10-2010-036351 A | 4/2010 |
| KR | 10-2012-0003323 A | 1/2012 |
| KR | 10-2012-0088746 A | 8/2012 |
| KR | 10-2012-0100433 A | 9/2012 |
| KR | 10-1253392 B1 | 4/2013 |
| KR | 10-2013-0063019 A | 6/2013 |
| KR | 10-2013-0075783 A | 7/2013 |
| KR | 10-2013-0082190 A | 7/2013 |
| KR | 10-20130-108563 A | 10/2013 |
| KR | 10-2013-0141688 A | 12/2013 |
| KR | 10-1342208 B1 | 12/2013 |
| KR | 10-2014-0016244 A | 2/2014 |
| KR | 10-2014-0031283 A | 3/2014 |
| KR | 10-2014-0043370 A | 4/2014 |
| KR | 10-2014-0137400 A | 12/2014 |
| KR | 10-2014-0148289 A | 12/2014 |
| KR | 10-2015-0121177 A | 10/2015 |
| KR | 10-2016-0045633 A | 4/2016 |
| KR | 10-2016-0092363 A | 8/2016 |
| KR | 10-2016-0141847 A | 12/2016 |
| KR | 10-2017-0008601 A | 1/2017 |
| KR | 10-2017-0027435 A | 3/2017 |
| KR | 10-2017-0027999 A | 3/2017 |
| KR | 10-2017-0082022 A | 7/2017 |
| KR | 10-2017-0100358 A | 9/2017 |
| KR | 10-2017-0124954 A | 11/2017 |
| KR | 10-1820573 B1 | 1/2018 |
| KR | 10-2018-0034637 A | 4/2018 |
| KR | 10-2018-0085931 A | 7/2018 |
| KR | 10-2019-0002658 A | 1/2019 |
| KR | 10-2019-0014495 A | 2/2019 |
| KR | 10-2019-0022883 A | 3/2019 |
| KR | 10-2019-0057414 A | 5/2019 |
| KR | 10-2020-0039030 A | 4/2020 |
| KR | 10-2022-0004223 A | 1/2022 |
| MX | 336834 B | 2/2016 |
| TW | 201131471 A | 9/2011 |
| TW | 201137722 A | 11/2011 |
| TW | 201316247 A | 4/2013 |
| TW | 201324310 A | 6/2013 |
| TW | 201403363 A | 1/2014 |
| TW | 201409345 A | 3/2014 |
| TW | 2014015345 A | 4/2014 |
| TW | 201416959 A | 5/2014 |
| WO | 1999/44114 A1 | 9/1999 |
| WO | 2002/01864 A1 | 1/2002 |
| WO | 2003/036457 A2 | 5/2003 |
| WO | 2003/054832 A1 | 7/2003 |
| WO | 2003/062975 A1 | 7/2003 |
| WO | 2003/062976 A1 | 7/2003 |
| WO | 2004/095414 A1 | 11/2004 |
| WO | 2004/104813 A1 | 12/2004 |
| WO | 2005/031608 A2 | 4/2005 |
| WO | 2005/053225 A1 | 6/2005 |
| WO | 2005/109829 A1 | 11/2005 |
| WO | 2006/011139 A2 | 2/2006 |
| WO | 2006/020304 A2 | 2/2006 |
| WO | 2006/020305 A2 | 2/2006 |
| WO | 2006/113834 A2 | 10/2006 |
| WO | 2006/130234 A2 | 12/2006 |
| WO | 2007/073422 A1 | 6/2007 |
| WO | 2007/102110 A2 | 9/2007 |
| WO | 2007/142703 A1 | 12/2007 |
| WO | 2007/149731 A1 | 12/2007 |
| WO | 2008/027924 A2 | 3/2008 |
| WO | 2008/030976 A2 | 3/2008 |
| WO | 2008/033853 A2 | 3/2008 |
| WO | 2008/085742 A2 | 7/2008 |
| WO | 2008/151229 A1 | 12/2008 |
| WO | 2009/005563 A1 | 1/2009 |
| WO | 2009/067670 A1 | 5/2009 |
| WO | 2009/086599 A1 | 7/2009 |
| WO | 2009/097592 A1 | 8/2009 |
| WO | 2010/087988 A1 | 8/2010 |
| WO | 2010/107661 A1 | 9/2010 |
| WO | 2010/120972 A1 | 10/2010 |
| WO | 2010/128442 A2 | 11/2010 |
| WO | 2011/027964 A1 | 3/2011 |
| WO | 2011/041427 A2 | 4/2011 |
| WO | 2011/084857 A1 | 7/2011 |
| WO | 2011/126502 A1 | 10/2011 |
| WO | 2011/149231 A2 | 12/2011 |
| WO | 2012/004288 A1 | 1/2012 |
| WO | 2012/006494 A1 | 1/2012 |
| WO | 2012/028773 A1 | 3/2012 |
| WO | 2012/050927 A2 | 4/2012 |
| WO | 2012/051052 A1 | 4/2012 |
| WO | 2012/104288 A1 | 8/2012 |
| WO | 2012/126078 A1 | 9/2012 |
| WO | 2012/154748 A1 | 11/2012 |
| WO | 2012/166352 A1 | 12/2012 |
| WO | 2012/170446 A2 | 12/2012 |
| WO | 2013/000150 A1 | 1/2013 |
| WO | 2013/026023 A1 | 2/2013 |
| WO | 2013/048880 A1 | 4/2013 |
| WO | 2013/049346 A1 | 4/2013 |
| WO | 2013/097882 A1 | 7/2013 |
| WO | 2013/097895 A1 | 7/2013 |
| WO | 2013/097896 A1 | 7/2013 |
| WO | 2013/111239 A1 | 8/2013 |
| WO | 2013/132144 A1 | 9/2013 |
| WO | 2013/135270 A1 | 9/2013 |
| WO | 2013/137503 A1 | 9/2013 |
| WO | 2013/153405 A2 | 10/2013 |
| WO | 2013/169842 A2 | 11/2013 |
| WO | 2013/169846 A1 | 11/2013 |
| WO | 2013/169875 A2 | 11/2013 |
| WO | 2013/173504 A1 | 11/2013 |
| WO | 2013/173838 A2 | 11/2013 |
| WO | 2013/176847 A1 | 11/2013 |
| WO | 2014/021967 A1 | 2/2014 |

(56) References Cited

FOREIGN PATENT DOCUMENTS

| | | |
|---|---|---|
| WO | 2014/030320 A1 | 2/2014 |
| WO | 2014/032461 A1 | 3/2014 |
| WO | 2014/078965 A1 | 5/2014 |
| WO | 2014/105274 A1 | 7/2014 |
| WO | 2014/105276 A1 | 7/2014 |
| WO | 2014/107469 A2 | 7/2014 |
| WO | 2014/115605 A1 | 7/2014 |
| WO | 2014/128800 A1 | 8/2014 |
| WO | 2014/143776 A2 | 9/2014 |
| WO | 2014/147297 A1 | 9/2014 |
| WO | 2014/151089 A1 | 9/2014 |
| WO | 2013/173504 A8 | 12/2014 |
| WO | 2014/197279 A1 | 12/2014 |
| WO | 2015/008409 A1 | 1/2015 |
| WO | 2015/062410 A1 | 5/2015 |
| WO | 2015/076930 A1 | 5/2015 |
| WO | 2015/124831 A1 | 8/2015 |
| WO | 2015/134692 A1 | 9/2015 |
| WO | 2015/185123 A1 | 12/2015 |
| WO | 2016/033400 A1 | 3/2016 |
| WO | 2016/036472 A1 | 3/2016 |
| WO | 2016/036541 A2 | 3/2016 |
| WO | 2016/057117 A1 | 4/2016 |
| WO | 2016/200603 A1 | 12/2016 |
| WO | 2016/204186 A1 | 12/2016 |
| WO | 2017/027526 A1 | 2/2017 |
| WO | 2017/058293 A1 | 4/2017 |
| WO | 2017/058442 A1 | 4/2017 |
| WO | 2017/112003 A1 | 6/2017 |
| WO | 2017/147081 A1 | 8/2017 |
| WO | 2017/218143 A1 | 12/2017 |
| WO | 2017/218192 A1 | 12/2017 |
| WO | 2018/025030 A2 | 2/2018 |
| WO | 2018/048510 A1 | 3/2018 |
| WO | 2018/067531 A1 | 4/2018 |
| WO | 2018/084802 A1 | 5/2018 |
| WO | 2018/085671 A1 | 5/2018 |
| WO | 2018/089700 A1 | 5/2018 |
| WO | 2018/098136 A1 | 5/2018 |
| WO | 2018/144339 A2 | 8/2018 |
| WO | 2018/213401 A1 | 11/2018 |
| WO | 2018/213415 A1 | 11/2018 |
| WO | 2018/232333 A1 | 12/2018 |
| WO | 2020/063762 A1 | 4/2020 |
| WO | 2020/076365 A1 | 4/2020 |
| WO | 2020/242577 A1 | 12/2020 |
| WO | 2020/243691 A1 | 12/2020 |
| WO | 2021/010993 A1 | 1/2021 |

OTHER PUBLICATIONS

Decision on Appeal received for U.S. Appl. No. 14/641,298, mailed on Nov. 1, 2021, 9 pages.
Decision to Grant received for European Patent Application No. 16710590.7, dated Oct. 28, 2021, 2 pages.
Final Office Action received for U.S. Appl. No. 16/679,967, dated Nov. 10, 2021, 14 pages.
Notice of Acceptance received for Australian Patent Application No. 2021201403, dated Oct. 22, 2021, 3 pages.
Office Action received for Chinese Patent Application No. 201810338040.5, dated Oct. 25, 2021, 22 pages (13 pages of English Translation and 9 pages of Official Copy).
Office Action received for Chinese Patent Application No. 201810339290.0, dated Oct. 18, 2021, 20 pages (11 pages of English Translation and 9 pages of Official Copy).
Pu, Fang, "Research on Location-aware Service in Pervasive Computing", Issue No. 7, Information Technology Series, China Doctoral Dissertations, Jul. 15, 2008, 140 pages (Official Copy only) (See Communication under 37 CFR § 1.98(a) (3)).
Corrected Notice of Allowance received for U.S. Appl. No. 17/013,778, dated Mar. 7, 2023, 5 pages.
Corrected Notice of Allowance received for U.S. Appl. No. 17/871,627, dated Mar. 7, 2023, 2 pages.
Decision on Opposition received for Australian Patent Application No. 2018271366, mailed on Mar. 3, 2023, 3 pages.
Final Office Action received for U.S. Appl. No. 17/314,948, dated Mar. 7, 2023, 31 pages.
Final Office Action received for U.S. Appl. No. 17/489,508, dated Mar. 10, 2023, 25 pages.
Intention to Grant received for Danish Patent Application No. PA202270464, dated Feb. 20, 2023, 2 pages.
Non-Final Office Action received for U.S. Appl. No. 17/747,804, dated Mar. 1, 2023, 14 pages.
Non-Final Office Action received for U.S. Appl. No. 17/752,582, dated Mar. 6, 2023, 17 pages.
Non-Final Office Action received for U.S. Appl. No. 17/867,317, dated Feb. 28, 2023, 18 pages.
Notice of Acceptance received for Australian Patent Application No. 2021201243, dated Feb. 23, 2023, 3 pages.
Notice of Acceptance received for Australian Patent Application No. 2022200901, dated Mar. 9, 2023, 3 pages.
Notice of Acceptance received for Australian Patent Application No. 2022203561, dated Feb. 27, 2023, 3 pages.
Notice of Allowance received for U.S. Appl. No. 17/013,778, dated Feb. 23, 2023, 8 pages.
Notice of Allowance received for U.S. Appl. No. 17/519,025, dated Mar. 2, 2023, 8 pages.
Office Action received for Chinese Patent Application No. 202111652452.4, dated Feb. 11, 2023, 28 pages (13 pages of English Translation and 15 pages of Official Copy).
Office Action received for European Patent Application No. 20760624.5, dated Mar. 7, 2023, 13 pages.
Office Action received for European Patent Application No. 21166718.3, dated Feb. 20, 2023, 7 pages.
Office Action received for European Patent Application No. 21728781.2, dated Mar. 1, 2023, 13 pages.
Philips Support Website, "How to switch to preferred audio language in Philips TV from a broadcast with multiple languages audio stream?", Available Online at: https://www.usa.philips.com/c-f/XC000010105/how-to-switch-to-preferred-audio-language-in-philips-tv-from-a-broadcast-with-multiple-languages-audio-stream, Dec. 29, 2016, 5 pages.
Supplemental Notice of Allowance received for U.S. Appl. No. 16/888,775, dated Mar. 1, 2023, 2 pages.
Applicant-Initiated Interview Summary received for U.S. Appl. No. 16/803,849, dated Oct. 12, 2021, 6 pages.
Brumberg et al., "The Unlock Project: A Python-based framework for practical brain-computer interface communication "app" development", Conf Proc IEEE Eng Med Biol Soc. 2012, doi:10.1109/EMBC.2012.6346473, Institute of Electrical and Electronics Engineers, 2012, 11 pages.
Corrected Notice of Allowance received for U.S. Appl. No. 16/807,604, dated Oct. 14, 2021, 3 pages.
Corrected Notice of Allowance received for U.S. Appl. No. 16/836,571, dated Oct. 12, 2021, 4 pages.
Han, Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages (Official Copy only). {See Communication under 37 CFR § 1.98(a) (3)}.
Intention to Grant received for European Patent Application No. 15760008.1, dated Oct. 5, 2021, 11 pages.
Office Action received for Chinese Patent Application No. 201580043701.6, dated Sep. 10, 2021, 10 pages (5 pages of English Translation and 5 pages of Official Copy).
Office Action received for European Patent Application No. 15714698.6, dated Oct. 13, 2021, 2 pages.
Record of Oral Hearing received for U.S. Appl. No. 14/641,298, mailed on Oct. 8, 2021, 17 pages.
Search Report and Opinion received for Danish Patent Application No. PA202170320, dated Oct. 6, 2021, 9 pages.
Notice of Allowance received for Japanese Patent Application No. 2020-558885, dated Jul. 26, 2021, 4 pages (1 page of English Translation and 3 pages of Official Copy).

(56) References Cited

OTHER PUBLICATIONS

Notice of Allowance received for Korean Patent Application No. 10-2020-0024632, dated Jul. 26, 2021, 3 pages (1 page of English Translation and 2 pages of Official Copy).
Notice of Allowance received for U.S. Appl. No. 16/987,003, dated Aug. 18, 2021, 9 pages.
Office Action received for Australian Patent Application No. 2021204454, dated Aug. 9, 2021, 7 pages.
Office Action received for Chinese Patent Application No. 201811367893.8, dated Jun. 21, 2021, 18 pages (8 pages of English Translation and 10 pages of Official Copy).
Notice of Allowance received for U.S. Appl. No. 17/062,891, dated Apr. 25, 2022, 9 pages.
Office Action received for Chinese Patent Application No. 202110235995.X, dated Mar. 22, 2022, 17 pages (9 pages of English Translation and 8 pages of Official Copy).
Androidcentral, "How do i respond to group messages from notification bar?", Available online at: https://forums.androidcentral.com/ask-question/952030-how-do-i-respond-group-messages-notification-bar.html, Mar. 25, 2019, 3 pages.
Applicant-Initiated Interview Summary received for U.S. Appl. No. 16/836,571, dated Jul. 7, 2021, 6 pages.
Board Decision received for Chinese Patent Application No. 201580046339.8, dated Jun. 22, 2021, 12 pages (1 page of English Translation and 11 pages of Official Copy).
Brief Communication Regarding Oral Proceedings received for European Patent Application No. 19169980.0, mailed on Jun. 17, 2021, 2 pages.
Corrected Notice of Allowance received for U.S. Appl. No. 16/583,994, dated Jul. 6, 2021, 3 pages.
Corrected Notice of Allowance received for U.S. Appl. No. 16/702,968, dated Jun. 28, 2021, 4 pages.
Corrected Notice of Allowance received for U.S. Appl. No. 16/807,604, dated Jun. 28, 2021, 3 pages.
Decision to Grant received for European Patent Application No. 15719347.5, dated Jun. 24, 2021, 2 pages.
Intention to Grant received for European Patent Application No. 16710590.7, dated Jun. 14, 2021, 8 pages.
Invitation to Pay Search Fees received for European Patent Application No. 18733381.0, dated Jun. 30, 2021, 4 pages.
Notice of Allowance received for U.S. Appl. No. 16/583,994, dated Jun. 24, 2021, 10 pages.
Notice of Allowance received for U.S. Appl. No. 17/031,833, dated Jun. 25, 2021, 15 pages.
Office Action received for Chinese Patent Application No. 201810338040.5, dated Jun. 3, 2021, 25 pages (15 pages of English Translation and 10 pages of Official Copy).
Office Action received for Chinese Patent Application No. 201810339290.0, dated Jun. 4, 2021, 20 pages (11 pages of English Translation and 9 pages of Official Copy).
Office Action received for Chinese Patent Application No. 202010125114.4, dated Jun. 7, 2021, 7 pages (4 pages of English Translation and 3 pages of Official Copy).
Summons to Attend Oral Proceedings received for European Patent Application No. 18178147.7, mailed on Jun. 28, 2021, 8 pages.
Applicant-Initiated Interview Summary received for U.S. Appl. No. 16/679,967, dated Feb. 10, 2022, 2 pages.
Notice of Allowance received for Chinese Patent Application No. 201580043701.6, dated Jan. 26, 2022, 2 pages (1 page of English Translation and 1 page of Official Copy).
Notice of Allowance received for Chinese Patent Application No. 201780033899.9, dated Feb. 8, 2022, 2 pages (1 page of English Translation and 1 page of Official Copy).
Notice of Allowance received for U.S. Appl. No. 16/836,571, dated Feb. 14, 2022, 31 pages.
Notice of Allowance received for U.S. Appl. No. 16/922,675, dated Feb. 10, 2022, 8 pages.
Office Action received for Japanese Patent Application No. 2020-184605, dated Feb. 14, 2022, 24 pages (11 pages of English Translation and 13 pages of Official Copy).
Board Decision received for Chinese Patent Application No. 201811367893.8, dated Aug. 25, 2022, 2 pages (1 page of English Translation and 1 page of Official Copy).
Brief Communication regarding Oral Proceedings received for European Patent Application No. 19150528.8, mailed on Sep. 5, 2022, 2 pages.
Notice of Allowance received for Japanese Patent Application No. 2022-102840, dated Aug. 19, 2022, 4 pages (1 page of English Translation and 3 pages of Official Copy).
Office Action received for Chinese Patent Application No. 202111612841.4, dated Jul. 22, 2022, 13 pages (7 pages of English Translation and 6 pages of Official Copy).
Office Action received for European Patent Application No. 21197457.1, dated Sep. 2, 2022, 8 pages.
"13 questions and answers about using Apple Pay online", Online available at: http://www.it528.com/apple/1356.html, Feb. 18, 2016, 5 pages (Official Copy Only). {See Communication under 37 CFR § 1.98(a) (3)}.
Board Opinion received for Chinese Patent Application No. 201910164962.3, dated Sep. 16, 2021, 16 pages (6 pages of English Translation and 10 pages of Official Copy).
Corrrected Notice of Allowance received for U.S. Appl. No. 16/807,604, dated Oct. 4, 2021, 5 pages.
International Search Report and Written Opinion received for PCT Patent Application No. PCT/US2021/031760, dated Sep. 16, 2021, 18 pages.
Minutes of the Oral Proceedings received for European Patent Application No. 1576008.1, dated Sep. 21, 2021, 6 pages.
Notice of Allowance received for U.S. Appl. No. 16/263,280, dated Sep. 17, 2021, 8 pages.
Notice of Allowance received for U.S. Appl. No. 16/922,675, dated Sep. 27, 2021, 10 pages.
Office Action received for Chinese Patent Application No. 201711292804.3, dated Sep. 10, 2021, 19 pages (8 pages of English Translation and 11 pages of Official Copy).
Office Action received for Chinese Patent Application No. 201780033899.9, dated Sep. 3, 2021, 12 pages (6 pages of English Translation and 6 pages of Official Copy).
Office Action received for Danish Patent Application No. PA202070617, dated Sep. 24, 2021, 4 pages.
Office Action received for Japanese Patent Application No. 2021-026630, dated Aug. 20, 2021, 7 pages (3 pages of English Translation and 4 pages of Official Copy).
Decision to Refuse received for European Patent Application No. 18208881.5, dated Dec. 23, 2022, 12 pages.
Invitation to Pay Search Fees received for European Patent Application No. 20760624.5, dated Jan. 2, 2023, 3 pages.
Minutes of Oral Proceedings received for European Patent Application No. 18208881.5, mailed on Dec. 22, 2022, 4 pages.
Minutes of Oral Proceedings received for European Patent Application No. 18728002.9, mailed on Dec. 22, 2022, 7 pages.
Non-Final Office Action received for U.S. Appl. No. 17/320,900, dated Dec. 22, 2022, 30 pages.
Non-Final Office Action received for U.S. Appl. No. 17/509,356, dated Dec. 22, 2022, 16 pages.
Notice of Acceptance received for Australian Patent Application No. 2022200515, dated Dec. 21, 2022, 3 pages.
Office Action received for Australian Patent Application No. 2022203561, dated Dec. 16, 2022, 2 pages.
Office Action received for Danish Patent Application No. PA202270464, dated Dec. 20, 2022, 3 pages.
Office Action received for Korean Patent Application No. 10-2022-0053111, dated Dec. 12, 2022, 9 pages (4 pages of English Translation and 5 pages of Official Copy).
Brief Communication Regarding Oral Proceedings received for European Patent Application No. 17799904.2, mailed on Sep. 13, 2022, 1 page.
Brief Communication Regarding Oral Proceedings received for European Patent Application No. 17813737.8, mailed on Sep. 19, 2022, 1 page.
Decision to Refuse received for European Patent Application No. 17799904.2, dated Sep. 19, 2022, 4 pages.

(56) References Cited

OTHER PUBLICATIONS

Decision to Refuse received for European Patent Application No. 19150528.8, dated Sep. 9, 2022, 4 pages.
Non-Final Office Action received for U.S. Appl. No. 17/476,404, dated Sep. 14, 2022, 31 pages.
Notice of Allowance received for Chinese Patent Application No. 201811367893.8, dated Sep. 2, 2022, 2 pages (1 page of English Translation and 1 page of Official Copy).
Office Action received for European Patent Application No. 20720675.6, dated Sep. 8, 2022, 6 pages.
Applicant-Initiated Interview Summary received for U.S. Appl. No. 17/509,356, dated Feb. 3, 2023, 3 pages.
Corrected Notice of Allowance received for U.S. Appl. No. 16/922,675, dated Jan. 20, 2023, 3 pages.
Corrected Notice of Allowance received for U.S. Appl. No. 17/871,627, dated Feb. 8, 2023, 2 pages.
Notice of Allowance received for Japanese Patent Application No. 2022-014389, dated Jan. 27, 2023, 4 pages (1 page of English Translation and 3 pages of Official Copy).
Notice of Allowance received for Japanese Patent Application No. 2022-125792, dated Jan. 27, 2023, 4 pages (1 page of English Translation and 3 pages of Official Copy).
Notice of Allowance received for Korean Patent Application No. 10-2022-7006175, dated Jan. 12, 2023, 7 pages (2 pages of English Translation and 5 pages of Official Copy).
Notice of Allowance received for U.S. Appl. No. 17/871,627, dated Jan. 20, 2023, 11 pages.
Office Action received for European Patent Application No. 20719301.2, dated Jan. 24, 2023, 9 pages.
Advisory Action received for U.S. Appl. No. 17/181,089, dated Dec. 20, 2022, 4 pages.
Applicant-Initiated Interview Summary received for U.S. Appl. No. 17/476,404, dated Dec. 20, 2022, 2 pages.
Brief Communication Regarding Oral Proceedings received for European Patent Application No. 18728002.9, mailed on Dec. 7, 2022, 1 page.
Cohn, Emily, "Sonos Just Fixed the Most Annoying Thing About Its iPhone App", online available at: https://www.businessinsider.com/sonos-mobile-app-works-on-lock-screen-2016-6, Jun. 27, 2016, 2 pages.
Decision to Grant received for European Patent Application No. 20158824.1, dated Dec. 15, 2022, 3 pages.
Examiner's Answer to Appeal Brief received for U.S. Appl. No. 17/013,778, mailed on Dec. 20, 2022, 9 pages.
Fingas, Jon, "Sonos Puts Speaker Controls on Your iPhone's Lock Screen", online available at https://www.engadget.com/2016-06-21-sonos-ios-lock-screen-controls.html, Jun. 21, 2016, 3 pages.
International Search Report and Written Opinion received for PCT Patent Application No. PCT/US2022/031252, dated Oct. 7, 2022, 18 pages.
Invitation to Pay Additional Fees and Partial International Search Report received for PCT Patent Application No. PCT/US2022/032340, dated Nov. 21, 2022, 14 pages.
Invitation to Pay Search Fees received for European Patent Application No. 15714698.6, dated Dec. 16, 2022, 4 pages.
Kazmucha, Allyson, "Sonos Controller App for iPhone and iPad Review", online available at https://www.imore.com/sonos-controller-app-iphone-and-ipad-review, Mar. 1, 2018, 4 pages.
Non-Final Office Action received for U.S. Appl. No. 17/666,971, dated Dec. 8, 2022, 26 pages.
Notice of Allowance received for U.S. Appl. No. 16/922,675, dated Dec. 8, 2022, 9 pages.
Office Action received for Australian Patent Application No. 2021201243, dated Dec. 12, 2022, 3 pages.
Office Action received for Australian Patent Application No. 2022200901, dated Dec. 19, 2022, 4 pages.
Office Action received for Australian Patent Application No. 2022201532, dated Dec. 19, 2022, 5 pages.
Office Action received for Japanese Patent Application No. 2020-184605, dated Dec. 12, 2022, 9 pages (4 pages of English Translation and 5 pages of Official Copy).
Result of Consultation received for European Patent Application No. 18208881.5, dated Dec. 6, 2022, 10 pages.
Supplemental Notice of Allowance received for U.S. Appl. No. 16/917,659, dated Dec. 21, 2022, 3 pages.
Applicant-Initiated Interview Summary received for U.S. Appl. No. 17/479,974, dated Apr. 4, 2023, 2 pages.
Applicant-Initiated Interview Summary received for U.S. Appl. No. 17/747,804, dated Mar. 17, 2023, 4 pages.
Intention to Grant received for European Patent Application No. 20720675.6, dated Mar. 24, 2023, 9 pages.
International Search Report and Written Opinion received for PCT Patent Application No. PCT/US2022/043733, dated Jan. 3, 2023, 12 pages.
Non-Final Office Action received for U.S. Appl. No. 17/476,404, dated Mar. 30, 2023, 29 pages.
Non-Final Office Action received for U.S. Appl. No. 17/835,110, dated Apr. 3, 2023, 28 pages.
Non-Final Office Action received for U.S. Appl. No. 18/077,971, dated Apr. 3, 2023, 24 pages.
Notice of Acceptance received for Australian Patent Application No. 2021261941, dated Mar. 15, 2023, 3 pages.
Notice of Allowance received for U.S. Appl. No. 16/922,675, dated Mar. 22, 2023, 8 pages.
Notice of Allowance received for U.S. Appl. No. 18/077,905, dated Mar. 24, 2023, 18 pages.
Office Action received for Australian Patent Application No. 2022241590, dated Mar. 17, 2023, 5 pages.
Office Action received for Chinese Patent Application No. 201811539259.8, dated Mar. 13, 2023, 16 pages (8 pages of English Translation and 8 pages of Official Copy).
Office Action received for Indian Patent Application No. 202215025360, dated Mar. 29, 2023, 6 pages.
Office Action received for Indian Patent Application No. 202215025361, dated Mar. 29, 2023, 6 pages.
Office Action received for Indian Patent Application No. 202215025363, dated Mar. 29, 2023, 6 pages.
Office Action received for Indian Patent Application No. 202215025364, dated Mar. 29, 2023, 6 pages.
Office Action received for Japanese Patent Application No. 2022-201453, dated Mar. 6, 2023, 8 pages (5 pages of English Translation and 3 pages of Official Copy).
Corrected Notice of Allowance received for U.S. Appl. No. 16/422,736, dated Jul. 9, 2021, 2 pages.
Decision to Refuse received for European Patent Application No. 19169980.0, dated Jul. 15, 2021, 4 pages.
Extended European Search Report received for European Patent Application No. 21166718.3, dated Jul. 6, 2021, 11 pages.
Non-Final Office Action received for U.S. Appl. No. 17/062,891, dated Jul. 13, 2021, 12 pages.
Notice of Allowance received for Brazilian Patent Application No. BR112014003009-0, dated Jun. 15, 2021, 3 pages (1 page of English Translation and 2 pages of Official Copy).
Office Action received for Australian Patent Application No. 2020207785, dated Jul. 13, 2021, 3 pages.
Office Action received for Australian Patent Application No. 2020273355, dated Jul. 6, 2021, 3 pages.
Board Decision received for Chinese Patent Application No. 201580043701.6, dated Aug. 19, 2021, 2 pages (1 page of English Translation and 1 page of Official Copy).
Corrected Notice of Allowance received for U.S. Appl. No. 16/987,003, dated Sep. 1, 2021, 3 pages.
Non-Final Office Action received for U.S. Appl. No. 17/013,778, dated Aug. 20, 2021, 9 pages.
Office Action received for Korean Patent Application No. 10-2021-7021047, dated Aug. 13, 2021, 5 pages (2 pages of English Translation and 3 pages of Official Copy).
Sony, "Sony Smartwatch 3 SWR50", User Guide, Jul. 2014, 31 pages.
Corrected Notice of Allowance received for U.S. Appl. No. 18/077,905, dated Apr. 26, 2023, 3 pages.

(56) References Cited

OTHER PUBLICATIONS

Final Office Action received for U.S. Appl. No. 17/747,804, dated Apr. 28, 2023, 17 pages.
International Preliminary Report on Patentability received for PCT Patent Application No. PCT/US2021/054470, dated Apr. 27, 2023, 9 pages.
Notice of Allowance received for Chinese Patent Application No. 202080039642.6, dated Apr. 17, 2023, 6 pages (2 pages of English Translation and 4 pages of Official Copy).
Office Action received for European Patent Application No. 15714698.6, dated Apr. 18, 2023, 14 pages.
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Corrected Notice of Allowance received for U.S. Appl. No. 16/263,280, dated Aug. 5, 2021, 4 pages.
Corrected Notice of Allowance received for U.S. Appl. No. 16/807,604, dated Jul. 26, 2021, 3 pages.
Corrected Notice of Allowance received for U.S. Appl. No. 17/031,833, dated Aug. 2, 2021, 3 pages.
Extended European Search Report received for European Patent Application No. 21160991.2, dated Jul. 16, 2021, 14 pages.
Final Office Action received for U.S. Appl. No. 17/026,818, dated Jan. 29, 2021, 21 pages.
Intention to Grant received for European Patent Application No. 18197583.0, dated Jul. 23, 2021, 9 pages.
Non-Final Office Action received for U.S. Appl. No. 17/026,818, dated Nov. 25, 2020, 20 pages.
Non-Final Office Action received for U.S. Appl. No. 17/223,794, dated Jun. 16, 2021, 32 pages.
Notice of Allowance received for Korean Patent Application No. 10-2021-7020549, dated Jul. 13, 2021, 3 pages (1 page of English Translation and 2 pages of Official Copy).
Notice of Allowance received for U.S. Appl. No. 16/888,775, dated Jul. 26, 2021, 5 pages.
Notice of Allowance received for U.S. Appl. No. 17/026,818, dated May 13, 2021, 10 pages.
Search Report and Opinion received for Danish Patent Application No. PA202070617, dated Dec. 23, 2020, 8 pages.
Corrected Notice of Allowance received for U.S. Appl. No. 16/803,849, dated Jul. 7, 2022, 3 pages.
Corrected Notice of Allowance received for U.S. Appl. No. 17/027,373, dated Jul. 12, 2022, 2 pages.
Notice of Allowance received for Japanese Patent Application No. 2021-074395, dated Jun. 27, 2022, 4 pages (1 page of English Translation and 3 pages of Official Copy).
Notice of Allowance received for Korean Patent Application No. 10-2021-7032984, dated Jun. 29, 2022, 5 pages (2 pages of English Translation and 3 pages of Official Copy).
Notice of Allowance received for U.S. Appl. No. 16/917,659, dated Jul. 8, 2022, 11 pages.
Summons to Attend Oral Proceedings received for European Patent Application No. 18208881.5, mailed on Jun. 29, 2022, 9 pages.
Corrected Notice of Allowance received for U.S. Appl. No. 16/922,675, dated Jan. 9, 2023, 3 pages.
Extended European Search Report received for European Patent Application No. 22195584.2, dated Jan. 5, 2023, 13 pages.
Extended European Search Report received for European Patent Application No. 22201007.6, dated Jan. 12, 2023, 7 pages.
International Search Report and Written Opinion received for PCT Patent Application No. PCT/US2022/032340, dated Jan. 12, 2023, 18 pages.
Notice of Allowance received for Chinese Patent Application No. 202111612841.4, dated Jan. 5, 2023, 3 pages (2 pages of English Translation & 1 page of Official Copy).
Office Action received for Korean Patent Application No. 10-2022-7001521, dated Dec. 26, 2022, 13 pages (6 pages of English Translation and 7 pages of Official Copy).

Applicant-Initiated Interview Summary received for U.S. Appl. No. 17/062,891, dated Apr. 5, 2022, 4 pages.
Applicant-Initiated Interview Summary received for U.S. Appl. No. 17/168,069, dated Nov. 17, 2021, 2 pages.
Corrected Notice of Allowance received for U.S. Appl. No. 16/836,571, dated Mar. 25, 2022, 2 pages.
Corrected Notice of Allowance received for U.S. Appl. No. 17/168,069, dated Feb. 9, 2022, 2 pages.
Examiner-Initiated Interview Summary received for U.S. Appl. No. 17/027,373, dated Mar. 31, 2022, 4 pages.
Final Office Action received for U.S. Appl. No. 17/013,778, dated Apr. 1, 2022, 11 pages.
International Search Report and Written Opinion received for PCT Patent Application No. PCT/US2021/048358, dated Feb. 24, 2022, 21 pages.
Invitation to Pay Additional Fees received for PCT Patent Application No. PCT/US2021/048358, dated Dec. 23, 2021, 14 pages.
Non-Final Office Action received for U.S. Appl. No. 17/168,069, dated Jul. 21, 2021, 17 pages.
Notice of Acceptance received for Australian Patent Application No. 2020285521, dated Mar. 15, 2022, 3 pages.
Notice of Acceptance received for Australian Patent Application No. 2022201369, dated Mar. 17, 2022, 3 pages.
Notice of Allowance received for Chinese Patent Application No. 201810338040.5, dated Mar. 30, 2022, 6 pages (2 pages of English Translation and 4 pages of Official Copy).
Notice of Allowance received for Korean Patent Application No. 10-2021-7041874, dated Mar. 24, 2022, 4 pages (1 page of English Translation and 3 pages of Official Copy).
Notice of Allowance received for U.S. Appl. No. 17/168,069, dated Jan. 19, 2022, 12 pages.
Notice of Allowance received for U.S. Appl. No. 17/168,069, dated Mar. 22, 2022, 5 pages.
Office Action received for Australian Patent Application No. 2018271366, dated May 17, 2021, 5 pages.
Office Action received for Chinese Patent Application No. 201811367893.8, dated Feb. 15, 2022, 14 pages (6 pages of English Translation and 8 pages of Official Copy).
Office Action received for European Patent Application No. 21160991.2, dated Mar. 24, 2022, 11 pages.
Office Action received for Japanese Patent Application No. 2020-159840, dated Mar. 28, 2022, 6 pages (3 pages of English Translation and 3 pages of Official Copy).
Qiye, Wang, "Design and Implementation of SAN Device Access Control in Unified Storage Platform", Master's Theses, Huazhong University of Science & Technology, Wuhan, Jun. 2008, 63 pages (Official Copy only). {See Communication under 37 CFR § 1.98(a)(3)}.
Supplemental Notice of Allowance received for U.S. Appl. No. 17/168,069, dated Feb. 2, 2022, 2 pages.
Applicant Initiated Interview Summary received for U.S. Appl. No. 17/176,908, dated Jun. 14, 2022, 6 pages.
Brief Communication Regarding Oral Proceedings received for European Patent Application No. 20158824.1, mailed on May 30, 2022, 1 page.
Corrected Notice of Allowance received for U.S. Appl. No. 16/803,849, dated Jun. 8, 2022, 3 pages.
Decision to Grant received for European Patent Application No. 19207753.5, dated Jun. 2, 2022, 3 pages.
Non-Final Office Action received for U.S. Appl. No. 16/922,675, dated Jun. 8, 2022, 21 pages.
Notice of Allowance received for Japanese Patent Application No. 2021-571464, dated May 30, 2022, 4 pages (1 page of English Translation and 3 pages of Official Copy).
Notice of Allowance received for U.S. Appl. No. 16/679,967, dated Jun. 15, 2022, 7 pages.
Office Action received for Australian Patent Application No. 2021201243, dated Jun. 1, 2022, 5 pages.
Office Action received for Chinese Patent Application No. 201811367893.8, dated Apr. 27, 2022, 11 pages (5 pages of English Translation and 6 pages of Official Copy).

(56) References Cited

OTHER PUBLICATIONS

Office Action received for Korean Patent Application No. 10-2022-7006175, dated May 27, 2022, 7 pages (3 pages of English Translation and 4 pages of Official Copy).
Summons to Attend Oral Proceedings received for European Patent Application No. 18728002.9, mailed on Jun. 3, 2022, 15 pages.
Corrected Notice of Allowance received for U.S. Appl. No. 17/871,627, dated May 3, 2023, 2 pages.
Corrected Notice of Allowance received for U.S. Appl. No. 18/077,905, dated May 4, 2023, 2 pages.
Decision to Grant received for Danish Patent Application No. PA202270464, dated May 9, 2023, 1 page.
Final Office Action received for U.S. Appl. No. 17/666,971, dated May 12, 2023, 29 pages.
Notice of Acceptance received for Australian Patent Application No. 2022204555, dated May 11, 2023, 3 pages.
Office Action received for Australian Patent Application No. 2022218517, dated Apr. 27, 2023, 7 pages.
Office Action received for Chinese Patent Application No. 201911099970.0, dated Feb. 23, 2023, 15 pages (05 pages of English Translation and 10 pages of Official Copy).
Applicant Initiated Interview Summary received for U.S. Appl. No. 16/917,659, dated Jan. 28, 2022, 2 pages.
Board Opinion received for Chinese Patent Application No. 201810338826.7, dated Jan. 19, 2022, 18 pages (6 pages of English Translation and 12 pages of Official Copy).
Corrected Notice of Allowance received for U.S. Appl. No. 16/921,551, dated Feb. 9, 2022, 2 pages.
Decision to Grant received for European Patent Application No. 18197583.0, dated Feb. 3, 2022, 2 pages.
Intention to Grant received for European Patent Application No. 19207753.5, dated Jan. 28, 2022, 8 pages.
Non-Final Office Action received for U.S. Appl. No. 17/476,404, dated Feb. 8, 2022, 26 pages.
Non-Final Office Action received for U.S. Appl. No. 17/027,373, dated Feb. 2, 2022, 17 pages.
Notice of Allowance received for Korean Patent Application No. 10-2021-0143923, dated Jan. 27, 2022, 4 pages (1 page of English Translation and 3 pages of Official Copy).
Office Action received for Korean Patent Application No. 10-2021-7041874, dated Jan. 19, 2022, 5 pages (2 pages of English Translation and 3 pages of Official Copy).
Notice of Acceptance received for Australian Patent Application No. 2020239711, dated Dec. 16, 2021, 3 pages.
Office Action received for Australian Patent Application No. 2020207785, dated Dec. 14, 2021, 5 pages.
Office Action received for Australian Patent Application No. 2020273355, dated Nov. 23, 2021, 6 pages.
Office Action received for Australian Patent Application No. 2020282362, dated Nov. 25, 2021, 3 pages.
Office Action received for Indian Patent Application No. 202014041529, dated Dec. 6, 2021, 6 pages.
Office Action received for Japanese Patent Application No. 2020-159840, dated Dec. 10, 2021, 13 pages (7 pages of English Translation and 6 pages of Official Copy).
Summons to Attend Oral Proceedings received for European Patent Application No. 17799904.2, mailed on Dec. 20, 2021, 8 pages.
Applicant-Initiated Interview Summary received for U.S. Appl. No. 16/922,675, dated Sep. 3, 2021, 2 pages.
Applicant-Initiated Interview Summary received for U.S. Appl. No. 17/223,794, dated Sep. 7, 2021, 3 pages.
Brief Communication Regarding Oral Proceedings received for European Patent Application No. 15760008.1, mailed on Sep. 13, 2021, 8 pages.
Corrected Notice of Allowance received for U.S. Appl. No. 16/670,949, dated Sep. 8, 2021, 2 pages.
Intention to Grant received for European Patent Application No. 19207753.5, dated Sep. 3, 2021, 8 pages.
Non-Final Office Action received for U.S. Appl. No. 16/679,967, dated Sep. 2, 2021, 12 pages.
Non-Final Office Action received for U.S. Appl. No. 16/921,551, dated Sep. 8, 2021, 7 pages.
Notice of Acceptance received for Australian Patent Application No. 2020257092, dated Aug. 27, 2021, 3 pages.
Notice of Allowance received for U.S. Appl. No. 16/670,949, dated Sep. 14, 2021, 7 pages.
Notice of Allowance received for U.S. Appl. No. 16/836,571, dated Sep. 8, 2021, 25 pages.
Notice of Allowance received for U.S. Appl. No. 17/031,833, dated Sep. 20, 2021, 6 pages.
Office Action received for Australian Patent Application No. 2020239711, dated Sep. 13, 2021, 5 pages.
Result of Consultation received for European Patent Application No. 15760008.1, dated Sep. 9, 2021, 7 pages.
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Senicar et al., "User-Centered Design and Development of an Intelligent Light Switch for Sensor Systems", Technical Gazette, vol. 26, No. 2, available online at: https://hrcak.srce.hr/file/320403, 2019, pp. 339-345.
Applicant-Initiated Interview Summary received for U.S. Appl. No. 16/679,967, dated Oct. 25, 2021, 2 pages.
Corrected Notice of Allowance received for U.S. Appl. No. 16/807,604, dated Oct. 22, 2021, 3 pages.
Decision to Grant received for Danish Patent Application No. PA202070560, dated Oct. 21, 2021, 2 pages.
Final Office Action received for U.S. Appl. No. 16/803,849, dated Nov. 2, 2021, 37 pages.
Office Action received for Chinese Patent Application No. 202011450203.2, dated Sep. 1, 2021, 12 pages (6 pages of English Translation and 6 pages of Official Copy).
Office Action received for European Patent Application No. 18733381.0, dated Oct. 29, 2021, 9 pages.
Office Action received for European Patent Application No. 19186538.5, dated Oct. 22, 2021, 7 pages.
Office Action received for European Patent Application No. 19203942.8, dated Oct. 29, 2021, 6 pages.
Applicant-Initiated Interview Summary received for U.S. Appl. No. 17/476,404, dated Jul. 27, 2022, 6 pages.
Extended European Search Report received for European Patent Application No. 22169639.6, dated Jul. 19, 2022, 14 pages.
Notice of Allowance received for Japanese Patent Application No. 2020-159840, dated Jul. 8, 2022, 4 pages (1 page of English Translation and 3 pages of Official Copy).
Notice of Allowance received for Japanese Patent Application No. 2022-079682, dated Jul. 15, 2022, 4 pages (1 page of English Translation and 3 pages of Official Copy).
Notice of Allowance received for Korean Patent Application No. 10-2022-7008567, dated Jul. 4, 2022, 9 pages (2 pages of English Translation and 7 pages of Official Copy).
Applicant-Initiated Interview Summary received for U.S. Appl. No. 17/314,948, dated Oct. 21, 2022, 6 pages.
Corrected Notice of Allowance received for U.S. Appl. No. 17/027,373, dated Oct. 26, 2022, 2 pages.
Extended European Search Report received for European Patent Application No. 22188377.0, dated Oct. 27, 2022, 8 pages.
Final Office Action received for U.S. Appl. No. 17/181,089, dated Oct. 21, 2022, 15 pages.
Notice of Allowance received for Korean Patent Application No. 10-2022-0091730, dated Oct. 4, 2022, 5 pages (2 pages of English Translation and 3 pages of Official Copy).
Notice of Allowance received for U.S. Appl. No. 16/679,967, dated Nov. 2, 2022, 7 pages.
Office Action received for Chinese Patent Application No. 202110235995.X, dated Sep. 30, 2022, 13 pages (7 pages of English Translation and 6 pages of Official Copy).
Office Action received for Danish Patent Application No. PA202270464, dated Oct. 25, 2022, 9 pages.
Summons to Attend Oral Proceedings received for European Patent Application No. 21160991.2, mailed on Oct. 19, 2022, 10 pages.

(56) References Cited

OTHER PUBLICATIONS

Applicant-Initiated Interview Summary received for U.S. Appl. No. 17/476,404, dated Mar. 18, 2022, 2 pages.
Notice of Allowance received for Chinese Patent Application No. 201810339290.0, dated Mar. 9, 2022, 2 pages (1 page of English Translation and 1 page of Official Copy).
Notice of Allowance received for Japanese Patent Application No. 2021-563716, dated Mar. 14, 2022, 4 pages (1 page of English Translation and 3 pages of Official Copy).
Notice of Allowance received for U.S. Appl. No. 17/461,103, dated Mar. 17, 2022, 10 pages.
Summons to Attend Oral Proceedings received for European Patent Application No. 19150528.8, mailed on Mar. 15, 2022, 7 pages.
Corrected Notice of Allowance received for U.S. Appl. No. 17/461,103, dated May 10, 2022, 2 pages.
Final Office Action received for U.S. Appl. No. 17/476,404, dated May 5, 2022, 30 pages.
International Search Report and Written Opinion received for PCT Patent Application No. PCT/US2021/056674, dated Jan. 26, 2022, 10 pages.
Non-Final Office Action received for U.S. Appl. No. 17/181,089, dated May 13, 2022, 12 pages.
Notice of Acceptance received for Australian Patent Application No. 2020207785, dated May 4, 2022, 3 pages.
Notice of Allowance received for U.S. Appl. No. 16/803,849, dated May 17, 2022, 12 pages.
Office Action received for Danish Patent Application No. PA202170320, dated May 3, 2022, 3 pages.
Board Decision received for Chinese Patent Application No. 201580046788.2, dated Jun. 6, 2022, 17 pages (1 page of English Translation and 16 pages of Official Copy).
Board Decision received for Chinese Patent Application No. 201810338826.7, dated May 30, 2022, 20 pages (2 pages of English Translation and 18 pages of Official Copy).
Notice of Allowance received for Korean Patent Application No. 10-2020-0123805, dated Jun. 19, 2022, 5 pages (2 pages of English Translation and 3 pages of Official Copy).
Notice of Allowance received for U.S. Appl. No. 17/461,103, dated Jun. 20, 2022, 6 pages.
Office Action received for European Patent Application No. 20158824.1, dated Jun. 13, 2022, 5 pages.
Office Action received for Indian Patent Application No. 202118054338, dated Jun. 21, 2022, 5 pages.
Office Action received for Japanese Patent Application No. 2021-569562, dated May 13, 2022, 6 pages (3 pages of English Translation and 3 pages of Official Copy).
Applicant-Initiated Interview Summary received for U.S. Appl. No. 17/181,089, dated Apr. 7, 2023, 5 pages.
Applicant-Initiated Interview Summary received for U.S. Appl. No. 17/320,900, dated Apr. 17, 2023, 4 pages.
Applicant-Initiated Interview Summary received for U.S. Appl. No. 17/752,582, dated Apr. 17, 2023, 3 pages.
Corrected Notice of Allowance received for U.S. Appl. No. 16/922,675, dated Apr. 14, 2023, 6 pages.
Corrected Notice of Allowance received for U.S. Appl. No. 17/871,627, dated Apr. 11, 2023, 3 pages.
Corrected Notice of Allowance received for U.S. Appl. No. 18/077,905, dated Apr. 10, 2023, 2 pages.
Corrected Notice of Allowance received for U.S. Appl. No. 18/077,905, dated Apr. 19, 2023, 2 pages.
Extended European Search Report received for European Patent Application No. 23157906.1, dated Apr. 6, 2023, 10 pages.
Final Office Action received for U.S. Appl. No. 17/181,089, dated Apr. 19, 2023, 13 pages.
Intention to Grant received for European Patent Application No. 18728002.9, dated Apr. 12, 2023, 9 pages.
International Preliminary Report on Patentability received for PCT Patent Application No. PCT/US2021/048358, dated Apr. 6, 2023, 15 pages.
Notice of Acceptance received for Australian Patent Application No. 2018271366, dated Mar. 31, 2023, 3 pages.
Notice of Allowance received for Japanese Patent Application No. 2022-007217, dated Apr. 10, 2023, 4 pages (1 page of English Translation and 3 pages of Official Copy).
Notice of Allowance received for U.S. Appl. No. 17/509,356, dated Apr. 7, 2023, 11 pages.
Office Action received for European Patent Application No. 20720310.0, dated Apr. 11, 2023, 8 pages.
Applicant-Initiated Interview Summary received for U.S. Appl. No. 16/263,280, dated Apr. 26, 2021, 2 pages.
Applicant-Initiated Interview Summary received for U.S. Appl. No. 16/583,994, dated May 28, 2021, 5 pages.
Applicant-Initiated Interview Summary received for U.S. Appl. No. 16/670,949, dated Apr. 6, 2021, 2 pages.
Applicant-Initiated Interview Summary received for U.S. Appl. No. 17/031,833, dated May 24, 2021, 6 pages.
Board Decision received for Chinese Patent Application No. 201510288981.9, dated May 6, 2021, 31 pages (3 pages of English Translation and 28 pages of Official Copy).
Board Decision received for Chinese Patent Application No. 201580046339.8, dated Mar. 19, 2021, 11 pages (3 pages of English Translation and 8 pages of Official Copy).
Corrected Notice of Allowance received for U.S. Appl. No. 15/910,263, dated Mar. 17, 2021, 3 pages.
Corrected Notice of Allowance received for U.S. Appl. No. 15/910,263, dated Mar. 18, 2021, 3 pages.
Corrected Notice of Allowance received for U.S. Appl. No. 16/583,981, dated Apr. 6, 2021, 3 pages.
Corrected Notice of Allowance received for U.S. Appl. No. 16/583,981, dated May 17, 2021, 3 pages.
Corrected Notice of Allowance received for U.S. Appl. No. 16/702,968, dated May 26, 2021, 4 pages.
Corrected Notice of Allowance received for U.S. Appl. No. 16/702,968, dated May 28, 2021, 4 pages.
Corrected Notice of Allowance received for U.S. Appl. No. 16/807,604, dated May 28, 2021, 3 pages.
Customize Notifications and Content on Your Galaxy Phone's Lock Screen, Online Available at: https://www.samsung.com/us/support/answer/ANS00062636, Oct. 4, 2017, 5 pages.
Decision to Grant received for Japanese Patent Application No. 2019-124728, dated Apr. 2, 2021, 4 pages (1 page of English Translation and 3 pages of Official Copy).
Examiner's Answer to Appeal to Brief received for U.S. Appl. No. 14/641,298, mailed on Mar. 22, 2021, 19 pages.
Gookin, Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
Intention to Grant received for Danish Patent Application No. PA202070560, dated Apr. 26, 2021, 2 pages.
Intention to Grant received for European Patent Application No. 15719347.5, dated May 11, 2021, 8 pages.
Non-Final Office Action received for U.S. Appl. No. 16/803,849, dated May 14, 2021, 34 pages.
Non-Final Office Action received for U.S. Appl. No. 16/836,571, dated Mar. 25, 2021, 28 pages.
Non-Final Office Action received for U.S. Appl. No. 16/922,675, dated May 4, 2021, 23 pages.
Non-Final Office Action received for U.S. Appl. No. 16/987,003, dated May 10, 2021, 20 pages.
Notice of Allowance received for Chinese Patent Application No. 201811539260.0, dated Mar. 15, 2021, 2 pages (1 page of English Translation and 1 page of Official Copy).
Notice of Allowance received for Chinese Patent Application No. 201910475434.X, dated Mar. 10, 2021, 2 pages (1 page of English Translation and 1 page of Official Copy).
Notice of Allowance received for Japanese Patent Application No. 2018-080122, dated May 7, 2021, 28 pages (1 page of English Translation and 27 pages of Official Copy).
Notice of Allowance received for Korean Patent Application No. 10-2020-7031319, dated Apr. 6, 2021, 5 pages (2 pages of English Translation and 3 pages of Official Copy).

(56) References Cited

OTHER PUBLICATIONS

Notice of Allowance received for Korean Patent Application No. 10-2021-7005691, dated Mar. 29, 2021, 3 pages (1 page of English Translation and 2 pages of Official Copy).
Notice of Allowance received for U.S. Appl. No. 16/702,968, dated Apr. 21, 2021, 20 pages.
Notice of Allowance received for U.S. Appl. No. 15/433,320, dated Apr. 1, 2021, 19 pages.
Notice of Allowance received for U.S. Appl. No. 16/422,736, dated Apr. 20, 2021, 12 pages.
Notice of Allowance received for U.S. Appl. No. 16/583,981, dated Mar. 26, 2021, 10 pages.
Notice of Allowance received for U.S. Appl. No. 16/584,490, dated Mar. 26, 2021, 13 pages.
Notice of Allowance received for U.S. Appl. No. 16/670,949, dated May 27, 2021, 7 pages.
Notice of Allowance received for U.S. Appl. No. 16/807,604, dated Apr. 30, 2021, 25 pages.
Notice of Hearing received for Indian Patent Application No. 717/CHENP/2014, mailed on May 5, 2021, 3 pages.
Office Action received for Australian Patent Application No. 2021201403, dated Mar. 16, 2021, 3 pages.
Office Action received for Chinese Patent Application No. 201580046788.2, dated Mar. 25, 2021, 9 pages (4 pages of English Translation and 5 pages of Official Copy).
Office Action received for Chinese Patent Application No. 201711292804.3, dated Feb. 23, 2021, 17 pages (8 pages of English Translation and 9 pages of Official Copy).
Office Action received for Chinese Patent Application No. 201911128105.4, dated Apr. 8, 2021, 10 pages (5 pages of English Translation and 5 pages of Official Copy).
Office Action received for Chinese Patent Application No. 202010125114.4, dated Mar. 1, 2021, 15 pages (9 pages of English Translation and 6 pages of Official Copy).
Office Action received for Danish Patent Application No. PA201970533, dated Apr. 20, 2021, 2 pages.
Office Action received for Danish Patent Application No. PA202070560, dated Mar. 10, 2021, 7 pages.
Office Action received for European Patent Application No. 17813737.8, dated Apr. 16, 2021, 7 pages.
Office Action received for European Patent Application No. 18208881.5, dated May 7, 2021, 6 pages.
Office Action received for European Patent Application No. 19207753.5, dated May 10, 2021, 4 pages.
Office Action received for European Patent Application No. 20158824.1, dated May 18, 2021, 10 pages.
Punchkick Interactive, "Punchkick hands-on review: Fitbit Surge", URL: https://www.youtube.com/watch?v=K2G7aebUYcA, Mar. 25, 2015, 3 pages.
Smart Home App—What is the Widget, Online Available at: https://support.vivint.com/s/article/Vivint-Smart-Home-App-What-is-the-Widget, Jan. 26, 2019, 4 pages.
Stroud, Forrest, "Screen Lock Meaning & Definition", Online Available at: https://www.webopedia.com/definitions/screen-lock, Jan. 30, 2014, 3 pages.
Supplemental Notice of Allowance received for U.S. Appl. No. 16/584,490, dated Apr. 13, 2021, 2 pages.
Advisory Action received for U.S. Appl. No. 10/308,315, dated Jul. 10, 2006, 3 pages.
Advisory Action received for U.S. Appl. No. 12/395,527, dated Apr. 26, 2012, 4 pages.
Advisory Action received for U.S. Appl. No. 12/566,673, dated Jun. 12, 2013, 3 pages.
Advisory Action received for U.S. Appl. No. 13/038,217, dated Dec. 8, 2014, 3 pages.
Advisory Action received for U.S. Appl. No. 13/587,850, dated May 15, 2015, 2 pages.
Advisory Action received for U.S. Appl. No. 14/863,099, dated Sep. 8, 2016, 3 pages.
Advisory Action received for U.S. Appl. No. 15/730,610, dated Oct. 24, 2019, 5 pages.
Advisory Action received for U.S. Appl. No. 16/422,736, dated Mar. 12, 2021, 3 pages.
Advisory Action received for U.S. Appl. No. 16/583,989, dated Sep. 22, 2020, 5 pages.
Advisory Action received for U.S. Appl. No. 16/584,347, dated Aug. 28, 2020, 2 pages.
Advisory Action received for U.S. Appl. No. 15/250,152, dated Mar. 25, 2019, 5 pages.
Akhgari Ehsan, "Don't Leave a Trace: Private Browsing in Firefox", available online at: http://ehsanakhgari.org/blog/2008-11-04/dont-leave-trace-private-browsing-firefox, Nov. 4, 2008, 71 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.
Appeal Brief received for U.S. Appl. No. 11/522,167 mailed on Nov. 23, 2010, 65 pages.
Apple, "Iphone User's Guide", iPhone first generation, Available at: http://pocketpccentral.net/iphone/products/1 g_iphone.htm, Jun. 29, 2007, 124 pages.
Applicant Initiated Interview Summary received for U.S. Appl. No. 14/641,304, dated Dec. 2, 2019, 5 pages.
Applicant Initiated Interview Summary received for U.S. Appl. No. 14/641,304, dated Jul. 28, 2020, 5 pages.
Applicant Initiated Interview Summary received for U.S. Appl. No. 15/433,320, dated Feb. 11, 2020, 5 pages.
Applicant Initiated Interview Summary received for U.S. Appl. No. 16/583,989, dated Aug. 3, 2020, 6 pages.
Applicant Initiated Interview Summary received for U.S. Appl. No. 16/583,989, dated Mar. 25, 2020, 4 pages.
Applicant Initiated Interview Summary received for U.S. Appl. No. 16/583,994, dated Apr. 3, 2020, 5 pages.
Applicant Initiated Interview Summary received for U.S. Appl. No. 16/584,490, dated Jul. 28, 2020, 4 pages.
Applicant Initiated Interview Summary received for U.S. Appl. No. 16/702,968, dated Jul. 1, 2020, 5 pages.
Applicant-Initiated Interview Summary received for U.S. Appl. No. 15/433,320, dated Nov. 25, 2020, 4 pages.
Applicant-Initiated Interview Summary received for U.S. Appl. No. 15/730,610, dated Aug. 25, 2020, 6 pages.
Applicant-Initiated Interview Summary received for U.S. Appl. No. 15/910,263, dated Nov. 18, 2020, 6 pages.
Applicant-Initiated Interview Summary received for U.S. Appl. No. 16/259,954, dated Mar. 23, 2020, 3 pages.
Applicant-Initiated Interview Summary received for U.S. Appl. No. 16/263,280, dated Nov. 25, 2020, 3 pages.
Applicant-Initiated Interview Summary received for U.S. Appl. No. 16/422,736, dated Feb. 24, 2021, 3 pages.
Applicant-Initiated Interview Summary received for U.S. Appl. No. 16/422,736, dated Sep. 28, 2020, 3 pages.
Applicant-Initiated Interview Summary received for U.S. Appl. No. 16/583,981, dated Mar. 9, 2020, 5 pages.
Applicant-Initiated Interview Summary received for U.S. Appl. No. 16/583,981, dated Sep. 14, 2020, 6 pages.
Applicant-Initiated Interview Summary received for U.S. Appl. No. 16/583,994, dated Nov. 24, 2020, 4 pages.
Applicant-Initiated Interview Summary received for U.S. Appl. No. 16/584,321, dated Apr. 8, 2020, 5 pages.
Applicant-Initiated Interview Summary received for U.S. Appl. No. 16/584,347, dated Sep. 1, 2020, 3 pages.
Applicant-Initiated Interview Summary received for U.S. Appl. No. 16/584,490, dated Jan. 31, 2020, 4 pages.
Applicant-Initiated Interview Summary received for U.S. Appl. No. 16/584,743, dated May 1, 2020, 5 pages.
Applicant-Initiated Interview Summary received for U.S. Appl. No. 16/586,002, dated Apr. 28, 2020, 5 pages.
Applicant-Initiated Interview Summary received for U.S. Appl. No. 16/702,968, dated Sep. 28, 2020, 6 pages.
Applicant-Initiated Interview Summary received for U.S. Appl. No. 16/723,583, dated Dec. 28, 2020, 6 pages.

(56) References Cited

OTHER PUBLICATIONS

Applicant-Initiated Interview Summary received for U.S. Appl. No. 16/803,849, dated Aug. 21, 2020, 5 pages.
Applicant-Initiated Interview Summary received for U.S. Appl. No. 16/803,849, dated Dec. 21, 2020, 5 pages.
Applicant-Initiated Interview Summary received for U.S. Appl. No. 16/807,604, dated Dec. 21, 2020, 7 pages.
Applicant-Initiated Interview Summary received for U.S. Appl. No. 16/807,604, dated Jul. 24, 2020, 5 pages.
Applicant-Initiated Interview Summary received for U.S. Appl. No. 16/922,675, dated Dec. 16, 2020, 3 pages.
Applicant-Initiated Interview Summary received for U.S. Appl. No. 16/922,675, dated Nov. 2, 2020, 3 pages.
Applicant-Initiated Interview Summary received for U.S. Appl. No. 17/031,833, dated Dec. 21, 2020, 5 pages.
Beard Chris, "Mozilla Labs Introducing Weave", available online at: https://blog.mozilla.org/labs/2007/12/introducing-weave/, Dec. 21, 2007, 57 pages.
Bell Killian, "Twitter Notifications, iCloud Tabs & Location-Based Reminders Appear in Latest OS X 10.8 Beta", available online at "http://www.cultofmac.com/154522/twitter-notifications-icloud-tabs-location-based-reminders-appear-in-latest-os-x-10-8-beta/", Mar. 19, 2012, 10 pages.
Benjamin Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.
Bennett Stephen, "ES2: Logic's Most Sophisticated Virtual Analogue Synth", Logic Notes & Techniques, Jun. 2007, 6 pages.
Board Opinion received for Chinese Patent Application No. 201510288981.9, dated Jan. 4, 2021, 21 pages.
Bove Tony, "iPod & iTunes for Dummies", Wiley Publishing, Inc., 6th Edition, 2008, pp. 143-182.
Brief Communication Regarding Oral Proceedings received for European Patent Application No. 18197583.0, mailed on Feb. 18, 2021, 2 pages.
Butler Travis, "Portable MP3: The Nomad Jukebox", available at: http://tidbits.com/article/6261, Jan. 8, 2001, 4 pages.
Call Me, "Samsung R3 speaker gives you a delicious 360degree sound experience—with WiFi and Bluetooth | Call me", 0:24 / 3:22, Available Online at: https://www.youtube.com/watch?v=4Uv_sOhrlro, Sep. 22, 2016, 3 pages.
Certificate of Examination received for Australian Patent Application No. 2017100553, dated Jan. 17, 2018, 2 pages.
Certificate of Examination received for Australian Patent Application No. 2018101014, dated Mar. 20, 2019, 2 pages.
Chan Christine, "Handoff Your Browser to Your iPhone or iPad! Plus a Chance to Win a Copy!", Apr. 12, 2011, 2 pages.
Ciprianij, "How to use Spotify's Offline mode on iPhone", XP055533907, retrieved from the Internet: https://www.cnet.com/how-to/how-to-use-spotifys-offline-mode-on-iphone/, Aug. 1, 2011, 5 pages.
Corrected Notice of Allowance received for U.S. Appl. No. 13/587,850, dated Apr. 1, 2020, 2 pages.
Corrected Notice of Allowance received for U.S. Appl. No. 13/587,850, dated Mar. 23, 2020, 2 pages.
Corrected Notice of Allowance received for U.S. Appl. No. 14/719,217, dated Apr. 22, 2019, 2 pages.
Corrected Notice of Allowance received for U.S. Appl. No. 14/719,217, dated Mar. 20, 2019, 2 pages.
Corrected Notice of Allowance received for U.S. Appl. No. 14/830,629, dated Feb. 13, 2019, 3 pages.
Corrected Notice of Allowance received for U.S. Appl. No. 14/841,614, dated Jan. 8, 2019, 3 pages.
Corrected Notice of Allowance received for U.S. Appl. No. 15/269,801, dated Oct. 3, 2017, 4 pages.
Corrected Notice of Allowance received for U.S. Appl. No. 15/730,610, dated Nov. 27, 2020, 3 pages.
Corrected Notice of Allowance received for U.S. Appl. No. 15/845,794, dated Feb. 25, 2019, 2 pages.
Corrected Notice of Allowance received for U.S. Appl. No. 15/910,263, dated Feb. 10, 2021, 3 pages.
Corrected Notice of Allowance received for U.S. Appl. No. 15/952,736, dated Nov. 19, 2018, 2 pages.
Corrected Notice of Allowance received for U.S. Appl. No. 16/229,959, dated Mar. 3, 2020, 3 pages.
Corrected Notice of Allowance received for U.S. Appl. No. 16/434,865, dated Apr. 28, 2020, 2 pages.
Corrected Notice of Allowance received for U.S. Appl. No. 16/434,865, dated Jun. 4, 2020, 2 pages.
Corrected Notice of Allowance received for U.S. Appl. No. 16/584,347, dated Nov. 9, 2020, 2 pages.
Corrected Notice of Allowance received for U.S. Appl. No. 16/584,347, dated Sep. 23, 2020, 5 pages.
Corrected Notice of Allowance received for U.S. Appl. No. 16/584,743, dated Dec. 30, 2020, 3 pages.
Crutnacker, "Amazon Echo Tips and Tricks: Playing Music Demonstration", Available Online at: https://www.youtube.com/watch?v=WbqQ2ynUll, Nov. 4, 2015, 1 page.
Decision on Appeal received for U.S. Appl. No. 12/566,673, mailed on Dec. 18, 2019, 10 pages.
Decision on Appeal received for U.S. Appl. No. 13/587,850, mailed on Aug. 28, 2019, 21 pages.
Decision on Appeal received for U.S. Appl. No. 13/587,850, mailed on Oct. 21, 2019, 3 pages.
Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision on Appeal received for U.S. Appl. No. 15/128,952, mailed on Dec. 28, 2020, 23 pages.
Decision to Grant received for Danish Patent Application No. PA201670628, dated Nov. 20, 2017, 2 pages.
Decision to Grant received for Danish Patent Application No. PA201770392, dated Oct. 24, 2018, 2 pages.
Decision to Grant received for Danish Patent Application No. PA201770401, dated Oct. 24, 2018, 2 pages.
Decision to Grant received for Danish Patent Application No. PA201770403, dated Oct. 24, 2018, 2 pages.
Decision to Grant received for Danish Patent Application No. PA201770404, dated Nov. 11, 2019, 3 pages.
Decision to Grant received for Danish Patent Application No. PA201770406, dated May 15, 2020, 2 pages.
Decision to Grant received for Danish Patent Application No. PA201770782, dated Oct. 25, 2019, 2 pages.
Decision to Grant received for European Patent Application No. 10712824.1, dated May 17, 2018, 3 pages.
Decision to Grant received for European Patent Application No. 12181537.7, dated Mar. 3, 2016, 2 pages.
Decision to Grant received for European Patent Application No. 12773460.6, dated Jun. 27, 2019, 2 pages.
Decision to Grant received for European Patent Application No. 13171047.7, dated Jun. 27, 2019, 2 pages.
Decision to Grant received for European Patent Application No. 15711969.4, dated Sep. 26, 2019, 2 pages.
Decision to Grant received for European Patent Application No. 15713062.6, dated Apr. 11, 2019, 2 pages.
Decision to Grant received for European Patent Application No. 15724160.5, dated Jun. 14, 2018, 2 pages.
Decision to Grant received for German Patent Application No. 102015208532.5, dated Sep. 22, 2020, 10 pages.
Decision to Grant received for Japanese Patent Application No. 2014-017726, dated Dec. 7, 2015, 6 pages.
Decision to Grant received for Japanese Patent Application No. 2017-075031, dated Jul. 1, 2019, 3 pages.
Decision to Refuse received for European Patent Application No. 07842262.3, dated Dec. 21, 2018, 8 pages
Decision to Refuse received for European Patent Application No. 10177096.4, dated Feb. 13, 2019, 4 pages.
Decision to Refuse received for European Patent Application No. 12753631.6, dated Feb. 20, 2019, 20 pages.
Decision to Refuse received for European Patent Application No. 12770400.5, dated Nov. 8, 2018, 12 pages.

(56) References Cited

OTHER PUBLICATIONS

Detroitborg, "Apple Music: Walkthrough", YouTube Video, online available at: https://www.youtube.com/watch?v=NLgjodiAtbQ, Jun. 30, 2015, 1 page.
Dharmasena Anusha, "iMessage—send as text message Option", YouTube, Available online at: https://www.youtube.com/watch?v=hXG-MdIW6FA, Feb. 18, 2013, 1 page.
Digital Video Editor, IBM Technical Disclosure Bulletin, vol. 35, No. 2, ip.com Journal, ip.com Inc., West Henrietta XP013097273, Jul. 1, 1992, 6 pages.
Dybwad Barb, "Google Chrome Gets Bookmark Syncing", available online at: http://mashable.com/2009/11/02/chrome-bookmark-sync/, Nov. 3, 2009, 6 pages.
Enright Andrewc., "Dissatisfaction Sows Innovation", Available at: http://web.archive.org/web/20051225123312/http://thetreehouseandthecave.blogspot.com/2004/12/dissatisfaction-sows-innovation.html, retrieved on Feb. 19, 2008, Dec. 29, 2004, 6 pages.
Enright Andrewc., "Meet Cover Flow", Available online at: http://web.archive.org/web/20060111073239/thetreehouseandthecave.blogspot.com/2005/08/meet-coverflow.html, retrieved on Feb. 19, 2008, Aug. 13, 2005, 2 pages.
Enright Andrewc., "Visual Browsing on an iBook Ds", Available online at: http://web.archive.org/web/20060111175609/thetreehouseandthecave.blogspot.com/2004/12/visual-browsing-on-i book-ds.html, Dec. 29, 2004, 2 pages.
Evaluation Report for Utility Model Patent received for Chinese Patent Application No. 201620051290.7, completed on Sep. 19, 2016, 11 pages.
Examiner's Answer to Appeal Brief received for U.S. Appl. No. 11/522,167 mailed on Feb. 15, 2011, 13 pages.
Examiner's Answer to Appeal Brief received for U.S. Appl. No. 12/566,673, mailed on Nov. 17, 2017, 10 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Examiner's Answer to Appeal Brief received for U.S. Appl. No. 15/128,952, mailed on Jan. 08, 2020, 9 pages.
Examiner's Initiated Interview Summary received for U.S. Appl. No. 14/641,298, dated Mar. 10, 2020, 4 pages.
Examiner's Pre-Review Report received for Japanese Patent Application No. 2018-080122, dated Feb. 25, 2020, 6 pages.
Extended European Search Report (includes Partial European Search Report and European Search Opinion) received for European Patent Application No. 12181537.7, dated Mar. 27, 2014, 7 pages.
Extended European Search Report (includes Partial European Search Report and European Search Opinion) received for European Patent Application No. 13184872.3, dated Dec. 5, 2013, 9 pages.
Extended European Search Report for European Application No. 10177099.8, dated Oct. 18, 2010, 7 pages.
Extended European Search Report for European Application No. 17813737.8, dated Nov. 22, 2019, 9 pages.
Extended European Search Report received for European Patent Application No. 10177096.4, dated Oct. 18, 2010, 9 pages.
Extended European Search Report received for European Patent Application No. 13171047.7, dated Oct. 29, 2014, 8 pages.
Extended European Search Report received for European Patent Application No. 17799904.2, dated Jul. 30, 2018, 7 pages.
Extended European Search Report received for European Patent Application No. 18178147.7, dated Oct. 4, 2018, 8 pages.
Extended European Search Report received for European Patent Application No. 18197583.0, dated Jun. 4, 2019, 20 pages.
Extended European Search Report received for European Patent Application No. 18197589.7, dated Jan. 7, 2019, 9 pages.
Extended European Search Report received for European Patent Application No. 18208881.5, dated Jan. 8, 2019, 7 pages.
Extended European Search Report received for European Patent Application No. 19150528.8, dated May 15, 2019, 9 pages.
Extended European Search Report received for European Patent Application No. 19169980.0, dated Jul. 2, 2019, 8 pages.
Extended European Search Report received for European Patent Application No. 19186538.5, dated Oct. 9, 2019, 10 pages.
Extended European Search Report received for European Patent Application No. 19203942.8, dated Apr. 1, 2020, 10 pages.
Extended European Search Report received for European Patent Application No. 19207753.5, dated Dec. 18, 2019, 9 pages.
Extended European Search Report received for European Patent Application No. 20158824.1, dated Aug. 10, 2020, 13 pages.
Feng Lipeng, "Bound for computer lovers", Dec. 31, 2009, 2 pages.
Final Office Action received for U.S. Appl. No. 09/293,507, dated Apr. 24, 2002, 12 pages.
Final Office Action received for U.S. Appl. No. 09/293,507, dated Feb. 14, 2001, 10 pages.
Final Office Action received for U.S. Appl. No. 10/308,315, dated Apr. 6, 2005, 10 pages.
Final Office Action received for U.S. Appl. No. 10/308,315, dated Mar. 9, 2006, 10 pages.
Final Office Action received for U.S. Appl. No. 10/308,315, dated Mar. 23, 2007, 12 pages.
Final Office Action received for U.S. Appl. No. 11/459,591, dated Jan. 13, 2009, 11 pages.
Final Office Action received for U.S. Appl. No. 11/522,167, dated Aug. 5, 2009, 9 pages.
Final Office Action received for U.S. Appl. No. 11/522,167, dated Jul. 23, 2010, 11 pages.
Final Office Action received for U.S. Appl. No. 11/522,167, dated Jun. 3, 2013, 18 pages.
Final Office Action received for U.S. Appl. No. 11/522,167, dated Oct. 15, 2008, 10 pages.
Final Office Action received for U.S. Appl. No. 11/767,409, dated Jul. 17, 2012, 24 pages.
Final Office Action received for U.S. Appl. No. 11/767,409, dated Mar. 16, 2011, 16 pages.
Final Office Action received for U.S. Appl. No. 11/960,674, dated May 12, 2011, 10 pages.
Final Office Action received for U.S. Appl. No. 11/983,059, dated Jun. 6, 2011, 11 pages.
Final Office Action received for U.S. Appl. No. 12/215,651, dated Jul. 6, 2012, 27 pages.
Final Office Action received for U.S. Appl. No. 12/395,537, dated Feb. 3, 2012, 15 pages.
Final Office Action received for U.S. Appl. No. 12/395,537, dated Jun. 29, 2015, 17 pages.
Final Office Action received for U.S. Appl. No. 12/395,537, dated Nov. 14, 2013, 22 pages.
Final Office Action received for U.S. Appl. No. 12/395,541, dated Dec. 28, 2011, 16 pages.
Final Office Action received for U.S. Appl. No. 12/566,669, dated Nov. 23, 2012, 29 pages.
Final Office Action received for U.S. Appl. No. 12/566,671, dated Dec. 20, 2012, 20 pages.
Final Office Action received for U.S. Appl. No. 12/566,673, dated Aug. 12, 2016, 28 pages.
Final Office Action received for U.S. Appl. No. 12/566,673, dated Jan. 17, 2013, 22 pages.
Final Office Action received for U.S. Appl. No. 12/566,673, dated Mar. 25, 2014, 19 pages.
Final Office Action received for U.S. Appl. No. 13/038,217, dated May 6, 2014, 11 pages.
Final Office Action received for U.S. Appl. No. 13/248,882, dated Dec. 4, 2013, 22 pages.
Final Office Action received for U.S. Appl. No. 13/333,890, dated Feb. 13, 2014, 19 pages.
Final Office Action received for U.S. Appl. No. 13/333,890, dated Oct. 2, 2015, 21 pages.
Final Office Action received for U.S. Appl. No. 13/333,900, dated Dec. 19, 2014, 15 pages.
Final Office Action received for U.S. Appl. No. 13/333,900, dated Nov. 7, 2013, 14 pages.
Final Office Action received for U.S. Appl. No. 13/489,245, dated Mar. 28, 2014, 23 pages.
Final Office Action received for U.S. Appl. No. 13/489,245, dated Oct. 16, 2019, 25 pages.

(56) References Cited

OTHER PUBLICATIONS

Final Office Action received for U.S. Appl. No. 13/489,245, dated Sep. 27, 2018, 25 pages.
Final Office Action received for U.S. Appl. No. 13/492,057, dated Apr. 8, 2016, 29 pages.
Final Office Action received for U.S. Appl. No. 13/492,057, dated Mar. 30, 2015, 18 pages.
Final Office Action received for U.S. Appl. No. 13/587,850, dated May 3, 2016, 31 pages.
Final Office Action received for U.S. Appl. No. 13/587,850, dated Nov. 28, 2014, 22 pages.
Final Office Action received for U.S. Appl. No. 14/045,544, dated May 6, 2016, 26 pages.
Final Office Action received for U.S. Appl. No. 14/285,378, dated Jul. 23, 2015, 19 pages.
Final Office Action received for U.S. Appl. No. 14/503,327, dated May 18, 2017, 10 pages.
Final Office Action received for U.S. Appl. No. 14/641,289, dated Jul. 1, 2016, 32 pages.
Final Office Action received for U.S. Appl. No. 14/641,298, dated Jun. 26, 2020, 50 pages.
Final Office Action received for U.S. Appl. No. 14/641,298, dated May 16, 2019, 50 pages.
Final Office Action received for U.S. Appl. No. 14/641,298, dated Oct. 4, 2017, 30 pages.
Final Office Action received for U.S. Appl. No. 14/641,304, dated Jul. 24, 2018, 19 pages.
Final Office Action received for U.S. Appl. No. 14/641,304, dated Oct. 15, 2019, 21 pages.
Final Office Action received for U.S. Appl. No. 14/719,217, dated Feb. 23, 2017, 37 pages.
Final Office Action received for U.S. Appl. No. 14/774,664, dated Aug. 25, 2017, 23 pages.
Final Office Action received for U.S. Appl. No. 14/830,629, dated Apr. 16, 2018, 27 pages.
Final Office Action received for U.S. Appl. No. 14/841,455, dated Nov. 6, 2018, 14 pages.
Final Office Action received for U.S. Appl. No. 14/841,614, dated May 10, 2018, 13 pages.
Final Office Action received for U.S. Appl. No. 14/841,623, dated Sep. 5, 2017, 16 pages.
Final Office Action received for U.S. Appl. No. 14/863,099, dated Apr. 21, 2016, 20 pages.
Final Office Action received for U.S. Appl. No. 15/128,952, dated Jul. 18, 2018, 19 pages.
Final Office Action received for U.S. Appl. No. 15/433,320, dated Dec. 31, 2019, 30 pages.
Final Office Action received for U.S. Appl. No. 15/730,610, dated Aug. 6, 2019, 28 pages.
Final Office Action received for U.S. Appl. No. 15/910,263, dated Aug. 28, 2019, 32 pages.
Final Office Action received for U.S. Appl. No. 16/263,280, dated Mar. 4, 2021, 13 pages.
Final Office Action received for U.S. Appl. No. 16/422,736, dated Jan. 11, 2021, 39 pages.
Final Office Action received for U.S. Appl. No. 16/583,981, dated Apr. 16, 2020, 19 pages.
Final Office Action received for U.S. Appl. No. 16/583,989, dated Jul. 10, 2020, 23 pages.
Final Office Action received for U.S. Appl. No. 16/583,994, dated Jul. 23, 2020, 16 pages.
Final Office Action received for U.S. Appl. No. 16/584,321, dated May 22, 2020, 12 pages.
Final Office Action received for U.S. Appl. No. 16/584,347, dated Jun. 10, 2020, 20 pages.
Final Office Action received for U.S. Appl. No. 16/584,490, dated May 1, 2020, 48 pages.
Final Office Action received for U.S. Appl. No. 16/702,968, dated Jul. 27, 2020, 21 pages.
Final Office Action received for U.S. Appl. No. 16/723,583, dated Feb. 5, 2021, 15 pages.
Final Office Action received for U.S. Appl. No. 16/803,849, dated Sep. 24, 2020, 29 pages.
Final Office Action received for U.S. Appl. No. 16/807,604, dated Aug. 19, 2020, 35 pages.
Final Office Action received for U.S. Appl. No. 16/922,675, dated Dec. 3, 2020, 21 pages.
Final Office Action received for U.S. Appl. No. 16/922,675, dated Nov. 30, 2020, 12 pages.
Final Office Action received for U.S. Appl. No. 17/031,833, dated Jan. 26, 2021, 17 pages.
Final Office Action received for U.S. Appl. No. 15/250,152, dated Aug. 23, 2017, 24 pages.
Final Office Action received for U.S. Appl. No. 15/250,152, dated Nov. 16, 2018, 30 pages.
Final Office Action received in U.S. Appl. No. 12/547,401, dated Jun. 28, 2010, 19 pages.
Finkelstein Ellen, "Temporarily Override Object Snap Settings", AutoCAD Tips Blog, Apr. 9, 2007, 4 pages.
Firefox Sync—Take Your Bookmarks, Tabs and Personal Information with You, available online at https://web.archive.org/web/20120601020556/http://support.mozilla.org/en-US/kb/firefox-sync-take-your-bookmarks-and-tabs-with-you?redirectlocale=en-US&redirectslug=what-firefox-sync, Jun. 1, 2012, 3 pages.
Frakes Dan, "How to Get Started with Airplay", Available at: https://www.macworld.com/article/2039770/how-to-get-started-with-airplay.html, Macworld, May 27, 2013, 8 pages.
Free Virtual Classic Analogue Mono Synth, Samsara Cycle Audio Releases DEISK-O, Jan. 2, 2011, 3 pages.
G Pad, LG's latest UIs that shine even more on the G-Pad, Online available at: http://bungq.com/1014, Nov. 19, 2013, 49 pages.
Google Labs, "Google Browser Sync", available online at: https://web.archive.org/web/20120518050142/http://www.google.com/tools/firefox/browsersync/faq.html, May 18, 2012, 5 pages.
Google, "Google Home Help, Listen to music", Datasheet [online], Available Online at: https://web.archive.org/web/20170326051235/https:/support.google.com/googlehome/answer/7030379?hl=en&ref_topic=7030084, Mar. 26, 2017, 3 pages.
Hein Buster, "iOS 5 Allows Users to Delete Music Directly From iPhone/iPad", Online available at: https://www.cultofmac.com/99990/ios-5-allows-users-to-delete-music-directly-from-iphoneipad/, Jun. 9, 2011, 7 pages.
Hoffberger Chase, "Spotify's Collaborative Playlists Let Friends Listen Together", Evolver.fm, available online at: http://www.evolver.fm/2011/08/22/spotify-collaborative-playlists/, Aug. 22, 2011, 4 pages.
How-To: iTunes in the Cloud, available at <http://y2kemo.com/2011/06/how-to-itunes-in-the-cloud/>, XP55040711, Jun. 9, 2011, 4 pages.
Hughes Neil, "Apple Explores Merging Cloud Content with Locally Stored Media Library", Available at: http://appleinsider.com/articles/11/02/10/apple_explores_merging_cloud_content_with_locally_stored_media_library.html, XP55040717, Feb. 10, 2011, 2 pages.
Intention to Grant received for Danish Patent Application No. PA201670628, dated Aug. 28, 2017, 2 pages.
Intention to Grant received for Danish Patent Application No. PA201770392, dated Aug. 31, 2018, 2 pages.
Intention to Grant received for Danish Patent Application No. PA201770392, dated Jul. 2, 2018, 2 pages.
Intention to Grant received for Danish Patent Application No. PA201770401, dated Jun. 14, 2018, 2 pages.
Intention to Grant received for Danish Patent Application No. PA201770401, dated Sep. 17, 2018, 2 pages.
Intention to Grant received for Danish Patent Application No. PA201770403, dated May 7, 2018, 2 pages.
Intention to Grant received for Danish Patent Application No. PA201770403, dated Oct. 3, 2018, 2 pages.
Intention to Grant received for Danish Patent Application No. PA201770404, dated Sep. 23, 2019, 3 pages.
Intention to Grant received for Danish Patent Application No. PA201770406, dated Feb. 6, 2020, 3 pages.
Intention to Grant received for Danish Patent Application No. PA201770408, dated Nov. 30, 2018, 3 pages.

(56) References Cited

OTHER PUBLICATIONS

Intention to Grant received for Danish Patent Application No. PA201770782, dated Aug. 8, 2019, 2 pages.
Intention to Grant received for European Patent Application No. 10712824.1, dated Jan. 5, 2018, 9 pages.
Intention to Grant Received for European Patent Application No. 12181537.7, dated Sep. 22, 2015, 7 pages.
Intention to Grant received for European Patent Application No. 12773460.6, dated Feb. 4, 2019, 8 pages.
Intention to Grant received for European Patent Application No. 12773460.6, dated Jun. 17, 2019, 4 pages.
Intention to Grant received for European Patent Application No. 13171047.7, dated Jan. 23, 2019, 8 pages.
Intention to Grant received for European Patent Application No. 13184872.3, dated Feb. 11, 2019, 7 pages.
Intention to Grant received for European Patent Application No. 15711969.4, dated May 29, 2019, 11 pages.
Intention to Grant received for European Patent Application No. 15713062.6, dated Mar. 25, 2019, 7 pages.
Intention to Grant received for European Patent Application No. 15713062.6, dated Oct. 8, 2018, 8 pages.
Intention to Grant received for European Patent Application No. 15719347.5, dated Dec. 8, 2020, 7 pages.
Intention to Grant received for European Patent Application No. 15724160.5, dated Mar. 7, 2018, 8 pages.
Intention to Grant received for European Patent Application No. 18197589.7, dated Jan. 21, 2021, 8 pages.
International Preliminary Report on Patentability received for PCT Patent Application No. PCT/US00/010441, dated Feb. 14, 2001, 3 pages.
International Preliminary Report on Patentability received for PCT Patent Application No. PCT/US2006/062714, dated Jul. 8, 2008, 6 pages.
International Preliminary Report on Patentability received for PCT Patent Application No. PCT/US2007/078180, dated Mar. 17, 2009, 6 pages.
International Preliminary Report on Patentability received for PCT Patent Application No. PCT/US2007/088914, dated Jul. 7, 2009, 8 pages.
International Preliminary Report on Patentability received for PCT Patent Application No. PCT/US2010/027088, dated Sep. 29, 2011, 7 pages.
International Preliminary Report on Patentability received for PCT Patent Application No. PCT/US2012/025314, dated Sep. 12, 2013, 8 pages.
International Preliminary Report on Patentability received for PCT Patent Application No. PCT/US2012/051432, dated Feb. 27, 2014, 10 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2013/044710, dated Dec. 18, 2014, 11 pages.
International Preliminary Report on Patentability received for PCT Patent Application No. PCT/US2014/027882, dated Sep. 24, 2015, 8 pages.
International Preliminary Report on Patentability Received for PCT Patent Application No. PCT/US2015/019306, dated Dec. 15, 2016, 10 pages.
International Preliminary Report on Patentability Received for PCT Patent Application No. PCT/US2015/019309, dated Dec. 15, 2016, 10 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2015/030199, dated Dec. 15, 2016, 7 pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2016/021012, dated Sep. 21, 2017, 11 pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/032240, dated Nov. 29, 2018, 29 pages.
International Preliminary Report on Patentability received for PCT Patent Application No. PCT/US2018/032158, dated Nov. 21, 2019, 12 pages.
International Preliminary Report on Patentability received for PCT Patent Application No. PCT/US2018/032904, dated Nov. 28, 2019, 14 pages.
International Preliminary Report on Patentability received for PCT Patent Application No. PCT/US2015/046787, dated Mar. 16, 2017, 19 pages.
International Search Report and Written Opinion received for PCT Application No. PCT/US2015/019309, dated Jun. 25, 2015, 15 pages.
International Search Report and Written Opinion received for PCT Patent Application No. PCT/US00/10441, dated Jul. 11, 2000, 2 pages.
International Search Report and Written Opinion received for PCT Patent Application No. PCT/US17/31086, dated Sep. 8, 2017, 15 pages.
International Search Report and Written Opinion received for PCT Patent Application No. PCT/US2007/078180, dated Mar. 3, 2008, 8 pages.
International Search Report and Written Opinion received for PCT Patent Application No. PCT/US2007/088914, dated Jun. 23, 2008, 10 pages.
International Search Report and Written Opinion received for PCT Patent Application No. PCT/US2010/027088, dated Jun. 18, 2010, 8 pages.
International Search Report and Written Opinion received for PCT Patent Application No. PCT/US2012/025314, dated May 14, 2012, 10 pages.
International Search Report and Written Opinion received for PCT Patent Application No. PCT/US2012/051432, dated Oct. 29, 2012, 12 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2013/032498, dated Feb. 10, 2014, 18 pages.
International Search Report and Written Opinion received for PCT Patent Application No. PCT/US2013/044710, dated Aug. 15, 2013, 11 pages.
International Search Report and Written Opinion received for PCT Patent Application No. PCT/US2014/027882, dated Oct. 10, 2014, 11 pages.
International Search Report and Written Opinion received for PCT Patent Application No. PCT/US2015/019306, dated Jun. 17, 2015, 15 pages.
International Search Report and Written Opinion received for PCT Patent Application No. PCT/US2015/019317, dated Aug. 25, 2015, 24 pages.

(56) References Cited

OTHER PUBLICATIONS

International Search Report and Written Opinion received for PCT Patent Application No. PCT/US2015/025188, dated Jun. 23, 2015, 11 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2015/045965, dated Feb. 1, 2016, 20 pages.
International Search Report and Written Opinion received for PCT Patent Application No. PCT/US2015/046787, dated Apr. 1, 2016, 26 pages.
International Search Report and Written Opinion received for PCT Patent Application No. PCT/US2016/021012, dated Jun. 2, 2016, 15 pages.
International Search Report and Written Opinion received for PCT Patent Application No. PCT/US2017/032240, dated Sep. 21, 2017, 33 pages.
International Search Report and Written Opinion received for PCT Patent Application No. PCT/US2018/032158, dated Nov. 2, 2018, 19 pages.
International Search Report and Written Opinion received for PCT Patent Application No. PCT/US2018/032904, dated Oct. 1, 2018, 21 pages.
International Search Report and written Opinion received for PCT Patent Application No. PCT/US2020/024390, dated Aug. 17, 2020, 22 pages.
International Search Report and Written Opinion received for PCT Patent Application No. PCT/US2020/024390, dated Oct. 23, 2020, 26 pages.
International Search Report and Written Opinion received for PCT Patent Application No. PCT/US2020/025526, dated Aug. 11, 2020, 18 pages.
International Search Report and Written Opinion received for PCT Patent Application No. PCT/US2020/026044, dated Sep. 9, 2020, 26 pages.
International Search Report and Written Opinion received for PCT Patent Application No. PCT/US2020/035446, dated Nov. 10, 2020, 20 pages.
International Search Report and Written Opinion received for PCT Patent Application No. PCT/US2020/035488, dated Nov. 17, 2020, 21 pages.
Invitation to Pay Addition Fees and Partial International Search Report received for PCT Patent Application No. PCT/US2018/032904, dated Jul. 31, 2018, 18 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US17/32240, dated Jul. 12, 2017, 2 pages.
Invitation to Pay Additional Fees received for PCT Patent Application No. PCT/US2020/024390, dated Jun. 26, 2020, 15 pages.
Invitation to Pay Additional Fees received for PCT Patent Application No. PCT/US2014/027882, dated Aug. 5, 2014, 2 pages.
Invitation to Pay Additional Fees received for PCT Patent Application No. PCT/US2015/019317, dated May 22, 2015, 7 pages.
Invitation to Pay Additional Fees received for PCT Patent Application No. PCT/US2015/046787, dated Dec. 15, 2015, 8 pages.
Invitation to Pay Additional Fees received for PCT Patent Application No. PCT/US2018/032158, dated Sep. 10, 2018, 16 pages.
Invitation to Pay Additional Fees received for PCT Patent Application No. PCT/US2020/025526, dated Jun. 15, 2020, 12 pages.
Invitation to Pay Additional Fees received for PCT Patent Application No. PCT/US2020/026044, dated Jun. 25, 2020, 12 pages.
Invitation to Pay Additional Fees received for PCT Patent Application No. PCT/US2020/035446, dated Sep. 11, 2020, 12 pages.
Invitation to Pay Additional Fees received for PCT Patent Application No. PCT/US2020/035488, dated Sep. 23, 2020, 15 pages.
Invitation to Pay Search Fees received for European Patent Application No. 18728002.9, dated Sep. 2, 2020, 8 pages.
Invitation to Pay Search Fees received for European Patent Application No. 20719301.2, dated Dec. 17, 2020, 5 pages.
Iphone, "User Guide for iOS 7.1 Software", Mar. 2014, 162 pages.
Itjungles, "iPhone 6: How to Pair with Another Bluetooth Device", Available Online at: https://www.youtube.com/watch?v=9setanYtHAk, Aug. 5, 2015, 3 pages.
Jarvie, "Alexa plays me music", Available online at: https://www.youtube.com/watch?v=bR2ZC8Sy8YQ, Feb. 23, 2015, 1 page.
Kanter David, "Start Download Automatically Sync Your (New) Music, Apps, and iBooks Across Your iDevices With iCloud", Available online at: https://appadvice.com/appnn/2011/06/automatically-sync-music-apps-ibooks-idevices-icloud, Jun. 8, 2011, 6 pages.
Kim et al., "An Energy Efficient Transmission Scheme for Real-Time Data in Wireless Sensor Networks", Sensors, vol. 15, in Sensors 2015, May 20, 2015, 25 pages.
Kimura Ryoji, "Keynote presentation practice guide for iPad & iPhone", K.K. Rutles, first edition, Feb. 29, 2012, 4 pages.
Kinect Gesture Commands—Kinect Voice Commands, Xbox Wire, Available Online at: <https://hwcdn.libsyn.com/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b >, 2013, 2 pages.
LG G Pad 8.3 Tablet Q Remote User, Available at: https://mushroomprincess.tistory.com/1320, Dec. 26, 2013, 37 pages.
Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
Mac Fan,"Chapter 4: The True Character of Apple's Genuine Cloud—Your Personal Data Always Exist in There, Regardless of Your Location", Mainichi Communications Inc., vol. 19, No. 8, Aug. 1, 2011, 8 pages.
Mackie Simon, "Emulate Safari's Reader Mode in Other Browsers with Readability", available online at "https://gigaom.com/2010/06/21/emulate-safaris-reader-mode-in-other-browsers-with-readability/", Jun. 21, 2010, 5 pages.
Mcelhearn Kirk, "iTunes 10.3 Offers Automatic Downloads and Access to Purchases", Available at: http://web.archive.org/web/20110613084837/http://www.tidbits.com/article/12235, Jun. 8, 2011, 5 pages.
Minutes of Oral Hearing received for German Patent Application No. 102015208532.5, mailed on Dec. 13, 2019, 21 pages.
Minutes of the Oral Proceedings received for European Application No. 12770400.5, mailed on Nov. 6, 2018, 7 pages.
Minutes of the Oral Proceedings received for European Application No. 15711969.4, mailed on May 16, 2019, 7 pages.
Minutes of the Oral Proceedings received for European Patent Application No. 00923491.5, mailed on May 11, 2011, 69 pages.
Minutes of the Oral Proceedings received for European Patent Application No. 12753631.6, mailed on Feb. 20, 2019, 3 pages.
Minutes of the Oral Proceedings received for European Patent Application No. 18197583.0, mailed on Mar. 9, 2021, 6 pages.
Miser Brad, "Sams Teach Yourself iTunes® 10 in 10 Minutes", SAMS Publishing, Dec. 30, 2010, pp. 65 and 67-69.
Mozilla Services, "Firefox Sync Terms of Service (for versions prior to Firefox 29)", Available online at: https://services.mozilla.com/tos/, Aug. 19, 2010, 4 pages.
NBC News, "NBC News—YouTube Democratic Debate (full)", Online available at: https://www.youtube.com/watch?v=ti2Nokoq1J4, Jan. 17, 2016, 1 page.
Non-Final Action received for U.S. Appl. No. 15/952,736, dated Jun. 1, 2018, 12 pages.
Non-Final Office Action received for U.S. Appl. No. 09/293,507, dated Aug. 1, 2001, 13 pages.
Non-Final Office Action received for U.S. Appl. No. 09/293,507, dated Jun. 22, 2000, 11 pages.
Non-Final Office Action received for U.S. Appl. No. 09/293,508, dated Jun. 30, 2000, 10 pages.
Non-Final Office Action received for U.S. Appl. No. 10/308,315, dated Aug. 8, 2005, 12 pages.

(56) References Cited

OTHER PUBLICATIONS

Non-Final Office Action received for U.S. Appl. No. 10/374,013, dated Feb. 1, 2007, 8 pages.
Non-Final Office Action received for U.S. Appl. No. 11/459,591, dated Jul. 29, 2008, 15 pages.
Non-Final Office Action received for U.S. Appl. No. 11/521,740, dated Dec. 27, 2007, 8 pages.
Non-Final Office Action received for U.S. Appl. No. 11/522,167, dated Dec. 6, 2012, 15 pages.
Non-Final Office Action received for U.S. Appl. No. 11/522,167, dated Feb. 5, 2009, 9 pages.
Non-Final Office Action received for U.S. Appl. No. 11/522,167, dated Jan. 20, 2010, 10 pages.
Non-Final Office Action received for U.S. Appl. No. 11/522,167, dated May 2, 2007, 8 pages.
Non-Final Office Action received for U.S. Appl. No. 11/522,167, dated Oct. 19, 2007, 10 pages.
Non-Final Office Action received for U.S. Appl. No. 11/767,409, dated Aug. 29, 2011, 18 pages.
Non-Final Office Action received for U.S. Appl. No. 11/767,409, dated Feb. 9, 2012, 20 pages.
Non-Final Office Action received for U.S. Appl. No. 11/767,409, dated Nov. 23, 2010, 12 pages.
Non-Final Office Action received for U.S. Appl. No. 11/960,674, dated Oct. 27, 2010, 7 pages.
Non-Final Office Action received for U.S. Appl. No. 11/983,059, dated Dec. 30, 2010, 11 pages.
Non-Final Office Action received for U.S. Appl. No. 12/215,651, dated Aug. 15, 2013, 27 pages.
Non-Final Office Action received for U.S. Appl. No. 12/215,651, dated Feb. 2, 2012, 18 pages.
Non-Final Office Action received for U.S. Appl. No. 12/395,537, dated Aug. 15, 2011, 17 pages.
Non-Final Office Action received for U.S. Appl. No. 12/395,537, dated Dec. 14, 2015, 18 pages.
Non-Final Office Action received for U.S. Appl. No. 12/395,537, dated Jan. 5, 2015, 20 pages.
Non-Final Office Action received for U.S. Appl. No. 12/395,537, dated Jul. 8, 2013, 22 pages.
Non-Final Office Action received for U.S. Appl. No. 12/395,541, dated Jul. 26, 2011, 15 pages.
Non-Final Office Action received for U.S. Appl. No. 12/395,541, dated Mar. 14, 2013, 23 pages.
Non-Final Office Action received for U.S. Appl. No. 12/566,669, dated Apr. 17, 2014, 27 pages.
Non-Final Office Action received for U.S. Appl. No. 12/566,669, dated Jun. 19, 2012, 30 pages.
Non-Final Office Action received for U.S. Appl. No. 12/566,671, dated May 23, 2012, 21 pages.
Non-Final Office Action received for U.S. Appl. No. 12/566,672, dated Nov. 8, 2012, 11 pages.
Non-Final Office Action received for U.S. Appl. No. 12/566,673, dated Jun. 7, 2012, 17 pages.
Non-Final Office Action received for U.S. Appl. No. 12/566,673, dated Mar. 26, 2015, 19 pages.
Non-Final Office Action received for U.S. Appl. No. 12/566,673, dated Sep. 13, 2013, 18 pages.
Non-Final Office Action received for U.S. Appl. No. 13/038,217, dated Sep. 13, 2013, 16 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 13/333,890, dated Aug. 30, 2013, 20 pages.
Non-Final Office Action received for U.S. Appl. No. 13/333,890, dated Jun. 5, 2015, 20 pages.
Non-Final Office Action received for U.S. Appl. No. 13/333,890, dated May 1, 2013, 26 pages.
Non-Final Office Action received for U.S. Appl. No. 13/333,900, dated Mar. 19, 2013, 17 pages.
Non-Final Office Action received for U.S. Appl. No. 13/333,900, dated May 23, 2014, 19 pages.
Non-Final Office Action received for U.S. Appl. No. 13/489,245, dated Apr. 8, 2019, 27 pages.
Non-Final Office Action received for U.S. Appl. No. 13/489,245, dated Dec. 27, 2017, 22 pages.
Non-Final Office Action received for U.S. Appl. No. 13/489,245, dated Nov. 20, 2013, 25 pages.
Non-Final Office Action received for U.S. Appl. No. 13/492,057, dated Dec. 17, 2015, 25 pages.
Non-Final Office Action received for U.S. Appl. No. 13/492,057, dated Jul. 8, 2014, 14 pages.
Non-Final Office Action received for U.S. Appl. No. 13/587,850, dated Apr. 7, 2014, 18 pages.
Non-Final Office Action received for U.S. Appl. No. 13/587,850, dated Oct. 8, 2015, 29 pages.
Non-Final Office Action received for U.S. Appl. No. 14/045,544, dated Oct. 6, 2015, 20 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/503,327, dated Sep. 12, 2016, 10 pages.
Non-Final Office Action received for U.S. Appl. No. 14/641,289, dated Jul. 16, 2015, 31 pages.
Non-Final Office Action received for U.S. Appl. No. 14/641,289, dated Mar. 11, 2016, 26 pages.
Non-Final Office Action received for U.S. Appl. No. 14/641,298, dated Mar. 6, 2017, 26 pages.
Non-Final Office Action received for U.S. Appl. No. 14/641,298, dated Nov. 29, 2019, 47 pages.
Non-Final Office Action received for U.S. Appl. No. 14/641,298, dated Sep. 19, 2018, 41 pages.
Non-Final Office Action received for U.S. Appl. No. 14/641,304, dated Feb. 27, 2019, 18 pages.
Non-Final Office Action received for U.S. Appl. No. 14/641,304, dated Mar. 4, 2020, 21 pages.
Non-Final Office Action received for U.S. Appl. No. 14/641,304, dated Sep. 11, 2017, 18 pages.
Non-Final Office Action received for U.S. Appl. No. 14/642,366, dated Aug. 24, 2015, 7 pages.
Non-Final Office Action received for U.S. Appl. No. 14/719,217, dated Jul. 26, 2018, 40 pages.
Non-Final Office Action received for U.S. Appl. No. 14/719,217, dated Jul. 28, 2016, 28 pages.
Non-Final Office Action received for U.S. Appl. No. 14/774,664, dated Mar. 7, 2017, 23 pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017, 24 pages.
Non-Final Office Action received for U.S. Appl. No. 14/841,455, dated Apr. 25, 2018, 13 pages.
Non-Final Office Action received for U.S. Appl. No. 14/841,608, dated Apr. 12, 2017, 9 pages.
Non-Final Office Action received for U.S. Appl. No. 14/841,614, dated Jul. 27, 2017, 13 pages.
Non-Final Office Action received for U.S. Appl. No. 14/841,623, dated Feb. 2, 2017, 17 pages.
Non-Final Office Action received for U.S. Appl. No. 14/863,099, dated Dec. 2, 2015, 12 pages.
Non-Final Office Action received for U.S. Appl. No. 15/128,952, dated Apr. 1, 2019, 20 pages.
Non-Final Office Action received for U.S. Appl. No. 15/128,952, dated Dec. 29, 2017, 13 pages.
Non-Final Office Action received for U.S. Appl. No. 15/134,638, dated Sep. 20, 2016, 6 pages.
Non-Final Office Action received for U.S. Appl. No. 15/269,801, dated Dec. 30, 2016, 17 pages.

(56) References Cited

OTHER PUBLICATIONS

Non-Final Office Action received for U.S. Appl. No. 15/274,963, dated Mar. 13, 2018, 23 pages.
Non-Final Office Action received for U.S. Appl. No. 15/433,320, dated Jul. 31, 2020, 13 pages.
Non-Final Office Action received for U.S. Appl. No. 15/620,666, dated Mar. 28, 2018, 14 pages.
Non-Final Office Action received for U.S. Appl. No. 15/730,610, dated Apr. 15, 2020, 36 pages.
Non-Final Office Action received for U.S. Appl. No. 15/730,610, dated Feb. 1, 2019, 22 pages.
Non-Final Office Action received for U.S. Appl. No. 15/845,794, dated Oct. 15, 2018, 8 pages.
Non-Final Office Action received for U.S. Appl. No. 15/910,263, dated Jun. 15, 2020, 38 pages.
Non-Final Office Action received for U.S. Appl. No. 15/910,263, dated Mar. 4, 2019, 26 pages.
Non-Final Office Action received for U.S. Appl. No. 16/229,959, dated Oct. 31, 2019, 10 pages.
Non-Final Office Action received for U.S. Appl. No. 16/259,954, dated Feb. 5, 2020, 10 pages.
Non-Final Office Action received for U.S. Appl. No. 16/263,280, dated Jul. 27, 2020, 11 pages.
Non-Final Office Action received for U.S. Appl. No. 16/422,736, dated Jun. 23, 2020, 24 pages.
Non-Final Office Action received for U.S. Appl. No. 16/434,865, dated Jan. 16, 2020, 9 pages.
Non-Final Office Action received for U.S. Appl. No. 16/583,981, dated Dec. 6, 2019, 14 pages.
Non-Final Office Action received for U.S. Appl. No. 16/583,989, dated Jan. 24, 2020, 20 pages.
Non-Final Office Action received for U.S. Appl. No. 16/583,994, dated Dec. 23, 2020, 17 pages.
Non-Final Office Action received for U.S. Appl. No. 16/583,994, dated Dec. 30, 2019, 14 pages.
Non-Final Office Action received for U.S. Appl. No. 16/584,321, dated Jan. 7, 2020, 19 pages.
Non-Final Office Action received for U.S. Appl. No. 16/584,347, dated Dec. 20, 2019, 16 pages.
Non-Final Office Action received for U.S. Appl. No. 16/584,490, dated Dec. 10, 2019, 27 pages.
Non-Final Office Action received for U.S. Appl. No. 16/584,743, dated Feb. 6, 2020, 15 pages.
Non-Final Office Action received for U.S. Appl. No. 16/586,002, dated Feb. 20, 2020, 15 pages.
Non-Final Office Action received for U.S. Appl. No. 16/670,949, dated Dec. 9, 2020, 11 pages.
Non-Final Office Action received for U.S. Appl. No. 16/702,968, dated Apr. 8, 2020, 20 pages.
Non-Final Office Action received for U.S. Appl. No. 16/723,583, dated Aug. 13, 2020, 13 pages.
Non-Final Office Action received for U.S. Appl. No. 16/803,849, dated Jul. 13, 2020, 23 pages.
Non-Final Office Action received for U.S. Appl. No. 16/807,604, dated Jun. 2, 2020, 28 pages.
Non-Final Office Action received for U.S. Appl. No. 16/922,675, dated Aug. 13, 2020, 17 pages.
Non-Final Office Action received for U.S. Appl. No. 17/031,833, dated Dec. 7, 2020, 13 pages.
Non-Final Office Action received for U.S. Appl. No. 10/308,315, dated Jul. 28, 2004, 10 pages.
Non-Final Office Action received for U.S. Appl. No. 14/841,455, dated Apr. 11, 2019, 13 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/433,320, dated May 2, 2019, 27 pages.
Non-Final Office Action received for U.S. Appl. No. 15/945,610, dated Sep. 20, 2018, 9 pages.
Non-Final Office Action received for U.S. Appl. No. 12/566,673, dated Dec. 16, 2015, 23 pages.
Non-Final Office Action received in U.S. Appl. No. 12/547,401, dated Feb. 11, 2013, 13 pages.
Non-Final Office Action received in U.S. Appl. No. 12/547,401, dated Jan. 8, 2010, 12 pages.
Notice of Acceptance received for Australian Patent Application No. 2015201884, dated Oct. 4, 2016, 3 pages.
Notice of Acceptance received for Australian Patent Application No. 2015267671, dated Apr. 4, 2018, 3 pages.
Notice of Acceptance received for Australian Patent Application No. 2016201454, dated Mar. 1, 2018, 3 pages.
Notice of Acceptance received for Australian Patent Application No. 2016230001, dated May 25, 2018, 3 pages.
Notice of Acceptance received for Australian Patent Application No. 2017266867, dated Mar. 6, 2019, 3 pages.
Notice of Acceptance received for Australian Patent Application No. 2017284013, dated Aug. 26, 2020, 3 pages.
Notice of Acceptance received for Australian Patent Application No. 2018202751, dated Sep. 4, 2019, 3 pages.
Notice of Acceptance received for Australian Patent Application No. 2018220115, dated Jun. 29, 2020, 3 pages.
Notice of Acceptance received for Australian Patent Application No. 2018223051, dated Oct. 30, 2018, 3 pages.
Notice of Acceptance received for Australian Patent Application No. 2018229544, dated May 4, 2020, 3 pages.
Notice of Acceptance received for Australian Patent Application No. 2018236872, dated Jul. 9, 2019, 3 pages.
Notice of Acceptance received for Australian Patent Application No. 2019203473, dated Nov. 7, 2019, 3 pages.
Notice of Acceptance received for Australian Patent Application No. 2019268111, dated Feb. 18, 2021, 3 pages.
Notice of Allowance and Search Report received for Taiwanese Patent Application No. 104128687, dated Jun. 7, 2016, 4 pages.
Notice of Allowance Received for Canadian Patent Application No. 2,661,200, dated Aug. 20, 2014, 1 page.
Notice of Allowance received for Canadian Patent Application No. 2,882,403, dated Oct. 31, 2018, 1 page.
Notice of Allowance received for Chinese Patent Application No. 201210308569.5, dated May 31, 2016, 4 pages.
Notice of Allowance received for Chinese Patent Application No. 201280040169.9, dated Sep. 4, 2018, 3 pages.
Notice of Allowance received for Chinese Patent Application No. 201280047459.6, dated Jan. 31, 2018, 2 pages.
Notice of Allowance received for Chinese Patent Application No. 201410449822.8, dated Mar. 5, 2019, 2 pages.
Notice of Allowance received for Chinese Patent Application No. 201580028491.3, dated Mar. 29, 2019, 2 pages.
Notice of Allowance received for Chinese Patent Application No. 201580028505.1, dated Sep. 19, 2019, 2 pages.
Notice of Allowance received for Chinese Patent Application No. 201620051290.7, dated Jun. 22, 2016, 2 pages.
Notice of Allowance received for Chinese Patent Application No. 201680011682.3, dated Aug. 5, 2020, 2 pages.
Notice of Allowance received for Chinese Patent Application No. 201780002398.4, dated Jun. 17, 2019, 2 pages.
Notice of Allowance received for Chinese Patent Application No. 201810338038.8, dated Jun. 30, 2020, 2 pages.
Notice of Allowance received for Chinese Patent Application No. 201811460172.1, dated Jan. 11, 2021, 2 pages.
Notice of Allowance received for Chinese Patent Application No. 201880001436.9, dated May 8, 2020, 3 pages.
Notice of Allowance received for Chinese Patent Application No. 201520364847.8, dated Nov. 5, 2015, 9 pages.
Notice of Allowance received for Danish Patent Application No. PA201770408, dated Feb. 8, 2019, 2 pages.
Notice of Allowance received for Japanese Patent Application No. 2012-500842, dated Jun. 20, 2014, 3 pages.
Notice of Allowance received for Japanese Patent Application No. 2014-148065, dated Jan. 12, 2016, 6 pages.

(56) References Cited

OTHER PUBLICATIONS

Notice of Allowance received for Japanese Patent Application No. 2014-526255, dated Jan. 7, 2016, 6 pages.
Notice of Allowance received for Japanese Patent Application No. 2015-095183, dated Apr. 21, 2017, 3 pages.
Notice of Allowance received for Japanese Patent Application No. 2016-001259, dated Jul. 27, 2018, 4 pages.
Notice of Allowance received for Japanese Patent Application No. 2016-017400, dated Dec. 16, 2016, 3 pages.
Notice of Allowance received for Japanese Patent Application No. 2016-022175, dated Jan. 12, 2018, 4 pages.
Notice of Allowance received for Japanese Patent Application No. 2016-569669, dated Mar. 19, 2018, 4 pages.
Notice of Allowance received for Japanese Patent Application No. 2017-101107, dated Jun. 3, 2019, 5 pages.
Notice of Allowance received for Japanese Patent Application No. 2017-507413, dated Jul. 22, 2019, 4 pages.
Notice of Allowance received for Japanese Patent Application No. 2017-543762, dated Mar. 30, 2020, 4 pages.
Notice of Allowance received for Japanese Patent Application No. 2018-560107, dated Dec. 6, 2019, 4 pages.
Notice of Allowance received for Japanese Patent Application No. 2019-116580, dated Oct. 2, 2020, 4 pages.
Notice of Allowance received for Japanese Patent Application No. 2019-238894, dated Oct. 5, 2020, 4 pages.
Notice of allowance received for Korean Patent Application No. 10-2013-7028489, dated Jan. 25, 2016, 5 pages.
Notice of Allowance received for Korean Patent Application No. 10-2014-7006538, dated May 19, 2016, 3 pages.
Notice of Allowance received for Korean Patent Application No. 10-2015-0072162, dated Dec. 27, 2017, 4 pages.
Notice of Allowance received for Korean Patent Application No. 1020167025395, dated Oct. 26, 2016, 5 pages.
Notice of Allowance received for Korean Patent Application No. 10-2016-7032902, dated Sep. 7, 2018, 3 pages.
Notice of Allowance received for Korean Patent Application No. 10-2016-7035555, dated Sep. 23, 2019, 3 pages.
Notice of Allowance received for Korean Patent Application No. 10-2017-7012145, dated Oct. 30, 2019, 3 pages.
Notice of Allowance received for Korean Patent Application No. 10-2017-7022905, dated Jul. 31, 2019, 4 pages.
Notice of Allowance received for Korean Patent Application No. 10-2017-7035057, dated May 31, 2018, 4 pages.
Notice of Allowance received for Korean Patent Application No. 10-2018-0035949, dated Nov. 28, 2019, 3 pages.
Notice of Allowance received for Korean Patent Application No. 10-2018-7033301, dated Feb. 20, 2019, 5 pages.
Notice of Allowance received for Korean Patent Application No. 10-2018-7035747, dated Dec. 9, 2020, 5 pages.
Notice of Allowance received for Korean Patent Application No. 10-2019-7014494, dated Mar. 19, 2020, 4 pages.
Notice of Allowance received for Korean Patent Application No. 10-2020-7002929, dated Nov. 26, 2020, 3 pages.
Notice of Allowance received for Korean Patent Application No. 10-2020-7017803, dated Nov. 5, 2020, 6 pages.
Notice of Allowance received for Korean Patent Application No. 10-2014-7008348, dated Feb. 21, 2019, 5 pages.
Notice of Allowance received for Mexican Patent Application No. MX/a/2014/001761, dated Sep. 11, 2015, 3 pages.
Notice of Allowance received for Mexican Patent Application No. MX/a/2016/001209, dated Mar. 26, 2018, 3 pages.
Notice of Allowance received for Taiwanese Patent Application No. 102120412, dated Oct. 28, 2015, 5 pages.
Notice of Allowance received for Taiwanese Patent Application No. 104108223, dated Jan. 10, 2017, 3 pages.
Notice of Allowance received for Taiwanese Patent Application No. 104114953, dated Oct. 17, 2017, 3 pages.
Notice of Allowance Received for Taiwanese Patent Application No. 104117041, dated Feb. 24, 2017, 3 pages.
Notice of Allowance received for Taiwanese Patent Application No. 104128519, dated Nov. 20, 2017, 5 pages.
Notice of Allowance received for Taiwanese Patent Application No. 106144804, dated Jun. 27, 2018, 6 pages.
Notice of Allowance received for Taiwanese Patent Application No. 104117042, dated Nov. 17, 2017, 5 pages.
Notice of Allowance received for U.S. Appl. No. 09/293,507, dated Jul. 25, 2002, 6 pages.
Notice of Allowance received for U.S. Appl. No. 09/293,508, dated Feb. 13, 2001, 5 pages.
Notice of Allowance received for U.S. Appl. No. 10/308,315, dated Aug. 27, 2007, 6 pages.
Notice of Allowance received for U.S. Appl. No. 10/374,013, dated Aug. 27, 2007, 6 pages.
Notice of Allowance received for U.S. Appl. No. 10/374,445, dated May 5, 2006, 7 pages.
Notice of Allowance received for U.S. Appl. No. 10/374,831, dated Sep. 10, 2004, 8 pages.
Notice of Allowance received for U.S. Appl. No. 11/459,591, dated May 21, 2009, 9 pages.
Notice of Allowance received for U.S. Appl. No. 11/521,740, dated Jul. 24, 2008, 7 pages.
Notice of Allowance received for U.S. Appl. No. 11/767,409, dated Jun. 12, 2013, 14 pages.
Notice of Allowance received for U.S. Appl. No. 11/960,674, dated Sep. 2, 2011, 7 pages.
Notice of Allowance received for U.S. Appl. No. 11/983,059, dated Feb. 10, 2012, 8 pages.
Notice of Allowance received for U.S. Appl. No. 12/215,651, dated Feb. 6, 2014, 5 pages.
Notice of Allowance received for U.S. Appl. No. 12/395,537 dated Jun. 29, 2016, 14 pages.
Notice of Allowance received for U.S. Appl. No. 12/395,541, dated Aug. 22, 2013, 8 pages.
Notice of Allowance received for U.S. Appl. No. 12/395,541, dated Sep. 12, 2013, 2 pages.
Notice of Allowance received for U.S. Appl. No. 12/547,401, dated Jul. 22, 2013, 8 pages.
Notice of Allowance received for U.S. Appl. No. 12/566,669, dated Nov. 6, 2014, 12 pages.
Notice of Allowance received for U.S. Appl. No. 12/566,671, dated Apr. 12, 2013, Apr. 12, 2013, 11 pages.
Notice of Allowance received for U.S. Appl. No. 12/566,671, dated Dec. 18, 2013, 11 pages.
Notice of Allowance received for U.S. Appl. No. 12/566,672, dated Jun. 24, 2013, 8 pages.
Notice of Allowance received for U.S. Appl. No. 12/566,672, dated Mar. 1, 2013, 7 pages.
Notice of Allowance received for U.S. Appl. No. 12/566,673, dated Feb. 26, 2020, 7 pages.
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 13/333,900, dated Apr. 13, 2015, 9 pages.
Notice of Allowance received for U.S. Appl. No. 13/333,900, dated Dec. 1, 2015, 2 pages.
Notice of Allowance received for U.S. Appl. No. 13/333,900, dated Sep. 15, 2015, 7 pages.
Notice of Allowance received for U.S. Appl. No. 13/492,057, dated Jan. 3, 2017, 5 pages.
Notice of Allowance received for U.S. Appl. No. 13/492,057, dated May 18, 2017, 3 pages.
Notice of Allowance received for U.S. Appl. No. 13/587,850, dated Feb. 27, 2020, 5 pages.
Notice of Allowance received for U.S. Appl. No. 13/587,850, dated Nov. 8, 2019, 6 pages.
Notice of Allowance received for U.S. Appl. No. 14/285,378, dated May 19, 2016, 10 pages.
Notice of Allowance received for U.S. Appl. No. 14/503,327, dated Mar. 22, 2018, 5 pages.

(56) References Cited

OTHER PUBLICATIONS

Notice of Allowance received for U.S. Appl. No. 14/503,327, dated Nov. 30, 2017, 5 pages.
Notice of Allowance received for U.S. Appl. No. 14/641,289, dated Aug. 24, 2017, 6 pages.
Notice of Allowance received for U.S. Appl. No. 14/641,289, dated Dec. 12, 2017, 5 pages.
Notice of Allowance received for U.S. Appl. No. 14/641,304, dated Sep. 9, 2020, 15 pages.
Notice of Allowance received for U.S. Appl. No. 14/642,366, dated Jan. 14, 2016, 8 pages.
Notice of Allowance received for U.S. Appl. No. 14/719,217, dated Feb. 13, 2019, 13 pages.
Notice of Allowance received for U.S. Appl. No. 14/830,629, dated Oct. 17, 2018, 8 pages.
Notice of Allowance received for U.S. Appl. No. 14/841,608, dated Nov. 14, 2017, 5 pages.
Notice of Allowance received for U.S. Appl. No. 14/841,614, dated Oct. 24, 2018, 10 pages.
Notice of Allowance received for U.S. Appl. No. 14/841,623, dated Feb. 23, 2018, 8 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/250,152, dated May 1, 2019, 12 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/274,963, dated Jul. 6, 2018, 10 pages.
Notice of Allowance received for U.S. Appl. No. 15/730,610, dated Oct. 21, 2020, 29 pages.
Notice of Allowance received for U.S. Appl. No. 15/845,794, dated Feb. 14, 2019, 6 pages.
Notice of Allowance received for U.S. Appl. No. 15/910,263, dated Feb. 18, 2021, 3 pages.
Notice of Allowance received for U.S. Appl. No. 15/910,263, dated Jan. 22, 2021, 33 pages.
Notice of Allowance received for U.S. Appl. No. 15/945,610, dated May 20, 2019, 7 pages.
Notice of Allowance received for U.S. Appl. No. 15/952,736, dated Sep. 11, 2018, 16 pages.
Notice of Allowance received for U.S. Appl. No. 16/131,767, dated Sep. 6, 2019, 7 pages.
Notice of Allowance received for U.S. Appl. No. 16/229,959, dated Dec. 4, 2019, 6 pages.
Notice of Allowance received for U.S. Appl. No. 16/259,954, dated May 7, 2020, 9 pages.
Notice of Allowance received for U.S. Appl. No. 16/434,865, dated Apr. 7, 2020, 5 pages.
Notice of Allowance received for U.S. Appl. No. 16/583,989, dated Apr. 1, 2021, 5 pages.
Notice of Allowance received for U.S. Appl. No. 16/583,989, dated Dec. 24, 2020, 7 pages.
Notice of Allowance received for U.S. Appl. No. 16/584,321, dated Aug. 25, 2020, 9 pages.
Notice of Allowance received for U.S. Appl. No. 16/584,347, dated Sep. 15, 2020, 9 pages.
Notice of Allowance received for U.S. Appl. No. 16/584,490, dated Aug. 27, 2020, 13 pages.
Notice of Allowance received for U.S. Appl. No. 16/584,743, dated Aug. 7, 2020, 8 pages.
Notice of Allowance received for U.S. Appl. No. 16/584,743, dated Nov. 16, 2020, 7 pages.
Notice of Allowance received for U.S. Appl. No. 16/586,002, dated Jun. 9, 2020, 5 pages.
Notice of Allowance received for U.S. Appl. No. 16/922,675, dated Jan. 21, 2021, 7 pages.
Notice of Allowance received for U.S. Appl. No. 14/841,455, dated Oct. 22, 2019, 10 pages.
Notice of Grant received for Chinese Patent Application No. 200780033722.5, dated Jun. 19, 2014, 4 pages.
Notice of Non-Compliant Amendment received for U.S. Appl. No. 11/522,167 dated May 14, 2008, 4 pages.
Office Action received for Australian Patent Application No. 2015201884, dated Oct. 12, 2015, 4 pages.
Office Action received for Australian Patent Application No. 2012296381, dated Jan. 21, 2016, 5 pages.
Office Action received for Australian Patent Application No. 2012296381, dated Mar. 4, 2016, 4 pages.
Office Action received for Australian Patent Application No. 2012296381, dated Mar. 6, 2015, 4 pages.
Office Action received for Australian Patent Application No. 2015100490, dated Jun. 9, 2015, 6 pages.
Office Action received for Australian Patent Application No. 2015100490, dated Dec. 15, 2016, 2 pages.
Office Action received for Australian Patent Application No. 2015267671, dated Apr. 5, 2017, 2 pages.
Office Action received for Australian Patent Application No. 2015302298, dated Apr. 4, 2018, 3 pages.
Office Action received for Australian Patent Application No. 2015302298, dated Jul. 20, 2018, 3 pages.
Office Action received for Australian Patent Application No. 2015302298, dated Sep. 14, 2017, 3 pages.
Office Action received for Australian Patent Application No. 2015302298, dated Sep. 4, 2018, 5 pages.
Office Action received for Australian Patent Application No. 2016201454, dated Mar. 29, 2017, 3 pages.
Office Action received for Australian Patent Application No. 2016230001, dated Feb. 7, 2018, 3 pages.
Office Action received for Australian Patent Application No. 2016266010, dated Aug. 23, 2018, 4 pages.
Office Action received for Australian Patent Application No. 2016266010, dated May 4, 2018, 4 pages.
Office Action received for Australian Patent Application No. 2016266010, dated Nov. 28, 2018, 5 pages.
Office Action received for Australian Patent Application No. 2016266010, dated Nov. 30, 2017, 5 pages.
Office Action received for Australian Patent Application No. 2017100553, dated Aug. 4, 2017, 5 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017266867, dated Dec. 6, 2018, 3 pages.
Office Action received for Australian Patent Application No. 2017284013, dated Mar. 19, 2020, 3 pages.
Office Action received for Australian Patent Application No. 2018101014, dated Jan. 18, 2019, 5 pages.
Office Action received for Australian Patent Application No. 2018101014, dated Sep. 19, 2018, 4 pages.
Office Action received for Australian Patent Application No. 2018202751, dated Apr. 2, 2019, 4 pages.
Office Action received for Australian Patent Application No. 2018203624, dated Feb. 5, 2020, 4 pages.
Office Action received for Australian Patent Application No. 2018203624, dated Mar. 11, 2020, 5 pages.
Office Action received for Australian Patent Application No. 2018203624, dated Mar. 15, 2019, 6 pages.
Office Action received for Australian Patent Application No. 2018203624, dated Oct. 30, 2019, 5 pages.
Office Action received for Australian Patent Application No. 2018220115, dated Apr. 21, 2020, 3 pages.
Office Action received for Australian Patent Application No. 2018220115, dated Oct. 4, 2019, 3 pages.
Office Action received for Australian Patent Application No. 2018229544, dated Nov. 15, 2019, 4 pages.

(56) References Cited

OTHER PUBLICATIONS

Office Action received for Australian Patent Application No. 2018236870, dated Jul. 29, 2019, 7 pages.
Office Action received for Australian Patent Application No. 2018236870, dated Nov. 21, 2018, 10 pages.
Office Action received for Australian Patent Application No. 2018236870, dated Oct. 31, 2019, 8 pages.
Office Action received for Australian Patent Application No. 2018236872, dated Nov. 23, 2018, 4 pages.
Office Action received for Australian Patent Application No. 2018271366, dated Feb. 25, 2020, 5 pages.
Office Action received for Australian Patent Application No. 2018271366, dated Jan. 19, 2021, 5 pages.
Office Action received for Australian Patent Application No. 2018271366, dated Oct. 26, 2020, 5 pages.
Office Action received for Australian Patent Application No. 2019203473, dated Oct. 25, 2019, 2 pages.
Office Action received for Australian Patent Application No. 2019268111, dated Oct. 27, 2020, 7 pages.
Office Action received for Australian Patent Application No. 2020257092, dated Mar. 3, 2021, 7 pages.
Office Action received for Australian Patent Application No. 2020257092, dated Nov. 30, 2020, 6 pages.
Office Action received for Brazilian Patent Application No. BR112014003009-0, dated Oct. 29, 2019, 6 pages.
Office Action Received for Canadian Patent Application No. 2,661,200, dated Jan. 3, 2013, 5 pages.
Office Action received for Canadian Patent Application No. 2,661,200, dated Jun. 9, 2010, 3 pages.
Office Action Received for Canadian Patent Application No. 2,661,200, dated Nov. 1, 2011, 4 pages.
Office Action received for Canadian Patent Application No. 2,661,200, dated Nov. 14, 2013, 2 pages.
Office Action received for Canadian Patent Application No. 2,882,403, dated Apr. 2, 2015, 5 pages.
Office Action received for Canadian Patent Application No. 2,882,403, dated Sep. 15, 2017, 5 pages.
Office Action received for Chinese Patent Application No. 201210308569.5, dated Feb. 5, 2016, 3 pages.
Office Action received for Chinese Patent Application No. 201210308569.5, dated Nov. 19, 2014, 24 pages.
Office Action received for Chinese Patent Application No. 201210308569.5, dated Sep. 1, 2015, 39 pages.
Office Action received for Chinese Patent Application No. 201280040169.9, dated Jun. 1, 2016, 10 pages.
Office Action received for Chinese Patent Application No. 201280040169.9, dated Mar. 31, 2017, 13 pages.
Office Action received for Chinese Patent Application No. 201280040169.9, dated May 14, 2018, 6 pages.
Office Action received for Chinese Patent Application No. 201280040169.9, dated Sep. 20, 2017, 14 pages.
Office Action received for Chinese Patent Application No. 201410449822.8, dated Dec. 2, 2016, 9 pages.
Office Action received for Chinese Patent Application No. 201410449822.8, dated May 4, 2018, 12 pages.
Office Action received for Chinese Patent Application No. 201410449822.8, dated Nov. 20, 2018, 11 pages.
Office Action received for Chinese Patent Application No. 201410449822.8, dated Sep. 30, 2017, 20 pages.
Office Action received for Chinese Patent Application No. 201510288981.9, dated Jul. 1, 2019, 16 pages.
Office Action received for Chinese Patent Application No. 201510288981.9, dated Jul. 3, 2018, 19 pages.
Office Action received for Chinese Patent Application No. 201510288981.9, dated Mar. 6, 2019, 20 pages.
Office Action received for Chinese Patent Application No. 201580028491.3, dated Oct. 8, 2018, 9 pages.
Office Action received for Chinese Patent Application No. 201580028505.1, dated Jan. 16, 2019, 15 pages.
Office Action received for Chinese Patent Application No. 201580028505.1, dated Jun. 20, 2019, 7 pages.
Office Action received for Chinese Patent Application No. 201580043701.6, dated Dec. 24, 2018, 20 pages.
Office Action received for Chinese Patent Application No. 201580043701.6, dated Nov. 4, 2019, 20 pages.
Office Action received for Chinese Patent Application No. 201580043701.6, dated Oct. 12, 2020, 22 pages.
Office Action received for Chinese Patent Application No. 201580046339.8, dated Feb. 26, 2019, 18 pages.
Office Action received for Chinese Patent Application No. 201580046339.8, dated Jun. 3, 2020, 19 pages.
Office Action received for Chinese Patent Application No. 201580046339.8, dated Oct. 19, 2020, 12 pages.
Office Action received for Chinese Patent Application No. 201580046339.8, dated Oct. 31, 2019, 9 pages.
Office Action received for Chinese Patent Application No. 201580046788.2, dated Apr. 15, 2019, 13 pages.
Office Action received for Chinese Patent Application No. 201580046788.2, dated Feb. 25, 2020, 14 pages.
Office Action received for Chinese Patent Application No. 201580046788.2, dated Sep. 22, 2020, 10 pages.
Office Action received for Chinese Patent Application No. 201680011682.3, dated Dec. 2, 2019, 14 pages.
Office Action received for Chinese Patent Application No. 201711292804.3, dated Aug. 5, 2020, 26 pages.
Office Action received for Chinese Patent Application No. 201780002398.4, dated Feb. 27, 2019, 6 pages.
Office Action received for Chinese Patent Application No. 201780002398.4, dated Sep. 12, 2018, 17 pages.
Office Action received for Chinese Patent Application No. 201810338038.8, dated Jan. 21, 2020, 26 pages.
Office Action received for Chinese Patent Application No. 201810338038.8, dated May 14, 2019, 26 pages.
Office Action received for Chinese Patent Application No. 201810338826.7, dated Apr. 3, 2019, 21 pages.
Office Action received for Chinese Patent Application No. 201810338826.7, dated Jan. 16, 2020, 16 pages.
Office Action received for Chinese Patent Application No. 201810338826.7, dated Oct. 21, 2019, 19 pages.
Office Action received for Chinese Patent Application No. 201811460172.1, dated Jan. 21, 2020, 17 pages.
Office Action received for Chinese Patent Application No. 201811460172.1, dated Oct. 14, 2020, 7 pages.
Office Action received for Chinese Patent Application No. 201811539259.8, dated Apr. 3, 2020, 10 pages.
Office Action received for Chinese Patent Application No. 201811539259.8, dated Sep. 3, 2020, 10 pages.
Office Action received for Chinese Patent Application No. 201811539259.8, dated Sep. 18, 2019, 12 pages.
Office Action received for Chinese Patent Application No. 201811539260.0, dated Jun. 3, 2020, 8 pages.
Office Action received for Chinese Patent Application No. 201811539260.0, dated Nov. 4, 2020, 9 pages.
Office Action received for Chinese Patent Application No. 201811539260.0, dated Oct. 8, 2019, 14 pages.
Office Action received for Chinese Patent Application No. 201880001436.9, dated Apr. 28, 2019, 19 pages.
Office Action received for Chinese Patent Application No. 201880001436.9, dated Nov. 6, 2019, 24 pages.
Office Action received for Chinese Patent Application No. 201910164962.3, dated Apr. 8, 2020, 25 pages.
Office Action received for Chinese Patent Application No. 201910164962.3, dated Jan. 12, 2021, 14 pages.
Office Action received for Chinese Patent Application No. 201910164962.3, dated Sep. 18, 2020, 19 pages.
Office Action received for Chinese Patent Application No. 201910475434.X, dated Dec. 4, 2019, 14 pages.
Office Action received for Chinese Patent Application No. 201910475434.X, dated Jun. 3, 2020, 9 pages.
Office Action received for Chinese Patent Application No. 201910475434.X, dated Oct. 30, 2020, 9 pages.

(56) References Cited

OTHER PUBLICATIONS

Office Action received for Chinese Patent Application No. 201911128105.4, dated Jan. 4, 2021, 14 pages.
Office Action received for Chinese Patent Application No. 201911128105.4, dated Jul. 3, 2020, 18 pages.
Office Action received for Chinese Patent Application No. 202010125114.4, dated Aug. 21, 2020, 16 pages.
Office Action received for Danish Patent Application No. PA201570256, dated Jul. 7, 2015, 2 pages.
Office Action received for Danish Patent Application No. PA201570256, dated Mar. 17, 2016, 5 pages.
Office Action received for Danish Patent Application No. PA201570256, dated May 23, 2017, 3 pages.
Office Action received for Danish Patent Application No. PA201570256, dated Oct. 10, 2016, 3 pages.
Office Action Received for Danish Patent Application No. PA201670622, dated Aug. 17, 2018, 4 pages.
Office Action Received for Danish Patent Application No. PA201670622, dated May 30, 2017, 4 pages.
Office Action received for Danish Patent Application No. PA201670622, dated Nov. 1, 2017, 5 pages.
Office Action Received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770392, dated Apr. 17, 2018, 2 pages.
Office Action received for Danish Patent Application No. PA201770392, dated Dec. 8, 2017, 4 pages.
Office Action received for Danish Patent Application No. PA201770392, dated Jun. 20, 2017, 11 pages.
Office Action received for Danish Patent Application No. PA201770401, dated Jan. 31, 2018, 3 pages.
Office Action received for Danish Patent Application No. PA201770401, dated May 17, 2018, 3 pages.
Office Action received for Danish Patent Application No. PA201770402, dated Apr. 16, 2018, 5 pages.
Office Action received for Danish Patent Application No. PA201770402, dated Dec. 18, 2017, 6 pages.
Office Action received for Danish Patent Application No. PA201770402, dated Jun. 19, 2017, 11 pages.
Office Action received for Danish Patent Application No. PA201770403, dated Dec. 12, 2017, 3 pages.
Office Action received for Danish Patent Application No. PA201770403, dated Jun. 16, 2017, 8 pages.
Office Action received for Danish Patent Application No. PA201770404, dated Aug. 8, 2018, 4 pages.
Office Action received for Danish Patent Application No. PA201770404, dated Dec. 1, 2017, 5 pages.
Office Action received for Danish Patent Application No. PA201770404, dated Feb. 21, 2019, 2 pages.
Office Action received for Danish Patent Application No. PA201770404, dated May 1, 2019, 2 pages.
Office Action received for Danish Patent Application No. PA201770406, dated Feb. 27, 2018, 7 pages.
Office Action received for Danish Patent Application No. PA201770406, dated Jan. 25, 2019, 8 pages.
Office Action received for Danish Patent Application No. PA201770406, dated Jun. 22, 2017, 11 pages.
Office Action received for Danish Patent Application No. PA201770406, dated Mar. 26, 2019, 3 pages.
Office Action received for Danish Patent Application No. PA201770406, dated Nov. 11, 2019, 4 pages.
Office Action received for Danish Patent Application No. PA201770408, dated Dec. 21, 2017, 6 pages.
Office Action received for Danish Patent Application No. PA201770408, dated Jun. 20, 2017, 9 pages.
Office Action received for Danish Patent Application No. PA201770408, dated May 3, 2018, 7 pages.
Office Action received for Danish Patent Application No. PA201770410, dated Apr. 9, 2018, 5 pages.
Office Action received for Danish Patent Application No. PA201770410, dated Jun. 23, 2017, 9 pages.
Office Action received for Danish Patent Application No. PA201770410, dated Nov. 22, 2018, 5 pages.
Office Action received for Danish Patent Application No. PA201770782, dated Jan. 26, 2018, 8 pages.
Office Action received for Danish Patent Application No. PA201770782, dated Nov. 22, 2018, 3 pages.
Office Action received for Danish Patent Application No. PA201870060, dated Jan. 15, 2019, 4 pages.
Office Action received for Danish Patent Application No. PA201870060, dated Jul. 25, 2019, 2 pages.
Office Action received for Danish Patent Application No. PA201870419, dated Feb. 27, 2020, 8 pages.
Office Action received for Danish Patent Application No. PA201870419, dated Sep. 30, 2019, 4 pages.
Office Action received for Danish Patent Application No. PA201870598, dated May 1, 2019, 3 pages.
Office Action received for Danish Patent Application No. PA201870598, dated Nov. 8, 2019, 4 pages.
Office Action received for Danish Patent Application No. PA201970533, dated Jul. 17, 2020, 6 pages.
Office Action received for Danish Patent Application No. PA202070560, dated Dec. 11, 2020, 7 pages.
Office Action received for European Patent Application No. 00923491.5, dated Jan. 11, 2010, 6 pages.
Office Action received for European Patent Application No. 00923491.5, dated Mar. 12, 2007, 9 pages.
Office Action received for European Patent Application No. 00923491.5, dated Sep. 11, 2007, 5 pages.
Office Action received for European Patent Application No. 07842262.3, dated Feb. 16, 2017, 6 pages.
Office Action received for European Patent Application No. 07842262.3, dated Sep. 8, 2011, 5 pages.
Office Action received for European Patent Application No. 10177096.4, dated Feb. 20, 2012, 6 pages.
Office Action received for European Patent Application No. 10177096.4, dated Jul. 26, 2017, 8 pages.
Office Action received for European Patent Application No. 10177096.4, dated Jun. 7, 2018, 14 pages.
Office Action received for European Patent Application No. 10177096.4, dated Mar. 21, 2013, 9 pages.
Office Action received for European Patent Application No. 10177099.8, dated Feb. 20, 2012, 5 pages.
Office Action received for European Patent Application No. 10712824.1, dated Jun. 23, 2014, 7 pages.
Office Action received for European Patent Application No. 12753631.6, dated Jul. 10, 2017, 6 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action received for European Patent Application No. 13171047.7, dated May 24, 2017, 7 pages.
Office Action received for European Patent Application No. 13184872.3, dated May 18, 2018, 8 pages.
Office Action received for European Patent Application No. 15711969.4, dated Nov. 17, 2017, 9 pages.
Office Action received for European Patent Application No. 15713062.6, dated Dec. 6, 2017, 7 pages.
Office Action received for European Patent Application No. 15719347.5, dated Apr. 9, 2020, 4 pages.
Office Action received for European Patent Application No. 15719347.5, dated Jun. 17, 2019, 4 pages.
Office Action received for European Patent Application No. 15760008.1, dated Jul. 16, 2019, 9 pages.
Office Action received for European Patent Application No. 16710590.7, dated Mar. 15, 2019, 10 pages.

(56) References Cited

OTHER PUBLICATIONS

Office Action received for European Patent Application No. 17799904.2, dated Oct. 21, 2020, 6 pages.
Office Action received for European Patent Application No. 18178147.7, dated Mar. 20, 2020, 4 pages.
Office Action received for European Patent Application No. 18197583.0, dated Feb. 28, 2020, 8 pages.
Office Action received for European Patent Application No. 18197589.7, dated Oct. 1, 2019, 5 pages.
Office Action received for European Patent Application No. 18208881.5, dated Jun. 11, 2019, 5 pages.
Office Action received for European Patent Application No. 18728002.9, dated Dec. 14, 2020, 15 pages.
Office Action received for European Patent Application No. 19150528.8, dated Jul. 1, 2020, 6 pages.
Office Action received for European Patent Application No. 19169980.0, dated Mar. 4, 2020, 6 pages.
Office Action received for European Patent Application No. 19186538.5, dated Oct. 12, 2020, 7 pages.
Office Action received for European Patent Application No. 19207753.5, dated Nov. 12, 2020, 5 pages.
Office Action received for European Patent Application No. 20719301.2, dated Jan. 28, 2021, 15 pages.
Office Action received for European Patent Application No. 10712824.1, dated Mar. 1, 2016, 11 pages.
Office Action received for German Patent Application No. 102015208532.5, dated Apr. 1, 2019, 20 pages.
Office Action received for German Patent Application No. 102015208532.5, dated Apr. 21, 2020, 3 pages.
Office Action received for German Patent Application No. 102015208532.5, dated Aug. 21, 2019, 15 pages.
Office Action received for Hong Kong Patent Application No. 151051633, dated Jun. 5, 2015, 11 pages.
Office Action Received for Indian Patent Application No. 717/CHENP/2014, dated Feb. 7, 2019, 5 pages.
Office Action Received for Japanese Patent Application No. 2012500842, dated Jan. 31, 2014, 5 pages.
Office Action received for Japanese Patent Application No. 2014-148065, dated Sep. 7, 2015, 5 pages.
Office Action received for Japanese Patent Application No. 2014-17726, dated Feb. 9, 2015, 4 pages.
Office Action received for Japanese Patent Application No. 2014-526255, dated Jun. 12, 2015, 5 pages.
Office Action received for Japanese Patent Application No. 2015095183, dated Jun. 3, 2016, 13 pages.
Office Action received for Japanese Patent Application No. 2016-001259, dated Feb. 23, 2018, 11 pages.
Office Action received for Japanese Patent Application No. 2016-001259, dated Jan. 6, 2017, 6 pages.
Office Action received for Japanese Patent Application No. 2016-001259, dated Nov. 13, 2017, 10 pages.
Office Action received for Japanese Patent Application No. 2016-022175, dated Apr. 10, 2017, 11 pages.
Office Action received for Japanese Patent Application No. 2017-075031, dated Jul. 30, 2018, 16 pages.
Office Action received for Japanese Patent Application No. 2017-101107, dated Sep. 7, 2018, 14 pages.
Office Action received for Japanese Patent Application No. 2017-507413, dated Feb. 22, 2019, 11 pages.
Office Action received for Japanese Patent Application No. 2017-507413, dated May 25, 2018, 14 pages.
Office Action received for Japanese Patent Application No. 2017-543762, dated Apr. 8, 2019, 5 pages.
Office Action received for Japanese Patent Application No. 2017-543762, dated Jul. 9, 2018, 8 pages.
Office Action received for Japanese Patent Application No. 2018-080122, dated Aug. 9, 2019, 5 pages.
Office Action received for Japanese Patent Application No. 2018-080122, dated Jan. 28, 2019, 11 pages.
Office Action received for Japanese Patent Application No. 2018-080122, dated Nov. 27, 2020, 16 pages.
Office Action received for Japanese Patent Application No. 2018-119170, dated May 10, 2019, 8 pages.
Office Action received for Japanese Patent Application No. 2018-560107, dated Jun. 14, 2019, 26 pages.
Office Action received for Japanese Patent Application No. 2019-124728, dated Dec. 14, 2020, 4 pages.
Office Action received for Japanese Patent Application No. 2019-124728, dated Sep. 18, 2020, 6 pages.
Office Action received for Japanese Patent Application No. 2019-238894, dated Mar. 6, 2020, 7 pages.
Office Action received for Korean Patent Application No. 10-2013-7028487, dated Feb. 18, 2016, 8 pages.
Office Action Received for Korean Patent Application No. 10-2013-7028487, dated Jun. 5, 2015, 9 pages.
Office Action received for Korean Patent Application No. 10-2013-7028487, dated Jun. 13, 2016, 6 pages.
Office Action received for Korean Patent Application No. 10-2013-7028489, dated Jun. 4, 2015, 4 pages.
Office Action received for Korean Patent Application No. 10-2014-7006538, dated Jul. 31, 2015, 8 pages.
Office Action received for Korean Patent Application No. 10-2014-7008348, dated Jan. 22, 2019, 16 pages.
Office Action received for Korean Patent Application No. 10-2015-0072162, dated Apr. 20, 2016, 11 pages.
Office Action received for Korean Patent Application No. 10-2015-0072162, dated Feb. 27, 2017, 12 pages.
Office Action received for Korean Patent Application No. 10-2016-7022902, dated Sep. 4, 2017, 3 pages.
Office Action received for Korean Patent Application No. 10-2016-7035555, dated Dec. 26, 2017, 5 pages.
Office Action received for Korean Patent Application No. 10-2016-7035555, dated Jul. 18, 2019, 9 pages.
Office Action received for Korean Patent Application No. 10-2016-7035555, dated Sep. 18, 2018, 9 pages.
Office Action received for Korean Patent Application No. 10-2017-7012145, dated Jul. 18, 2019, 5 pages.
Office Action received for Korean Patent Application No. 10-2017-7012145, dated Sep. 13, 2018, 6 pages.
Office Action received for Korean Patent Application No. 10-2017-7022905, dated Oct. 22, 2018, 9 pages.
Office Action received for Korean Patent Application No. 10-2017-7035057, dated Mar. 21, 2018, 10 pages.
Office Action received for Korean Patent Application No. 10-2018-0035949, dated Apr. 24, 2019, 9 pages.
Office Action received for Korean Patent Application No. 10-2018-0035949, dated Dec. 24, 2018, 7 pages.
Office Action received for Korean Patent Application No. 10-2018-0035949, dated Jun. 20, 2018, 9 pages.
Office Action received for Korean Patent Application No. 10-2018-7033301, dated Dec. 14, 2018, 6 pages.
Office Action received for Korean Patent Application No. 10-2018-7035747, dated Apr. 9, 2020, 11 pages.
Office Action received for Korean Patent Application No. 10-2018-7035747, dated Oct. 14, 2020, 6 pages.
Office Action received for Korean Patent Application No. 10-2019-7014494, dated Jun. 14, 2019, 11 pages.
Office Action received for Korean Patent Application No. 10-2020-0024632, dated Dec. 29, 2020, 11 pages.
Office Action received for Korean Patent Application No. 10-2020-0024632, dated May 18, 2020, 11 pages.
Office Action received for Korean Patent Application No. 10-2020-7002929, dated Mar. 22, 2020, 5 pages.
Office Action received for Korean Patent Application No. 10-2020-7031319, dated Dec. 8, 2020, 14 pages.
Office Action received for Mexican Patent Application No. MX/a/2016/001209, dated Apr. 20, 2017, 5 pages.
Office Action received for Mexican Patent Application No. MX/a/2016/001209, dated Aug. 25, 2016, 4 pages.
Office Action received for Mexican Patent Application No. MX/a/2016/001209, dated Sep. 13, 2017, 5 pages.

(56) References Cited

OTHER PUBLICATIONS

Office Action received for Taiwanese Patent Application No. 102120412, dated Feb. 25, 2015, 15 pages.
Office Action received for Taiwanese Patent Application No. 104108223, dated Apr. 25, 2016, 10 pages.
Office Action received for Taiwanese Patent Application No. 104114953, dated Feb. 18, 2017, 9 pages.
Office Action received for Taiwanese Patent Application No. 104114953, dated Jun. 8, 2016, 11 pages.
Office Action Received for Taiwanese Patent Application No. 104117041, dated Aug. 22, 2016, 6 pages.
Office Action received for Taiwanese Patent Application No. 104117042, dated Apr. 20, 2017, 18 pages.
Office Action received for Taiwanese Patent Application No. 104128519, dated Mar. 29, 2017, 16 pages.
On-Line Definition for "Playback", American Heritage Dictionary of the English Language, 4th Edition, 2000, 1 page.
Partial European Search Report received for European Patent Application No. 20158824.1, dated May 8, 2020, 14 pages.
Partial European Search Report received for European Patent Application No. 18197583.0, dated Jan. 14, 2019, 18 pages.
PartyShare—turn your Xperia into a jukebox, Available at: https://forum.xda-developers.com/crossdevice-dev/sony/app-partyshare-xperia-jukebox-t2877807, Sep. 15, 2014, 5 pages.
Plaisant et al., "Touchscreen Toggle Switches: Push or slide? Design Issues and Usability Study", Technical Report CAR-TR-521, CS-TR-2557, Nov. 1990, pp. 1-10.
Planet Quark, "See Everything Your Mac Printed", XP055533938, retrieved from the Internet: URL: https://www.planetquark.com/2011/05/19/see-everything-your-mac-printed/#.XjkfQsgzZGM, May 19, 2011, 7 pages.
Q Pair, When I connected to LG G Pad 8.3 Q pair G Flex.-G Pad 8.3 review, Posting of a blog, Online Available at: http://www.leaderyou.co.kr/2595, Dec. 7, 2013, 28 pages.
QPair, online available at: http://mongri.net/entry/G-Pad-83-Qpair, Retrieved on Mar. 6, 2017, Dec. 20, 2013, 22 pages.
Quick Time Movie Player Ver. 2.1.2.59, Current Time Indicator Dragging Operation, Ver. 2.1.2.59, 1996, 1 page.
RealOne Player Version 2.0 Screen Dumps, 2002, 4 pages.
Restriction Requirement received for U.S. Appl. No. 10/374,013, dated Oct. 6, 2006, 4 pages.
Restriction Requirement received for U.S. Appl. No. 11/767,409, dated Sep. 21, 2010, 8 pages.
Restriction Requirement received for U.S. Appl. No. 12/215,651, dated Sep. 28, 2011, 11 pages.
Restriction Requirement received for U.S. Appl. No. 12/395,537, dated May 9, 2011, 6 pages.
Restriction Requirement received for U.S. Appl. No. 12/395,541, dated May 27, 2011, 6 pages.
Result of Consultation received for European Patent Application No. 16710590.7, dated Dec. 7, 2020, 4 pages.
Result of Consultation received for European Patent Application No. 18197583.0, dated Feb. 24, 2021, 3 pages.
Result of Consultation received for European Patent Application No. 18197589.7, dated Dec. 1, 2020, 9 pages.
Result of Consultation received for European Patent Application No. 18197589.7, dated Dec. 17, 2020, 6 pages.
Rev. Some Culture, "It's super easy for middle-aged and elderly people to learn compute", Jul. 31, 2013, 2 pages.
Review: Samsung Radiant R3 Wireless Speakers, Available Online at: https://www.youtube.com/watch?v=ZBICVE1WdKE, Jan. 19, 2016, 3 pages.
Richards, "TN Audio Mixer and Master Volume Control with Automatic Configuration", Technical Disclosure Bulletin, vol. 37, No. 01, Jan. 1, 1994, pp. 485-486.
Ricker Thomas, "iTunes (in the Cloud) 10.3 beta available for download, we go hands-on", retrieved from the internet: https://www.engadget.com/2011/06/07/itunes-in-the-cloud-10-3-beta-available-for-download-we-go-ha/, 2011, 12 pages.
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
Samsung, "Samsung R3 Wireless 360° Smart Speaker (Black)", User Manual ver. 1.0 (English), User manual [online], Available Online at: https://www.samsung.com/uk/support/model/WAM3500/XU/, Dec. 16, 2016, 3 pages.
Samsung, "SM-G900F User Manual", English (EU). Rev.1.0, Mar. 2014, 249 pages.
Sawyer Brian, "Get with the CoverFlow", Available online at: https://briansawyer.net/2005/12/08/get-with-the-coverflow/, Dec. 9, 2005, pp. 1-2.
Search Report and Opinion received for Danish Patent Application No. PA201770401, dated Jun. 19, 2017, 6 pages.
Search Report and Opinion received for Danish Patent Application No. PA201870060 dated Apr. 30, 2018, 7 pages.
Search Report and Opinion received for Danish Patent Application No. PA201870419, dated Aug. 27, 2018, 7 pages.
Search Report and Opinion received for Danish Patent Application No. PA201870419, dated Sep. 10, 2018, 9 pages.
Search Report and Opinion received for Danish Patent Application No. PA201870598, dated Dec. 5, 2018, 8 pages.
Search Report and Opinion received for Danish Patent Application No. PA201970533, dated Oct. 25, 2019, 9 pages.
Search Report received for Danish Patent Application No. PA201770404, dated Jun. 20, 2017, 8 pages.
Search Report received for Danish Patent Application No. PA201770409, dated Jun. 20, 2017, 9 pages.
Search Report received for European Patent Application No. 00923491.5, dated Jun. 2, 2006, 6 pages.
Search Report received for European Patent Application No. 00923491.5, dated Mar. 6, 2006., 4 pages.
Search Report received for Netherlands Patent Application No. 2014737, dated Oct. 29, 2015, 9 pages.
Seifert Dan, "Google Home review: Home is where the smart is", The Verge, Available Online at: https://www.theverge.com/2016/11/3/13504658/google-home-review-speaker-assistant-amazon-echo-competitor, Nov. 3, 2016, 11 pages.
Seifi Joe, "Pianist Pro Review", available at: http://www.appsafari.com/productivity/11529/pianist-pro/, Apr. 24, 2010, 9 pages.
Shankland Stephen, "Chrome OS Gets 'OK Google' Voice Search Control", available online at: http://www.cnet.com/news/chrome-os-gets-ok-google-voice-search-control/, May 21, 2014, 4 pages.
Smarttricks, "Top 3 Music Player for Android", Available online at: https://www.youtube.com/watch?v=He7RTn4CL34, Feb. 22, 2017, 4 pages.
Smith Eddie, "The expert's guide to Instapaper", available online at "http://www.macworld.com/article/1166898/the_experts_guide_to_instapaper.html", May 23, 2012, 8 pages.
Sonos, "Sonos Controller App for iPad Product Guide", Available online at: https://wvvw.sonos.com/documents/productguides/en/iPadGuide_EN.pdf, Nov. 2014, 47 pages.
Summon to Attend Oral Proceeding received for European Patent Application No. 10177099.8 mailed on Mar. 20, 2013, 9 pages.
Summons to attend oral proceedings received for European Patent Application No. 00923491.5, mailed on Jan. 27, 2011, 10 pages.
Summons to Attend Oral Proceedings received for European Patent Application No. 07842262.3, mailed on Jun. 25, 2018, 9 pages.
Summons to Attend Oral Proceedings received for European Patent Application No. 12753631.6, mailed on Jul. 6, 2018, 5 pages.
Summons to Attend Oral Proceedings received for European Patent Application No. 12753631.6, mailed on May 8, 2018, 9 pages.
Summons to Attend Oral Proceedings received for European Patent Application No. 12770400.5 , mailed on Mar. 19, 2018, 10 pages.
Summons to Attend Oral Proceedings received for European Patent Application No. 13171047.7, mailed on Jul. 9, 2018, 12 pages.

(56) References Cited

OTHER PUBLICATIONS

Summons to Attend Oral Proceedings received for European Patent Application No. 15711969.4, mailed on Oct. 22, 2018, 12 pages.
Summons to Attend Oral Proceedings received for European Patent Application No. 15760008.1, mailed on Feb. 5, 2021, 11 pages.
Summons to Attend Oral Proceedings received for European Patent Application No. 18197583.0, mailed on Aug. 14, 2020, 12 pages.
Summons to attend Oral proceedings received for European Patent Application No. 18197589.7, mailed on Apr. 9, 2020, 7 pages.
Summons to Attend Oral Proceedings received for European Patent Application No. 19169980.0, mailed on Dec. 3, 2020, 8 pages.
Summons to Attend Oral Proceedings received for European Patent Application No. 10177096.4, mailed on Sep. 21, 2018, 12 pages.
Summons to Oral Proceedings received for German Patent Application No. 112007002143.8 mailed on Nov. 28, 2018, 13 pages.
Supplemental Notice of Allowance received for U.S. Appl. No. 14/841,608, dated Jan. 25, 2018, 2 pages.
Supplemental Notice of Allowance received for U.S. Appl. No. 16/584,743, dated Nov. 25, 2020, 2 pages.
Tedeschi Bob, "Stoking a Music Fan's Fancy with Apps That Rock", available at: http://www.nytimes.com/2010/05/20/technology/personaltech/20smart.html, May 19, 2010, 3 pages.
The Single Keyboard Piano, available at: http://web.archive.org/web/20100926023929/http://moocowmusic.com/PianistPro/Manual/ManualSingleKeyboardPiano.html, Sep. 26, 2010, 4 pages.
Vanhemert Kyle, "Why Siri Could Be the Killer App for Smartwatches", XP002798416, Retrieved from the Internet: URL: https://www.wired.com/2013/12/what-can-a-smartwatch-really-do/, Dec. 19, 2013, 14 pages.
Whitehouse Ben, "Coverflow: Better Digital Music Navigation", Whitehouse & Company, Online Available at: http://wandco.com/2005/08/coverflow-better-digital-music-navigation/, Aug. 15, 2005, pp. 1-3.
Wikipedia,"QR code", Available online at: https://en.wikipedia.org/w/index.php?title=QR_code&oldid=452939488, Sep. 28, 2011, pp. 1-9.
Windows Media Player for Windows XP version 8.0, 2001, 2 pages.
Woolsey Amanda, "Apple Watch Tips—How to Add and Play Music", Available online at: https://www.youtube.com/watch?v=E0QEuqMaoi8, Apr. 26, 2015, 3 pages.
WZ Science Alliance, "Very simple geriatrics computer and Internet bestselling upgrade", Sep. 30, 2013, 3 pages.
Yamaguchi Yuu, "Useful Freeware and Shareware Information", Pick Up Onlineware, 23th MdN, vol. 146, MdN Corporation, Jun. 6, 2006, 4 pages.
Corrected Notice of Allowance received for U.S. Appl. No. 16/702,968, dated Jun. 8, 2021, 3 pages.
Corrected Notice of Allowance received for U.S. Appl. No. 16/702,968, dated Jun. 16, 2021, 4 pages.
Decision to Grant received for European Patent Application No. 18197589.7, dated Jun. 10, 2021, 2 pages.
Intention to Grant received for European Patent Application No. 15719347.5, dated Jun. 8, 2021, 7 pages.
Notice of Allowance received for U.S. Appl. No. 16/263,280, dated Jun. 8, 2021, 8 pages.
Notice of Allowance received for U.S. Appl. No. 16/422,736, dated Jun. 15, 2021, 13 pages.
Notice of Allowance received for U.S. Appl. No. 16/888,775, dated Jun. 3, 2021, 11 pages.
Office Action received for Chinese Patent Application No. 201580043701.6, dated May 8, 2021, 10 pages (1 page of English Translation and 9 pages of Official Copy).
Rossignol Joe, "iOS 10 Concept Simplifies Lock Screen with Collapsed Notifications", Available online at: https://www.macrumors.com/2016/06/16/ios-10-collapsed-notifications-concept/, Jun. 16, 2016, 10 pages.
Applicant-Initiated Interview Summary received for U.S. Appl. No. 16/679,967, dated Jun. 1, 2022, 2 pages.
Notice of Acceptance received for Australian Patent Application No. 2021203669, dated May 25, 2022, 3 pages.
Notice of Acceptance received for Australian Patent Application No. 2022202458, dated May 6, 2022, 3 pages.
Notice of Allowance received for U.S. Appl. No. 17/027,373, dated Jun. 3, 2022, 8 pages.
Office Action received for Chinese Patent Application No. 202011450203.2, dated Apr. 20, 2022, 9 pages (5 pages of English Translation and 4 pages of Official Copy).
Result of Consultation received for European Patent Application No. 20158824.1, dated May 17, 2022, 7 pages.
Non-Final Office Action received for U.S. Appl. No. 17/181,089, dated Feb. 17, 2023, 14 pages.
Non-Final Office Action received for U.S. Appl. No. 17/479,974, dated Feb. 22, 2023, 30 pages.
Notice of Allowance received for Chinese Patent Application No. 202111646465.0, dated Feb. 6, 2023, 3 pages (1 page of English Translation and 2 pages of Official Copy).
Notice of Allowance received for U.S. Appl. No. 16/888,775, dated Feb. 21, 2023, 5 pages.
Office Action received for Australian Patent Application No. 2022204555, dated Feb. 17, 2023, 5 pages.
Office Action received for Chinese Patent Application No. 201911288715.0, dated Jan. 20, 2023, 23 pages (11 pages of English Translation and 12 pages of Official Copy).
Board Opinion received for Chinese Patent Application No. 201580046788.2, dated Dec. 29, 2021, 10 pages (4 pages of English Translation and 6 pages of Official Copy).
Final Office Action received for U.S. Appl. No. 17/062,891, dated Jan. 3, 2022, 13 pages.
Notice of Allowance received for Australian Patent Application No. 2020285524, dated Dec. 17, 2021, 3 pages.
Notice of Allowance received for Japanese Patent Application No. 2020-183773, dated Dec. 23, 2021, 4 pages (1 page of English Translation and 3 pages of Official Copy).
Notice of Allowance received for Korean Patent Application No. 10-2021-7039234, dated Dec. 20, 2021, 4 pages (1 page of English Translation and 3 pages of Official Copy).
Notice of Allowance received for U.S. Appl. No. 16/888,775, dated Jan. 12, 2022, 5 pages.
Notice of Allowance received for U.S. Appl. No. 16/921,551, dated Jan. 13, 2022, 6 pages.
Office Action received for Australian Patent Application No. 2020285521, dated Dec. 20, 2021, 3 pages.
Office Action received for Chinese Patent Application No. 201811367893.8, dated Nov. 29, 2021, 6 pages (3 pages of English Translation and 3 pages of Official Copy).
Summons to Attend Oral Proceedings received for European Patent Application No. 17813737.8, mailed on Jan. 4, 2022, 12 pages.
Applicant-Initiated Interview Summary received for U.S. Appl. No. 17/461,103, dated Jan. 26, 2022, 6 pages.
Corrected Notice of Allowance received for U.S. Appl. No. 16/921,551, dated Jan. 26, 2022, 3 pages.
Intention to Grant received for European Patent Application No. 18197583.0, dated Jan. 17, 2022, 9 pages.
Non-Final Office Action received for U.S. Appl. No. 16/917,659, dated Jan. 14, 2022, 10 pages.
Notice of Acceptance received for Australian Patent Application No. 2020273355, dated Jan. 17, 2022, 3 pages.
Notice of Acceptance received for Australian Patent Application No. 2020282362, dated Jan. 4, 2022, 3 pages.
Notice of Allowance received for Japanese Patent Application No. 2021-026630, dated Jan. 7, 2022, 4 pages (1 page of English Translation and 3 pages of Official Copy).
Corrected Notice of Allowance received for U.S. Appl. No. 17/062,891, dated Aug. 2, 2022, 2 pages.
Corrected Notice of Allowance received for U.S. Appl. No. 17/461,103, dated Aug. 3, 2022, 2 pages.
Decision to Grant received for European Patent Application No. 15760008.1, dated Aug. 11, 2022, 2 pages.
Intention to Grant received for Danish Patent Application No. PA202170320, dated Jul. 27, 2022, 2 pages.
Intention to Grant received for European Patent Application No. 20158824.1, dated Aug. 11, 2022, 10 pages.

(56) References Cited

OTHER PUBLICATIONS

Non-Final Office Action received for U.S. Appl. No. 17/314,948, dated Aug. 1, 2022, 33 pages.
Notice of Allowance received for Japanese Patent Application No. 2021-569562, dated Jul. 29, 2022, 4 pages (1 page of English Translation and 3 pages of Official Copy).
Notice of Allowance received for U.S. Appl. No. 17/027,373, dated Aug. 2, 2022, 2 pages.
Farmboyreef,"Apple watch controlling your tv", Available online at: https://www.youtube.com/watch?v=xaJPG0Wm3Tg, Jun. 23, 2015, 3 pages.
Gil Lory, "How to control Apple TV with your Apple Watch", Available online at: https://www.imore.com/how-control-your-apple-tv-remote-app%ADapple-watch], Jun. 6, 2016, 24 pages.
Hobbyistsoftwareltd,"VLC Remote", Online available at: https://watchaware.com/watch-apps/297244048, 2016, 7 pages.
Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Nikolov Anton, "Design principle: Consistency", Available online at: https://uxdesign.cc/design-principle-consistency-6b0cf7e7339f, Apr. 8, 2017, 9 pages.
Ojeda-Zapata Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
Pairing Your Apple Watch With Your AppleTV, Available online at: https://www.youtube.com/watch?v=C4t8YFSJ-UY, Apr. 27, 2015, 3 pages.
Singh Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Whitney Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.
Applicant-Initiated Interview Summary received for U.S. Appl. No. 17/062,891, dated Nov. 22, 2021, 4 pages.
Corrected Notice of Allowance received for U.S. Appl. No. 16/836,571, dated Nov. 18, 2021, 3 pages.
Extended European Search Report received for European Patent Application No. 21197457.1, dated Nov. 15, 2021, 8 pages.
Intention to Grant received for Danish Patent Application No. PA202070617, dated Nov. 15, 2021, 2 pages.
Non-Final received for U.S. Appl. No. 17/461,103, dated Nov. 22, 2021, 15 pages.
Notice of Allowance received for U.S. Appl. No. 14/641,298, dated Nov. 29, 2021, 8 pages.
Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.
Boxer David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Corrected Notice of Allowance received for U.S. Appl. No. 14/641,298, dated Dec. 9, 2021, 5 pages.
Corrected Notice of Allowance received for U.S. Appl. No. 16/836,571, dated Dec. 6, 2021, 5 pages.
International Preliminary Report on Patentability received for PCT Patent Application No. PCT/US2020/024390, dated Dec. 9, 2021, 20 pages.
International Preliminary Report on Patentability received for PCT Patent Application No. PCT/US2020/025526, dated Dec. 9, 2021, 13 pages.
International Preliminary Report on Patentability received for PCT Patent Application No. PCT/US2020/026044, dated Dec. 9, 2021, 18 pages.
International Preliminary Report on Patentability received for PCT Patent Application No. PCT/US2020/035446, dated Dec. 9, 2021, 14 pages.
International Preliminary Report on Patentability received for PCT Patent Application No. PCT/US2020/035488, dated Dec. 9, 2021, 16 pages.
Non-Final Office Action received for U.S. Appl. No. 17/013,778, dated Dec. 9, 2021, 11 pages.
Notice of Allowance received for Chinese Patent Application No. 202010125114.4, dated Nov. 24, 2021, 2 pages (1 page of English Translation and 1 page of Official Copy).
Notice of Allowance received for Korean Patent Application No. 10-2021-7021047, dated Dec. 6, 2021, 3 pages (1 page of English Translation and 2 pages of Official Copy).
Notice of Allowance received for Korean Patent Application No. 10-2021-7035472, dated Nov. 23, 2021, 4 pages (2 pages of English Translation and 2 pages of Official Copy).
Summons to Attend Oral Proceedings received for European Patent Application 20158824.1, mailed on Dec. 7, 2021, 6 pages.
Applicant-Initiated Interview Summary received for U.S. Appl. No. 16/922,675, dated Nov. 15, 2022, 2 pages.
Applicant-Initiated Interview Summary received for U.S. Appl. No. 17/181,089, dated Nov. 22, 2022, 3 pages.
Applicant-Initiated Interview Summary received for U.S. Appl. No. 17/489,508, dated Nov. 17, 2022, 6 pages.
Decision to Grant received for Danish Patent Application No. PA202170320, dated Nov. 10, 2022, 2 pages.
Office Action received for Australian Patent Application No. 2021261941, dated Nov. 3, 2022, 3 pages.
Office Action received for Australian Patent Application No. 2022200515, dated Nov. 2, 2022, 2 pages.
Office Action received for Chinese Patent Application No. 202111646465.0, dated Oct. 21, 2022, 11 pages (6 pages of English Translation and 5 pages of Official Copy).
Brief Communication Regarding Oral Proceedings received for European Patent Application No. 18728002.9, mailed on Nov. 28, 2022, 7 pages.
Extended European Search Report received for European Patent Application No. 22198071.7, dated Dec. 5, 2022, 8 pages.
International Preliminary Report on Patentability received for PCT Patent Application No. PCT/US2021/031760, dated Nov. 24, 2022, 11 pages.
Invitation to Pay Search Fees received for European Patent Application No. 21728781.2, dated Dec. 2, 2022, 3 pages.
Notice of Allowance received for Japanese Patent Application No. 2022-135126, dated Nov. 18, 2022, 4 pages (1 page of English Translation and 3 pages of Official Copy).
Notice of Allowance received for U.S. Appl. No. 16/917,659, dated Dec. 1, 2022, 11 pages.
Office Action received for Australian Patent Application No. 2022241590, dated Nov. 18, 2022, 8 pages.
Office Action received for Chinese Patent Application No. 201811377642.8, dated Oct. 27, 2022, 20 pages (08 pages of English Translation and 12 pages of Official Copy).
Office Action received for Chinese Patent Application No. 201811379281.0, dated Oct. 27, 2022, 21 pages (8 pages of English Translation and 13 pages of Official Copy).
Applicant-Initiated Interview Summary received for U.S. Appl. No. 17/181,089, dated Oct. 7, 2022, 4 pages.
Decision to Refuse received for European Patent Application No. 17813737.8, dated Sep. 30, 2022, 5 pages.
Non-Final Office Action received for U.S. Appl. No. 17/489,508, dated Oct. 19, 2022, 20 pages.
Notice of Allowance received for Chinese Patent Application No. 202011450203.2, dated Sep. 30, 2022, 4 pages (1 page of English Translation and 3 pages of Official Copy).
Notice of Allowance received for U.S. Appl. No. 16/888,775, dated Oct. 19, 2022, 6 pages.
Notice of Allowance received for U.S. Appl. No. 17/027,373, dated Oct. 3, 2022, 5 pages.

(56) References Cited

OTHER PUBLICATIONS

Office Action received for Chinese Patent Application No. 202080039642.6, dated Sep. 5, 2022, 12 pages (6 pages of English Translation and 6 pages of Official Copy).
Office Action received for Chinese Patent Application No. 202111652452.4, dated Aug. 29, 2022, 23 pages (12 pages of English Translation and 11 pages of Official Copy).
Office Action received for European Patent Application No. 20720310.0, dated Oct. 4, 2022, 9 pages.
Hoffman Chris, "How to Ungroup Notifications on iPhone or iPad", Retrieved from the internet <URL: https://www.howtogeek.com/366566/how-to-ungroup-notifications-on-iphone-or-ipad/>, Sep. 17, 2018, 3 pages.
Corrected Notice of Allowance received for U.S. Appl. No. 17/461,103, dated Apr. 14, 2022, 2 pages.
Intention to Grant received for European Patent Application No. 15760008.1, dated Apr. 6, 2022, 11 pages.
International Search Report and Written Opinion received for PCT Patent Application No. PCT/US2021/054470, dated Feb. 2, 2022, 12 pages.
Non-Final Office Action received for U.S. Appl. No. 16/679,967, dated Apr. 19, 2022, 13 pages.
Office Action received for Australian Patent Application No. 2021203669, dated Apr. 5, 2022, 3 pages.
Office Action received for Korean Patent Application No. 10-2022-7008567, dated Mar. 28, 2022, 5 pages (2 pages of English Translation and 3 pages of Official Copy).
Supplemental Notice of Allowance received for U.S. Appl. No. 17/168,069, dated Apr. 20, 2022, 2 pages.
Applicant-Initiated Interview Summary received for U.S. Appl. No. 16/803,849, dated Feb. 28, 2022, 9 pages.
Applicant-Initiated Interview Summary received for U.S. Appl. No. 17/013,778, dated Feb. 28, 2022, 2 pages.
Corrected Notice of Allowance received for U.S. Appl. No. 16/922,675, dated Mar. 4, 2022, 6 pages.
Extended European Search Report received for European Patent Application No. 21207736.6, dated Feb. 22, 2022, 11 pages.
Non-Final Office Action received for U.S. Appl. No. 17/176,908, dated Feb. 24, 2022, 28 pages.
Notice of Acceptance received for Australian Patent Application No. 2021204454, dated Feb. 25, 2022, 3 pages.
Office Action received for Australian Patent Application No. 2021201243, dated Feb. 17, 2022, 4 pages.
Office Action received for European Patent Application No. 20719301.2, dated Feb. 21, 2022, 9 pages.
Office Action received for Korean Patent Application No. 10-2021-7032984, dated Feb. 22, 2022, 8 pages (4 pages of English Translation and 4 pages of Official Copy).
Computeradv, "Sonos App Navigation & Menu on iPhone", Available online at: https://www.youtube.com/watch?v=Jhz9XvWQ204, Aug. 4, 2015, 1 page.
Howcast. "How to Create and Edit Playlists on iPhone", Youtube, Available online at: https://www.youtube.com/watch?v=YPOnKUvcso4, Mar. 13, 2014, 3 pages.
Noriega Josh, "How to Store and Listen to Music Directly from Your Android Wear Smartwatch", Guiding Tech, Available online at: https://www.guidingtech.com/55254/listen-music-android-wear-smartwatch, Jan. 15, 2016, 16 pages.
Sandrahoutz, "How Do I Delete a Playlist from a Synced Ipod but Not Remove it From the Library in itunes", Apple Communities Website, Available online at: https://discussions.apple.com/thread/7503609, Mar. 23, 2016, 2 pages.
Sharepoint at Rackspace, "Sharepoint 2013: How to Edit a List or Library Using Quick Edit", Available online at: https://www.youtube.com/watch?v=foZXcFC1k80, Oct. 10, 2014, 1 page.
Supertunetv, "Ipod Nano 6G—Sync Selected Playlist iTunes", Youtube, Available online at: https://www.youtube.com/watch?v=xU 3rYRabt_l, Sep. 10, 2012, 3 pages.
Whitwam Ryan, "How to Sync and Play Music on Your Android Wear Watch", Available online at: https://www.greenbot.com/article/2997520/how-to-sync-and-play-music-on-your-android-wear-watch.html, Nov. 2, 2015, 4 pages.
Applicant Initiated Interview Summary received for U.S. Appl. No. 17/666,971, dated Jun. 9, 2023, 2 pages.
Applicant-Initiated Interview Summary received for U.S. Appl. No. 17/476,404, dated Jun. 2, 2023, 2 pages.
Applicant-Initiated Interview Summary received for U.S. Appl. No. 17/489,508, dated Jun. 2, 2023, 4 pages.
Corrected Notice of Allowance received for U.S. Appl. No. 17/509,356, dated Jun. 13, 2023, 2 pages.
Notice of Allowance received for Japanese Patent Application No. 2022-201453, dated Jun. 5, 2023, 4 pages (1 page of English Translation and 3 pages of Official Copy).
Notice of Allowance received for U.S. Appl. No. 17/019,845, dated Jun. 5, 2023, 10 pages.
Notice of Allowance received for U.S. Appl. No. 17/752,582, dated Jun. 13, 2023, 18 pages.
Office Action received for Chinese Patent Application No. 201811539259.8, dated May 24, 2023, 22 pages (2 pages of English Translation and 20 pages of Official Copy).
Office Action received for European Patent Application No. 21197457.1, dated May 30, 2023, 8 pages.
Advisory Action received for U.S. Appl. No. 17/747,804, dated Jun. 23, 2023, 6 pages.
Applicant Initiated Interview Summary received for U.S. Appl. No. 17/824,510, dated Jun. 16, 2023, 4 pages.
Extended European Search Report received for European Patent Application No. 23158566.2, dated Jun. 14, 2023, 10 pages.
Final Office Action received for U.S. Appl. No. 17/479,974, dated Jun. 28, 2023, 32 pages.
Non-Final Office Action received for U.S. Appl. No. 17/489,508, dated Jun. 21, 2023, 26 pages.
Notice of Allowance received for U.S. Appl. No. 17/519,025, dated Jun. 22, 2023, 7 pages.
Office Action received for Australian Patent Application No. 2022235591, dated Jun. 6, 2023, 3 pages.
Office Action received for Australian Patent Application No. 2022241590, dated Jun. 7, 2023, 7 pages.
Office Action received for Chinese Patent Application No. 201811379281.0, dated May 16, 2023, 16 pages (6 pages of English Translation and 10 pages of Official Copy).
Office Action received for Chinese Patent Application No. 202111652452.4, dated May 19, 2023, 15 pages (8 pages of English Translation and 7 pages of Official Copy).
Applicant-Initiated Interview Summary received for U.S. Appl. No. 17/181,089, dated May 16, 2023, 4 pages.
Applicant-Initiated Interview Summary received for U.S. Appl. No. 17/747,804, dated May 31, 2023, 4 pages.
Applicant-Initiated Interview Summary received for U.S. Appl. No. 17/867,317, dated May 30, 2023, 4 pages.
Corrected Notice of Allowance received for U.S. Appl. No. 17/509,356, dated May 24, 2023, 2 pages.
International Preliminary Report on Patentability received for PCT Patent Application No. PCT/US2021/056674, dated May 11, 2023, 7 pages.
Mitroff, Sarah, "8 things you should know about Apple Music for Android", CNET website, downloaded from https://www.cnet.com/tech/services-and-software/apple-music-for-android-what-to-know/, Nov. 11, 2015, 4 pages.
Non-Final Office Action received for U.S. Appl. No. 17/824,510, dated May 22, 2023, 15 pages.
Notice of Acceptance received for Australian Patent Application No. 2022201532, dated May 22, 2023, 3 pages.
Notice of Allowance received for U.S. Appl. No. 17/848,845, dated May 24, 2023, 26 pages.
Ochs, Susie, "Getting Started with Apple Music: 12 Things to Do First", Macworld website, downloaded from https://www.macworld.com/article/225812/getting-started-with-apple-music-12-things-to-do-first.html, Jun. 30, 2015, 12 pages.

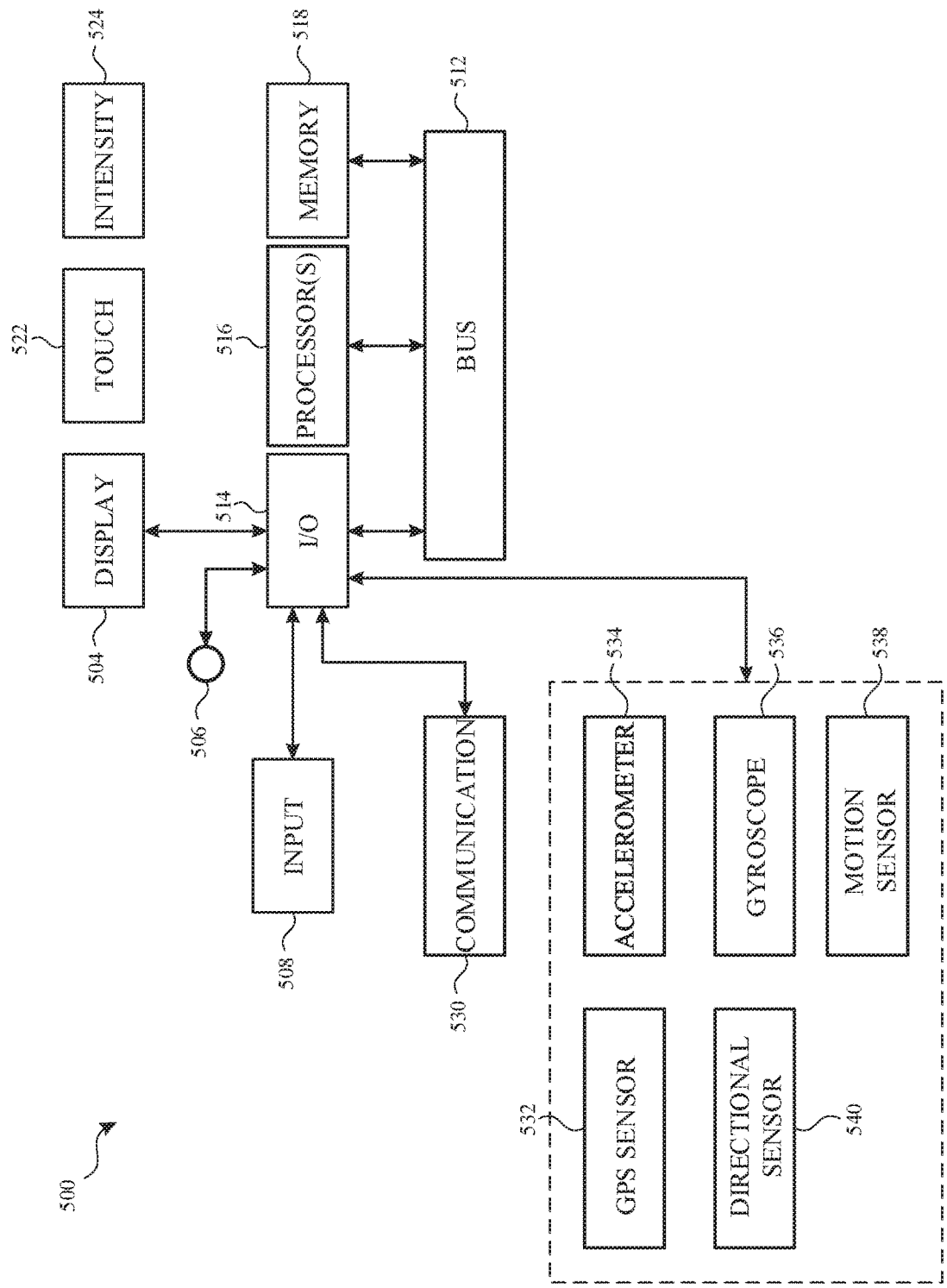

USER INTERFACES FOR AUDIO MEDIA CONTROL

CROSS-REFERENCE TO RELATED APPLICATIONS

This application is a continuation of U.S. patent application Ser. No. 16/583,989, titled "USER INTERFACES FOR AUDIO MEDIA CONTROL," filed Sep. 26, 2019, which claims priority to U.S. Provisional Patent Application Ser. No. 62/855,852, titled "USER INTERFACES FOR AUDIO MEDIA CONTROL," filed on May 31, 2019. The contents of which are hereby incorporated by reference in their entireties.

FIELD

The present disclosure relates generally to computer user interfaces, and more specifically to techniques for controlling audio playback.

BACKGROUND

The number of electronic devices, and particularly smart devices, continues to increase. These devices are increasingly being interconnected with each other, are increasingly more capable, and are performing more complex tasks. As such, these devices are increasingly expected to have thoughtfully-designed user interfaces.

BRIEF SUMMARY

Some techniques for controlling audio playback using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for controlling audio playback. Such methods and interfaces optionally complement or replace other methods for controlling audio playback. Such methods and interfaces reduce the cognitive burden on a user and produce a more efficient human-machine interface. For battery-operated computing devices, such methods and interfaces conserve power and increase the time between battery charges.

Example methods are disclosed herein. An example method includes, at an electronic device with a display device: detecting, while connected to an external device, an indication that a physical proximity between the electronic device and the external device satisfies a proximity condition; in response to detecting the indication that the physical proximity satisfies the proximity condition, displaying, via the display device, a first media information affordance representing a first media item, the first media information affordance including a first set of information about the first media item; receiving a first input representing selection of the first media information affordance; and in response to receiving the first input: in accordance with a determination that the first input is a first type of input, transmitting an instruction to the external device to initiate playback of the first media item on the external device; and in accordance with a determination that the first input is a second type of input different from the first type of input, displaying, via the display device, a second media information affordance representing the first media item, the second media information affordance different from the first media information affordance and including a second set of information about the first media item.

Example non-transitory computer-readable storage media are described herein. An example non-transitory computer-readable storage medium stores one or more programs configured to be executed by one or more processors of an electronic device with a display device, the one or more programs including instructions for: detecting, while connected to an external device, an indication that a physical proximity between the electronic device and the external device satisfies a proximity condition; in response to detecting the indication that the physical proximity satisfies the proximity condition, displaying, via the display device, a first media information affordance representing a first media item, the first media information affordance including a first set of information about the first media item; receiving a first input representing selection of the first media information affordance; and in response to receiving the first input: in accordance with a determination that the first input is a first type of input, transmitting an instruction to the external device to initiate playback of the first media item on the external device; and in accordance with a determination that the first input is a second type of input different from the first type of input, displaying, via the display device, a second media information affordance representing the first media item, the second media information affordance different from the first media information affordance and including a second set of information about the first media item.

Example transitory computer-readable storage media are described herein. An example transitory computer-readable storage medium stores one or more programs configured to be executed by one or more processors of an electronic device with a display device, the one or more programs including instructions for: detecting, while connected to an external device, an indication that a physical proximity between the electronic device and the external device satisfies a proximity condition; in response to detecting the indication that the physical proximity satisfies the proximity condition, displaying, via the display device, a first media information affordance representing a first media item, the first media information affordance including a first set of information about the first media item; receiving a first input representing selection of the first media information affordance; and in response to receiving the first input: in accordance with a determination that the first input is a first type of input, transmitting an instruction to the external device to initiate playback of the first media item on the external device; and in accordance with a determination that the first input is a second type of input different from the first type of input, displaying, via the display device, a second media information affordance representing the first media item, the second media information affordance different from the first media information affordance and including a second set of information about the first media item.

Example electronic devices are described herein. An example electronic device includes a display device; one or more processors; and memory storing one or more programs configured to be executed by the one or more processors, the one or more programs including instructions for: detecting, while connected to an external device, an indication that a physical proximity between the electronic device and the external device satisfies a proximity condition; in response to detecting the indication that the physical proximity satisfies the proximity condition, displaying, via the display device, a first media information affordance representing a first media item, the first media information affordance including a first set of information about the first media item; receiving a first input representing selection of the first media information affordance; and in response to receiving the first input: in accordance with a determination that the first input is a first type of input, transmitting an instruction to the external device to initiate playback of the first media item on the external device; and in accordance with a determination that the first input is a second type of input different from the first type of input, displaying, via the display device, a second media information affordance representing the first media item, the second media information affordance different from the first media information affordance and including a second set of information about the first media item.

An example electronic device includes a display device; means for detecting, while connected to an external device, an indication that a physical proximity between the electronic device and the external device satisfies a proximity condition; means for, in response to detecting the indication that the physical proximity satisfies the proximity condition, displaying, via the display device, a first media information affordance representing a first media item, the first media information affordance including a first set of information about the first media item; means for receiving a first input representing selection of the first media information affordance; and means for, in response to receiving the first input: in accordance with a determination that the first input is a first type of input, transmitting an instruction to the external device to initiate playback of the first media item on the external device; and in accordance with a determination that the first input is a second type of input different from the first type of input, displaying, via the display device, a second media information affordance representing the first media item, the second media information affordance different from the first media information affordance and including a second set of information about the first media item.

An example method includes, at an electronic device with a display device: detecting, while connected to an external device, an indication that a physical proximity between the electronic device and the external device satisfies a proximity condition in response to detecting the indication that the physical proximity satisfies the proximity condition, displaying, via the display device, a first media information affordance representing a first media item that is currently playing on the external device, the first media information affordance including a first set of information about the first media item; receiving a first input representing selection of the first media information affordance; and in response to receiving the first input: in accordance with a determination that the first input is a first type of input, initiating playback of the first media item on the electronic device; and in accordance with a determination that the first input is a second type of input different from the first type of input, displaying, via the display device, a second media information affordance representing the first media item, the second media information affordance different from the first media information affordance and including a second set of information about the first media item.

An example non-transitory computer-readable storage medium stores one or more programs configured to be executed by one or more processors of an electronic device with a display device, the one or more programs including instructions for: detecting, while connected to an external device, an indication that a physical proximity between the electronic device and the external device satisfies a proximity condition in response to detecting the indication that the physical proximity satisfies the proximity condition, displaying, via the display device, a first media information affordance representing a first media item that is currently playing on the external device, the first media information affordance including a first set of information about the first media item; receiving a first input representing selection of the first media information affordance; and in response to receiving the first input: in accordance with a determination that the first input is a first type of input, initiating playback of the first media item on the electronic device; and in accordance with a determination that the first input is a second type of input different from the first type of input, displaying, via the display device, a second media information affordance representing the first media item, the second media information affordance different from the first media information affordance and including a second set of information about the first media item.

An example transitory computer-readable storage medium stores one or more programs configured to be executed by one or more processors of an electronic device with a display device, the one or more programs including instructions for: detecting, while connected to an external device, an indication that a physical proximity between the electronic device and the external device satisfies a proximity condition in response to detecting the indication that the physical proximity satisfies the proximity condition, displaying, via the display device, a first media information affordance representing a first media item that is currently playing on the external device, the first media information affordance including a first set of information about the first media item; receiving a first input representing selection of the first media information affordance; and in response to receiving the first input: in accordance with a determination that the first input is a first type of input, initiating playback of the first media item on the electronic device; and in accordance with a determination that the first input is a second type of input different from the first type of input, displaying, via the display device, a second media information affordance representing the first media item, the second media information affordance different from the first media information affordance and including a second set of information about the first media item.

An example electronic device includes a display device; one or more processors; and memory storing one or more programs configured to be executed by the one or more processors, the one or more programs including instructions for: detecting, while connected to an external device, an indication that a physical proximity between the electronic device and the external device satisfies a proximity condition in response to detecting the indication that the physical proximity satisfies the proximity condition, displaying, via the display device, a first media information affordance representing a first media item that is currently playing on the external device, the first media information affordance including a first set of information about the first media item; receiving a first input representing selection of the first media information affordance; and in response to receiving the first input: in accordance with a determination that the first input is a first type of input, initiating playback of the first media item on the electronic device; and in accordance with a determination that the first input is a second type of input different from the first type of input, displaying, via the display device, a second media information affordance representing the first media item, the second media information affordance different from the first media information affordance and including a second set of information about the first media item.

An example electronic device includes a display device; means for detecting, while connected to an external device, an indication that a physical proximity between the electronic device and the external device satisfies a proximity condition means for, in response to detecting the indication that the physical proximity satisfies the proximity condition, displaying, via the display device, a first media information affordance representing a first media item that is currently playing on the external device, the first media information affordance including a first set of information about the first media item; means for receiving a first input representing selection of the first media information affordance; and means for, in response to receiving the first input: in accordance with a determination that the first input is a first type of input, initiating playback of the first media item on the electronic device; and in accordance with a determination that the first input is a second type of input different from the first type of input, displaying, via the display device, a second media information affordance representing the first media item, the second media information affordance different from the first media information affordance and including a second set of information about the first media item.

An example method includes, at an electronic device with a display device: detecting, while connected to an external device, an indication that a physical proximity between the electronic device and the external device satisfies a first proximity condition; in response to detecting the indication that the physical proximity satisfies the first proximity condition, displaying, via the display device, a first media information affordance representing a first media item; while displaying the first media information affordance representing the first media item, detecting an indication that the physical proximity between the electronic device and the external device satisfies a second proximity condition; and in response to detecting the indication that the physical proximity satisfies the second proximity condition, initiating playback of the first media item.

An example non-transitory computer-readable storage medium stores one or more programs configured to be executed by one or more processors of an electronic device with a display device, the one or more programs including instructions for: detecting, while connected to an external device, an indication that a physical proximity between the electronic device and the external device satisfies a first proximity condition; in response to detecting the indication that the physical proximity satisfies the first proximity condition, displaying, via the display device, a first media information affordance representing a first media item; while displaying the first media information affordance representing the first media item, detecting an indication that the physical proximity between the electronic device and the external device satisfies a second proximity condition; and in response to detecting the indication that the physical proximity satisfies the second proximity condition, initiating playback of the first media item.

An example transitory computer-readable storage medium stores one or more programs configured to be executed by one or more processors of an electronic device with a display device, the one or more programs including instructions for: detecting, while connected to an external device, an indication that a physical proximity between the electronic device and the external device satisfies a first proximity condition; in response to detecting the indication that the physical proximity satisfies the first proximity condition, displaying, via the display device, a first media information affordance representing a first media item; while displaying the first media information affordance representing the first media item, detecting an indication that the physical proximity between the electronic device and the external device satisfies a second proximity condition; and in response to detecting the indication that the physical proximity satisfies the second proximity condition, initiating playback of the first media item.

An example electronic device includes a display device; one or more processors; and memory storing one or more programs configured to be executed by the one or more processors, the one or more programs including instructions for: detecting, while connected to an external device, an indication that a physical proximity between the electronic device and the external device satisfies a first proximity condition; in response to detecting the indication that the physical proximity satisfies the first proximity condition, displaying, via the display device, a first media information affordance representing a first media item; while displaying the first media information affordance representing the first media item, detecting an indication that the physical proximity between the electronic device and the external device satisfies a second proximity condition; and in response to detecting the indication that the physical proximity satisfies the second proximity condition, initiating playback of the first media item.

An example electronic device includes a display device; means for detecting, while connected to an external device, an indication that a physical proximity between the electronic device and the external device satisfies a first proximity condition; means for, in response to detecting the indication that the physical proximity satisfies the first proximity condition, displaying, via the display device, a first media information affordance representing a first media item; means for, while displaying the first media information affordance representing the first media item, detecting an indication that the physical proximity between the electronic device and the external device satisfies a second proximity condition; and means for, in response to detecting the indication that the physical proximity satisfies the second proximity condition, initiating playback of the first media item.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for controlling audio playback, thereby increasing the effectiveness, efficiency, and user satisfaction with such devices. Such methods and interfaces may complement or replace other methods for controlling audio playback.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 5B is a block diagram illustrating a personal electronic device in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for controlling audio playback. Techniques described below allow a user to transfer playback of audio from one device to another by bringing the two devices in proximity of each other. For example, while playing music on a phone, a user can place the phone close to a wireless speaker to transfer playback of the music to the wireless speaker, which might provide better sound quality than the phone. When the phone is brought into proximity of the speaker, a notification is displayed on the phone (e.g., at the top of a display of the phone) to notify the user that the music can be played on the speaker. The notification can be tapped to initiate playback of the music on the speaker. A swipe gesture pulling down on the notification, instead of initiating playback, provides an interface with additional information, such as a queue of recent and/or scheduled media items that can be selected for playback on the speaker. Audio media playing on the speaker can be transferred to the phone in a similar manner. While audio is playing on the speaker, bringing the phone in proximity of the speaker causes the phone to display a notification similar to the notification discussed above, except tapping the notification transfers the audio from the speaker to the phone, and swiping on the notification displays additional information for the media playing on the speaker. In some embodiments, while the notification is displayed, the phone can be brought in even closer proximity to the speaker to initiate playback without a touch input on a display of the phone. Such techniques can reduce the cognitive burden on a user who initiates playback of audio media, thereby enhancing productivity. Further, such techniques can reduce processor and battery power otherwise wasted on redundant user inputs.

Figure 7:
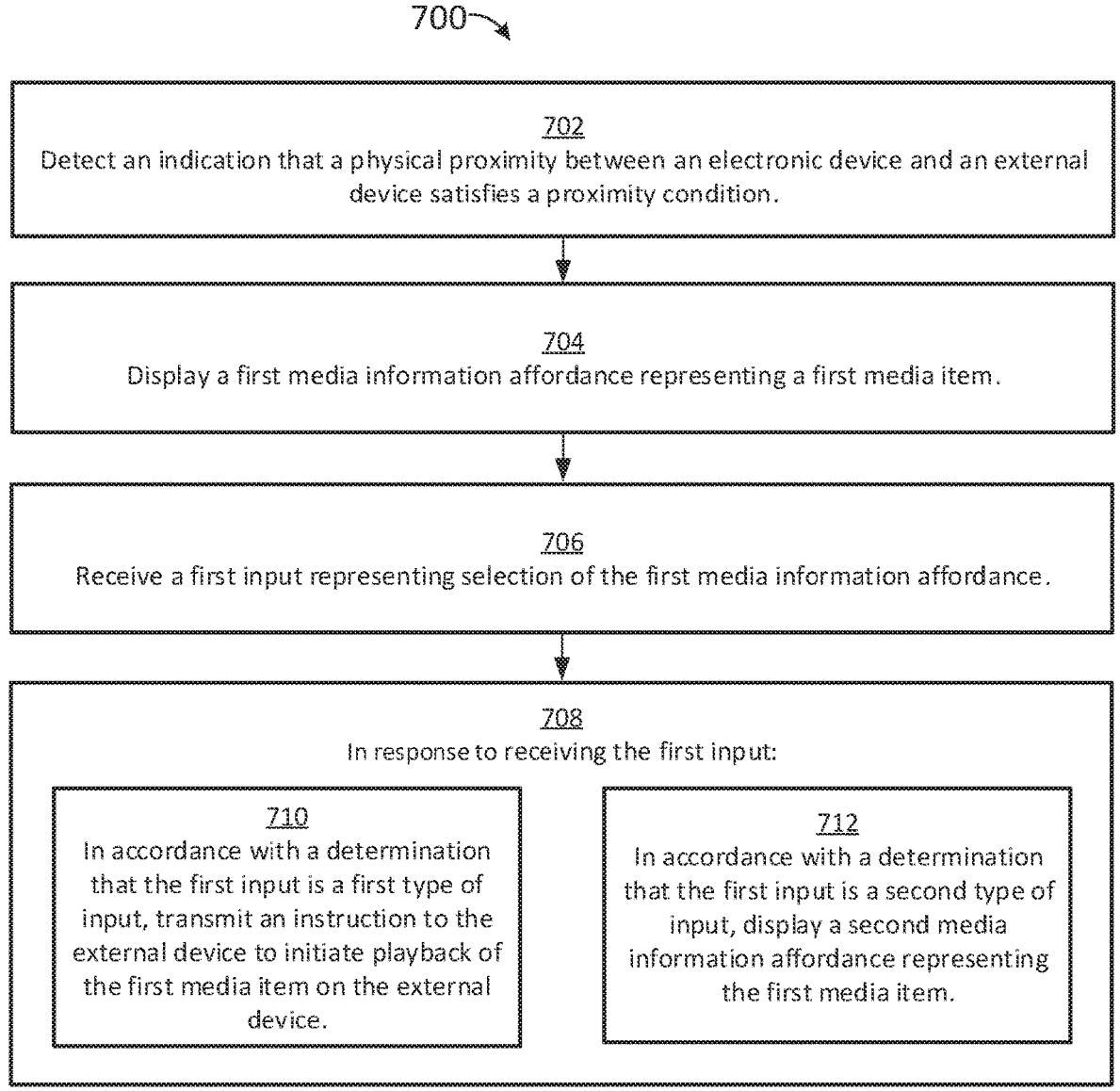
FIG. 7 illustrates an exemplary method in accordance with some embodiments.
Figure 8:
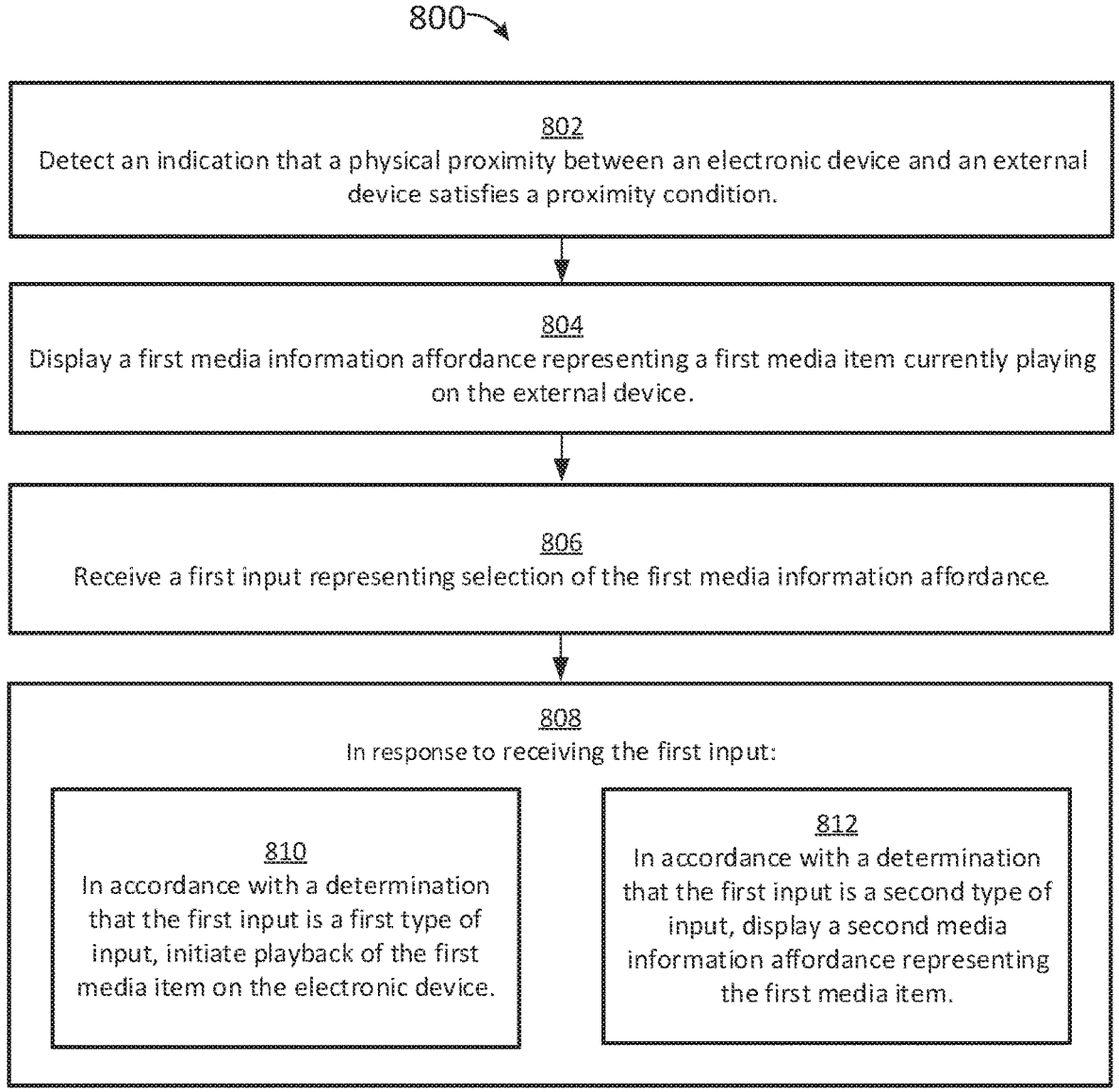
FIG. 8 illustrates an exemplary method in accordance with some embodiments.

Below, FIGS. 1A-1B, 2, 3, 4A-4B, and 5A-5J provide a description of exemplary devices for performing the techniques for managing event notifications. FIGS. 6A-6P and 11A-11D illustrate exemplary user interfaces for controlling audio playback. FIGS. 7-8 are flow diagrams illustrating methods of controlling audio playback in accordance with some embodiments. The user interfaces in FIGS. 6A-6P and 11A-11D are used to illustrate the processes described below, including the processes in FIGS. 7-8. FIGS. 9A-9D and 11A-11D illustrate exemplary user interfaces for controlling audio playback. FIG. 10 is a flow diagram illustrating methods of controlling audio playback in accordance with some embodiments. The user interfaces in FIGS. 9A-9D and 11A-11D are used to illustrate the processes described below, including the processes in FIG. 10.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
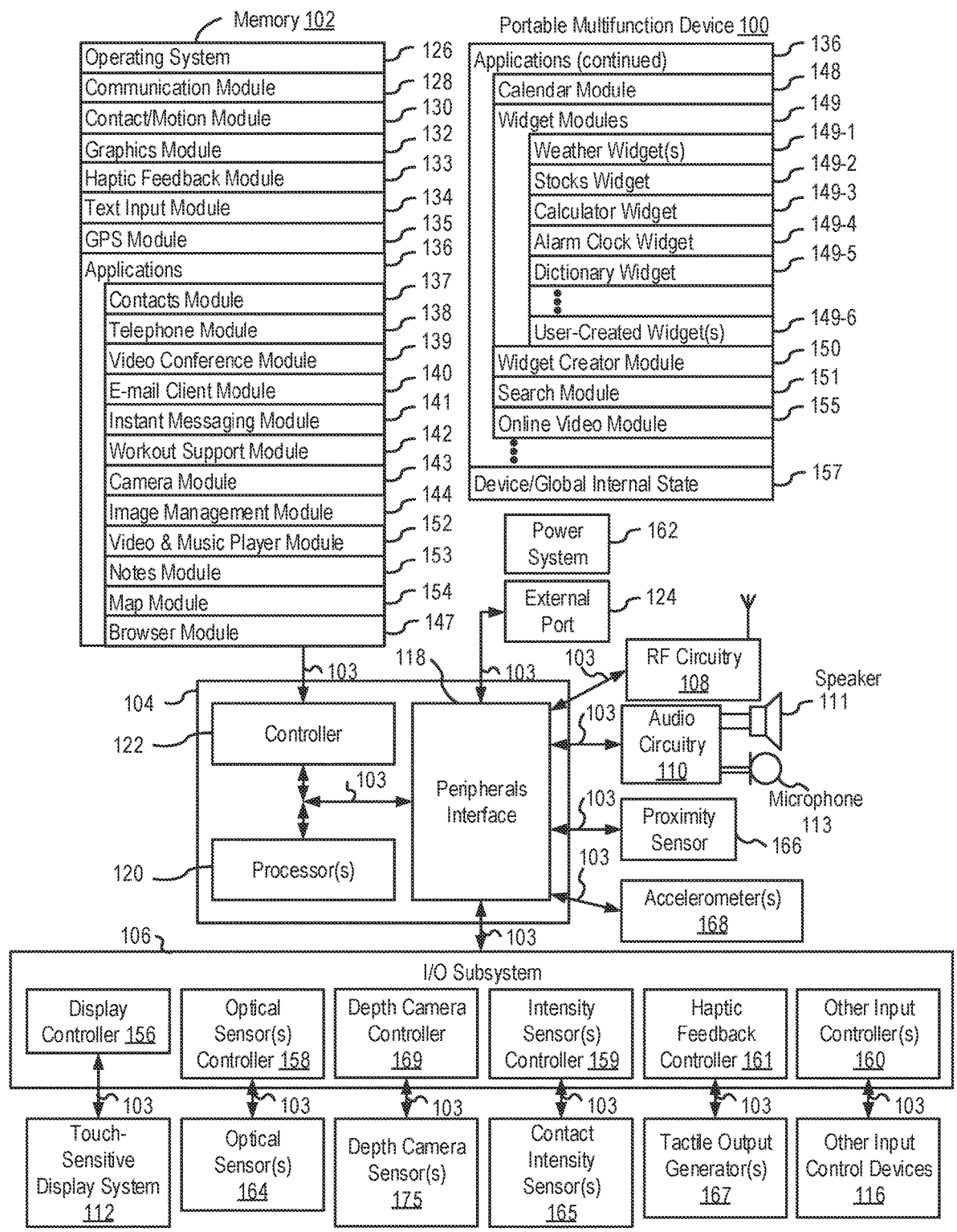
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
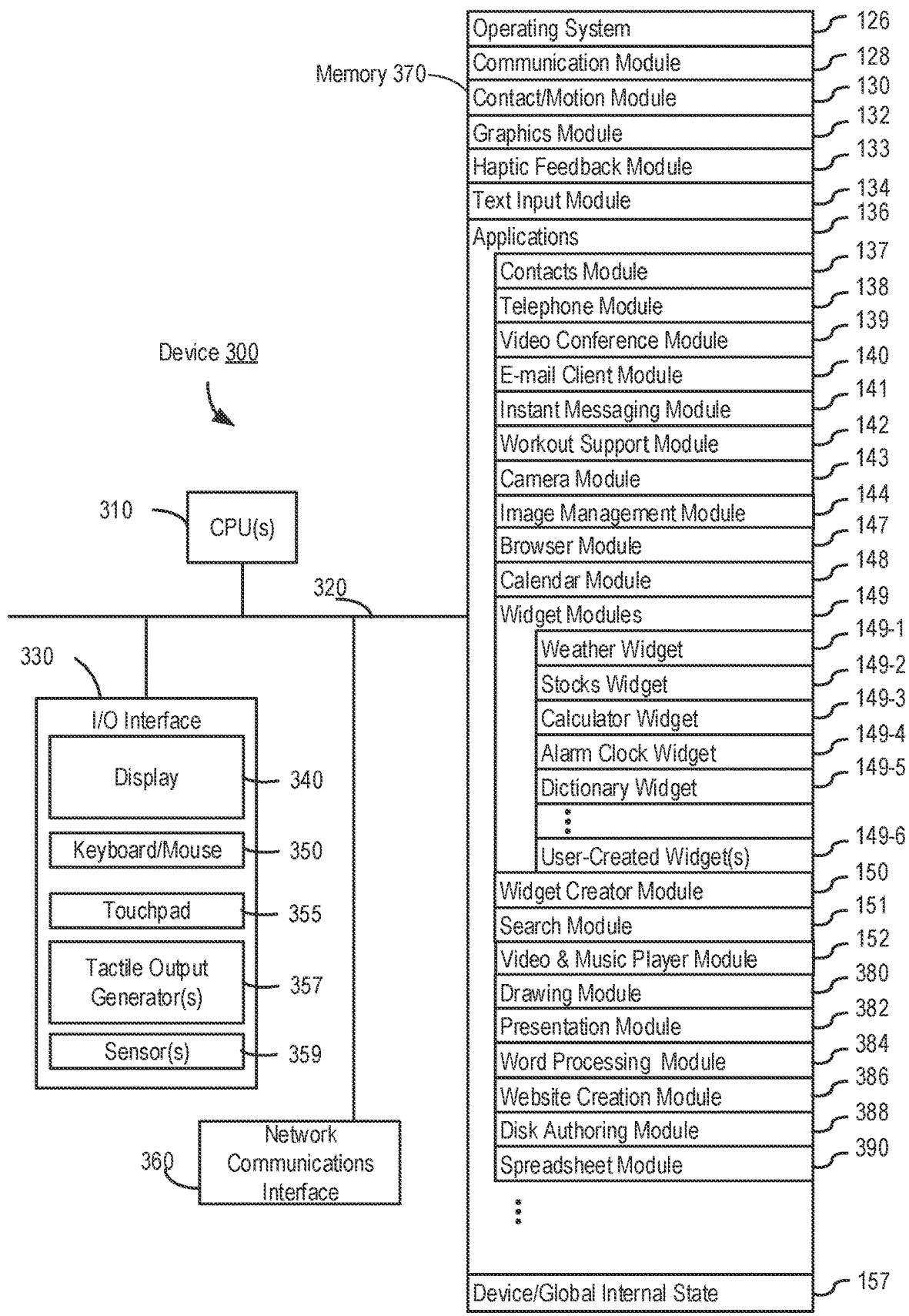
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
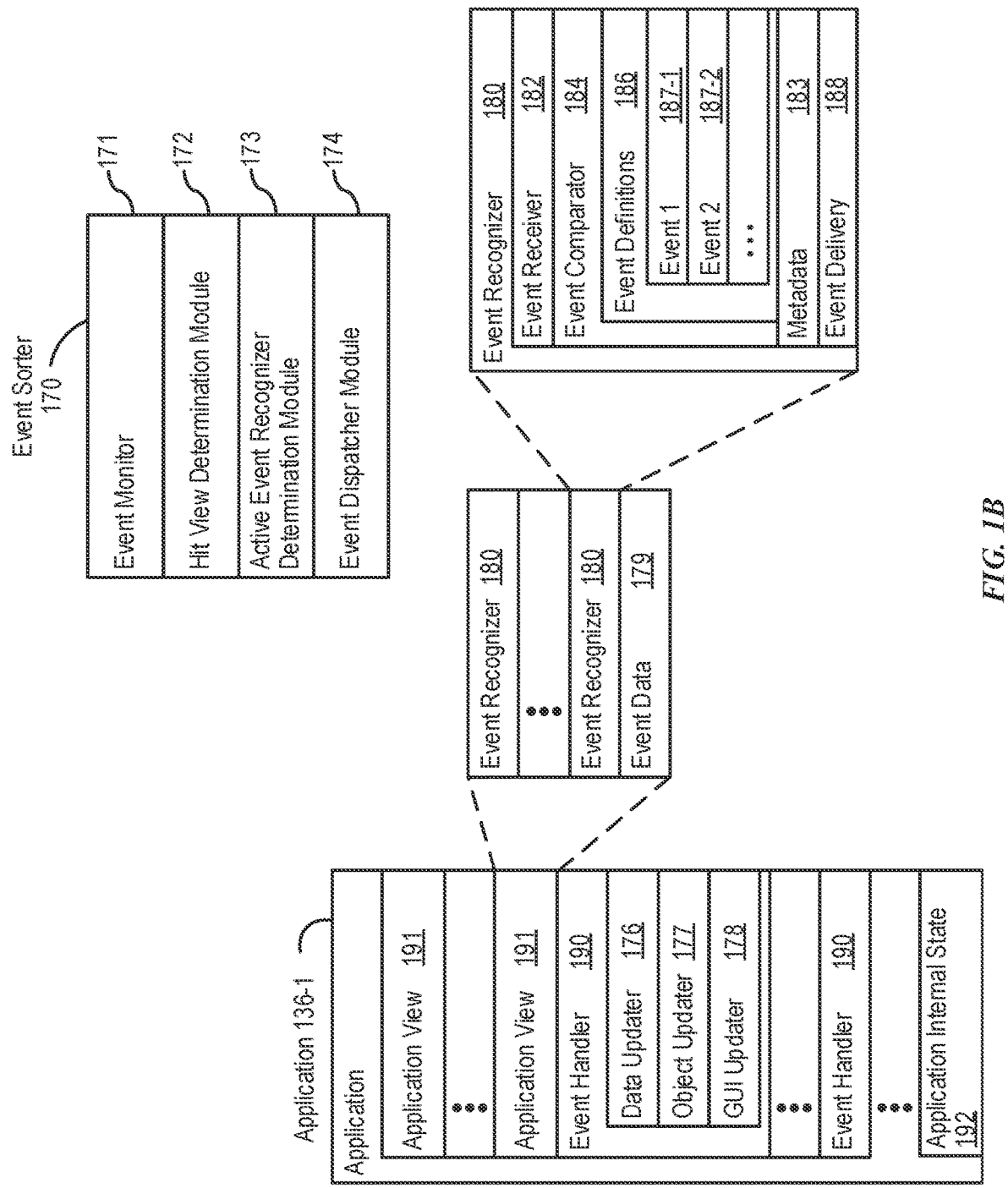
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
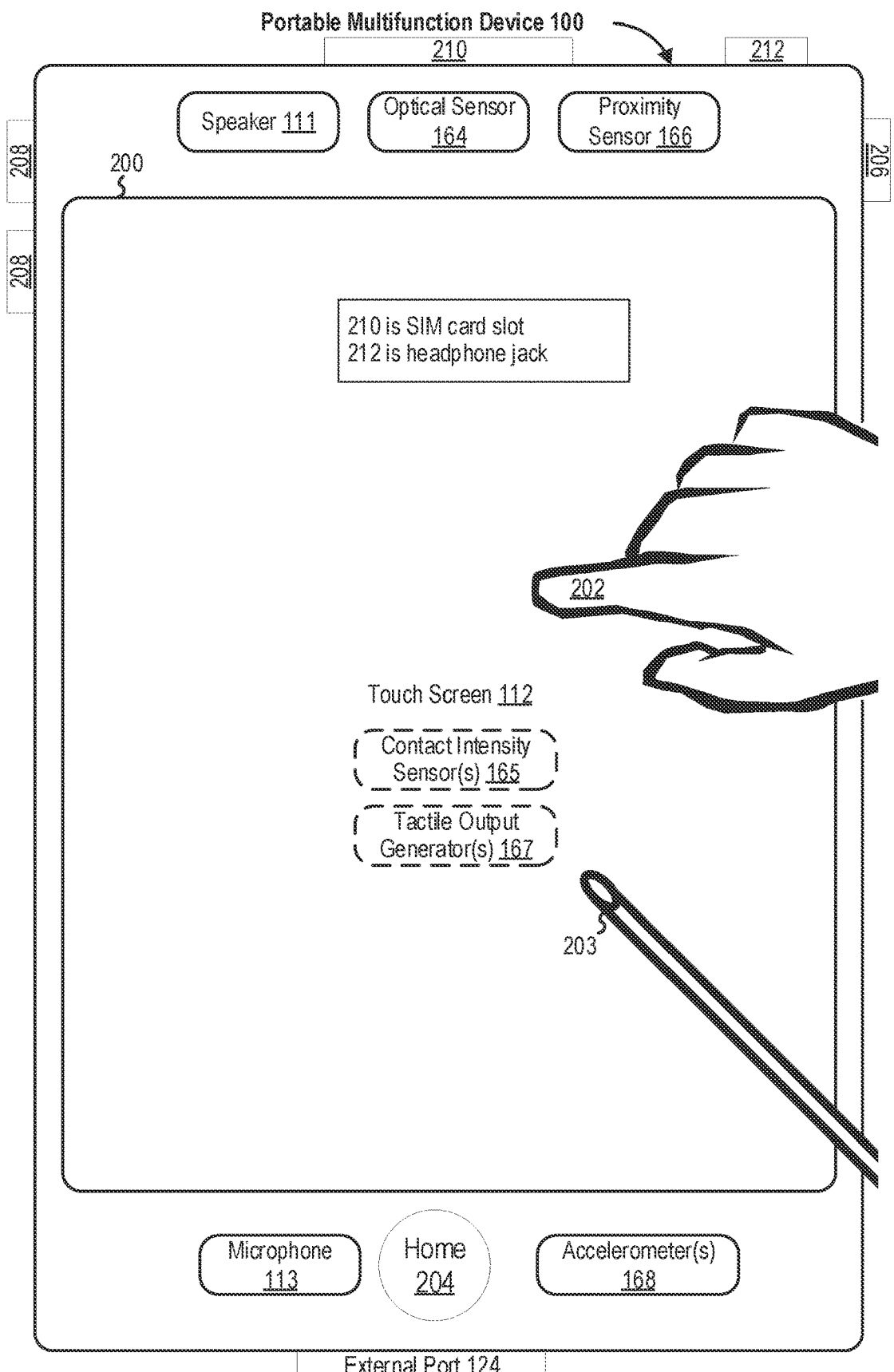
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG.

1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
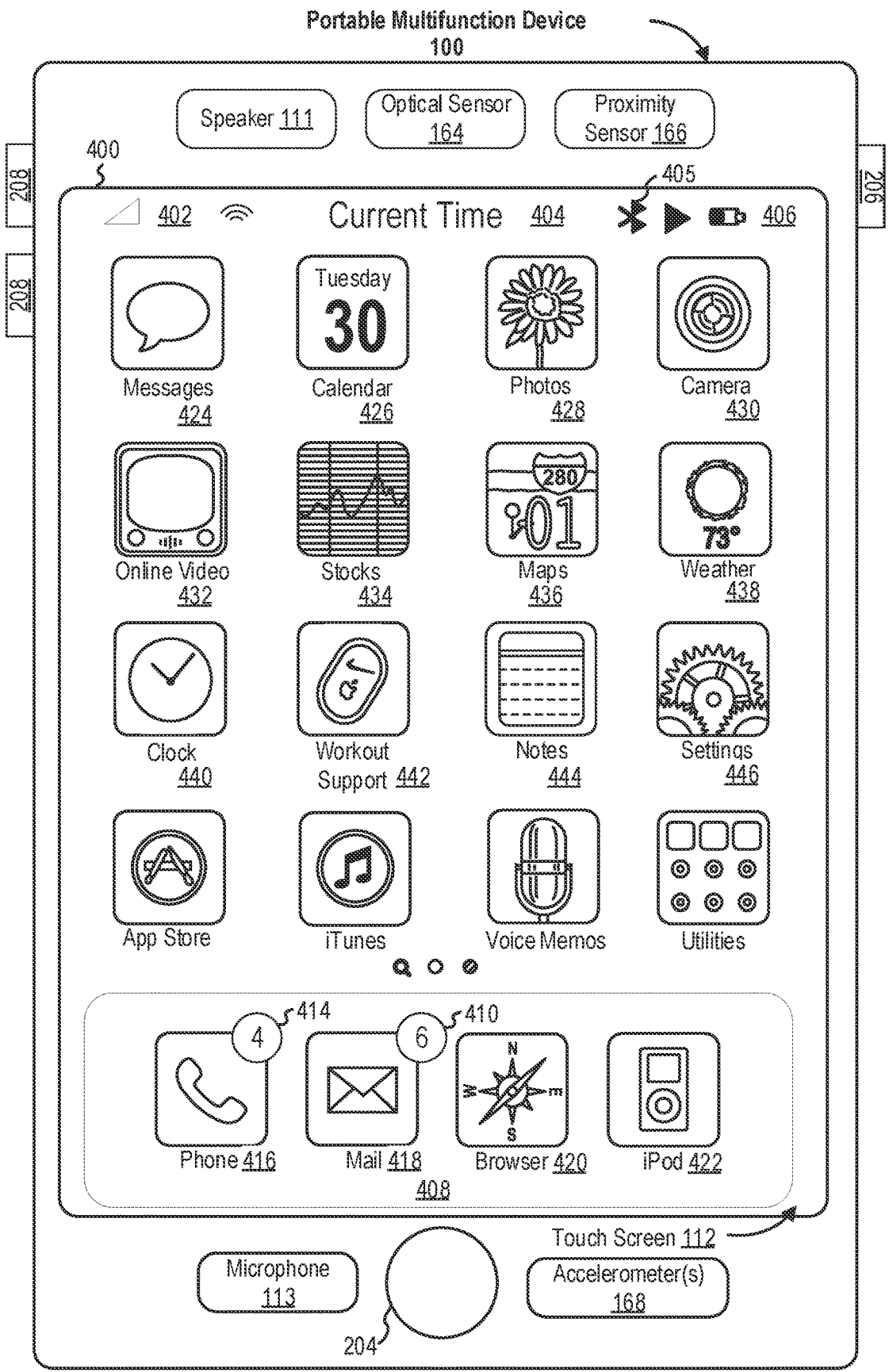
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
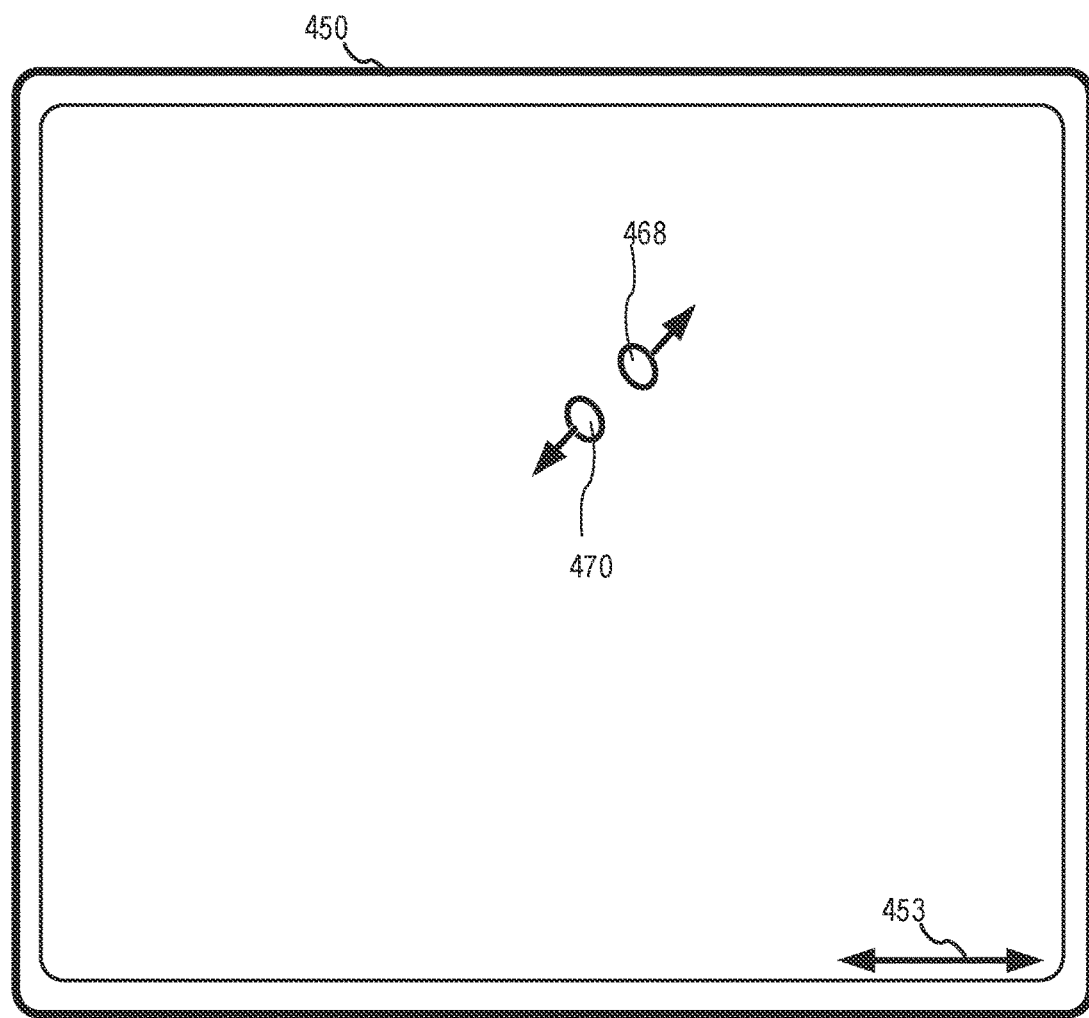
FIG. 4B illustrates an exemplary user interface for a multifunction device with a touch-sensitive surface that is separate from the display in accordance with some embodiments.
Figure 4B:
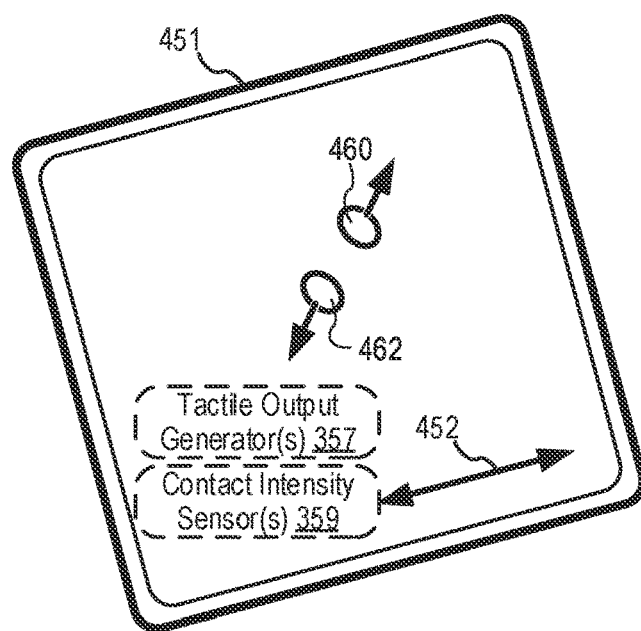

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
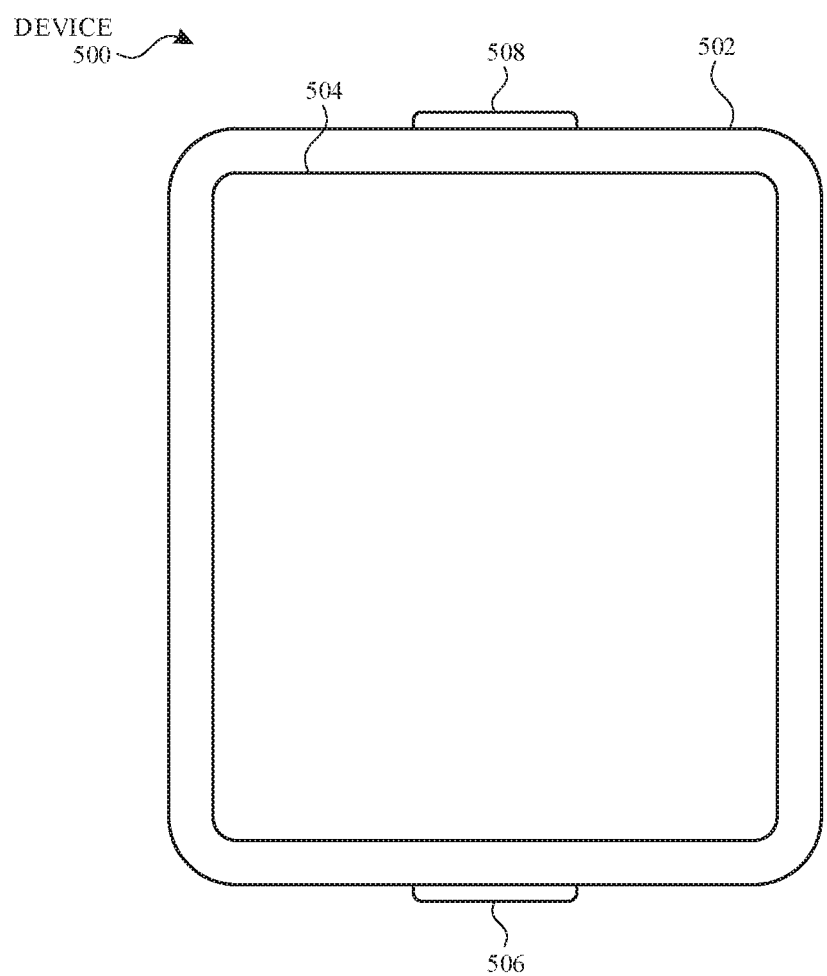
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including methods 700, 800, and 1000 (FIGS. 7, 8, and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
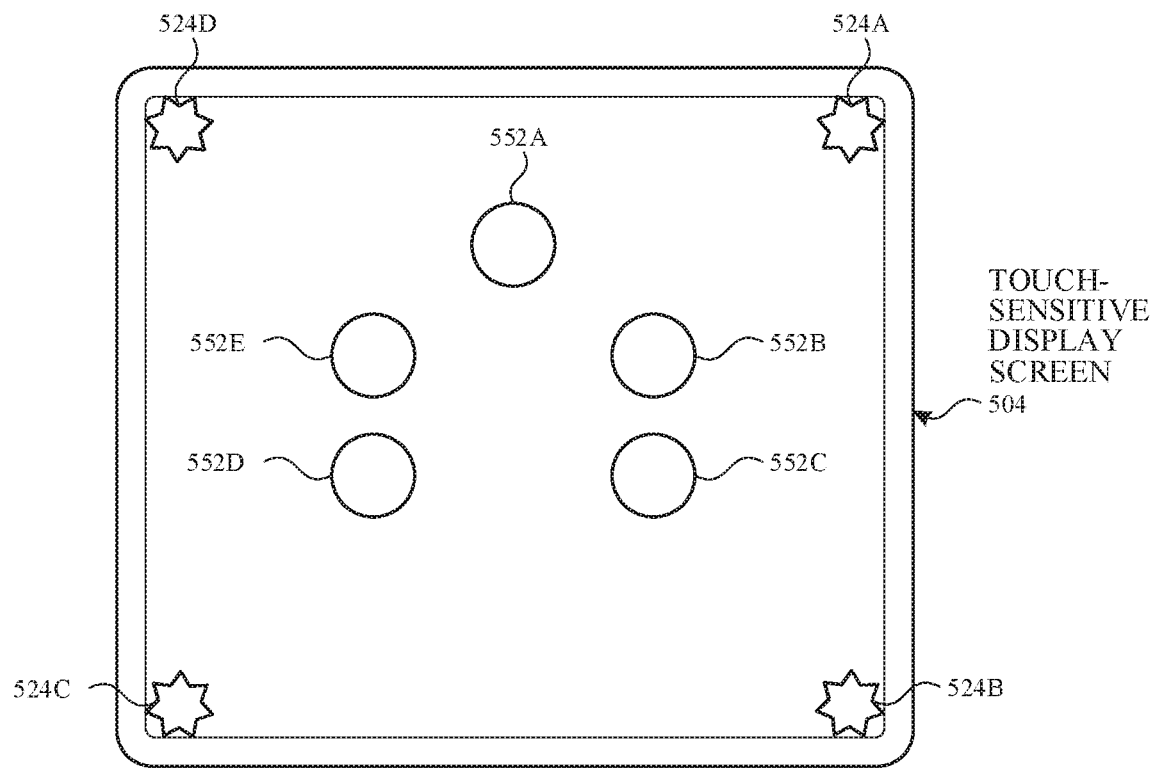
FIGS. 5C-5D illustrate exemplary components of a personal electronic device having a touch-sensitive display and intensity sensors in accordance with some embodiments.
Figure 5C:
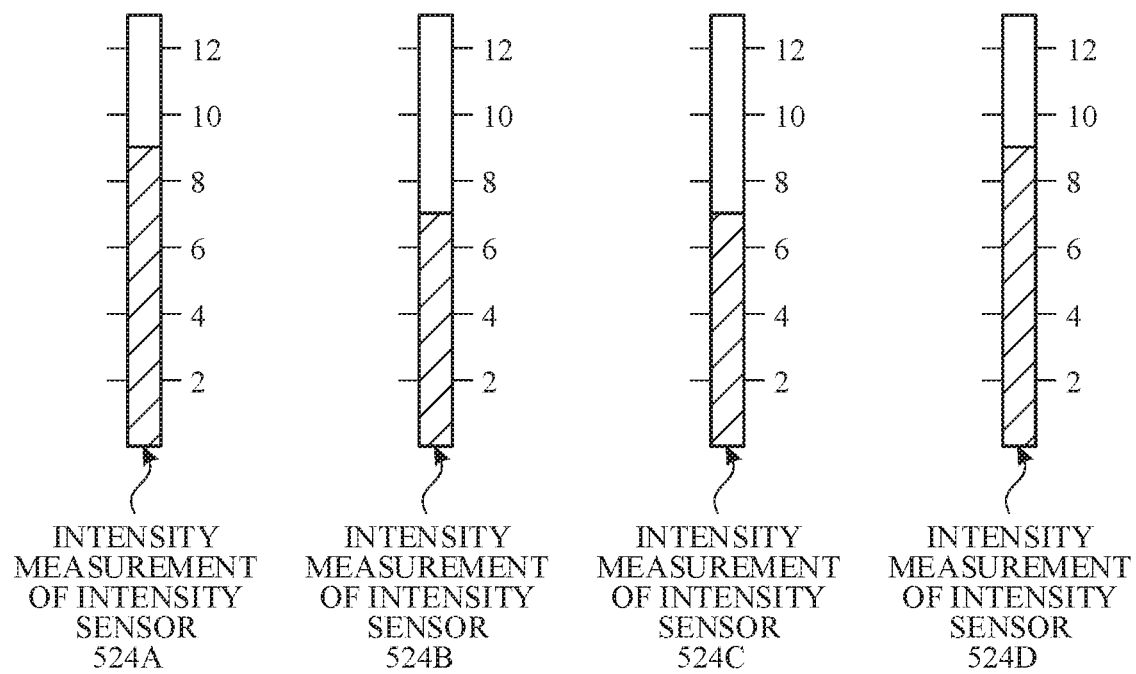
Figure 5D:
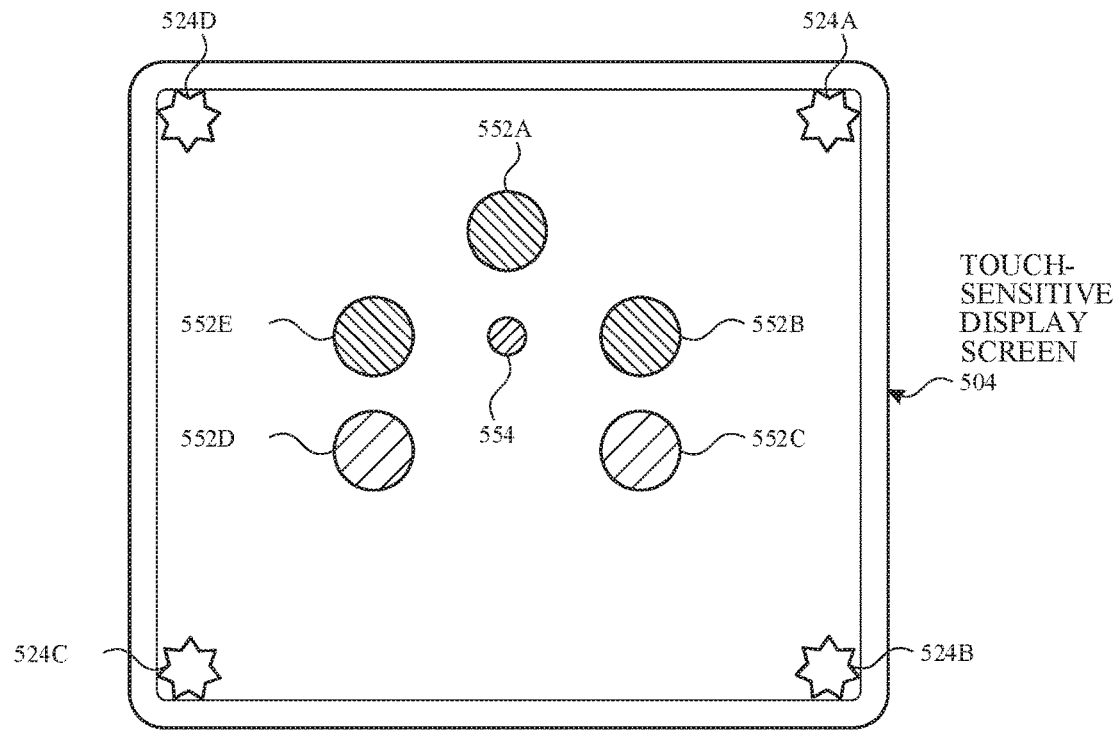
Figure 5D:
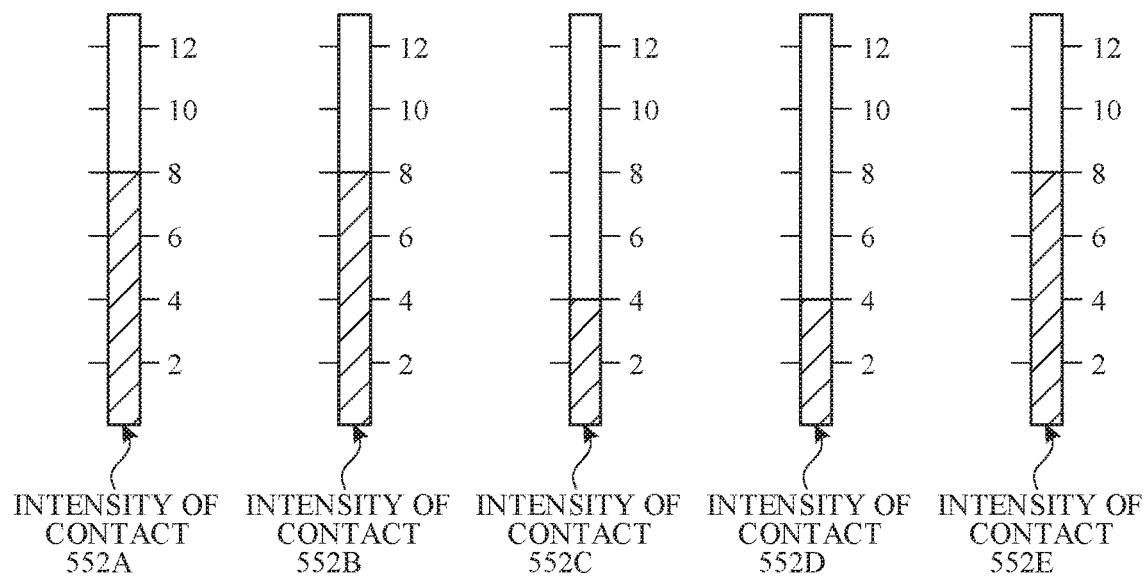

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
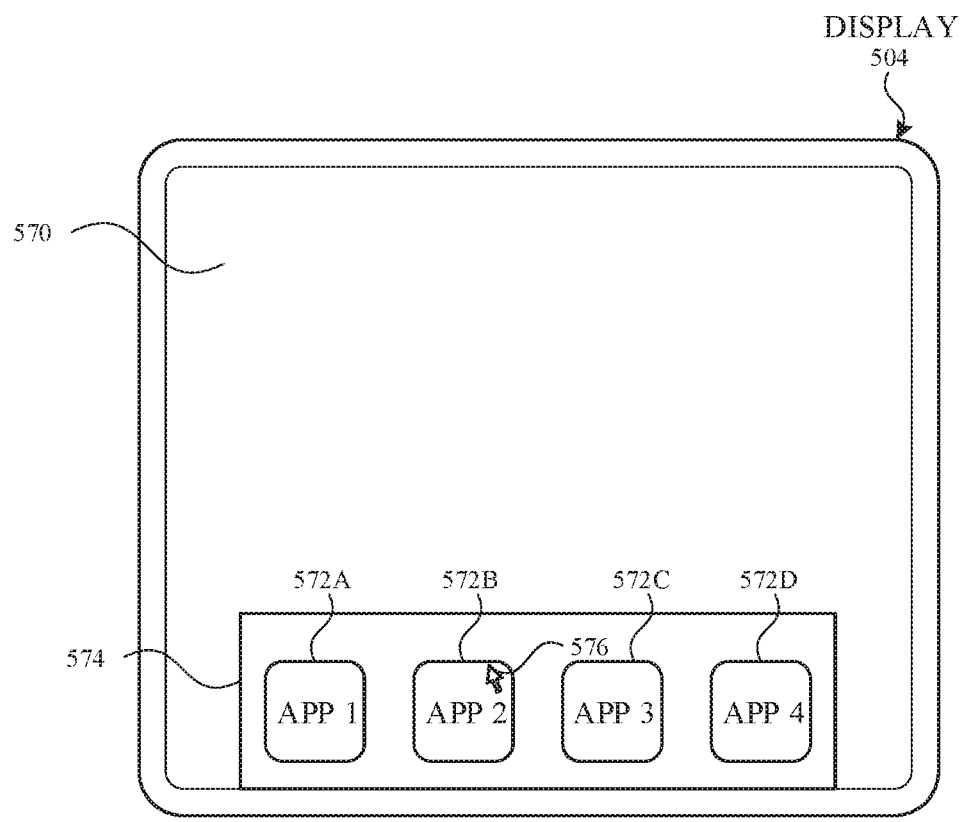
FIGS. 5E-5H illustrate exemplary components and user interfaces of a personal electronic device in accordance with some embodiments.
Figure 5E:
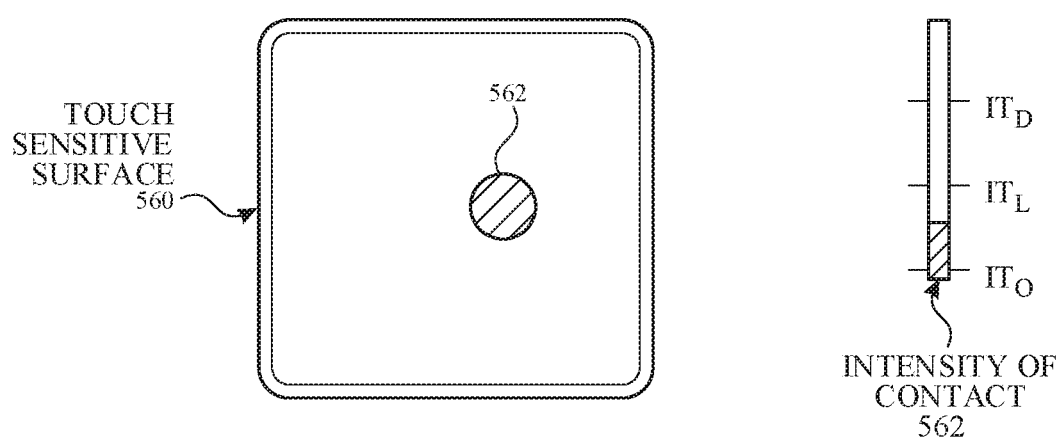
Figure 5F:
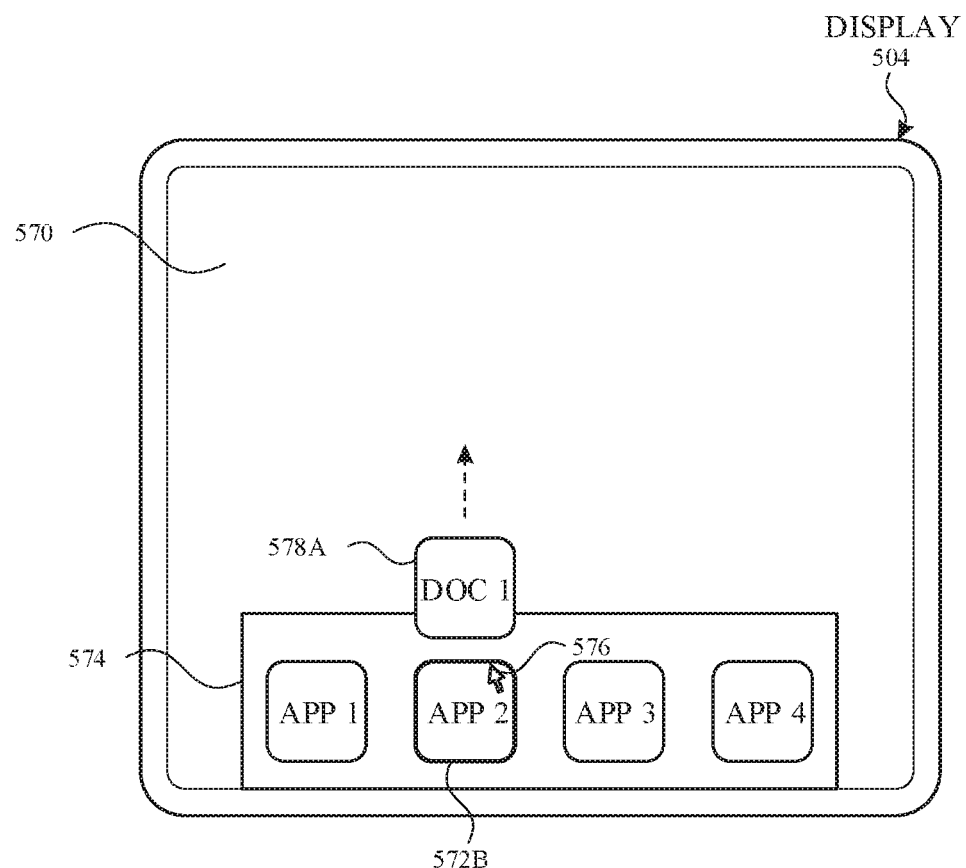
Figure 5F:
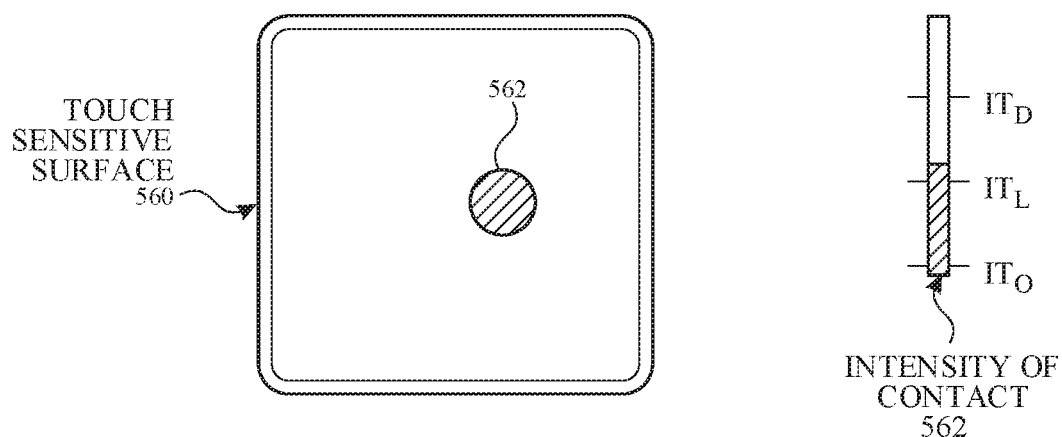
Figure 5G:
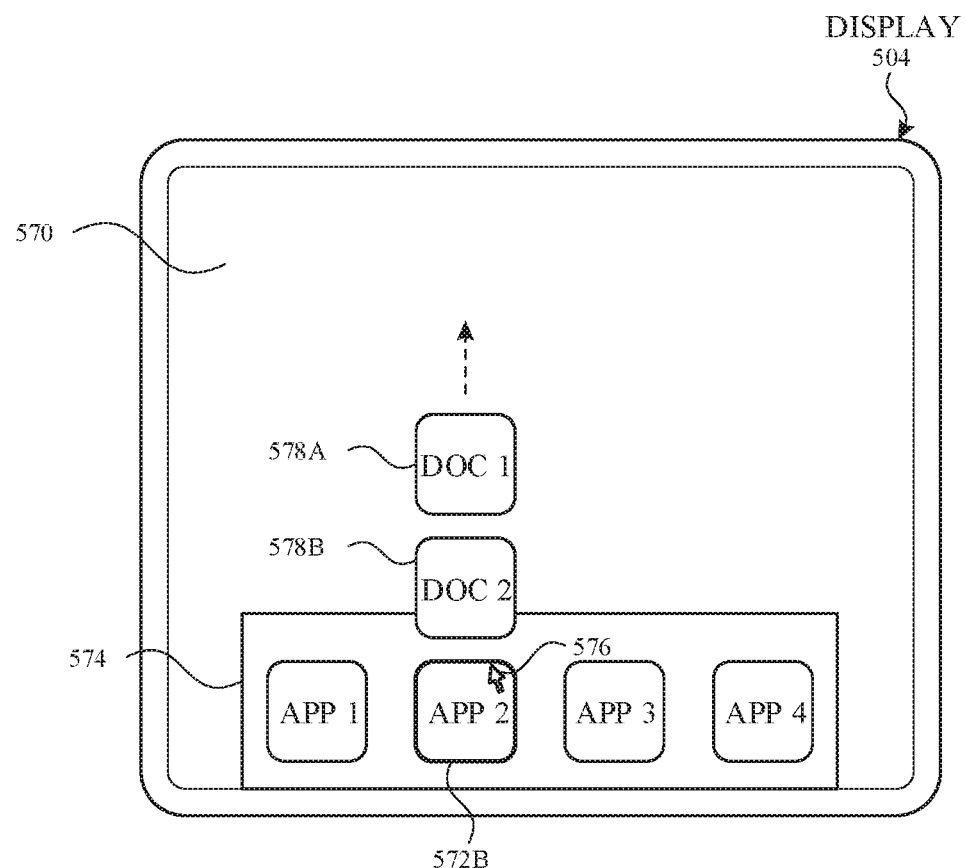
Figure 5G:
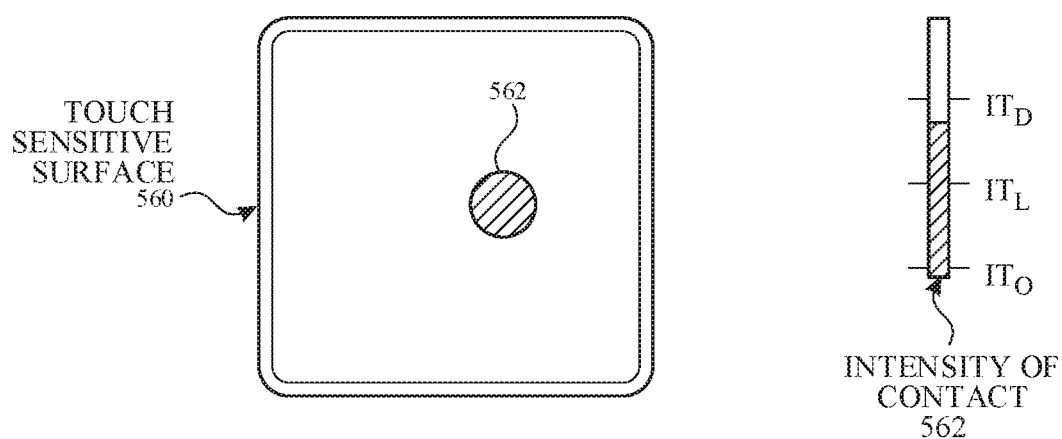
Figure 5H:
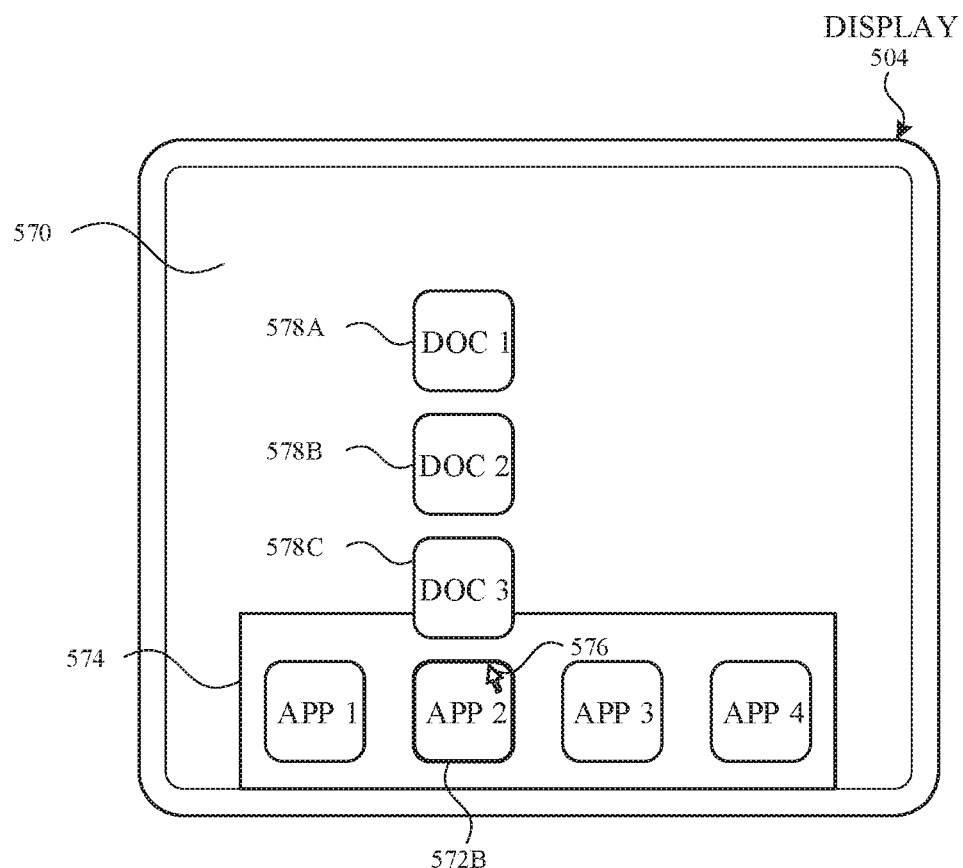
Figure 5H:
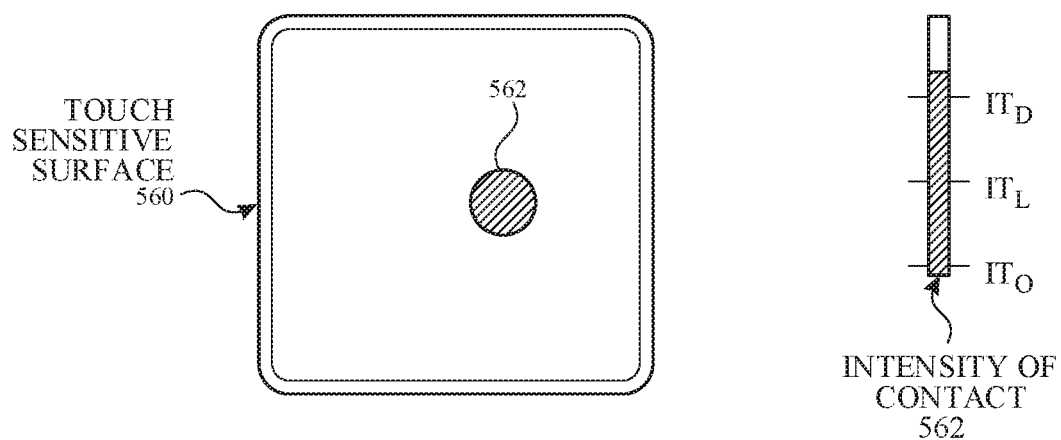

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5I:
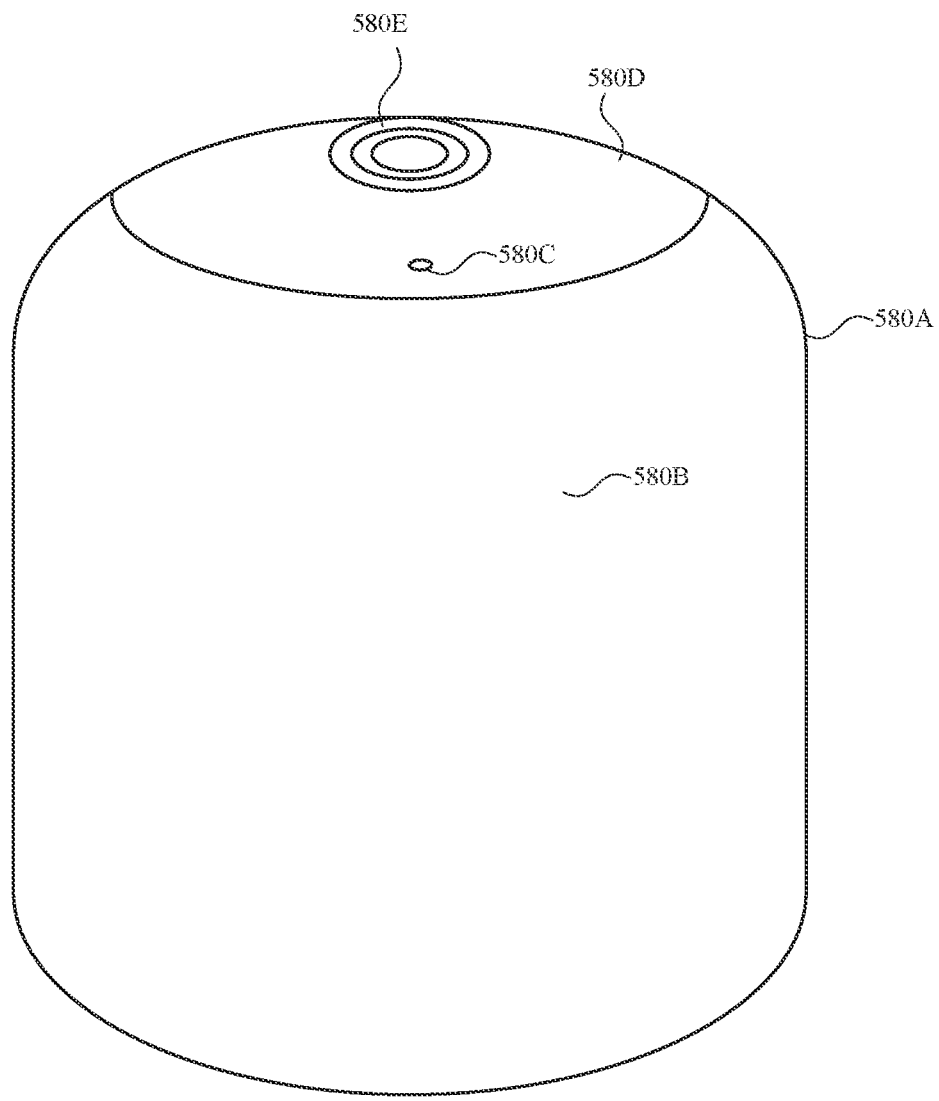
FIG. 5I illustrates an electronic device in accordance with some embodiments.

FIG. 5I illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5J:
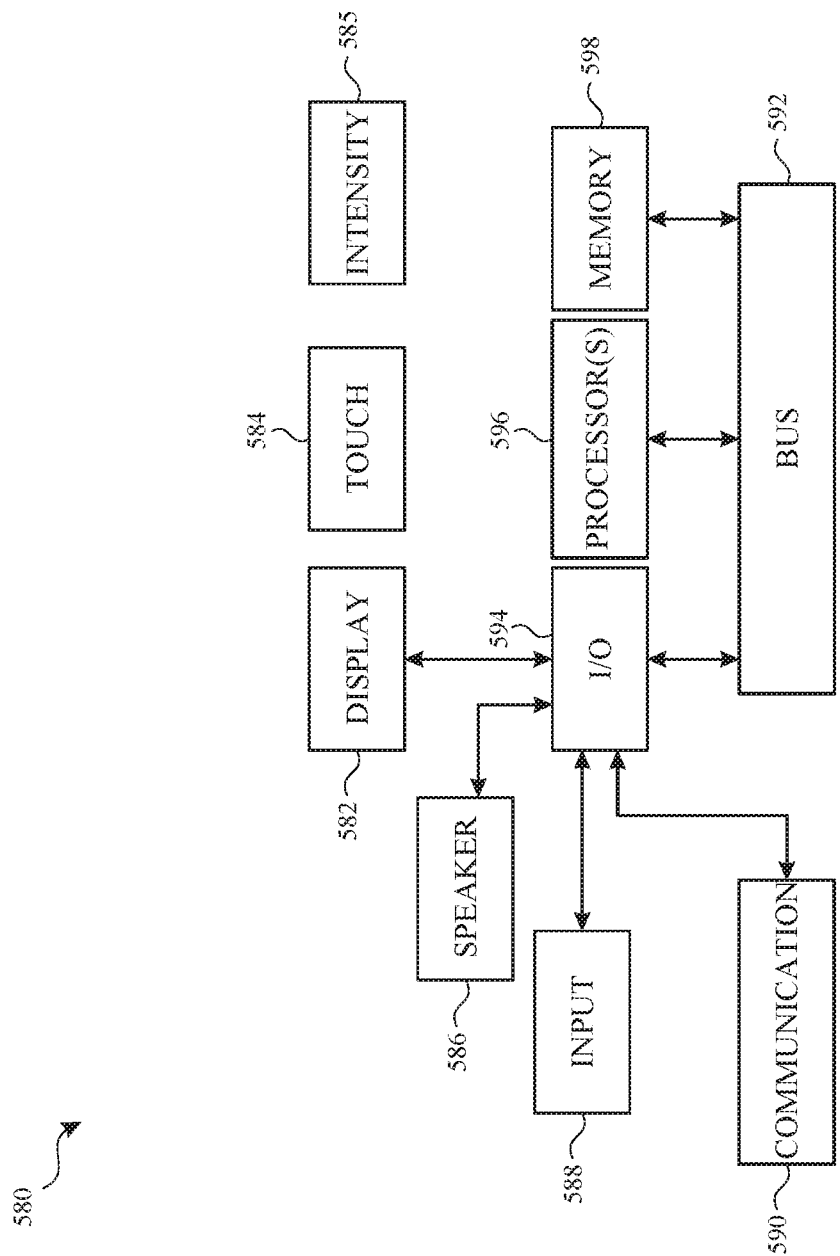
FIG. 5J is a block diagram illustrating an electronic device in accordance with some embodiments.

FIG. 5J depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in 1/0 section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including at least portions of methods 700, 800, and 1000 (FIGS. 7, 8, and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5J, but can include other or additional components in multiple configurations.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

Figure 6A:
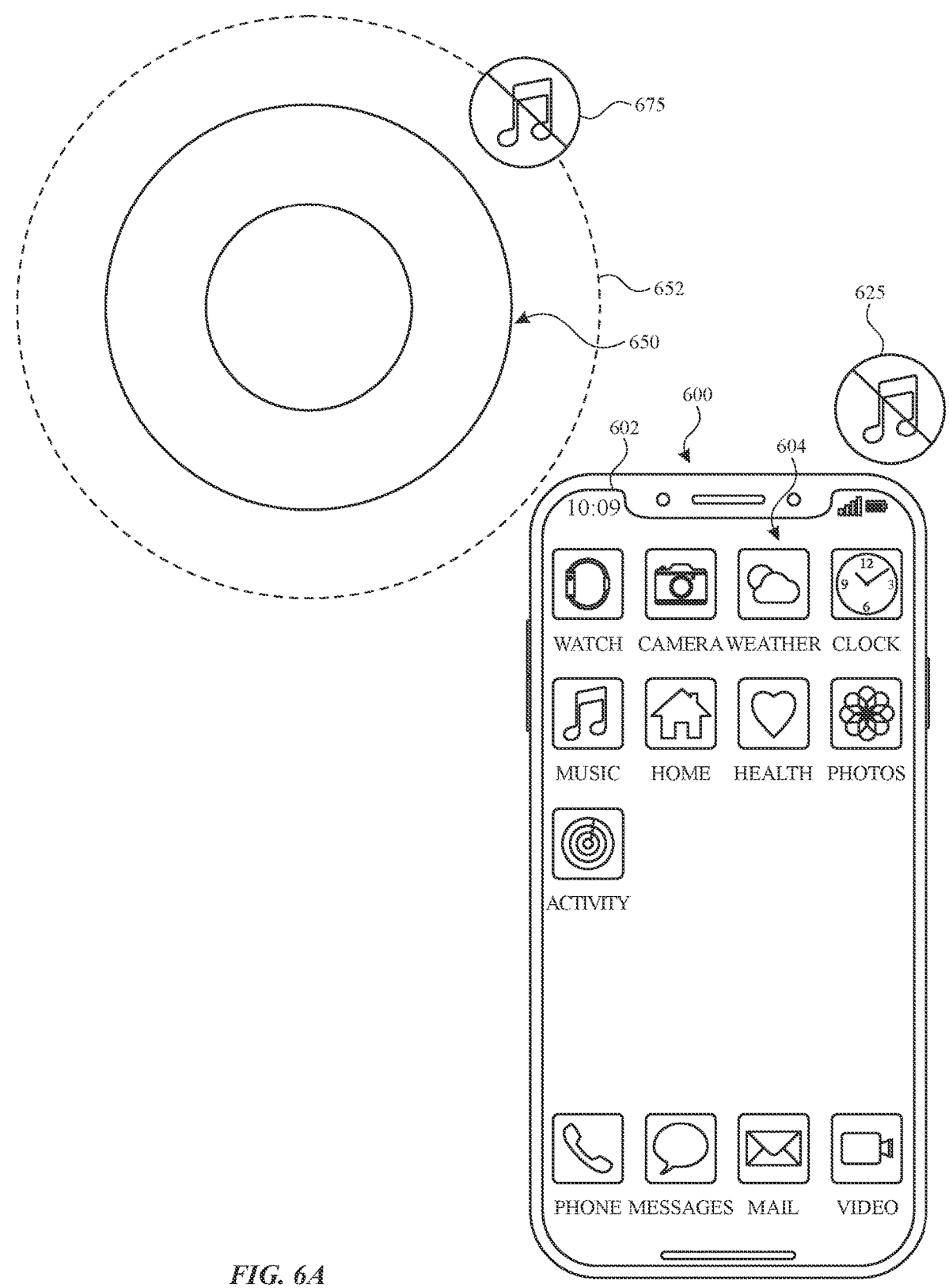
FIGS. 6A-6P illustrate exemplary user interfaces in accordance with some embodiments.
Figure 6B:
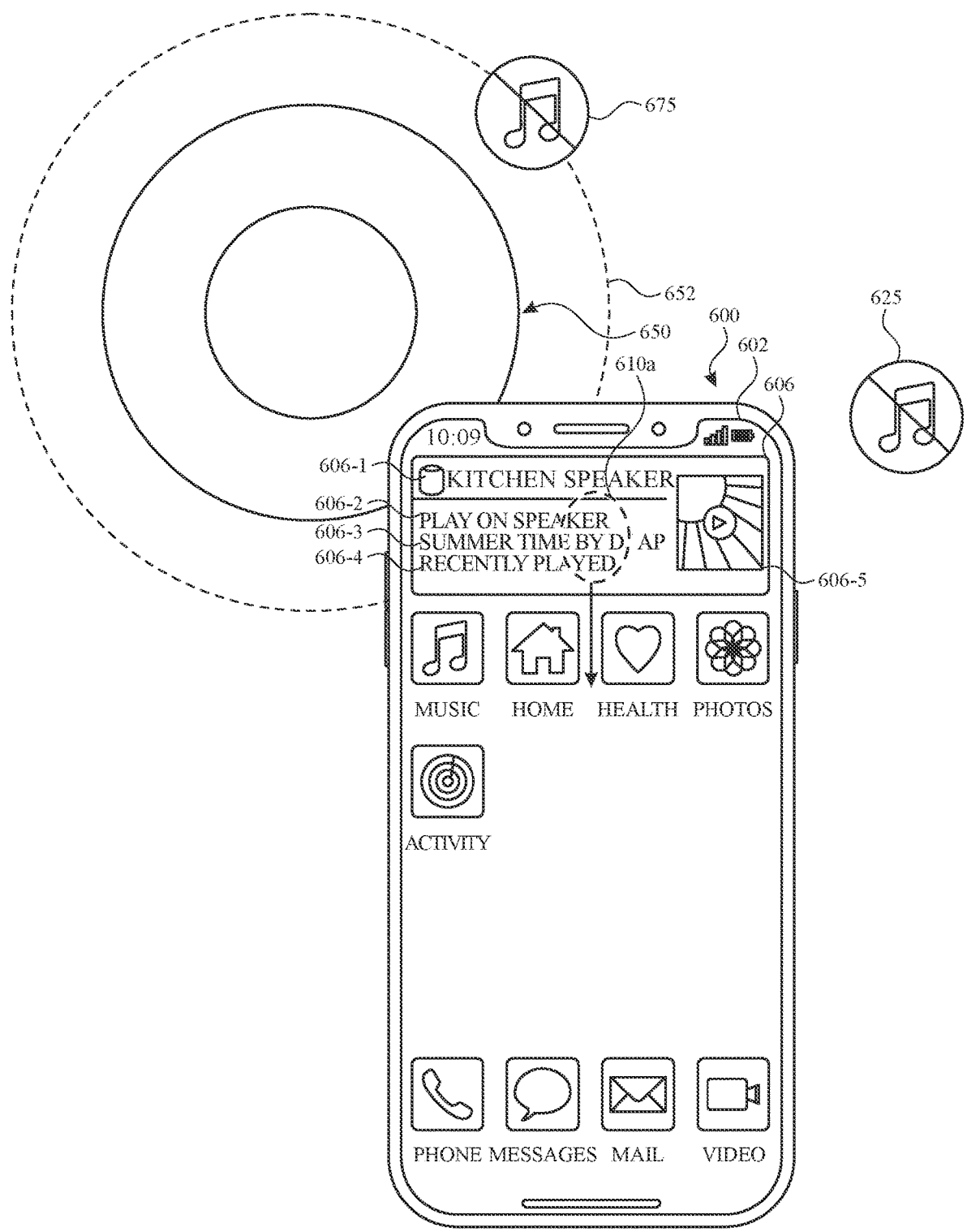
Figure 6C:
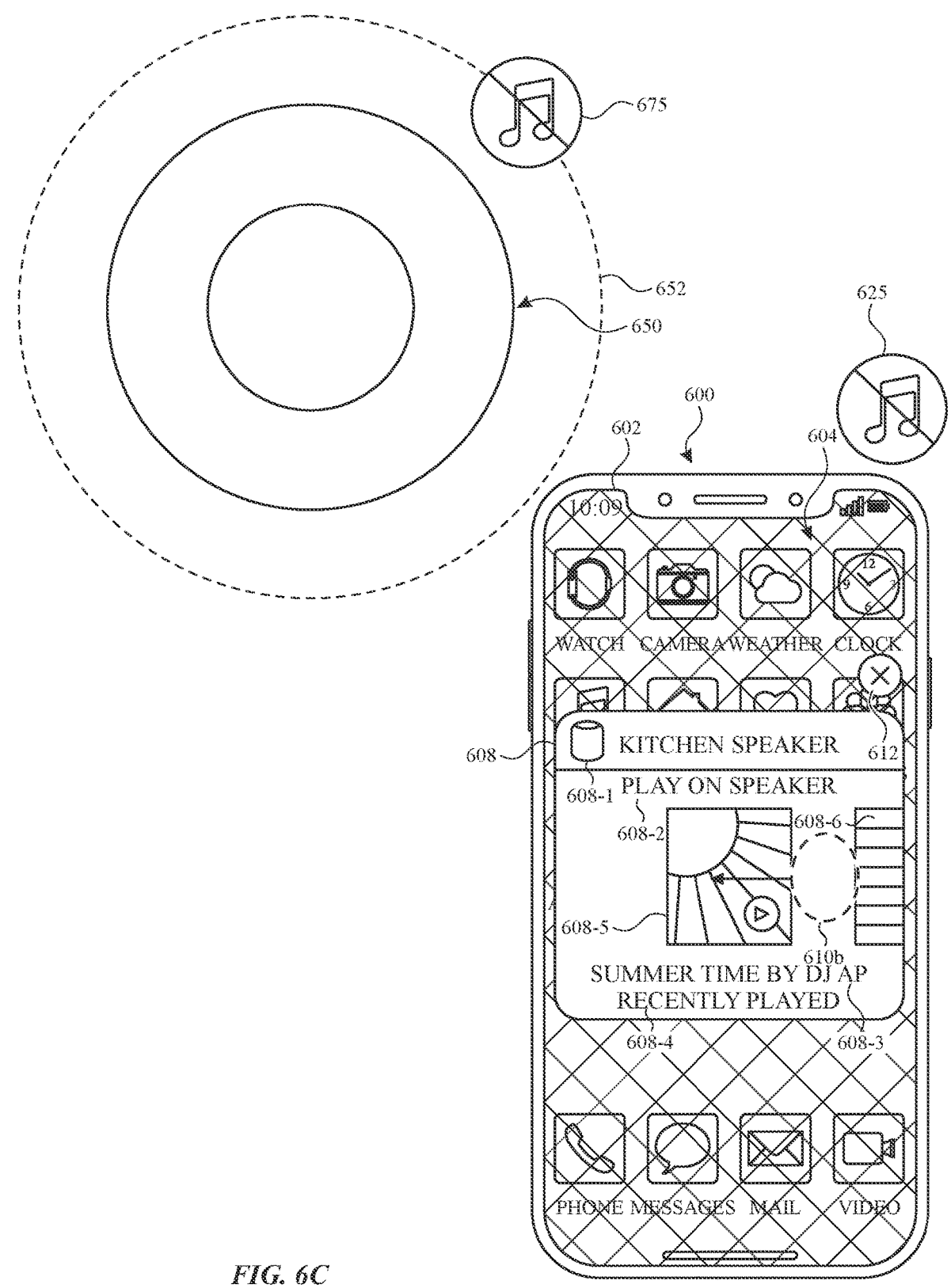
Figure 6D:
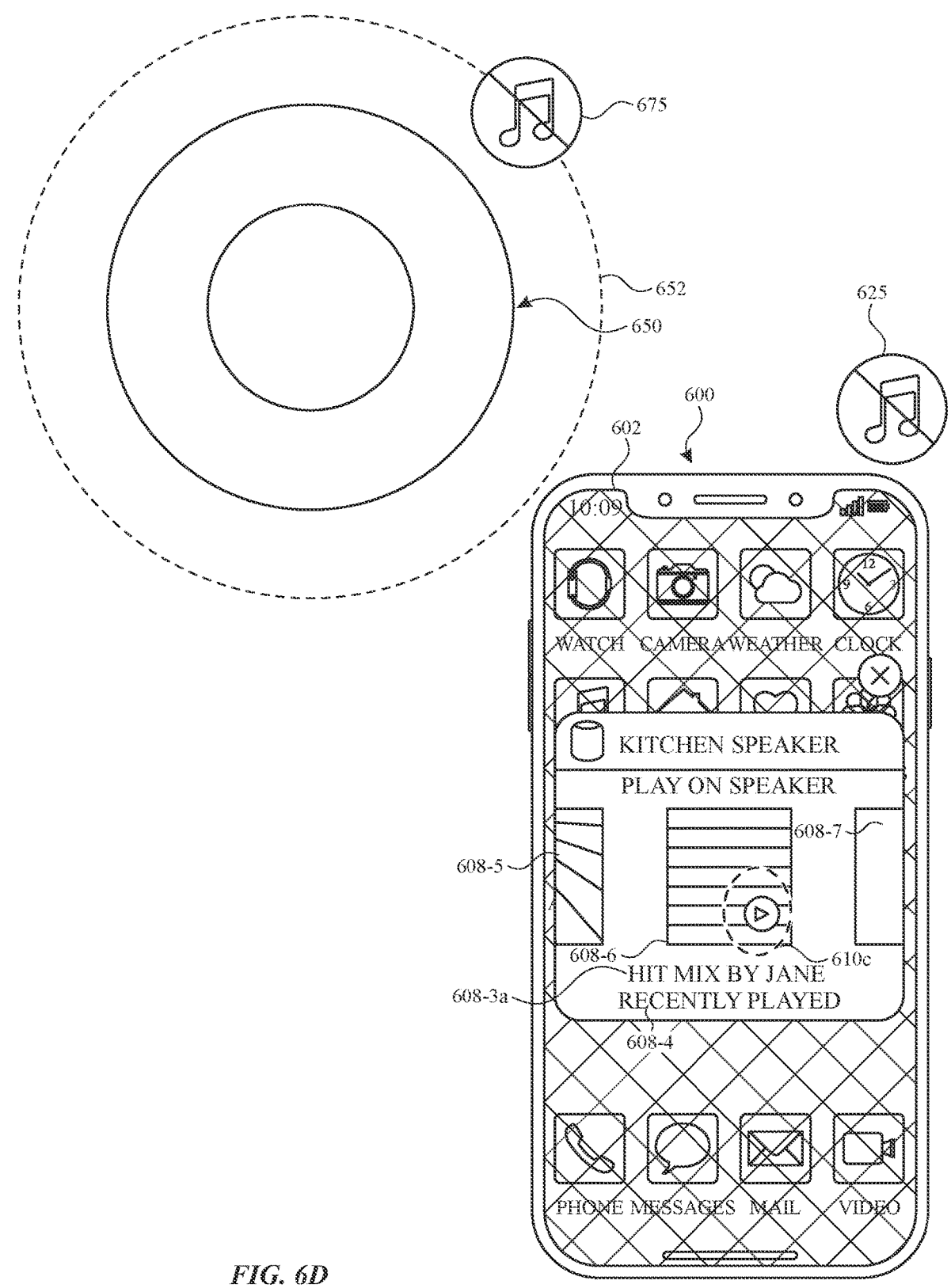
Figure 6E:
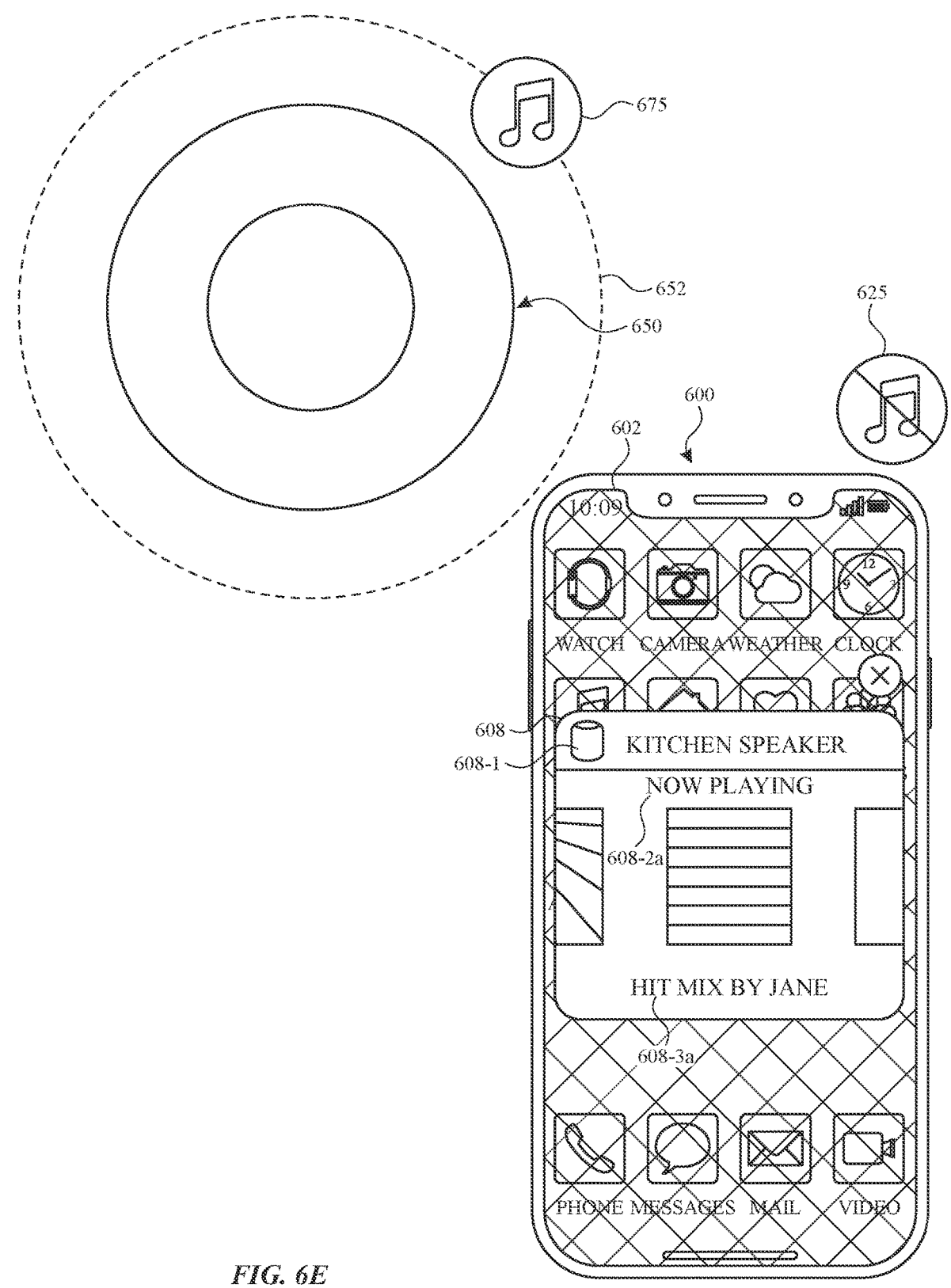
Figure 6F:
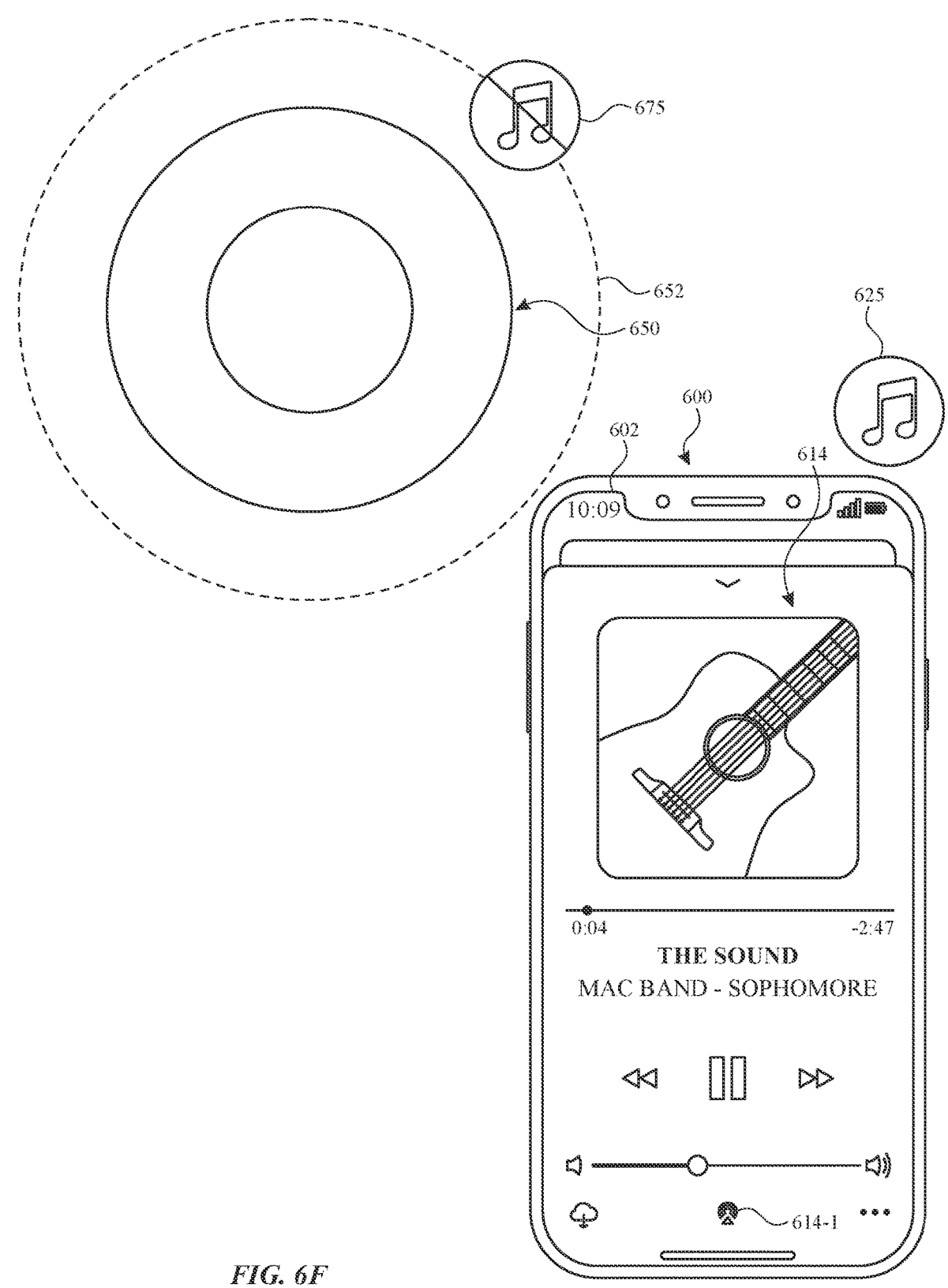
Figure 6G:
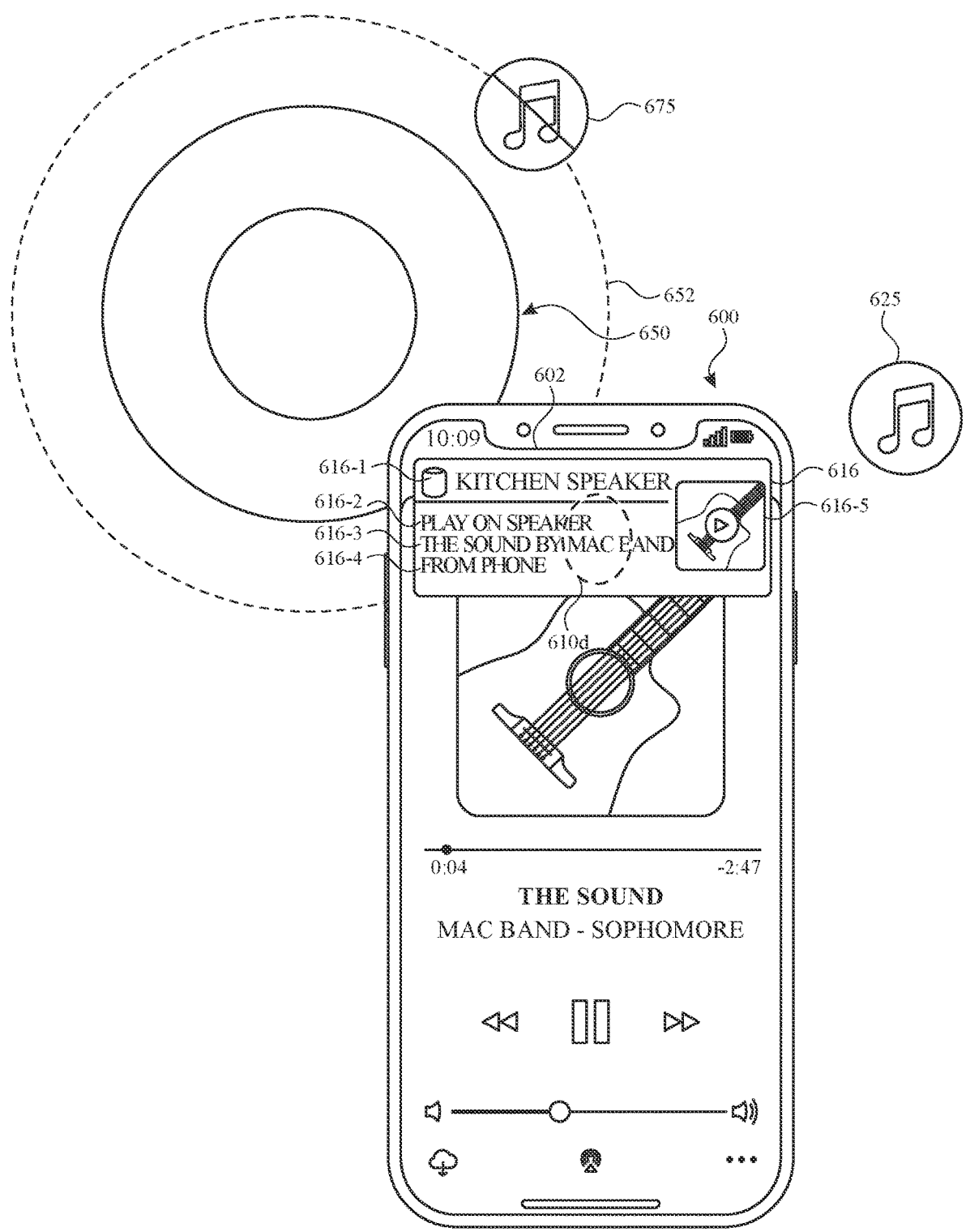
Figure 6H:
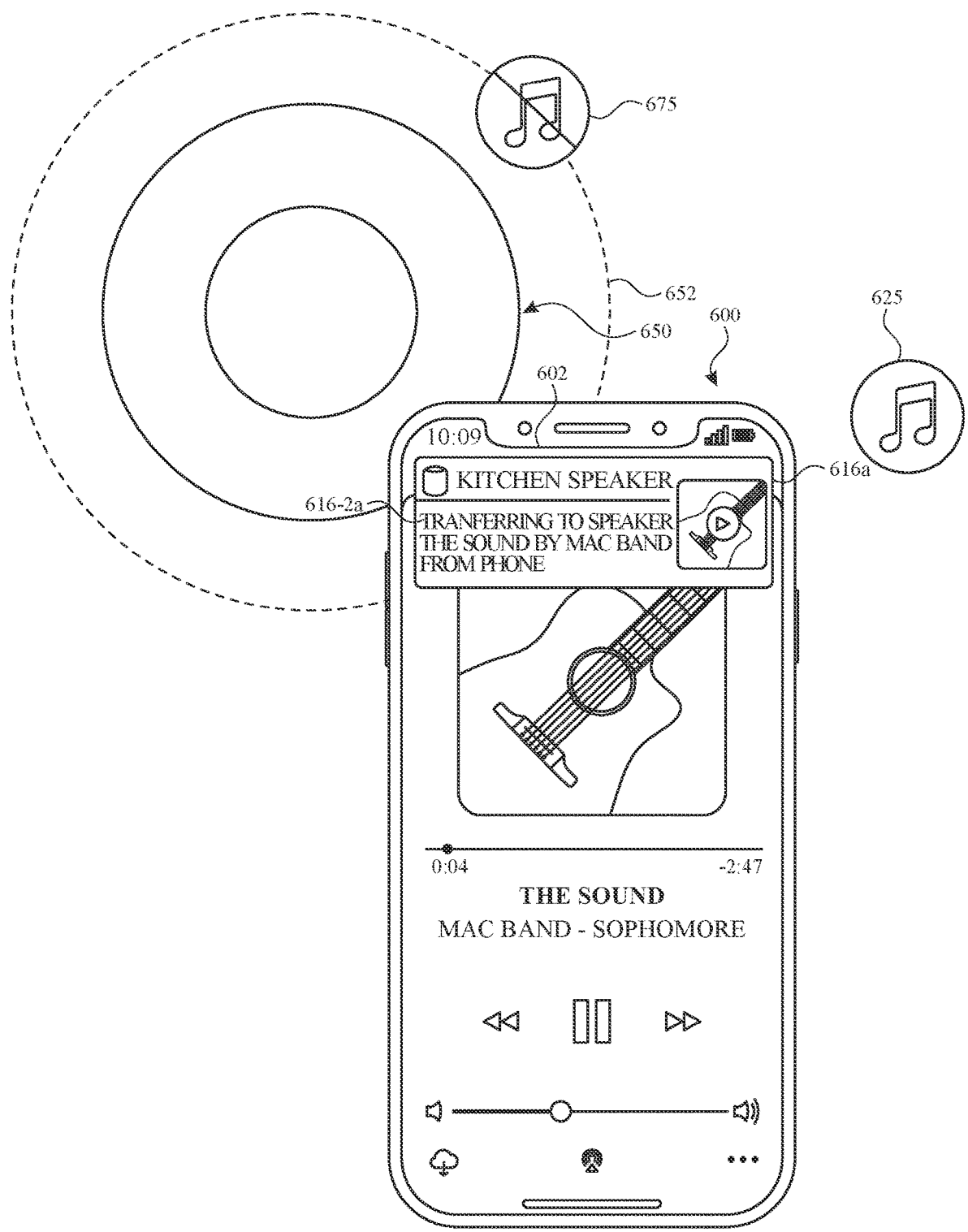
Figure 6I:
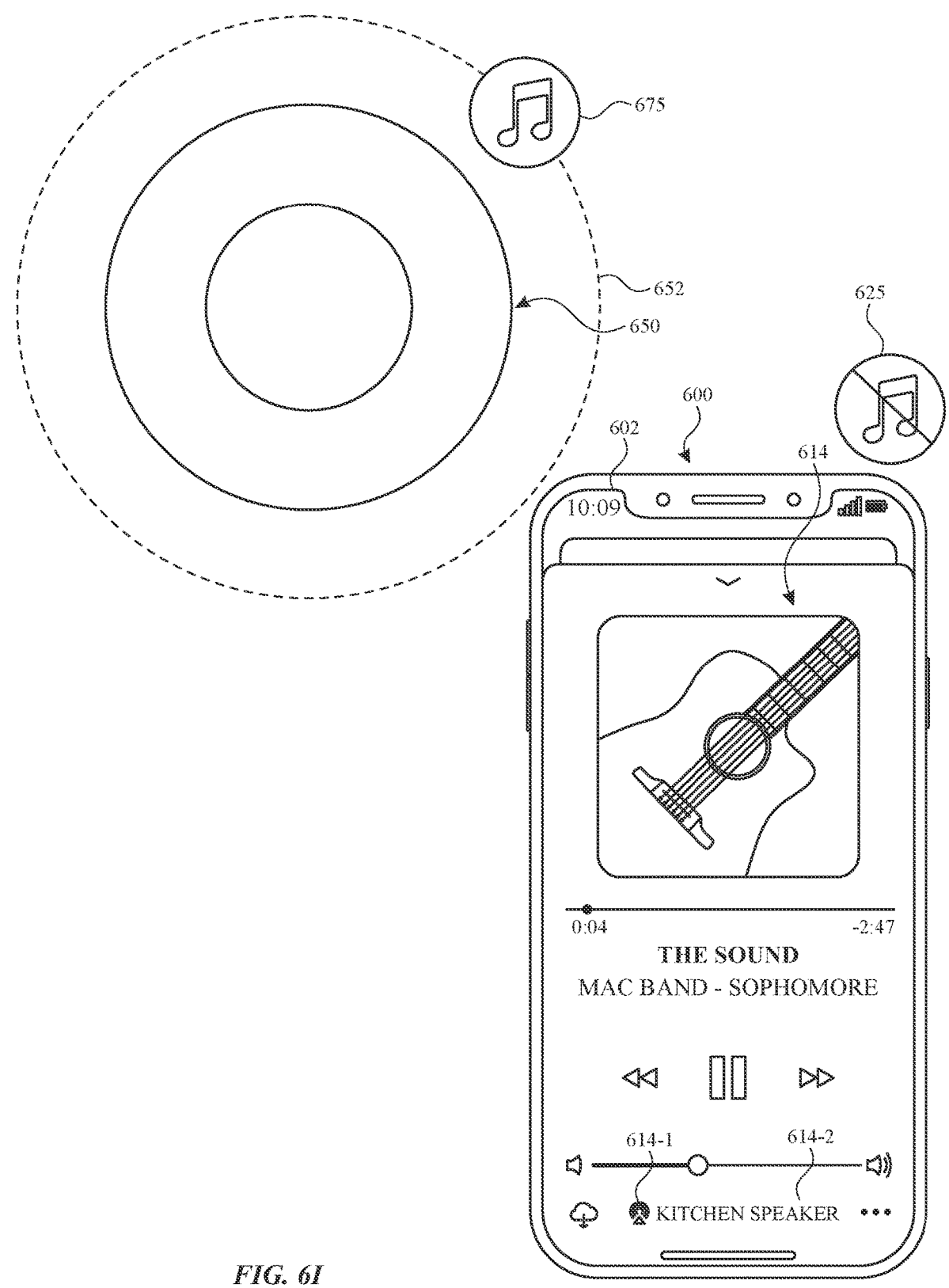
Figure 6J:
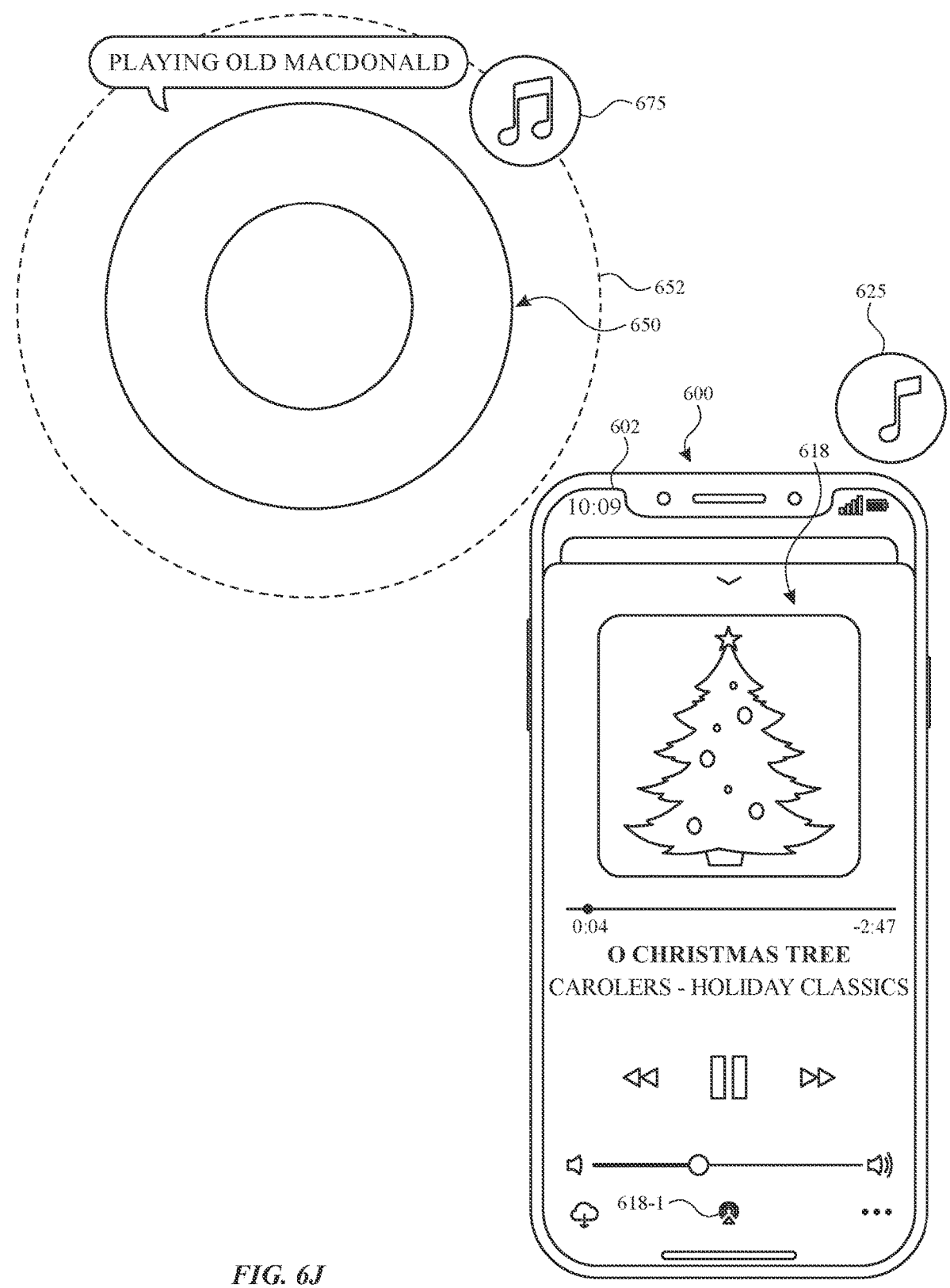
Figure 6K:
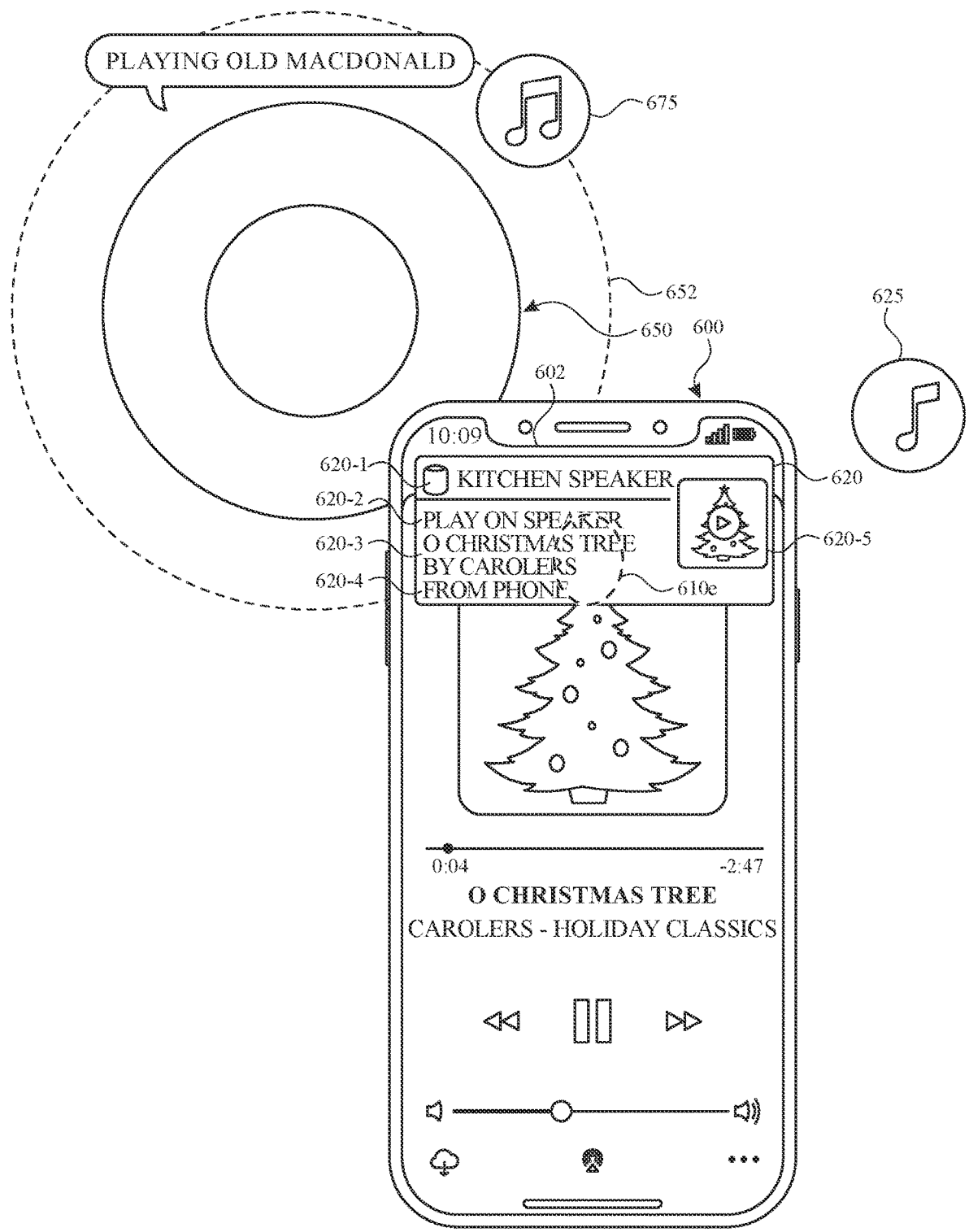
Figure 6L:
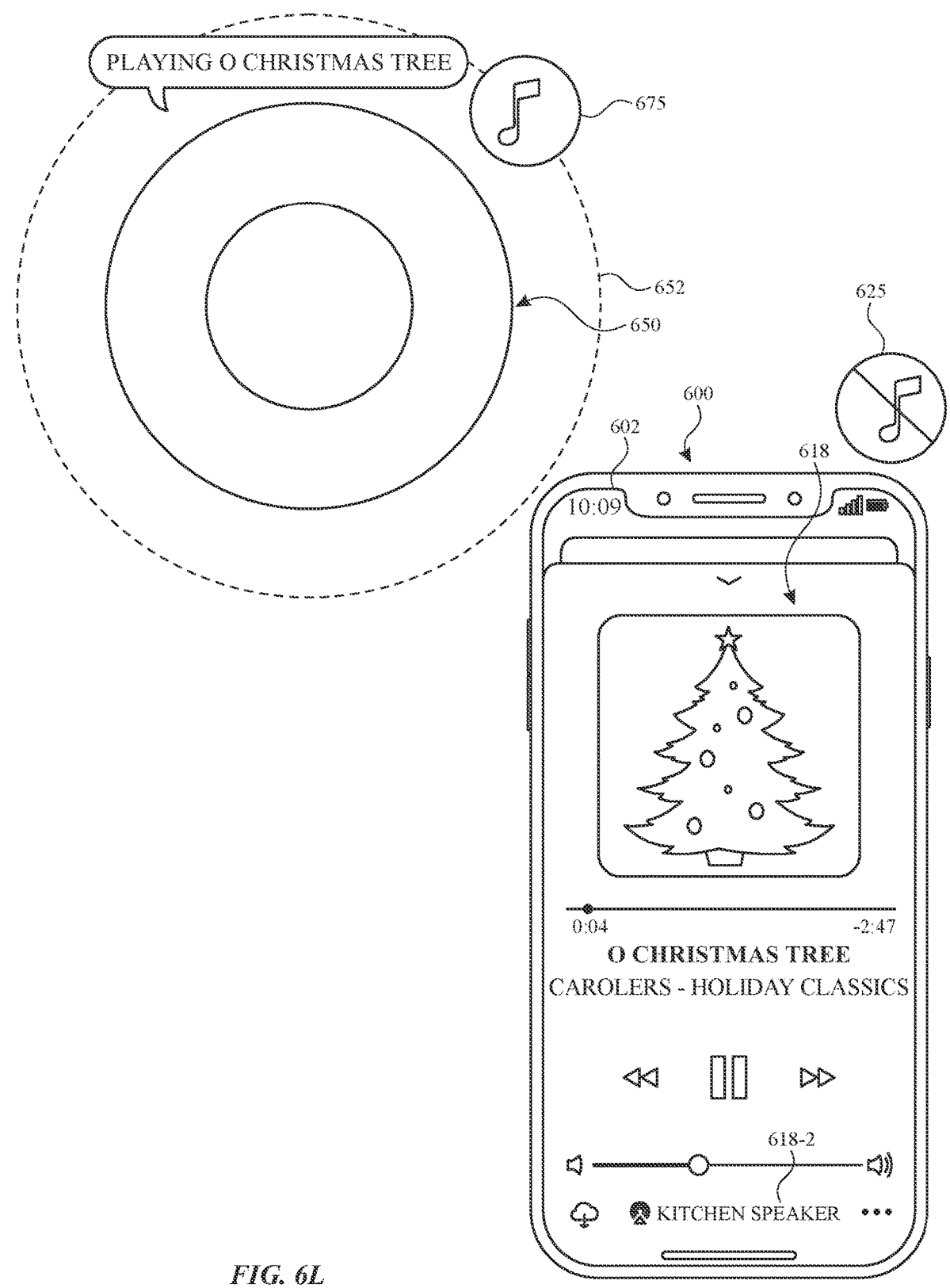
Figure 6M:
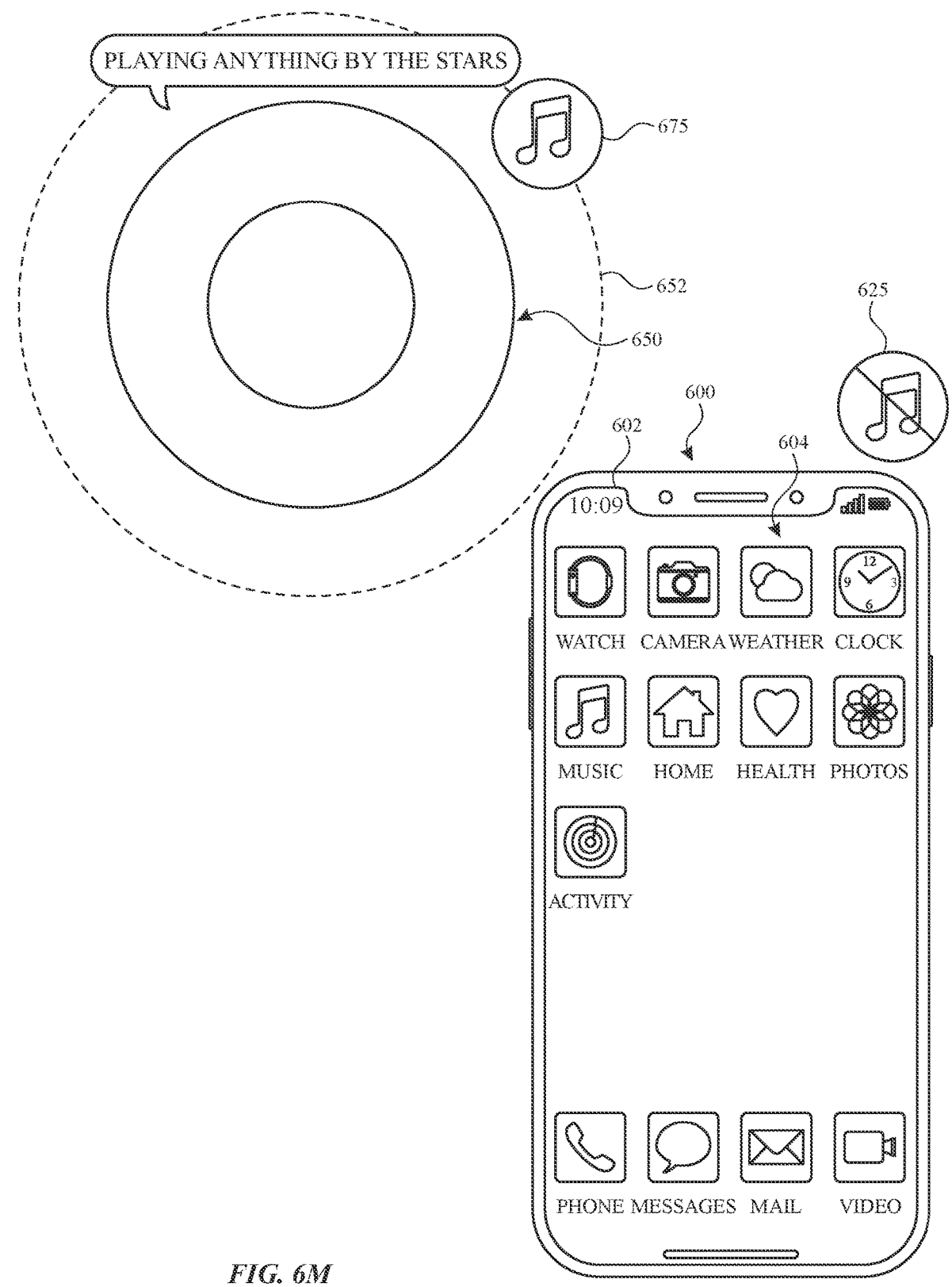
Figure 6N:
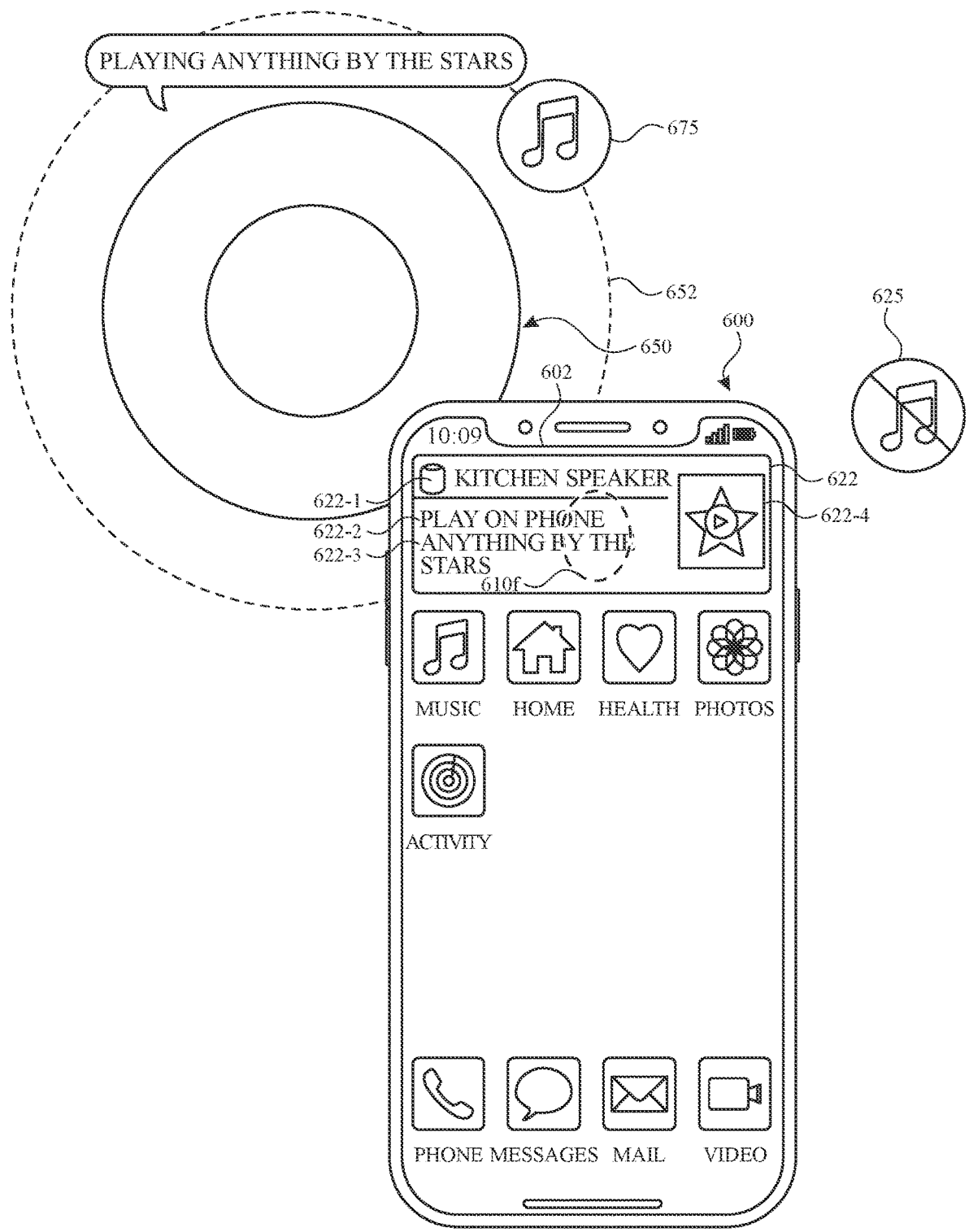
Figure 6O:
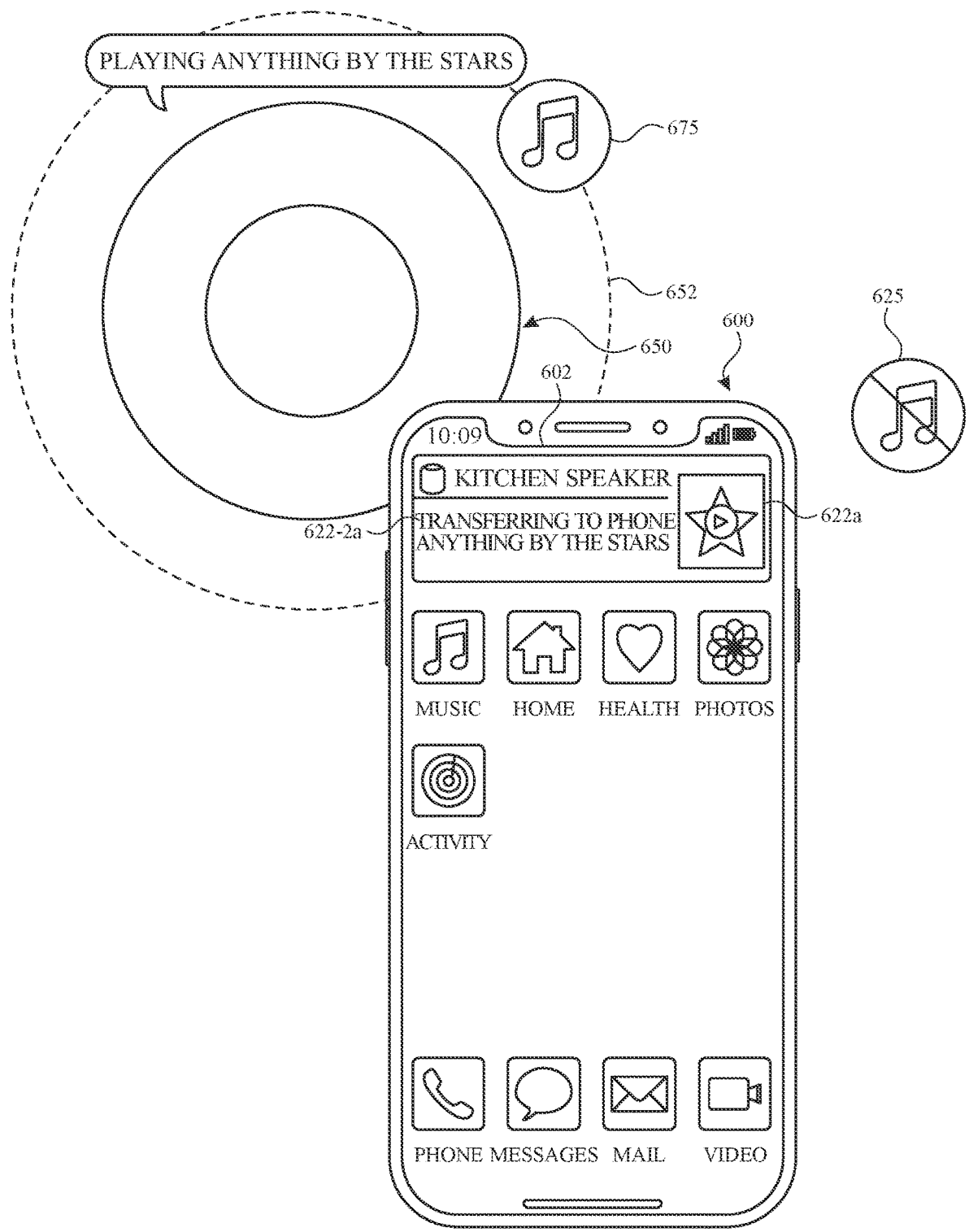
Figure 6P:
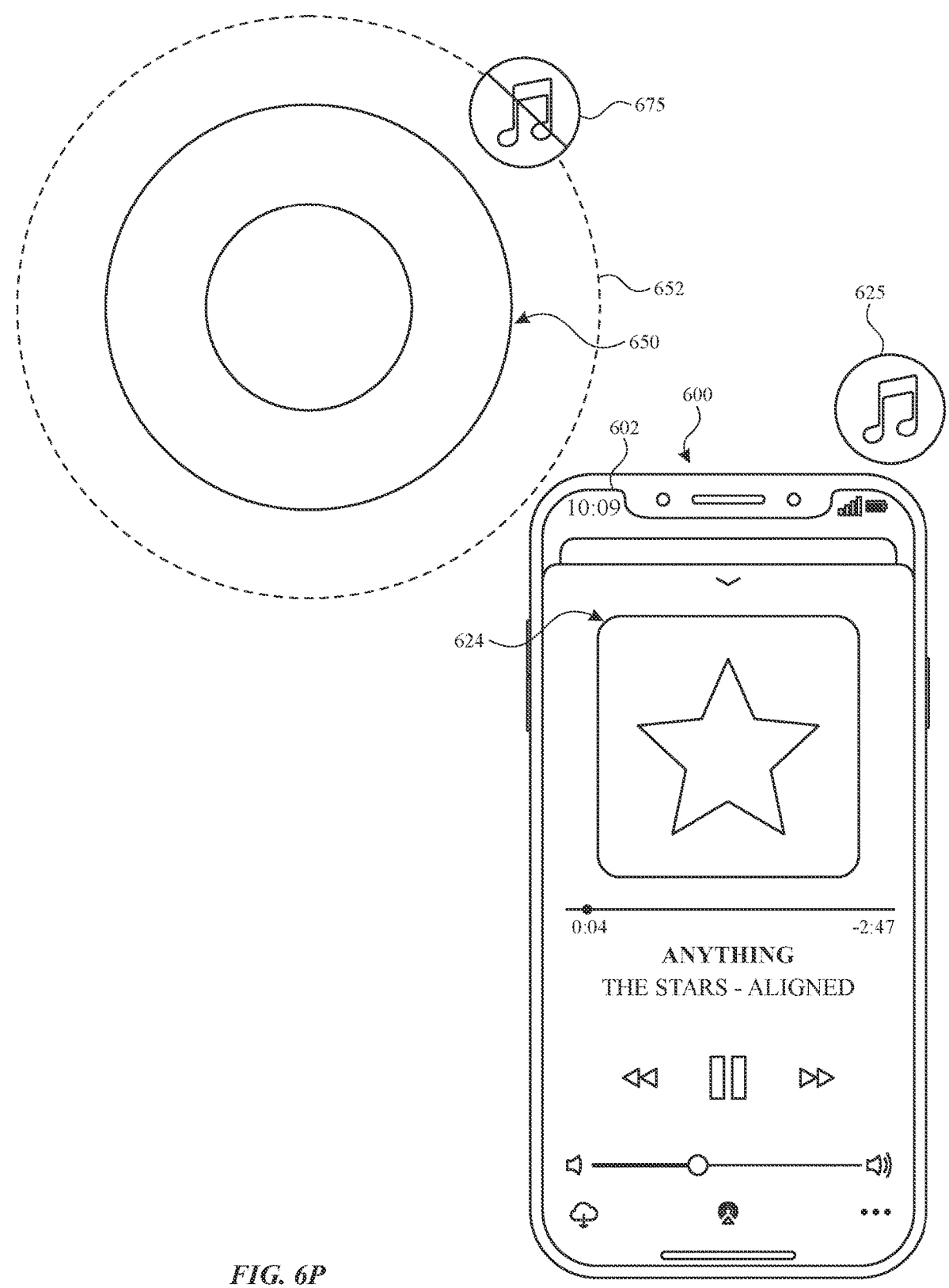

FIGS. 6A-6P illustrate exemplary user interfaces for controlling audio playback, in accordance with some embodiments. The user interfaces in these figures are used to illustrate the processes described below, including the methods in FIGS. 7-8.

Devices can use the satisfaction of a proximity condition to perform one or more functions. The use of proximity of one device to another device can be used as a clear indicator that a user (e.g., holding one of the devices) would like to perform some action (e.g., invoke an interface) on one or both of the devices. For example, this can prevent a waste of device resources by avoiding excessive user input (e.g., to navigate one or more menus on a device display) in order perform a function. Moreover, this can save the user time as well, for example, by reducing the number of user inputs required to perform a function (e.g., invoke an interface on a display).

FIG. 6A illustrates an exemplary electronic device 600 (e.g., a phone) and device 650 (e.g., a smart speaker). In some embodiments, device 600 includes one or more features of device 100, 300, or 500. Device 650 includes one or more features of device 580. In some embodiments, device 650 includes one or more features of device 100, 300, or 500. In the embodiment illustrated in FIG. 6A, device 650 is located in a kitchen and is designated as "Kitchen Speaker." Device 600 and device 650 are connected (e.g., via Bluetooth, near-field communication, a network connection) such that information about device 600 and device 650 can each obtain information about the other device. Such information can include information about audio currently playing or recently played on a device.

FIGS. 6A-6P illustrate exemplary physical arrangements of a device 600 and device 650. FIG. 6A illustrates a first scenario that includes device 650 and device 600 at a relatively long distance away from the device 650. FIG. 6A illustrates an exemplary overhead view of the first scenario. As shown in FIG. 6A, device 600 and device 650 are far apart. FIG. 6A shows proximity condition range indicator 652 around device 650. A proximity condition range indicator is also referred to herein as a "proximity zone indicator" or simply as a "proximity zone." Device 600 is not inside of proximity condition range indicator 652. The proximity condition range indicators are included in the figures to aid understanding, but are not displayed on either device 600 or device 650. Proximity condition range indicator 652 is included as a visual aid, and is intended to represent a physical proximity that would satisfy a proximity condition. For example, range indicator 652 can represent the range of a near-field communication detection circuitry of device 650. In some embodiments, any appropriate technique can be used to detect proximity between devices. For instance, in some examples, wide-band wireless connection is used. Wide-band wireless connection is used, for example, to determine one or more of: directionality, distance, and orientation, of one or more devices. Thus, presence of a detectable device within (e.g., partially or completely) proximity condition range indicator 652 would satisfy a proximity condition, but would not if the detectable device is located outside of the range indicator 652. One of skill would appreciate that a detection range of physical proximity can be non-uniform, can be affected by numerous variables (e.g., wireless interference, air humidity, or the like), and can include points in space in three dimensions, all of which are intended to be within the scope of this disclosure. Thus, the graphical representation of proximity condition range indicator 652 is not intended to limit the scope of determining whether a proximity condition is satisfied. Furthermore, the figures are not necessarily to scale and are included merely as a visual aid. Thus, unless otherwise noted, the size and scale of features depicted in the figures are not intended as a limitation on a distance required to be in close proximity or to satisfy a proximity condition.

FIG. 6A shows audio activity indicator 625, which indicates the audio activity of device 600, and audio activity indicator 675, which indicates the audio activity of device 650. Audio activity indicator 625 and audio activity indicator 675 indicate that device 600 and device 650 are both not currently outputting audio (e.g., are not playing back media) in the scenario illustrated in FIG. 6A, as indicated by the diagonal lines through the music notes in audio activity indicator 625 and audio activity indicator 675. The audio activity indicators are included in the figures to aid understanding, but are not displayed on either device 600 or device 650.

FIG. 6B illustrates a second scenario that includes device 600 at a short distance away from device 650. FIG. 6B illustrates an exemplary overhead view of the second scenario. As shown in 6B, device 600 and device 650 are close together and now device 600 is at least partially within the proximity condition range indicator 652. Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied).

In response to detecting the indication that the physical proximity satisfies the proximity condition, device 600 displays media information affordance 606, which represents a media item recently played on device 600. Exemplary media items include, but are not limited to, a music track, an audio book (or portion thereof, such as a chapter), a podcast, a video, and a phone call. In some embodiments, media information affordance 606 represents a media item recently played on device 600 in accordance with a determination that both device 600 and device 650 are not currently playing audio. In FIG. 6B, media information affordance 606 represents a music track (e.g., a song).

Media information affordance 606 includes several graphical elements that provide information about the media item, including: (1) external device indicator 606-1, which indicates the device with which device 600 is in proximity (e.g., device 650, also referred to as Kitchen Speaker); (2) action indicator 606-2, which indicates an action or function associated with media information affordance 606 (e.g., an action that is performed in response to selection of media information affordance 606); (3) media item indicator 606-3, which provides information identifying the media item (e.g., song title ("Summertime") and artist "DJ AP"); (4) media item status indicator 606-4, which describes a status of the media item (e.g., "Recently Played"); and (5) media item graphic 606-5, which includes an image associated with the media item (e.g., an album cover of the album on which the song is included).

As indicated by action indicator 606-2, selection of media information affordance 606 can cause the media item associated with media information affordance 606 to be played on device 650. In some embodiments, the action performed in response to selection of media information affordance 606 depends on the type of input. For example, in response to a tap gesture on media information affordance 606, playback of the media item on device 650 is initiated, whereas a downward swipe gesture starting on or near media information affordance 606 results in performance of a different operation.

In FIG. 6B, device 600 receives input 610a (e.g., a swipe) on media information affordance 606. In response to receiving input 610a, and in accordance with a determination that input 610a is a swipe (e.g., as opposed to a tap), device 600 displays media information affordance 608, as shown in FIG. 6C. In the embodiment illustrated in FIGS. 6B-6C, device 600 also ceases display of media information affordance 606 and partially obscures (e.g., greys out, blurs out) the portion of user interface 604 that is not occupied by media information affordance 608. Media information affordance 608 includes several graphical elements that provide information about the media item, including: (1) external device indicator 608-1, which indicates the device with which device 600 is in proximity (e.g., device 650, also referred to as Kitchen Speaker); (2) action indicator 608-2, which indicates an action or function associated with media information affordance 608 (e.g., an action that is performed in response to selection of media information affordance 608); (3) media item indicator 608-3, which provides information identifying the media item (e.g., song title ("Summertime") and artist "DJ AP"); (4) media item status indicator 608-4, which describes a status of the media item (e.g., "Recently Played"); and (5) media item graphic 608-5, which includes an image associated with the media item (e.g., an album cover of the album on which the song is included). In some embodiments, media information affordance 608 is different from media information affordance 606. In the embodiment illustrated in FIGS. 6B-6C, media information affordance 608 is larger than media information affordance 606 and is displayed at or near the middle of display 602, whereas media information affordance 606 is displayed at or near the top of display 602.

In response to an input corresponding to selection of the media item while media information affordance 608 is displayed (e.g., a tap on media item graphic 608-5 or a tap on media information affordance 608 while media item graphic 608-5 is entered on media information affordance 608), playback of the media item "Summertime by DJ AP" on device 650 is initiated.

In addition, media information affordance 608 includes a queue of media items that can be selected for playback on device 650. As shown in FIG. 6C, media information affordance 608 includes media item graphic 608-6, which corresponds to another media item other than the media item represented by media item graphic 608-5. In FIG. 6C, device 600 receives input 610b (e.g., a right-to-left swipe) on media information affordance 608. In response to receiving input 610b, device 600 scrolls media information affordance 608, as shown in FIG. 6D. Scrolling media information affordance 608 includes moving media item graphic 608-5 partially off the left edge of media information affordance 608, fully displaying media item graphic 608-6 in the middle of media information affordance 608, and partially displaying media item graphic 608-7, which was previously completely hidden (e.g., not displayed). As a result of scrolling, media item indicator 608-3 is replaced (or updated) with media item indicator 608-3a, which provides information identifying the media item corresponding to media item graphic 608-6 (e.g., playlist ("Hit Mix") and user "Jane"). In some embodiments, the media item corresponding to media item graphic 608-6 is the media item that was played immediately prior to the media item corresponding to media item graphic 608-5, and is considered recently played, as indicated by media item status indicator 608-4 in FIG. 6D. In some embodiments, the queue in media information affordance 608 includes media items that are scheduled to be played after the media item corresponding to media item graphic 608-5. In some such embodiments, the media item corresponding to media item graphic 608-6 represents a media item scheduled to be played after the media item corresponding to media item graphic 608-5, and, optionally, media item status indicator 608-4 is replaced or updated, e.g., with a media item status indicator such as "Up Next".

In FIG. 6D, device 600 receives input 610c (e.g., a tap) corresponding to selection of the media item corresponding to media item graphic 608-6. In response to receiving input 610c, device 600 transmits an instruction to device 650 to initiate playback of the media item corresponding to media item graphic 608-6 on device 650. FIG. 6E illustrates the status of device 600 and device 650 after initiating playback on device 650. In FIG. 6E, audio activity indicator 675 indicates that device 650 is currently playing audio, and audio activity indicator 625 indicates that device 600 still is not playing audio. Media information affordance 608 is updated to reflect the current state; updated action indicator 608-2a indicates that the media item "Hit Mix by Jane" is now playing on device 650, as indicated by external device indicator 608-1, which still identifies device 650 ("Kitchen Speaker").

FIG. 6F illustrates a scenario in which device 600 is not inside of proximity condition range indicator 652, device 600 is playing audio (as indicated by audio activity indicator 625), and device 650 is not playing audio (as indicated by audio activity indicator 675). In FIG. 6F, device 600 displays user interface 614 of a music application running on device 600, which indicates the media item currently being played on device 600. FIG. 6G illustrates that device 600 is moved at least partially inside of proximity condition range indicator 652 while device 600 is playing audio and device 650 is not playing audio (e.g., song "The Sound" by artist "Mac Band" from album "Sophomore"). Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied).

In response to detecting the indication that the physical proximity satisfies the proximity condition, device 600 displays media information affordance 616, which represents the media item currently playing on device 600. In some embodiments, media information affordance 616 represents the media item currently playing on device 600 in accordance with a determination that device 600 is currently playing a media item.

Media information affordance 616 includes several graphical elements that provide information about the media item currently playing on device 600, including: (1) external device indicator 616-1, which indicates the device with which device 600 is in proximity (e.g., device 650, also referred to as Kitchen Speaker); (2) action indicator 616-2, which indicates an action or function associated with media information affordance 616 (e.g., an action that is performed in response to selection of media information affordance 616); (3) media item indicator 616-3, which provides information identifying the media item (e.g., song title ("The Sound") and artist "Mac Band"); (4) media item status indicator 616-4, which describes a status of the media item (e.g., "From Phone"); and (5) media item graphic 616-5, which includes an image associated with the media item (e.g., an album cover of the album on which the song is included).

As indicated by action indicator 616-2, selection of media information affordance 616 can cause the media item associated with media information affordance 616 to be played on device 650. Furthermore, media item status indicator 616-4 indicates the source of the media item to be played back (e.g., "From Phone").

In some embodiments, media information affordance 616 corresponding to a currently playing media item is analogous to media information affordance 606 corresponding to a recently played media item. For example, the action performed in response to selection of media information affordance 616 depends on the type of input. In some embodiments, in response to a tap gesture on media information affordance 616, playback of the media item currently playing on device 600 is initiated on device 650, whereas a downward swipe gesture starting on or near media information affordance 616 causes device 600 to display a media information affordance analogous to media information affordance 608 described above, but with information for the media item currently playing on device 600 in FIG. 6G.

In FIG. 6G, device 600 receives input 610d (e.g., a tap) corresponding to selection of media information affordance 616. In response to receiving input 610d, device 600 transmits an instruction to device 650 to initiate playback of the media item currently playing on device 600. As shown in FIG. 6H, in response to receiving input 610d, device 600 displays updated media information affordance 616a (e.g., replaces media information affordance 616 with a new affordance or maintains display of media information affordance 616, but changes at least a portion of the information displayed therein). In FIG. 6H, media information affordance 616a includes updated action indicator 616-2a, which indicates that playback has been initiated (e.g., "Transferring to Speaker"). In some embodiments, device 600 displays a media information affordance analogous to media information affordance 616a in response to a tap on media information affordance 606 (FIG. 6B), except with information corresponding to recently played media item "Summertime by DJ AP" instead of currently playing media item "The Sound by Mac Band."

As shown in FIG. 6I, after displaying updated media information affordance 616a (e.g., in response to an indication that playback has successfully begun on device 650 or a predetermined amount of time after receiving input 610d or displaying media information affordance 616a), device 600 ceases displaying media information affordance 616a and updates user interface 614 with graphical element 614-2 to indicate that audio is being played back on device 650, "Kitchen Speaker" (as indicated by audio status indicator 675). Audio status indicator 625 indicates that device 600 ceases playing audio when playback begins on device 650 (e.g., in response to input 610d). In some embodiments, device 600 continues playing audio (e.g., "The Sound by Mac Band") during playback on device 650.

FIG. 6J illustrates a scenario in which device 600 is not inside of proximity condition range indicator 652, device 600 is playing audio (as indicated by audio activity indicator 625), and device 650 is playing audio different from the audio playing on device 600 (as indicated by audio activity indicator 675). In FIG. 6J, device 600 displays user interface 618 of a music application running on device 600, which indicates the media item currently being played on device 600. FIG. 6K illustrates that device 600 is moved at least partially inside of proximity condition range indicator 652 while both device 600 and device 650 are playing their respective audio media items. Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied).

In response to detecting the indication that the physical proximity satisfies the proximity condition, device 600 displays media information affordance 620, which represents the media item currently playing on device 600. In some embodiments, media information affordance 620 represents the media item currently playing on device 600 in accordance with a determination that device 600 is currently playing a media item (e.g., regardless of whether or not device 650 is playing audio). In some embodiments, media information affordance 620 represents the media item currently playing on device 600 in accordance with a determination that device 600 and device 650 are both currently playing audio.

Media information affordance 620 includes several graphical elements that provide information about the media item currently playing on device 600, including: (1) external device indicator 620-1, which indicates the device with which device 600 is in proximity (e.g., device 650, also referred to as Kitchen Speaker); (2) action indicator 620-2, which indicates an action or function associated with media information affordance 620 (e.g., an action that is performed in response to selection of media information affordance 620); (3) media item indicator 620-3, which provides information identifying the media item (e.g., song title ("O Christmas Tree") and artist "Carolers"); (4) media item status indicator 620-4, which describes a status of the media item (e.g., "From Phone"); and (5) media item graphic 620-5, which includes an image associated with the media item (e.g., an album cover of the album on which the song is included).

As indicated by action indicator 620-2, selection of media information affordance 620 can cause the media item associated with media information affordance 620 to be played on device 650. Furthermore, media item status indicator 620-4 indicates the source of the media item to be played back (e.g., "From Phone").

In some embodiments, media information affordance 620 is analogous to media information affordance 616. For example, the action performed in response to selection of media information affordance 620 depends on the type of input. In some embodiments, in response to a tap gesture on media information affordance 620, playback of the media item currently playing on device 600 is initiated on device 650, whereas a downward swipe gesture starting on or near media information affordance 620 causes device 600 to display a media information affordance analogous to media information affordance 608 described above, but with information for the media item currently playing on device 600 in FIG. 6K.

In FIG. 6K, device 600 receives input 610e (e.g., a tap) corresponding to selection of media information affordance 620. In response to receiving input 610e, device 600 transmits an instruction to device 650 to initiate playback of the media item currently playing on device 600. In some embodiments, in response to receiving input 610e, device 600 displays an updated media information affordance analogous to updated media information affordance 616a to indicate that the media item currently playing on device 600 is being transferred for playback on device 650.

As shown in FIG. 6L, after receiving input 610e (e.g., in response to receiving input 610e), device 600 ceases displaying media information affordance 620 and updates user interface 618 with graphical element 618-2 to indicate that audio is being played back on device 650, "Kitchen Speaker" (as indicated by audio status indicator 675). Audio status indicator 625 indicates that device 600 ceases playing audio when playback begins on device 650 (e.g., in response to input 610e). In some embodiments, device 600 continues playing audio (e.g., "O Christmas Tree") during playback on device 650.

FIG. 6M illustrates a scenario in which device 600 is not inside of proximity condition range indicator 652, device 600 is not playing audio (as indicated by audio activity indicator 625), and device 650 is playing audio ("Anything"

by The Stars, as indicated by audio activity indicator 675). In FIG. 6M, device 600 displays user interface 604 (e.g., a home screen with application icons). FIG. 6N illustrates that device 600 is moved at least partially inside of proximity condition range indicator 652 while both device 600 and device 650 are playing their respective audio media items. Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied).

In response to detecting the indication that the physical proximity satisfies the proximity condition, device 600 displays media information affordance 622, which represents the media item currently playing on device 650. In some embodiments, media information affordance 622 represents the media item currently playing on device 650 in accordance with a determination that device 650 is currently playing a media item and device 600 is not currently playing a media item. In some embodiments, media information affordance 620 represents the media item currently playing on device 650 in accordance with a determination that device 650 is currently playing a media item (e.g., regardless of whether or not device 600 is playing a media item).

Media information affordance 622 includes several graphical elements that provide information about the media item currently playing on device 650, including: (1) external device indicator 622-1, which indicates the device with which device 600 is in proximity (e.g., device 650, also referred to as Kitchen Speaker); (2) action indicator 622-2, which indicates an action or function associated with media information affordance 622 (e.g., an action that is performed in response to selection of media information affordance 622); (3) media item indicator 622-3, which provides information identifying the media item (e.g., song title ("Anything") and artist "The Stars"); and (4) media item graphic 622-4, which includes an image associated with the media item (e.g., an album cover of the album on which the song is included).

As indicated by action indicator 622-2, selection of media information affordance 622 can cause the media item associated with media information affordance 622 to be played on device 600 (e.g., transferred from device 650).

In some embodiments, the action performed in response to selection of media information affordance 622 depends on the type of input. For example, in response to a tap gesture on media information affordance 622, playback of the media item currently playing on device 650 is initiated on device 600, whereas a downward swipe gesture starting on or near media information affordance 622 causes device 600 to display a media information affordance analogous to media information affordance 608 described above, but with information for the media item currently playing on device 650 in FIG. 6N.

In FIG. 6N, device 600 receives input 610*f* (e.g., a tap) corresponding to selection of media information affordance 622. In response to receiving input 610*f*, device 600 initiates playback on device 600 of the media item currently playing on device 650. As shown in FIG. 6O, in response to receiving input 610*f*, device 600 displays updated media information affordance 622*a* (analogous to updated media information affordance 616*a*), with updated action indicator 622-2*a* to indicate that the media item currently playing on device 650 is being transferred for playback on device 600.

As shown in FIG. 6P, after displaying updated media information affordance 622*a* (e.g., in response to an indication that playback has successfully begun on device 600 or a predetermined amount of time after receiving input 610*f* or displaying media information affordance 622*a*), device 600 ceases displaying media information affordance 622*a* and displays user interface 624 to indicate that audio is being played back on device 600 (as indicated by audio status indicator 625). In some embodiments, user interface 624 corresponds to a music application that is launched in response to initiating playback on device 600, and allows a user to further control playback on device 600. Audio status indicator 675 indicates that device 650 ceases playing audio when playback begins on device 600 (e.g., in response to input 610*f*). In some embodiments, device 650 continues playing audio (e.g., "Anything" by The Stars) during playback on device 600.

FIG. 7 is a flow diagram illustrating a method for controlling audio playback using an electronic device in accordance with some embodiments. Method 700 is performed at a device (e.g., 100, 300, 500, or 600) with a display device (e.g., 602). Some operations in method 700 are, optionally, combined, the orders of some operations are, optionally, changed, and some operations are, optionally, omitted.

As described below, method 700 provides an intuitive way for controlling audio playback. The method reduces the cognitive burden on a user for controlling audio playback, thereby creating a more efficient human-machine interface. For battery-operated computing devices, enabling a user to control audio playback faster and more efficiently conserves power and increases the time between battery charges.

The electronic device detects (702), while connected to an external device (e.g., 650), an indication that a physical proximity between the electronic device and the external device satisfies a proximity condition (e.g., represented by 652). In some embodiments, the indication is provided in response to a determination that the physical proximity between the electronic device and the external device satisfies the proximity condition. In some embodiments, the proximity condition is satisfied if the distance between the electronic device is less than a threshold distance (e.g., 6 inches, 12 inches, 18 inches, 24 inches).

In response to detecting the indication that the physical proximity satisfies the proximity condition, the electronic device displays (704), via the display device, a first media information affordance (e.g., 606, 616, 620) representing a first media item (e.g., a music track, an audio book (or portion thereof, such as a chapter), a podcast, a video, a phone call; a media item that is currently playing on the electronic device, a most recent media item that was playing on the electronic device and has ended or has been stopped or paused, a media item that is scheduled to be played next on the electronic device, such as a first track in a playlist, when a user launches a media application or selects a playlist), the first media information affordance including a first set of information (e.g., 606-1 through 606-5) about the first media item. Displaying a first media information affordance representing a first media item in response to detecting the indication that the physical proximity satisfies the proximity condition automatically provides feedback by indicating for the user that the physical proximity satisfies the proximity condition, thus reducing the number of inputs needed to display the first media information affordance. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device receives (706) a first input (e.g., 610a, 610d, 610e) representing selection of the first media information affordance.

In response to (708) receiving the first input, in accordance with a determination that the first input is a first type of input (e.g., a tap gesture on a touch-sensitive display of the electronic device at a location corresponding to the first media information affordance), the electronic device transmits (710) an instruction to the external device to initiate playback of the first media item on the external device (e.g., FIG. 6H-6I).

In response to (708) receiving the first input, in accordance with a determination that the first input is a second type of input (e.g., a directional swipe gesture on the first media information affordance) different from the first type of input, the electronic device displays (712), via the display device, a second media information affordance (e.g., 608) representing the first media item, the second media information affordance different from the first media information affordance and including a second set of information about the first media item. Transmitting an instruction to the external device to initiate playback of the first media item on the external device or displaying a second media information affordance representing the first media item depending on the type of input selecting the first media affordance provides additional control options related to the first media affordance without cluttering the user interface with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device displays the second media information affordance without transmitting an instruction to the external device to initiate playback of the first media item on the external device. In some embodiments, the second set of information includes the first set of information, but is displayed differently. In some embodiments, the second media information affordance includes additional information (e.g., more details) about the first media item and/or a larger graphical representation of the first media item. In some embodiments, the second set of information includes a queue of media items, including media items that are subsequent to the first media item (e.g., media items scheduled to be played after the first media item) and/or prior to the first media item in the queue (e.g., media items that were played prior to the first media item or are positioned before the first media item in a list of media items, such as a playlist).

In some embodiments, the first media information affordance includes an indication (e.g., 606-1, 606-2) that identifies the external device. In some embodiments, the second media information affordance includes an indication that identifies the external device. In some embodiments, the first media information affordance includes an indication that selection of the first media information affordance will initiate playback of the first media item on the external device.

In some embodiments, in response to receiving the first input, and in accordance with the determination that the first input is the first type of input, the electronic device alters the visual appearance (e.g., 612-2a) of the first media information affordance to indicate that playback of the first media item on the external device has been initiated (see, e.g., FIG. 6H). In some embodiments, altering the visual appearance of the first media information affordance includes displaying text indicating that playback of the first media item on the external device has been initiated, while, optionally, maintaining display of at least some of the first set of information about the first media item. In some embodiments, altering the visual appearance of the first media information affordance includes replacing the indication that selection of the first media information affordance will initiate playback of the first media item on the external device with the indication (e.g., text) that playback of the first media item on the external device has been initiated.

In some embodiments, the first set of information about the first media item indicates (e.g., 606-5, 902-4) a type of media item corresponding to the first media item. Exemplary types of media items include, but are not limited to, a music track, an audio book, a podcast, a video, and a phone call. In some embodiments, the first set of information for a phone call media item includes an avatar of the participant of the call.

In some embodiments, as part of initiating playback of the first media item on the external device, in accordance with a determination that the first media item satisfies a data transmission condition (e.g., the first media item is a phone call; the first media item is provided by an application, service, or account available to the electronic device but not available to the external device), the electronic device transmits data for the first media item to the external device. In some embodiments, as part of initiating playback of the first media item on the external device, in accordance with a determination the first media item does not satisfy the data transmission condition (e.g., the first media item is provided by a particular application, service, or account to which the external device has access), the electronic device forgoes transmitting data for the first media item to the external device. Transmitting data for the first media item to the external device (or not) based on whether the first media item satisfies a data transmission condition avoids a user having to provide additional inputs to transmit the data. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a queue of media items including the first media item exists on the electronic device prior to initiating playback. In some such embodiments, initiating playback includes transferring the queue to the external device. In some embodiments, the first media item is accessible to both the electronic device and the external device via a common user account. In some embodiments, the external device obtains the first media item from the common user account (e.g., playback of the first item does not include streaming the first media item from the electronic device to the external device). In some embodiments, the external device obtains the queue from the common user account.

In some embodiments, after transmitting the instruction to the external device to initiate playback of the first media item on the external device, in response to a determination that a time condition is met (e.g., a threshold amount of time has passed since receiving the first input of the first type), the electronic device ceases displaying the first media information affordance representing the first media item (see, e.g., FIG. 6I).

In some embodiments, while displaying the first media information affordance representing the first media item and before receiving the first input, the electronic device detects an indication that the physical proximity between the electronic device and the external device satisfies a physical separation condition (e.g., represented by 656). In some embodiments, the indication is provided in response to a determination that the physical proximity between the electronic device and the external device satisfies the physical separation condition. In some embodiments, the physical separation condition is satisfied if the distance between the electronic device and the external device exceeds a predefined threshold distance. In some embodiments, the threshold distance associated with the physical separation condition is greater than a first threshold distance associated with the (first) proximity condition. For example, the physical separation condition is satisfied if the distance between the electronic device and the external device exceeds a third threshold distance (e.g., 20 feet), and the first proximity condition is satisfied if the distance between the electronic device and the external device is less than the first threshold distance (e.g., 1-2 feet), where the third threshold distance is greater than the first threshold distance. In some embodiments, while displaying the first media information affordance representing the first media item and before receiving the first input, in response to detecting the indication that the physical proximity satisfies the physical separation condition, the electronic device ceases displaying the first media information affordance representing the first media item (e.g., FIG. 11D). Ceasing displaying the first media information affordance representing the first media item in response to detecting the indication that the physical proximity satisfies the physical separation condition provides feedback to the user indicating that playback can no longer be initiated on the external device via selection of the first media information affordance. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first type of input includes a tap gesture (e.g., 610d) and the second type of input includes a swipe or drag gesture (e.g., 610a; a vertical upward or vertical downward swipe or drag gesture).

In some embodiments, while displaying the second media information affordance representing the first media item, the electronic device receives a second input (e.g., 610c) representing selection of the second media information affordance. In some embodiments, in response to receiving the second input representing selection of the second media information affordance, the electronic device transmits an instruction to the external device to initiate playback of a second media item on the external device. In some embodiments, the second media item is the first media item. In some embodiments, the second media information affordance represents a queue of media items including a representation of the first media item and a representation of at least one other media item. In some such embodiments, the electronic device scrolls the queue in response to input (e.g., a horizontal swipe or drag gesture). In some embodiments, in response to an input corresponding to selection of a media item in the queue, the electronic device transmits an instruction to the external device to initiate playback of the selected media item on the external device. Displaying the second media information affordance (e.g., with additional information about the first media item) and initiating playback of a second media item on the external device in response to selection of the second media information affordance provides improved feedback by giving the user additional information and/or control over playback on the external device. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, detecting the indication that the physical proximity between the electronic device and the external device satisfies a proximity condition occurs while the electronic device is causing playback of the first media item (e.g., FIG. 6G). In some embodiments, causing playback includes outputting the media item via one or more speakers of the electronic device, or causing output at one or more connected external speakers. In some embodiments, in response to receiving the first input, and in accordance with a determination that the first input is a first type of input, the electronic device ceases causing playback of the first media item at the electronic device (see, e.g., FIG. 6I). In some embodiments, the electronic device continues playing the first media item.

In some embodiments, the first media information affordance represents the first media item in accordance with a determination that the first media item is playing on the electronic device while detecting the indication that the physical proximity between the electronic device and the external device satisfies the proximity condition (e.g., FIG. 6G). In some embodiments, transmitting the instruction to the external device to initiate playback of the first media item on the external device is performed in accordance with a determination that the first media item is currently playing on the electronic device.

In some embodiments, as part of initiating playback of the first media item on the external device the electronic device ceases playing a third media item on the external device (see, e.g., FIG. 6L).

In some embodiments, in accordance with a determination that the electronic device is not playing a media item while detecting the indication that the physical proximity between the electronic device and the external device satisfies the proximity condition (e.g., FIG. 6B), the first media item is a media item played on the electronic device most recently before detecting the indication that the physical proximity between the electronic device and the external device satisfies the proximity condition. In some embodiments, the first media information affordance represents the media item most recently played on the electronic device in accordance with a determination that the external device is not playing a media item at the time of detecting the indication that the physical proximity between the electronic device and the external device satisfies the proximity condition.

Note that details of the processes described above with respect to method 700 (e.g., FIG. 7) are also applicable in an analogous manner to the methods described below. For example, method 800 and/or method 1000 optionally includes one or more of the characteristics of the various methods described above with reference to method 700. For example, operation 706 of method 700 can be performed to select the first media information affordance described in operation 1004 of method 1000, and operations 708, 710, and/or 712 can be performed as part of method 1000 in response to the selection. For brevity, these details are not repeated below.

FIG. 8 is a flow diagram illustrating a method for controlling audio playback using an electronic device in accordance with some embodiments. Method 800 is performed at a device (e.g., 100, 300, 500, or 600) with a display device (e.g., 602). Some operations in method 800 are, optionally, combined, the orders of some operations are, optionally, changed, and some operations are, optionally, omitted.

As described below, method 800 provides an intuitive way for controlling audio playback. The method reduces the cognitive burden on a user for controlling audio playback, thereby creating a more efficient human-machine interface. For battery-operated computing devices, enabling a user to control audio playback faster and more efficiently conserves power and increases the time between battery charges.

The electronic device detects (802), while connected to an external device (e.g., 650), an indication that a physical proximity between the electronic device and the external device satisfies a proximity condition (e.g., represented by 652). In some embodiments, the indication is provided in response to a determination that the physical proximity between the electronic device and the external device satisfies the proximity condition. In some embodiments, the proximity condition is satisfied if the distance between the electronic device is less than a threshold distance (e.g., 6 inches, 12 inches, 18 inches, 24 inches).

In response to detecting the indication that the physical proximity satisfies the proximity condition, the electronic device displays (804), via the display device, a first media information affordance (e.g., 622) representing a first media item (e.g., a music track, an audio book (or portion thereof, such as a chapter), a podcast, a video, a phone call) that is currently playing on the external device. In some embodiments, the first media information affordance represents the first media item in accordance with a determination that the first media item is currently playing on the external device and not currently playing on the electronic device.). In some embodiments, the first media information affordance includes a first set of information (e.g., 622-1 through 622-4) about the first media item. Displaying a first media information affordance representing a first media item in response to detecting the indication that the physical proximity satisfies the proximity condition automatically provides feedback by indicating for the user that the physical proximity satisfies the proximity condition, thus reducing the number of inputs needed to display the first media information affordance. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

The electronic device receives (806) a first input (e.g., 610f) representing selection of the first media information affordance.

In response to (808) receiving the first input, in accordance with a determination that the first input is a first type of input (e.g., a tap gesture on a touch-sensitive display of the electronic device at a location corresponding to the first media information affordance), the electronic device initiates (810) playback of the first media item on the electronic device.

In response to (808) receiving the first input, in accordance with a determination that the first input is a second type of input (e.g., a directional swipe gesture on the first media information affordance) different from the first type of input, the electronic device displays (812), via the display device, a second media information affordance (e.g., 608) representing the first media item, the second media information affordance different from the first media information affordance and including a second set of information about the first media item. Initiating playback of the first media item on the electronic device or displaying a second media information affordance representing the first media item depending on the type of input selecting the first media affordance provides additional control options related to the first media affordance without cluttering the user interface with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second set of information includes the first set of information, but is displayed differently. In some embodiments, the second media information affordance includes additional information (e.g., more details) about the first media item and/or a larger graphical representation of the first media item. In some embodiments, the second set of information includes a queue of media items, including media items that are subsequent to the first media item (e.g., media items scheduled to be played after the first media item) and/or prior to the first media item in the queue (e.g., media items that were played prior to the first media item or are positioned before the first media item in a list of media items, such as a playlist).

In some embodiments, the electronic device displays the first media information affordance representing the first media item that is currently playing on the external device in accordance with a determination that the electronic device is not playing an audio media item at the time of detecting the indication that the physical proximity between the electronic device and the external device satisfies the proximity condition (e.g., FIG. 6N).

In some embodiments, the first media information affordance includes an indication (e.g., 622-2) that identifies the electronic device. In some embodiments, the second media affordance includes an indication that identifies the electronic device. In some embodiments, the first media information affordance includes an indication that selection of the first media information affordance will initiate playback of the first media item on the electronic device.

In some embodiments, in response to receiving the first input, and in accordance with a determination that the first input is a first type of input, the electronic device alters the visual appearance of the first media information affordance (e.g., 622-2a) to indicate that playback of the first media item on the electronic device has been initiated. In some embodiments, altering the visual appearance of the first media information affordance includes displaying text indicating that playback of the first media item on the electronic device has been initiated, while, optionally, maintaining display of at least some of the first set of information about the first media item. In some embodiments, altering the visual appearance of the first media information affordance includes replacing the indication that selection of the first media information affordance will initiate playback of the first media item on the electronic device with the indication (e.g., text) that playback of the first media item on the electronic device has been initiated.

In some embodiments, the first media information affordance includes an indication (e.g., 622-1) that identifies the external device as a source of the first media item.

In some embodiments, the first set of information about the first media item indicates (e.g., 622-4, 902-4) a type of media item corresponding to the first media item. Exemplary types of media items include, but are not limited to, a music track, an audio book, a podcast, a video, and a phone call. In some embodiments, the first set of information for a phone call media item includes an avatar of the participant of the call.

In some embodiments, as part of initiating playback of the first media item on the electronic device, in accordance with a determination that the first media item satisfies a data transmission condition (e.g., the first media item is provided by an application or account available to the external device but not available to the electronic device), the electronic device receives data for the first media item from the external device. In some embodiments, a queue of media items including the first media item exists on the external device prior to initiating playback. In some such embodiments, initiating playback includes transferring the queue to the electronic device. In some embodiments, as part of initiating playback of the first media item on the electronic device, in accordance with a determination that the first media item does not satisfy the data transmission condition (e.g., the electronic device was transmitting data for the first media item to the external device; the first media item is a phone call; the first media item is provided by a particular application, service, or account to which the electronic device has access), the electronic device forgoes receiving data for the first media item from the external device. Receiving data for the first media item from the external device (or not) based on whether the first media item satisfies a data transmission condition avoids a user having to provide additional inputs to receive the data. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a queue of media items including the first media item exists on external device prior to initiating playback. In some such embodiments, initiating playback includes transferring the queue to the electronic device. In some embodiments, the first media item is accessible to both the electronic device and the external device via a common user account. In some embodiments, the electronic device obtains the first media item from the common user account (e.g., playback of the first item does not include streaming the first media item from the external device to the electronic device). In some embodiments, the electronic device obtains the queue from the common user account.

In some embodiments, after initiating playback of the first media item on the electronic device, in response to a determination that a time condition is met (e.g., a threshold amount of time has passed since receiving the first input of the first type), the electronic device ceases displaying the first media information affordance representing the first media item (see, e.g., FIG. 6P).

In some embodiments, after displaying the first media information affordance representing the first media item and before receiving the first input, the electronic device detects an indication that the physical proximity between the electronic device and the external device satisfies a physical separation condition (e.g., represented by 656). In some embodiments, the indication is provided in response to a determination that the physical proximity between the electronic device and the external device satisfies the physical separation condition. In some embodiments, the physical separation condition is satisfied if the distance between the electronic device and the external device exceeds a predefined threshold distance. In some embodiments, the threshold distance associated with the physical separation condition is greater than a first threshold distance associated with the (first) proximity condition. For example, the physical separation condition is satisfied if the distance between the electronic device and the external device exceeds a third threshold distance (e.g., 20 feet), and the first proximity condition is satisfied if the distance between the electronic device and the external device is less than the first threshold distance (e.g., 1-2 feet), where the third threshold distance is greater than the first threshold distance.). In some embodiments, after displaying the first media information affordance representing the first media item and before receiving the first input, in response to detecting the indication that the physical proximity satisfies the physical separation condition, the electronic device ceases displaying the first media information affordance representing the first media item (see, e.g., FIG. 11D). Ceasing displaying the first media information affordance representing the first media item in response to detecting the indication that the physical proximity satisfies the physical separation condition provides feedback to the user indicating that playback can no longer be initiated on the electronic device via selection of the first media information affordance. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first type of input includes a tap gesture (e.g., 610f) and the second type of input includes a swipe or drag gesture (e.g., 610a; a vertical upward or vertical downward swipe or drag gesture).

In some embodiments, while displaying the second media information affordance (e.g., 608) representing the first media item, the electronic device receives a second input (e.g., 610c) representing selection of the second media information affordance. In some embodiments, in response to receiving the second input representing selection of the second media information affordance, the electronic device initiates playback of a second media item on the electronic device. In some embodiments, the second media item is the first media item. In some embodiments, the second media information affordance represents a queue of media items including a representation of the first media item and a representation of at least one other media item. In some such embodiments, the electronic device scrolls the queue in response to input (e.g., a horizontal swipe or drag gesture). In some embodiments, in response to an input corresponding to selection of a media item in the queue, the electronic device initiates playback of the selected media item on the electronic device. Displaying the second media information affordance (e.g., with additional information about the first media item) and initiating playback of a second media item on the electronic device in response to selection of the second media information affordance provides improved feedback by giving the user additional information and/or control over playback on the external device. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the first input, and in accordance with a determination that the first input is a first type of input, the external device ceases playing the first media item (see, e.g., FIG. 6P). In some embodiments, the external device continues playing the first media item.

Note that details of the processes described above with respect to method 800 (e.g., FIG. 8 are also applicable in an analogous manner to the methods described below. For example, method 1000 optionally includes one or more of the characteristics of the various methods described above with reference to method 800. For example, operation 806 of method 800 can be performed to select the first media information affordance described in operation 1004 of method 1000, and operations 808, 810, and/or 812 can be performed as part of method 1000 in response to the selection. For brevity, these details are not repeated below.

FIGS. 9A-9D illustrate exemplary methods and user interfaces for controlling playback of media according to some embodiments. In some embodiments, the techniques described with reference to FIGS. 9A-9D allow a user to initiate playback of a media item on a different device with touch input.

Figure 9A:
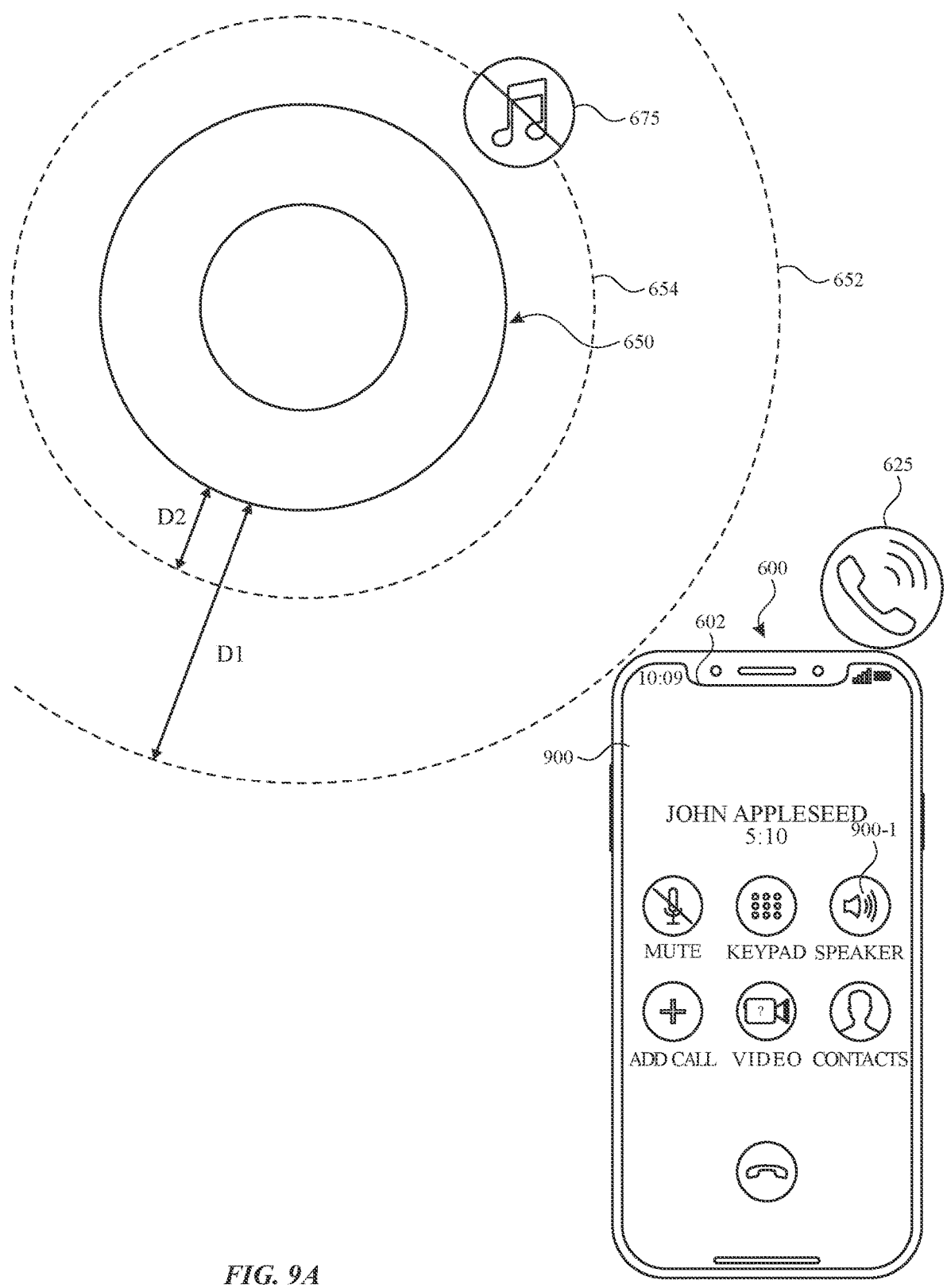
FIGS. 9A-9D illustrate exemplary user interfaces in accordance with some embodiments.
Figure 10:
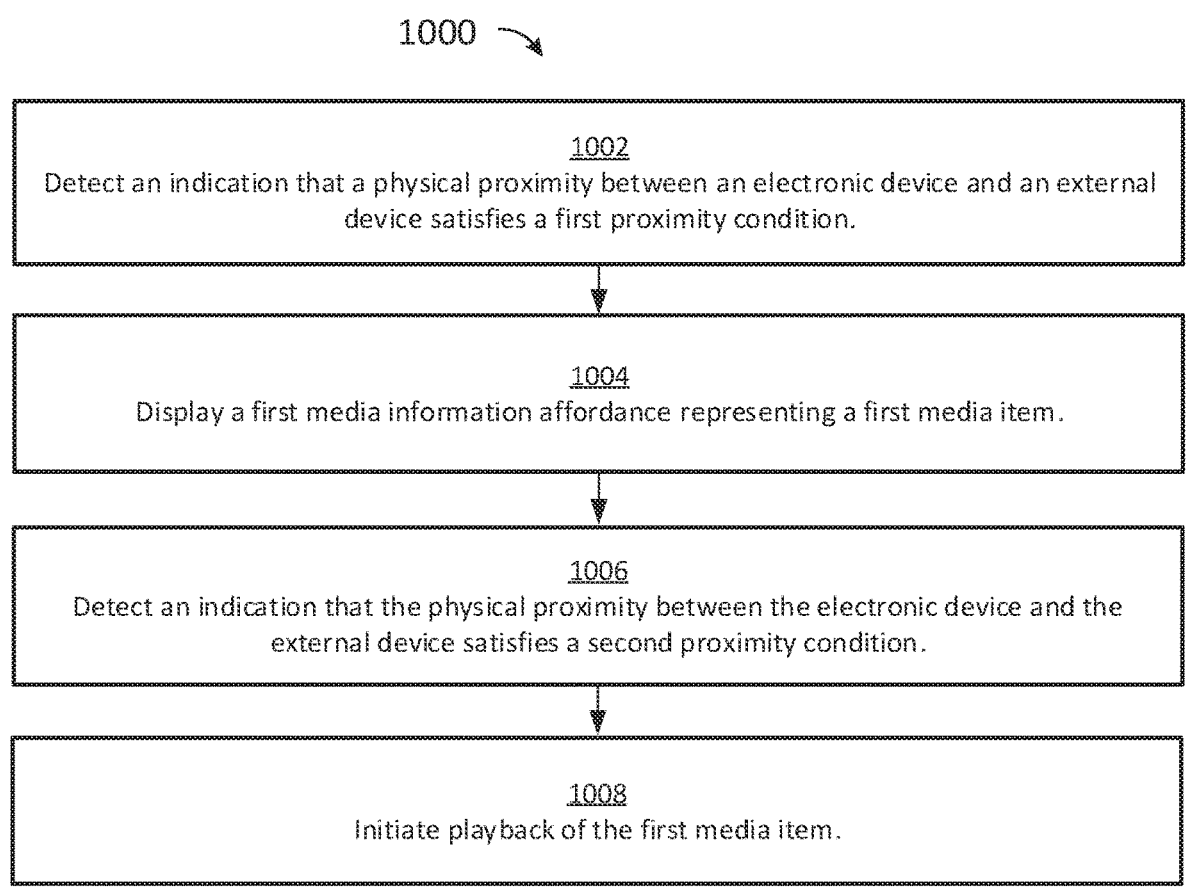
FIG. 10 illustrates an exemplary method in accordance with some embodiments.

FIG. 9A illustrates device 600, device 650, and proximity condition range indicator 652, described above with reference to FIGS. 6A-6P. Additionally, FIG. 9A illustrates playback proximity condition range indicator 654. As described in more detail below, playback of a media item can be initiated automatically (e.g., without selection of a media information affordance, such as 606, 608, 616, 620, and 622) by bringing device 600 within playback proximity condition range indicator 654.

Playback proximity condition range indicator 654 is included as a visual aid, and is intended to represent a physical proximity that would satisfy a playback proximity condition. Presence of a detectable device (e.g., 600) within (e.g., partially or completely) playback proximity condition range indicator 654 would satisfy a playback proximity condition, but would not if the detectable device is located outside of playback proximity condition range indicator 654. The graphical representation of playback proximity condition range indicator 654 is not intended to limit the scope of determining whether a playback proximity condition is satisfied. Furthermore, the figures are not necessarily to scale and are included merely as a visual aid. Thus, unless otherwise noted, the size and scale of features depicted in the figures are not intended as a limitation on a distance required to be in close proximity or to satisfy a playback proximity condition. However, as indicated by the arrows d1 and d2 in FIG. 9A, playback proximity condition range indicator 654 is inside of proximity condition range indicator 652 (e.g., d1 is greater than d2), such that device 600 must be closer to device 650 to satisfy the playback proximity condition associated with playback proximity condition range indicator 654 than to satisfy the proximity condition associated with proximity condition range indicator 652.

FIG. 9A illustrates a scenario in which device 600 is not inside of proximity condition range indicator 652, device 600 has an active phone call (as indicated by phone user interface 900 and audio activity indicator 625), and device 650 is not playing audio (as indicated by audio activity indicator 675). In FIG. 9A, device 600 is both providing audio output for the phone call (as indicated by audio status indicator 900-1) and receiving audio input for the phone call. Although FIGS. 9A-9D are described with reference to a phone call media item, the techniques described can be applied to other types of media items (e.g., a video call, music track, audio book, podcast). Similarly, the techniques described above with reference to FIGS. 6A-6P can be applied to a phone call.

Figure 9B:
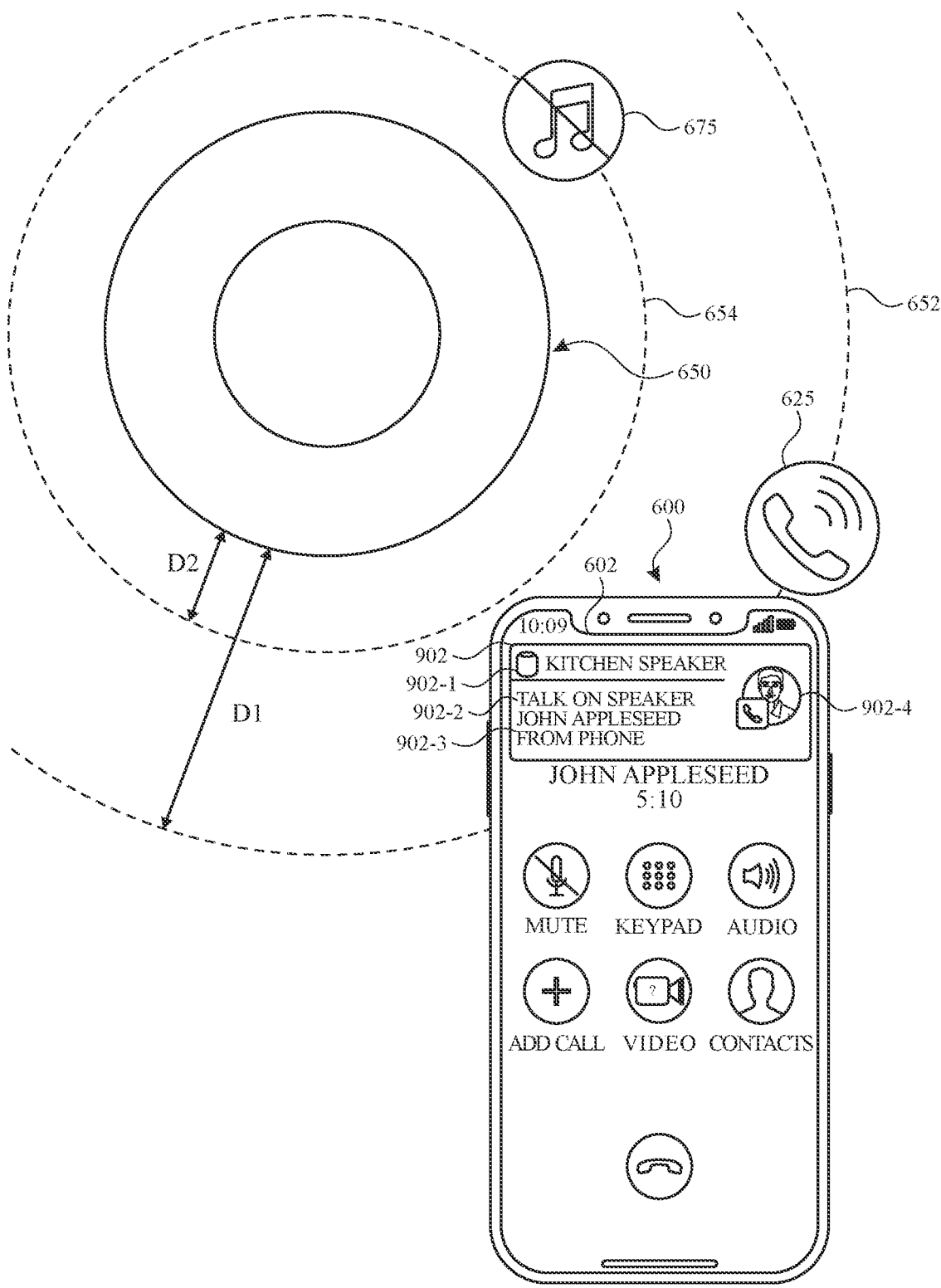

FIG. 9B illustrates that device 600 is moved at least partially inside of proximity condition range indicator 652 during the phone call on device 600. Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied).

In response to detecting the indication that the physical proximity satisfies the proximity condition, device 600 displays media information affordance 902, which represents the media item currently playing on device 600 (e.g., the phone call associated with user interface 900). Media information affordance 902 is analogous to media information affordances 606, 608, 616, 620, and 622 as applied to a phone call media item.

Media information affordance 902 includes several graphical elements that provide information about the phone call in FIG. 9B, including: (1) external device indicator 902-1, which indicates the device with which device 600 is in proximity (e.g., device 650, also referred to as Kitchen Speaker); (2) action indicator 902-2, which indicates an action or function associated with media information affordance 902 (e.g., an action that is performed in response to selection of media information affordance 902); (3) media item indicator 902-3, which provides information identifying the media item (e.g., call participant ("John Appleseed") and current call source "Phone"); and (4) media item graphic 902-4, which includes an image associated with the media item. In the embodiment illustrated in FIG. 9B, media item graphic 902-4 includes a representation (e.g., an avatar) of a call participant on the other end of the call and an icon or thumbnail representing a phone. In some embodiments, the representation of the call participant in media item graphic 902-4 includes the participant's initials or name.

FIG. 9B illustrates that device 600 is moved at least partially inside of playback proximity condition range indicator 654 while media information affordance 902 is displayed on device 600 and while the phone call on device 600 is in process. Since playback proximity condition range indicator 654 represents a physical proximity that satisfies the playback proximity condition, device 600 detects an indication that a physical proximity between the device 600 and device 650 satisfies the playback proximity condition (e.g., and, in response, initiates communication with device 650, for example, to send an indication that the playback proximity condition is satisfied). In some examples, device 650 detects an indication that the playback proximity condition is satisfied (e.g., and, in response, initiates communication with device 600, for example, to send an indication that the playback proximity condition is satisfied).

Figure 9C:
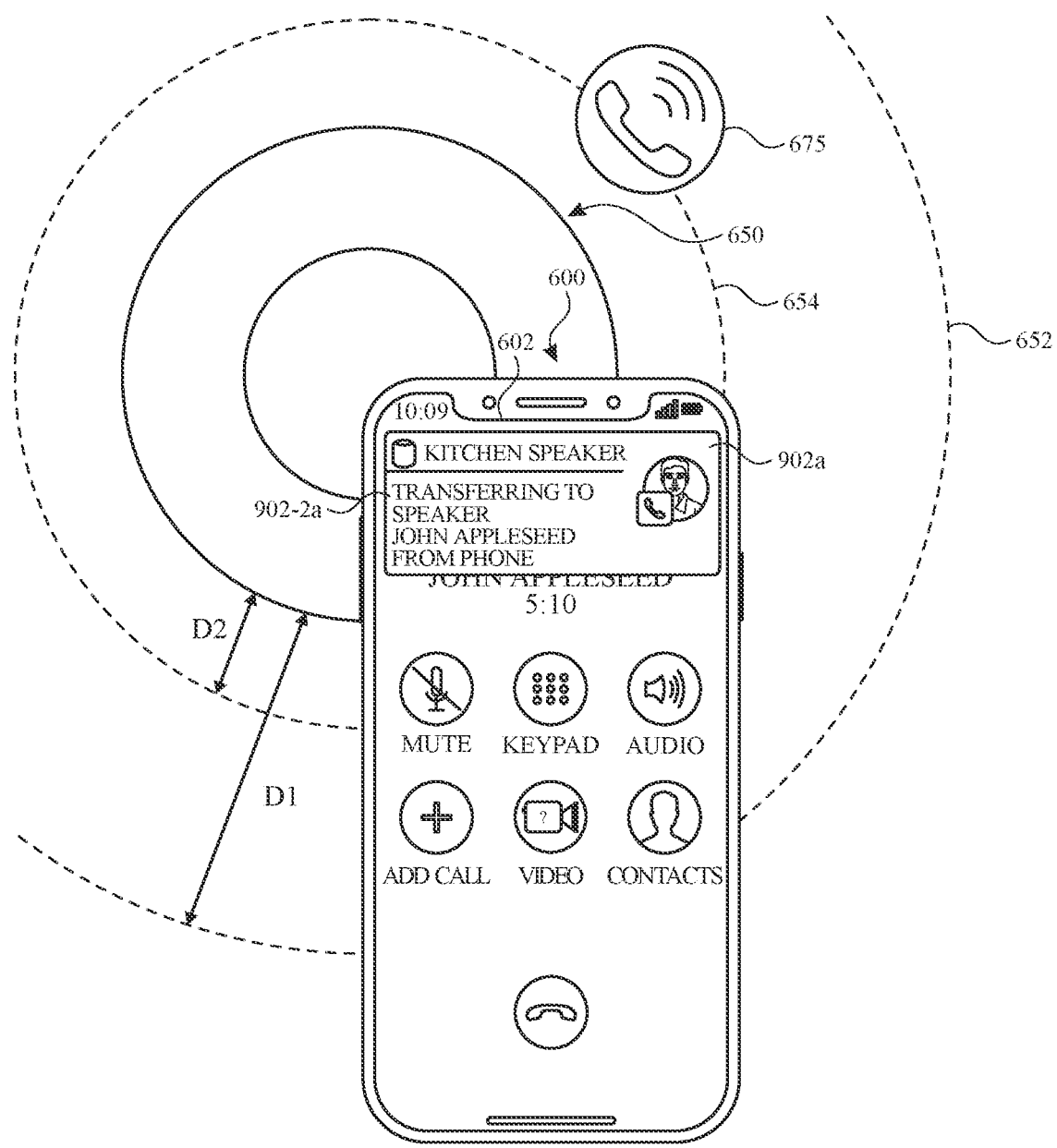

In response to detecting the indication that the physical proximity satisfies the playback proximity condition, device 600 initiates playback of the phone call on device 650. As shown in FIG. 9C, in response to detecting the indication that the physical proximity satisfies the playback proximity condition, device 600 displays updated media information affordance 902a (analogous to updated media information affordance 616a and 622a), with updated action indicator 902-2a to indicate that the phone call currently in process on device 600 is being transferred to device 600. In some embodiments, initiating playback of a phone call includes outputting audio of the phone call on device 650. In some embodiments, in response to detecting the indication that the physical proximity satisfies the playback proximity condition, device 650 begins receiving audio input for the phone call (e.g., audio received by device 650 is transmitted to the other participant). In some embodiments, device 600 remains the source of the phone call.

Figure 9D:
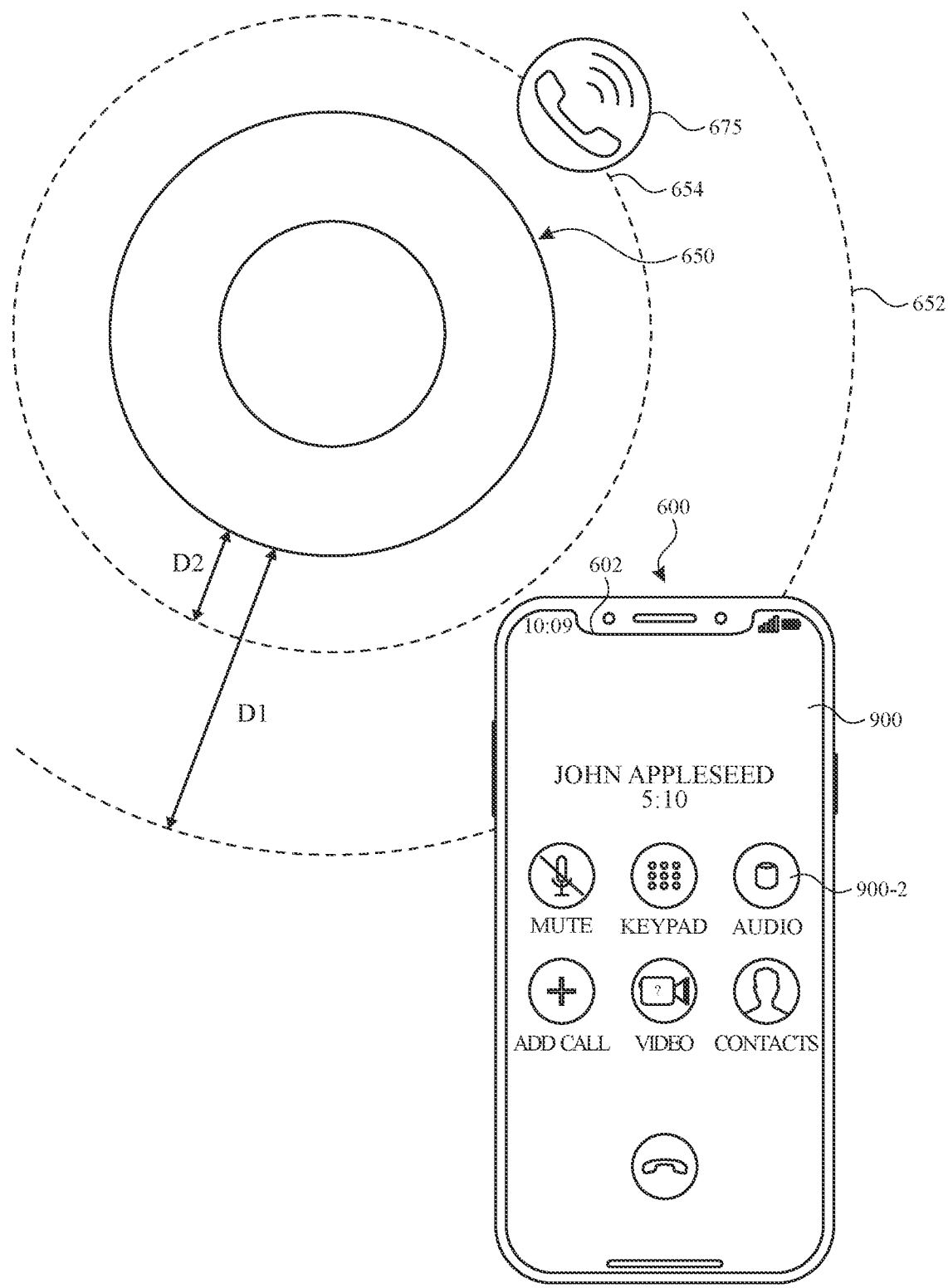

As shown in FIG. 9D, after displaying updated media information affordance 902a (e.g., in response to an indication that playback has successfully begun on device 650 or a predetermined amount of time after detecting the indication that the physical proximity satisfies the playback proximity condition or displaying media information affordance 902a), device 600 ceases displaying media information affordance 902a and updates user interface 900 to indicate that audio is being played back on device 650 (as indicated by updated audio status indicator 900-1a).

FIG. 10 is a flow diagram illustrating a method for controlling audio playback using an electronic device in accordance with some embodiments. Method 1000 is performed at a device (e.g., 100, 300, 500, or 600) with a display device (e.g., 602). Some operations in method 1000 are, optionally, combined, the orders of some operations are, optionally, changed, and some operations are, optionally, omitted.

As described below, method 1000 provides an intuitive way for controlling audio playback. The method reduces the cognitive burden on a user for controlling audio playback, thereby creating a more efficient human-machine interface. For battery-operated computing devices, enabling a user to control audio playback faster and more efficiently conserves power and increases the time between battery charges.

The electronic device detects (1002), while connected to an external device (e.g., 650), an indication that a physical proximity between the electronic device and the external device satisfies a first proximity condition (e.g., represented by 652). In some embodiments, the indication is provided in response to a determination that the physical proximity between the electronic device and the external device satisfies the first proximity condition. In some embodiments, the first proximity condition is satisfied if the distance between the electronic device and the external device is less than a first threshold distance (e.g., 6 inches, 12 inches, 18 inches, 24 inches).

In response to detecting the indication that the physical proximity satisfies the first proximity condition, the electronic device displays (1004), via the display device, a first media information affordance (e.g., 902) representing a first media item (e.g., a music track, an audio book (or portion thereof, such as a chapter), a podcast, a video, a phone call; a media item to be played on the electronic device (e.g., a media item that is currently playing on the electronic device, a most recent media item that was playing on the electronic device and has ended or has been stopped or paused, a media item that is scheduled to be played next on the electronic device, such as a first track in a playlist, when a user launches a media application or selects a playlist); a media item that is to be played on the external device). Displaying a first media information affordance representing a first media item in response to detecting the indication that the physical proximity satisfies the first proximity condition automatically provides feedback by indicating for the user that the physical proximity satisfies the proximity condition, thus reducing the number of inputs needed to display the first media information affordance. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the first media information affordance representing the first media item, the electronic device detects (1006) an indication that the physical proximity between the electronic device and the external device satisfies a second proximity condition (e.g., represented by 654). In some embodiments, the indication is provided in response to a determination that the physical proximity between the electronic device and the external device satisfies the second proximity condition. In some embodiments, the second proximity condition is satisfied if the distance between the electronic device and the external device is less than a second threshold distance, where the second threshold distance is less than the first threshold distance (e.g., 0 inches, 0.5 inches, 1 inch, 1.5 inches, 2 inches, less than 6 inches.). In some embodiments, the second proximity condition corresponds to the electronic device being closer to the external device than what is required to satisfy the first proximity condition (e.g., the proximity that is required to trigger display of the first media information affordance).

In response to detecting the indication that the physical proximity satisfies the second proximity condition, the electronic device initiates (1008) playback of the first media item (e.g., FIG. 9C). In some embodiments, initiating playback of the first media item is performed without detecting selection of the first media information affordance. In some embodiments, initiating playback of the first media item causes the first media item to be played on the electronic device. In some embodiments, initiating playback of the first media item causes the first media item to be played on the external device. In some embodiments, initiating playback of the first media item includes transmitting an instruction to the external device to initiate playback of the first media item on the external device. Initiating playback of the first media item in response to detecting the indication that the physical proximity satisfies the second proximity condition automatically provides feedback by indicating for the user that the physical proximity satisfies the proximity condition, thus reducing the number of inputs needed to display the first media information affordance. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first proximity condition is satisfied if the physical proximity between the electronic device and the external device is less than a first threshold distance (e.g., 652, D1). In some embodiments, the second proximity condition is satisfied if the physical proximity between the electronic device and the external device is less than a second threshold distance (e.g., 654, D2) that is less than the first threshold distance.

In some embodiments, the first media information affordance includes an indication (e.g., 902-1, 902-2) that identifies a device upon which playback of the first media item can be initiated. In some embodiments, the second media information affordance includes an indication that identifies the device upon which playback of the first media item is being initiated (e.g., a destination device). In some embodiments, the first media information affordance includes an indication of the device upon which playback of the first media item can be initiated and that selection of the first media information affordance will initiate playback of the first media item on the indicated device.

In some embodiments, as part of initiating playback of the first media item the electronic device alters (e.g., 902-2*a*) the visual appearance of the first media information affordance to indicate that playback of the first media item has been initiated. In some embodiments, altering the visual appearance of the first media information affordance includes displaying text indicating that playback of the first media item has been initiated, while, optionally, maintaining display of at least some information about the first media item. In some embodiments, altering the visual appearance of the first media information affordance includes replacing the indication that selection of the first media information affordance will initiate playback of the first media item with the indication (e.g., text) that playback of the first media item has been initiated.

In some embodiments, the first media information affordance indicates (e.g., 606-5, 622-4, 902-4) a type of media item corresponding to the first media item. Exemplary types of media items include, but are not limited to, a music track, an audio book, a podcast, a video, and a phone call. In some embodiments, the first media information affordance for a phone call media item includes an avatar of the participant of the call.

In some embodiments, as part of initiating playback of the first media item, in accordance with a determination that the first media item satisfies a data transmission condition (e.g., the first media item is provided by an application, service, or account not available to the device upon which playback of the first media item is being initiated), the electronic device transmits data for the first media item between the electronic device and the external device. In some embodiments, a queue of media items including the first media item exists on the device that is initially the source of the first media item prior to initiating playback. In some such embodiments, initiating playback includes transferring the queue to the device upon which playback of the first media item is being initiated. In some embodiments, as part of initiating playback of the first media item, in accordance with a determination that the first media item does not satisfy the data transmission condition (e.g., the first media item is provided by a particular application, service, or account to which the electronic device and the external device both have access), the electronic device forgoes transmitting data for the first media item between the electronic device and the external device. Transmitting data for the first media item between the electronic device and the external device (or not) based on whether the first media item satisfies a data transmission condition avoids a user having to provide additional inputs to transmit the data. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a queue of media items including the first media item exists (e.g., on the electronic device or the external device) prior to initiating playback. In some such embodiments, initiating playback includes transferring the queue between the electronic device and the external device. In some embodiments, the first media item is accessible to both the electronic device and the external device via a common user account. In some embodiments, the device upon which playback is initiated obtains the first media item from the common user account (e.g., playback of the first item does not include streaming the first media item between the electronic device and the external device). In some embodiments, the device upon which playback is initiated obtains the queue from the common user account.

In some embodiments, after initiating playback of the first media item, in response to a determination that a time condition is met (e.g., a threshold amount of time has passed since detecting the indication that the physical proximity satisfies the second proximity condition), the electronic device ceases displaying the first media information affordance representing the first media item (see, e.g., FIGS. 9C-9D).

In some embodiments, after displaying the first media information affordance representing the first media item and before detecting the indication that the physical proximity satisfies the second proximity condition, the electronic device detects an indication that the physical proximity between the electronic device and the external device satisfies a physical separation condition (e.g., represented by 656). In some embodiments, the indication is provided in response to a determination that the physical proximity between the electronic device and the external device satisfies the physical separation condition. In some embodiments, the physical separation condition is satisfied if the distance between the electronic device and the external device exceeds a predefined threshold distance. In some embodiments, the threshold distance associated with the physical separation condition is greater than a threshold distance (e.g., the first threshold distance) associated with the first proximity condition. For example, the physical separation condition is satisfied if the distance between the electronic device and the external device exceeds a third threshold distance (e.g., 20 feet), and the first proximity condition is satisfied if the distance between the electronic device and the external device is less than the first threshold distance (e.g., 1-2 feet), where the third threshold distance is greater than the first threshold distance. In some embodiments, after displaying the first media information affordance representing the first media item and before detecting the indication that the physical proximity satisfies the second proximity condition, in response to detecting the indication that the physical proximity satisfies the physical separation condition, the electronic device ceases displaying the first media information affordance representing the first media item (see, e.g., FIGS. 11C-11D). Ceasing displaying the first media information affordance representing the first media item in response to detecting the indication that the physical proximity satisfies the physical separation condition provides feedback to the user indicating that playback can no longer be initiated via selection of the first media information affordance. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, before detecting the indication that the physical proximity satisfies the second proximity condition, the electronic device detects an input (e.g., 610a, 610d, 610e, 610f) representing selection of the first media information affordance. In some embodiments, before detecting the indication that the physical proximity satisfies the second proximity condition, in response to receiving the first input, in accordance with a determination that the first input is a first type of input (e.g., a tap gesture on a touch-sensitive display of the electronic device at a location corresponding to the first media information affordance), the electronic device initiates playback of the first media item. In some embodiments, before detecting the indication that the physical proximity satisfies the second proximity condition, in response to receiving the first input, in accordance with a determination that the first input is a second type of input (e.g., a directional swipe gesture on the first media information affordance) different from the first type of input, the electronic device displays, via the display device, a second media information affordance (e.g., 608) representing the first media item, the second media information affordance different from the first media information affordance. Initiating playback of the first media item or displaying a second media information affordance representing the first media item depending on the type of input selecting the first media affordance provides additional control options related to the first media affordance without cluttering the user interface with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the second media information affordance representing the first media item, the electronic device receives a second input (e.g., 610c) representing selection of the second media information affordance. In some embodiments, in response to receiving the second input representing selection of the second media information affordance, the electronic device initiates playback of a second media item. In some embodiments, the second media item is the first media item. In some embodiments, the second media information affordance represents a queue of media items including a representation of the first media item and a representation of at least one other media item. In some such embodiments, the electronic device scrolls the queue in response to input (e.g., a horizontal swipe or drag gesture). In some embodiments, in response to an input corresponding to selection of a media item in the queue, the electronic device initiates playback of the selected media item. Displaying the second media information affordance (e.g., with additional information about the first media item) and initiating playback of a second media item in response to selection of the second media information affordance provides improved feedback by giving the user additional information and/or control over playback. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of initiating playback of the first media item, in accordance with a determination that the first media item is playing on the electronic device while detecting the indication that the physical proximity between the electronic device and the external device satisfies the second proximity condition (e.g., FIG. 6G), the electronic device ceases playing of the first media item on the electronic device and initiates playback of the first media item on the external device (e.g., FIG. 6I). In some embodiments, as part of initiating playback of the first media item, in accordance with a determination that the first media item is playing on the external device while detecting the indication that the physical proximity between the electronic device and the external device satisfies the second proximity condition, the electronic device ceases playing of the first media item on the external device and initiating playback of the first media item on the electronic device In some embodiments, the first media item is playing on the electronic device while detecting the indication that the physical proximity between the electronic device and the external device satisfies the first proximity condition (see, e.g., FIGS. 6G and 6K). In some embodiments, as part of initiating playback of the first media item includes initiating playback of the first media item on the external device. In some embodiments, the first media information affordance represents the first media item in accordance with a determination that the electronic device is playing the first media item at the time of detecting the indication that the first physical proximity between the electronic device and the external device satisfies the proximity condition. In some embodiments, transmitting the instruction to the external device to initiate playback of the first media item on the external device is performed in accordance with a determination that the first media item is currently playing on the electronic device. In some embodiments, initiating playback of the first media item includes ceasing playing the first media item on the electronic device.

In some embodiments, as part of initiating playback of the first media item on the external device, the electronic device ceases playing a third media item on the external device (e.g., FIG. 6L).

In some embodiments, in accordance with a determination that neither the electronic device nor the external device is playing a media item while detecting the indication that the physical proximity between the electronic device and the external device satisfies the first proximity condition (e.g., 6B), the first media item is a media item played on the electronic device most recently before detecting the indication that the physical proximity between the electronic device and the external device satisfies the first proximity condition. In some embodiments, as part of initiating playback of the first media item, the electronic device initiates playback of the first media item on the external device. In some embodiments, the first media information affordance represents the media item most recently played on the electronic device in accordance with a determination that the external device is not playing a media item at the time of detecting the indication that the physical proximity between the electronic device and the external device satisfies the proximity condition.

In some embodiments, in accordance with a determination that, while detecting the indication that the physical proximity between the electronic device and the external device satisfies the first proximity condition, the electronic device is not playing a media item and the external device is playing a media item (e.g., FIG. 6N), the first media item is the media item playing on the external device. In some embodiments, as part of initiating playback of the first media item, the electronic device initiates playback of the first media item on the electronic device.

Note that details of the processes described above with respect to method 1000 (e.g., FIG. 10) are also applicable in an analogous manner to the methods described above. For example, method 700 and/or method 800 optionally includes one or more of the characteristics of the various methods described above with reference to method 1000. For example, operations 1006 and 1008 of method 1000 can be applied to method 700 and/or method 800 to initiate playback of the first media item described in method 700 and/or method 800. For brevity, these details are not repeated below.

Figure 11A:
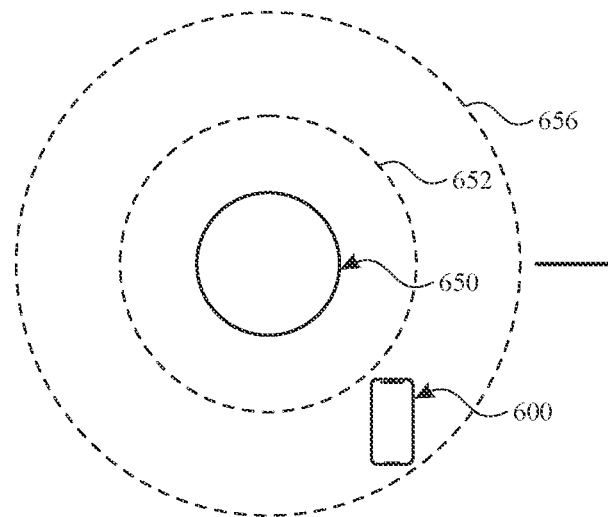
FIGS. 11A-11D illustrates exemplary user interfaces in accordance with some embodiments.

FIGS. 11A-11D illustrates techniques for ceasing display of graphical elements, such as, e.g., media information affordances 606, 608, 616, 620, 622, and 902. FIG. 11A illustrates device 600, device 650, and proximity condition range indicator 652, as described above. In addition, FIG. 11A includes element removal condition range indicator 656. Element removal condition range indicator 656 is included as a visual aid, and is intended to represent a range that would satisfy an element removal condition. Presence of a detectable device (e.g., 600) outside (e.g., partially or completely) element removal condition range indicator 656 would satisfy an element removal condition, but would not if the detectable device is located inside of element removal condition range indicator 656. The graphical representation of element removal condition range indicator 656 is not intended to limit the scope of determining whether an element removal condition is satisfied. Furthermore, the figures are not necessarily to scale and are included merely as a visual aid. Thus, unless otherwise noted, the size and scale of features depicted in the figures are not intended as a limitation on a distance required to satisfy element removal condition. However, element removal condition range indicator 656 is outside of proximity condition range indicator 652, such that device 600 must be farther away from device 650 to satisfy the element removal condition associated with element removal condition range indicator 656 than to satisfy the proximity condition associated with proximity condition range indicator 652.

Figure 11B:
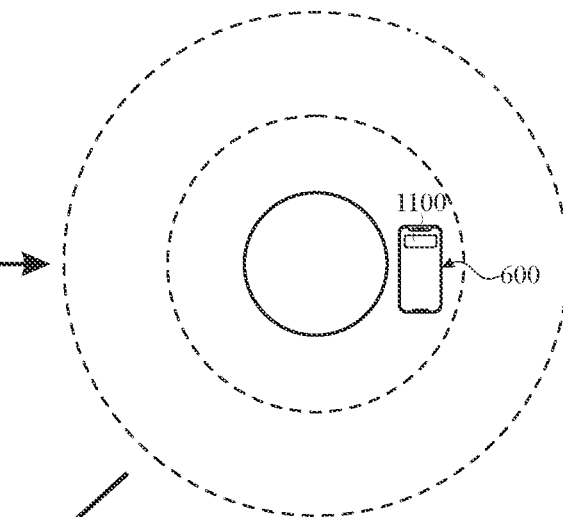

FIG. 11A illustrates a scenario in which device 600 is not inside of proximity condition range indicator 652 (e.g., FIG. 6A, 6F, 6J, 6M, or 9A). FIG. 11B illustrates that device 600 is moved at least partially inside of proximity condition range indicator 652 (e.g., FIG. 6B, 6G, 6K, 6N, or 9B). Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied). In response to detecting the indication that the physical proximity satisfies the proximity condition, device 600 displays media information affordance 1100 (e.g., media information affordance 606, 608, 616, 620, 622, or 902), which represents a media item. In some embodiments, the media item represented by media information affordance is based on the audio output status of device 600 and/or device 650, as described above.

Figure 11C:
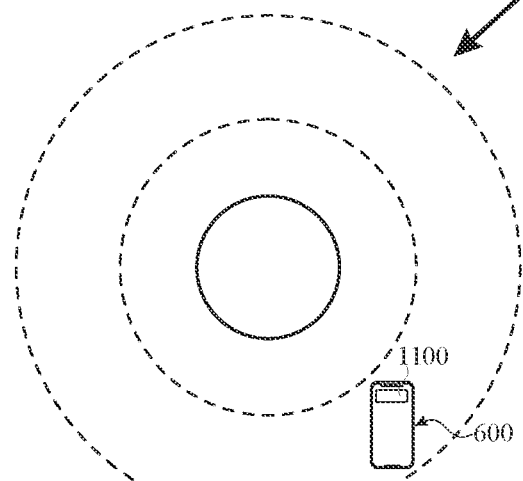

FIG. 11C illustrates that, while media information affordance 1100 is displayed, device 600 is moved outside of proximity condition range indicator 652, but remains within element removal condition range indicator 656. As shown in FIG. 11C, device 600 continues display of media information affordance 1100.

Figure 11D:
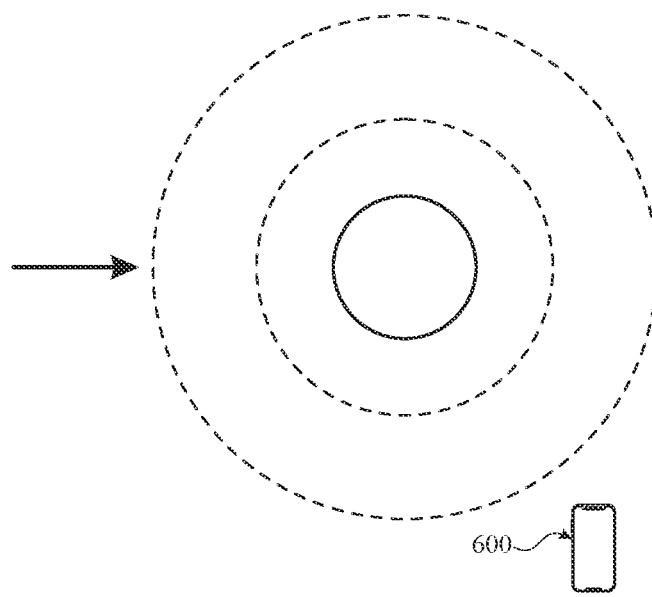

FIG. 11D illustrates that, while media information affordance 1100 is displayed, device 600 is moved outside of element removal condition range indicator 656. Since element removal condition range indicator 656 represents a physical range that satisfies the element removal condition, device 600 detects an indication that a physical range between device 600 and device 650 satisfies the element removal condition (e.g., and, in response, initiates communication with device 650, for example, to send an indication that the element removal condition is satisfied). In some examples, device 650 detects an indication that the element removal condition is satisfied (e.g., and, in response, initiates communication with device 600, for example, to send an indication that the element removal condition is satisfied). In response to detecting the indication that the physical range between device 600 and device 650 satisfies the element removal condition, device 600 ceases display of media information affordance 1100 (e.g., removes media information affordance 1100 from display 602).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of audio media. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, account information and/or user preferences for audio media services (e.g., streaming music services), data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide audio media that is of greater interest to the user. Accordingly, use of such personal information data enables users to have calculated control of the provided content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of streaming audio services, the present technology can be configured to allow users to select to "opt in" or "opt out" of participation in the collection of personal information data during registration for services or anytime thereafter. In another example, users can select not to provide user preferences or account information for streaming audio services. In yet another example, users can select to limit the length of time preference data is maintained or entirely prohibit the development of a baseline preference profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, audio content can be selected and delivered to users by inferring preferences based on non-personal information data or a bare minimum amount of personal information, such as the content being requested by the device associated with a user, other non-personal information available to the audio content delivery services, or publicly available information.

What is claimed is:
1. An electronic device, comprising:
    a display device;
    one or more processors; and
    memory storing one or more programs configured to be executed by the one or more processors, the one or more programs including instructions for:
        detecting, while connected to an external device, an indication that a physical proximity between the electronic device and the external device satisfies a proximity condition, wherein the physical proximity satisfies the proximity condition when the electronic device is within a first distance from the external device;
        in response to detecting the indication that the physical proximity satisfies the proximity condition, displaying, via the display device, a first media information affordance representing a first media item that is currently playing on the external device, the first media information affordance including a first set of information about the first media item;

receiving a first input representing selection of the first media information affordance;

in response to receiving the first input:
  in accordance with a determination that the first input is a first type of input, initiating playback of the first media item on the electronic device; and
  in accordance with a determination that the first input is a second type of input different from the first type of input, displaying, via the display device, a second media information affordance representing the first media item, the second media information affordance different from the first media information affordance and including a second set of information about the first media item; and after displaying the first media information affordance:
  in accordance with a determination that a distance between the electronic device and the external device is between the first distance and a second distance from the external device that is greater than the first distance, continuing to display, via the display device, the first media information affordance; and
  in accordance with a determination that the distance between the electronic device and the external device is greater than the second distance, ceasing to display, via the display device, the first media information affordance.

2. The electronic device of claim 1, wherein displaying the first media information affordance representing the first media item that is currently playing on the external device is performed in accordance with a determination that the electronic device is not playing an audio media item at a time of detecting the indication that the physical proximity between the electronic device and the external device satisfies the proximity condition.

3. The electronic device of claim 1, wherein the first media information affordance includes an indication that identifies the electronic device.

4. The electronic device of claim 1, wherein the one or more programs further include instructions for:
  in response to receiving the first input and in accordance with a determination that the first input is the first type of input, altering a visual appearance of the first media information affordance to indicate that playback of the first media item on the electronic device has been initiated.

5. The electronic device of claim 1, wherein the first media information affordance includes an indication that identifies the external device as a source of the first media item.

6. The electronic device of claim 1, wherein the first set of information about the first media item indicates a type of media item corresponding to the first media item.

7. The electronic device of claim 1, wherein initiating playback of the first media item on the electronic device includes:
  in accordance with a determination that the first media item satisfies a data transmission condition, receiving data for the first media item from the external device; and
  in accordance with a determination that the first media item does not satisfy the data transmission condition, foregoing receiving data for the first media item from the external device.

8. The electronic device of claim 1, wherein the one or more programs further include instructions for:
  after initiating playback of the first media item on the electronic device, in response to a determination that a time condition is met, ceasing displaying the first media information affordance representing the first media item.

9. The electronic device of claim 1, wherein the first type of input includes a tap gesture and the second type of input includes a swipe or drag gesture.

10. The electronic device of claim 1, wherein the one or more programs further include instructions for:
  while displaying the second media information affordance representing the first media item, receiving a second input representing selection of the second media information affordance; and
  in response to receiving the second input representing selection of the second media information affordance, initiating playback of a second media item on the electronic device.

11. The electronic device of claim 1, wherein the one or more programs further include instructions for:
  in response to receiving the first input and in accordance with a determination that the first input is the first type of input, ceasing playing the first media item on the external device.

12. A non-transitory computer-readable storage medium storing one or more programs configured to be executed by one or more processors of an electronic device with a display device, the one or more programs including instructions for:
  detecting, while connected to an external device, an indication that a physical proximity between the electronic device and the external device satisfies a proximity condition, wherein the physical proximity satisfies the proximity condition when the electronic device is within a first distance from the external device;
  in response to detecting the indication that the physical proximity satisfies the proximity condition, displaying, via the display device, a first media information affordance representing a first media item that is currently playing on the external device, the first media information affordance including a first set of information about the first media item;
  receiving a first input representing selection of the first media information affordance;
  in response to receiving the first input:
    in accordance with a determination that the first input is a first type of input, initiating playback of the first media item on the electronic device; and
    in accordance with a determination that the first input is a second type of input different from the first type of input, displaying, via the display device, a second media information affordance representing the first media item, the second media information affordance different from the first media information affordance and including a second set of information about the first media item; and
  after displaying the first media information affordance:
    in accordance with a determination that a distance between the electronic device and the external device is between the first distance and a second distance from the external device that is greater than the first distance, continuing to display, via the display device, the first media information affordance; and
    in accordance with a determination that the distance between the electronic device and the external device is greater than the second distance, ceasing to display, via the display device, the first media information affordance.

13. The non-transitory computer-readable storage medium of claim 12, wherein displaying the first media information affordance representing the first media item that is currently playing on the external device is performed in accordance with a determination that the electronic device is not playing an audio media item at a time of detecting the indication that the physical proximity between the electronic device and the external device satisfies the proximity condition.

14. The non-transitory computer-readable storage medium of claim 12, wherein the first media information affordance includes an indication that identifies the electronic device.

15. The non-transitory computer-readable storage medium of claim 12, wherein the one or more programs further include instructions for:
   in response to receiving the first input and in accordance with a determination that the first input is the first type of input, altering a visual appearance of the first media information affordance to indicate that playback of the first media item on the electronic device has been initiated.

16. The non-transitory computer-readable storage medium of claim 12, wherein the first media information affordance includes an indication that identifies the external device as a source of the first media item.

17. The non-transitory computer-readable storage medium of claim 12, wherein the first set of information about the first media item indicates a type of media item corresponding to the first media item.

18. The non-transitory computer-readable storage medium of claim 12, wherein initiating playback of the first media item on the electronic device includes:
   in accordance with a determination that the first media item satisfies a data transmission condition, receiving data for the first media item from the external device; and
   in accordance with a determination that the first media item does not satisfy the data transmission condition, foregoing receiving data for the first media item from the external device.

19. The non-transitory computer-readable storage medium of claim 12, wherein the one or more programs further include instructions for:
   after initiating playback of the first media item on the electronic device, in response to a determination that a time condition is met, ceasing displaying the first media information affordance representing the first media item.

20. The non-transitory computer-readable storage medium of claim 12, wherein the first type of input includes a tap gesture and the second type of input includes a swipe or drag gesture.

21. The non-transitory computer-readable storage medium of claim 12, wherein the one or more programs further include instructions for:
   while displaying the second media information affordance representing the first media item, receiving a second input representing selection of the second media information affordance; and
   in response to receiving the second input representing selection of the second media information affordance, initiating playback of a second media item on the electronic device.

22. The non-transitory computer-readable storage medium of claim 12, wherein the one or more programs further include instructions for:
   in response to receiving the first input and in accordance with a determination that the first input is the first type of input, ceasing playing the first media item on the external device.

23. A method, comprising:
   at an electronic device with a display device:
      detecting, while connected to an external device, an indication that a physical proximity between the electronic device and the external device satisfies a proximity condition, wherein the physical proximity satisfies the proximity condition when the electronic device is within a first distance from the external device;
      in response to detecting the indication that the physical proximity satisfies the proximity condition, displaying, via the display device, a first media information affordance representing a first media item that is currently playing on the external device, the first media information affordance including a first set of information about the first media item;
      receiving a first input representing selection of the first media information affordance;
      in response to receiving the first input:
         in accordance with a determination that the first input is a first type of input, initiating playback of the first media item on the electronic device; and
         in accordance with a determination that the first input is a second type of input different from the first type of input, displaying, via the display device, a second media information affordance representing the first media item, the second media information affordance different from the first media information affordance and including a second set of information about the first media item; and
      after displaying the first media information affordance:
         in accordance with a determination that a distance between the electronic device and the external device is between the first distance and a second distance from the external device that is greater than the first distance, continuing to display, via the display device, the first media information affordance; and
         in accordance with a determination that the distance between the electronic device and the external device is greater than the second distance, ceasing to display, via the display device, the first media information affordance.

24. The method of claim 23, wherein displaying the first media information affordance representing the first media item that is currently playing on the external device is performed in accordance with a determination that the electronic device is not playing an audio media item at a time of detecting the indication that the physical proximity between the electronic device and the external device satisfies the proximity condition.

25. The method of claim 23, wherein the first media information affordance includes an indication that identifies the electronic device.

26. The method of claim 23, further comprising:
   in response to receiving the first input and in accordance with a determination that the first input is the first type of input, altering a visual appearance of the first media information affordance to indicate that playback of the first media item on the electronic device has been initiated.

27. The method of claim 23, wherein the first media information affordance includes an indication that identifies the external device as a source of the first media item.

28. The method of claim 23, wherein the first set of information about the first media item indicates a type of media item corresponding to the first media item.

29. The method of claim 23, wherein initiating playback of the first media item on the electronic device includes:
in accordance with a determination that the first media item satisfies a data transmission condition, receiving data for the first media item from the external device; and
in accordance with a determination that the first media item does not satisfy the data transmission condition, foregoing receiving data for the first media item from the external device.

30. The method of claim 23, further comprising:
after initiating playback of the first media item on the electronic device, in response to a determination that a time condition is met, ceasing displaying the first media information affordance representing the first media item.

31. The method of claim 23, wherein the first type of input includes a tap gesture and the second type of input includes a swipe or drag gesture.

32. The method of claim 23, further comprising:
while displaying the second media information affordance representing the first media item, receiving a second input representing selection of the second media information affordance; and
in response to receiving the second input representing selection of the second media information affordance, initiating playback of a second media item on the electronic device.

33. The method of claim 23, further comprising:
in response to receiving the first input and in accordance with a determination that the first input is the first type of input, ceasing playing the first media item on the external device.

\* \* \* \* \*